(12) United States Patent
Ishii

(10) Patent No.: US 12,720,390 B2
(45) Date of Patent: Aug. 25, 2026

(54) VALIDITY OF NETWORK SLICE-RELATED INFORMATION PROVIDED BY DEDICATED SIGNALING

(71) Applicant: SHARP KABUSHIKI KAISHA, Sakai City (JP)

(72) Inventor: Atsushi Ishii, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 344 days.

(21) Appl. No.: 18/289,055

(22) PCT Filed: Mar. 28, 2022

(86) PCT No.: PCT/JP2022/014769
§ 371 (c)(1),
(2) Date: Oct. 31, 2023

(87) PCT Pub. No.: WO2022/234744
PCT Pub. Date: Nov. 10, 2022

(65) Prior Publication Data

US 2024/0224144 A1 Jul. 4, 2024

Related U.S. Application Data

(60) Provisional application No. 63/184,722, filed on May 5, 2021.

(51) Int. Cl.
*H04W 36/08* (2009.01)
*H04W 48/18* (2009.01)
(Continued)

(52) U.S. Cl.
CPC ........... *H04W 36/08* (2013.01); *H04W 48/18* (2013.01); *H04W 60/04* (2013.01); *H04W 76/20* (2018.02)

(58) Field of Classification Search
CPC ..... H04W 36/08; H04W 76/20; H04W 48/18; H04W 60/04
See application file for complete search history.

(56) References Cited

U.S. PATENT DOCUMENTS

2021/0227438 A1 7/2021 Xu
2022/0345997 A1 10/2022 Kuge et al.
(Continued)

FOREIGN PATENT DOCUMENTS

JP 2021-057671 A 4/2021
WO 2020/252874 A1 12/2020

OTHER PUBLICATIONS

3GPP TS 38.331 V16.3.1 (Jan. 2021) 3rd Generation Partnership Project; Technical Specification Group Radio Access Network; NR; Radio Resource Control (RRC) protocol specification (Release 16).
(Continued)

*Primary Examiner* — Justin Y Lee
(74) *Attorney, Agent, or Firm* — ScienBiziP, P.C.

(57) ABSTRACT

A wireless terminal communicates with an access node of a radio access network which supports one or more network slices. The wireless terminal comprises transmitter circuitry, receiver circuitry, and processor circuitry. The transmitter circuitry is configured to transmit a request message comprising one or more identifiers of requested network slices. The receiver circuitry is configured to receive, in response to the request message, a response message comprising one or more tracking area identities as a registration area (RA) and one or more network slice identifiers indicating allowed network slices in the RA. The receiver circuitry is further configured to receive a dedicated message comprising dedicated network slice-related information associated with the allowed network slices. The processor circuitry is config-
(Continued)

ured to discard the dedicated network slice-related information upon occurrence of a predetermined event.

5 Claims, 64 Drawing Sheets

(51) Int. Cl.
*H04W 60/04* (2009.01)
*H04W 76/20* (2018.01)

(56) References Cited

U.S. PATENT DOCUMENTS

2023/0371011 A1* 11/2023 Fu ........................ H04W 48/18
2023/0388879 A1* 11/2023 Fu ........................ H04W 48/16

OTHER PUBLICATIONS

3GPP TS 38.304 V16.3.0 (Dec. 2020) 3rd Generation Partnership Project; Technical Specification Group Radio Access Network; NR; User Equipment (UE) procedures in Idle mode and RRC Inactive state (Release 16).
3GPP TS 24.501 V15.4.0 (Jun. 2019) 3rd Generation Partnership Project; Technical Specification Group Core Network and Terminals; Non-Access-Stratum (NAS) protocol for 5G System (5GS); Stage 3 (Release 15).
Intel Corporation (rapporteur), "Summary of [AT113b-e][251][NR] Slice-specific cell reselection (Intel)", draft-R2-2104321, 3GPP TSG-RAN WG2 Meeting #113b-e, Electronic meeting, Apr. 12-20, 2021.
Samsung, "Discussion on slice based cell reselection", R2-2104176, 3GPP TSG-RAN WG2 Meeting #113bis-e, Online, Apr. 12-Apr. 20, 2021.
ZTE Corporation et al., "Discussion on slice-aware cell reselection", R2-2104063, 3GPP TSG-RAN WG2 Meeting#113bis-e, Electronic, Apr. 12-20, 2021.
CATT, "Discussion on slice based Cell Reselection", R2-2104032, 3GPP TSG-RAN WG2 Meeting #113bis electronic, Online, Apr. 12-Apr. 20, 2021.
Huawei et al., "Discussion on slice based cell reselection under network control", R2-2104004, 3GPP TSG-RAN WG2 Meeting #113bis-e electronic, Online, Apr. 12-20, 2021.
Sharp, "System information contents for slice-aware cell reselection", R2-2103961, 3GPP TSG RAN WG2 Meeting #113-bis-e, Apr. 12-20, 2021.
Apple, "Discussion on slice based cell reselection", R2-2103881, 3GPP TSG-RAN WG2 Meeting #113bis-e, Electronic, Apr. 12-Apr. 20, 2021.
Google, "Slice-specific system information for cell reselection", R2-2103745, 3GPP TSG-RAN WG2 Meeting#113bis-e, Online, Apr. 12-20, 2021.
CMCC, "Discussion on slice based cell reselection", R2-2103695, 3GPP TSG-RAN WG2 Meeting #113bis-e, Electronic Meeting, Apr. 12-20, 2021.
Nokia et al., "Slice-based cell reselection information", R2-2103668, 3GPP TSG-RAN WG2 Meeting #113bis Electronic, Apr. 12-20, 2021.
Ericsson, "On solution for RAN slicing enhancement", Tdoc R2-2103646, 3GPP TSG-RAN WG2 #113bis-e, Electronic meeting, Apr. 12, 2021-Apr. 20, 2021.
LG Electronics Inc., "Discussion on slice based cell reselection", R2-2103621, 3GPP TSG-RAN2 #113bis-e, Electronic meeting, Apr. 12-20, 2021.
Sony, "Slice based Cell Reselection", R2-2103589, 3GPP TSG RAN WG2 Meeting# 113bis electronic, Online, Apr. 12-Apr. 20, 2021.
Vivo, "Slice based cell reselection", R2-2103375, 3GPP TSG-RAN WG2 Meeting #113b e, E-Meeting, Apr. 12-20, 2021.
Asia Pacific Telecom, et al., "Cell (re)selection for RAN slicing", R2-2103269, 3GPP TSG-RAN WG2 Meeting #113bis electronic, Online, Apr. 12-Apr. 20, 2021.
Spreadtrum Communications, "Discussion on slice based cell reselection", R2-2103239, 3GPP TSG-RAN WG2 Meeting #113bis electronic, Online, Apr. 12-20, 2021.
Oppo, "Consideration on slice-specific cell reselection", R2-2103213, 3GPP TSG-RAN WG2 #113bis-e, E-meeting, Apr. 2021.
China Telecommunication, "Discussion on slice based cell reselection", R2-2103159, 3GPP TSG-RAN WG2 Meeting #113bis electronic, Online, Apr. 12-Apr. 20, 2021.
Lenovo et al., "Considerations on slice-based cell reselection", R2-2102988, 3GPP TSG RAN WG2 Meeting #113bis-e, Electronic, Apr. 12-20, 2021.
Intel Corporation, "Slice specific cell (re)selection", R2-2102831, 3GPP TSG RAN WG2 Meeting #113bis-e, E-Meeting, Apr. 12-20, 2021.
KDDI Corporation, "Considerations on contents of slice related cell selection info", R2-2102773, 3GPP TSG-RAN WG2 Meeting #113 electronic, Online, Apr. 12-Apr. 20, 2021.
Xiaomi, "Considerations on slice based cell reselection", R2-2102762, 3GPP TSG-RAN WG2 Meeting #113 bis electronic, Online, Apr. 12-20, 2021.
Qualcomm Incorporated, "Slice specific cell reselection", R2-2102696, 3GPP TSG RAN WG2 Meeting #113bis-e, E-Conference, Apr. 12-20, 2021.
3GPP TR 23.740 V16.0.0 (Dec. 2018) 3rd Generation Partnership Project; Technical Specification Group Services and System Aspects; Study on Enhancement of Network Slicing (Release 16).
3GPP TS 24.501 V16.4.1 (Mar. 2020) 3rd Generation Partnership Project; Technical Specification Group Core Network and Terminals; Non-Access-Stratum (NAS) protocol for 5G System (5GS); Stage 3; (Release 16).
3GPP TS 23.501 V16.4.0 (Mar. 2020) 3rd Generation Partnership Project; Technical Specification Group Services and System Aspects; System architecture for the 5G System (5GS); Stage 2 (Release 16).
3GPP TS 38.331 V16.1.0 (Jul. 2020) 3rd Generation Partnership Project; Technical Specification Group Radio Access Network; NR; Radio Resource Control (RRC) protocol specification (Release 16).
3GPP TS 38.304 V16.1.0 (Jul. 2020) 3rd Generation Partnership Project; Technical Specification Group Radio Access Network; NR; User Equipment (UE) procedures in Idle mode and RRC Inactive state (Release 16).
3GPP TS 38.300 V16.1.0 (Mar. 2020) 3rd Generation Partnership Project; Technical Specification Group Radio Access Network; NR; NR and NG-RAN Overall Description; Stage 2 (Release 16).

* cited by examiner

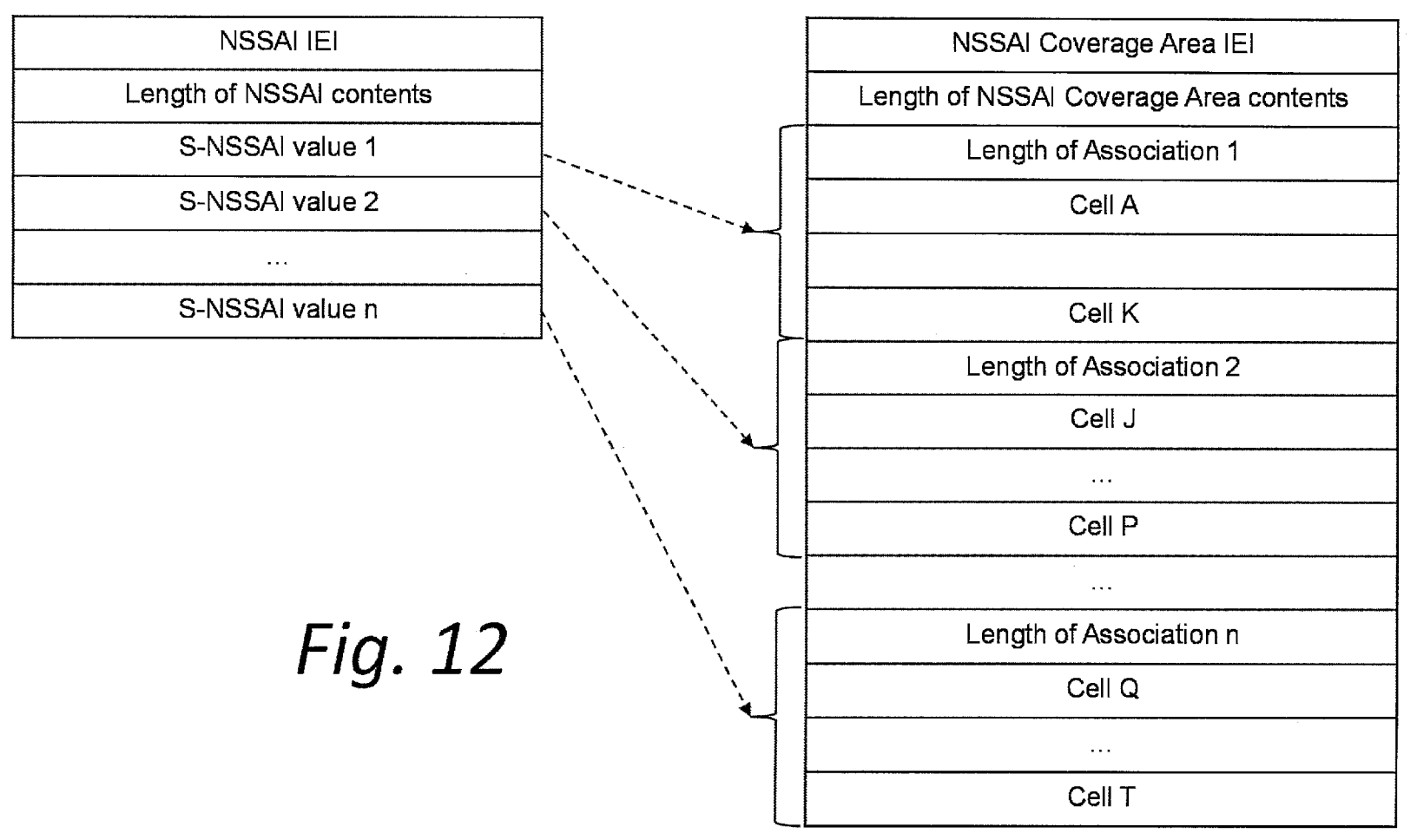

NSSAI Coverage Area IEI
Length of NSSAI Coverage Area contents
Length of Association 1
Cell A
Cell K
Length of Association 2
Cell J
...
Cell P
...
Length of Association n
Cell Q
...
Cell T NSSAI IEI
Length of NSSAI contents
S-NSSAI value 1
S-NSSAI value 2
...
S-NSSAI value n

Fig. 12

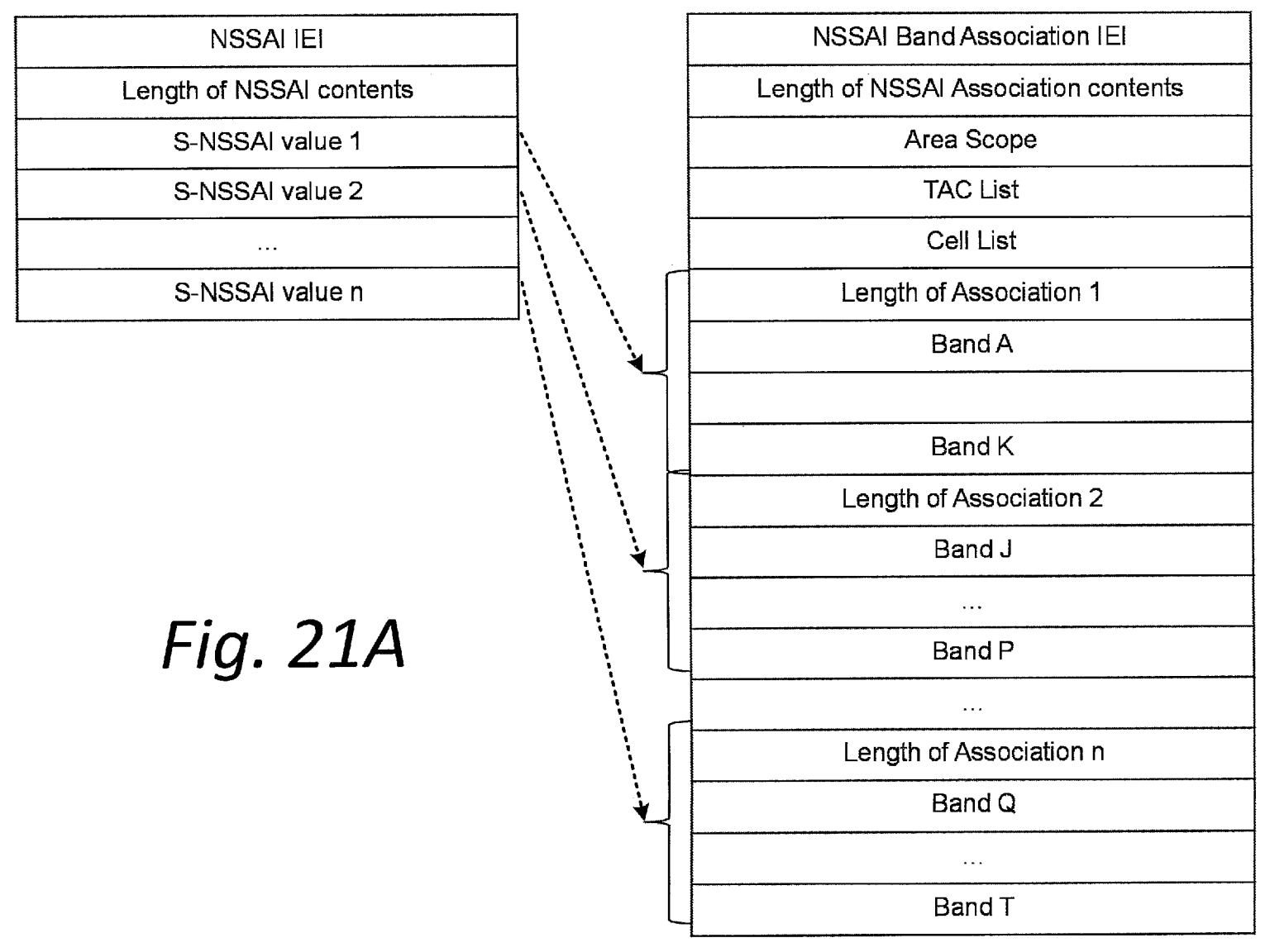

NSSAI Band Association IEI
Length of NSSAI Association contents
Area Scope
TAC List
Cell List
Length of Association 1
Band A
Band K
Length of Association 2
Band J
...
Band P
...
Length of Association n
Band Q
...
Band T NSSAI IEI
Length of NSSAI contents
S-NSSAI value 1
S-NSSAI value 2
...
S-NSSAI value n

Fig. 21A

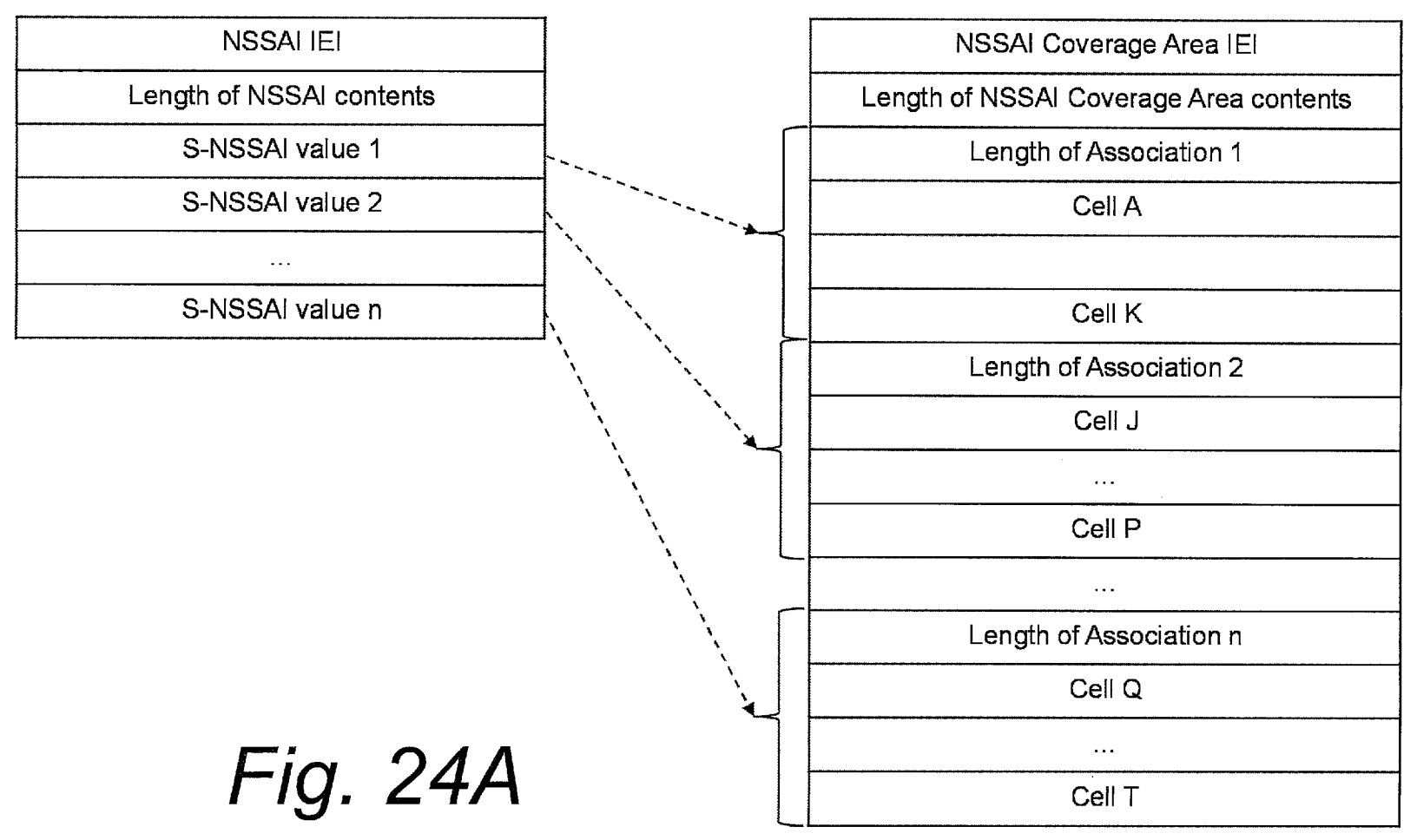

NSSAI Coverage Area IEI
Length of NSSAI Coverage Area contents
Length of Association 1
Cell A
Cell K
Length of Association 2
Cell J
...
Cell P
...
Length of Association n
Cell Q
...
Cell T NSSAI IEI
Length of NSSAI contents
S-NSSAI value 1
S-NSSAI value 2
...
S-NSSAI value n

Fig. 24A

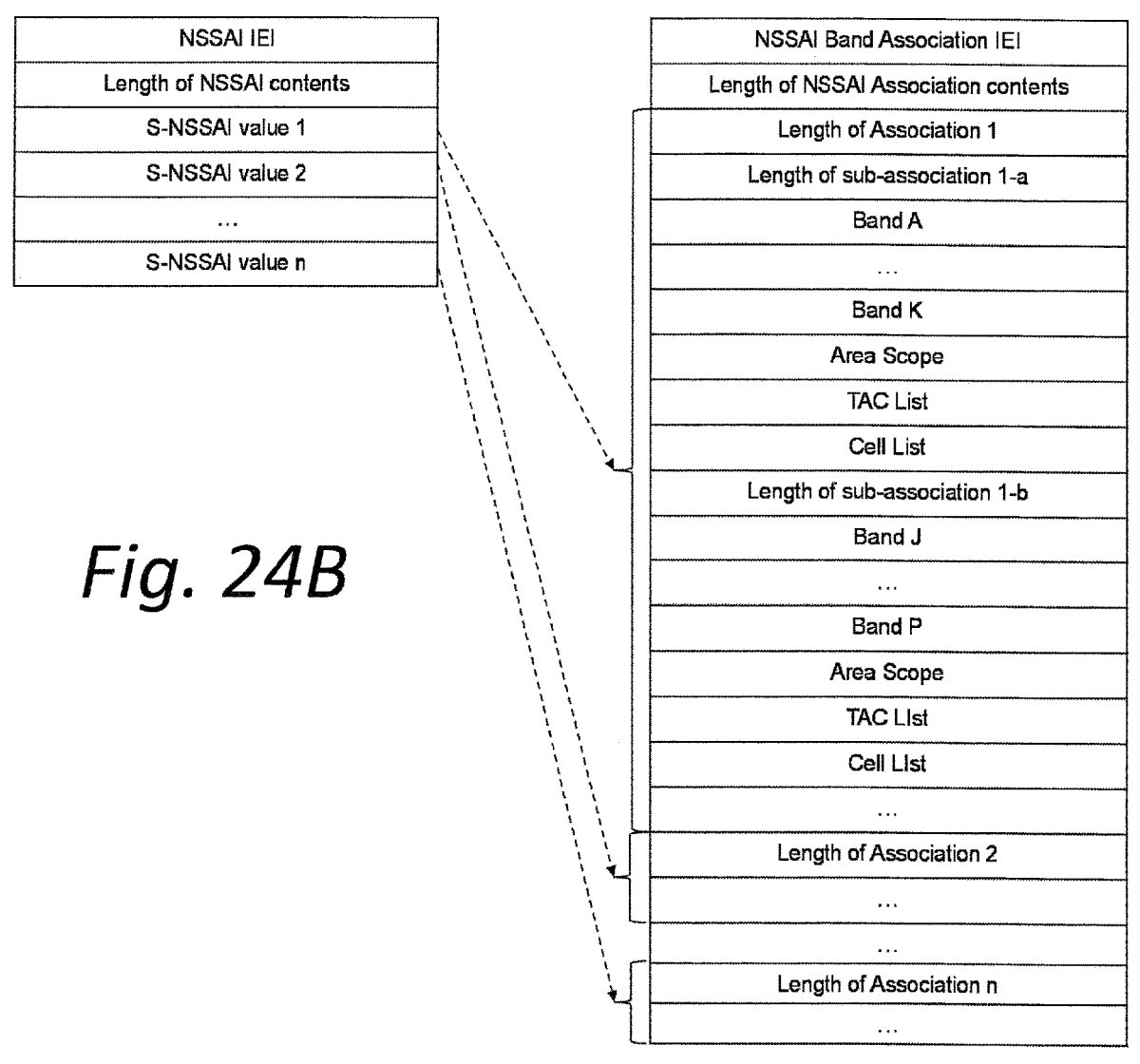

| NSSAI IEI |
| --- |
| Length of NSSAI contents |
| S-NSSAI value 1 |
| S-NSSAI value 2 |
| ... |
| S-NSSAI value n |

| NSSAI Band Association IEI |
| --- |
| Length of NSSAI Association contents |
| Length of Association 1 |
| Length of sub-association 1-a |
| Band A |
| ... |
| Band K |
| Area Scope |
| TAC List |
| Cell List |
| Length of sub-association 1-b |
| Band J |
| ... |
| Band P |
| Area Scope |
| TAC List |
| Cell List |
| ... |
| Length of Association 2 |
| ... |
| ... |
| Length of Association n |
| ... |

Fig. 24B

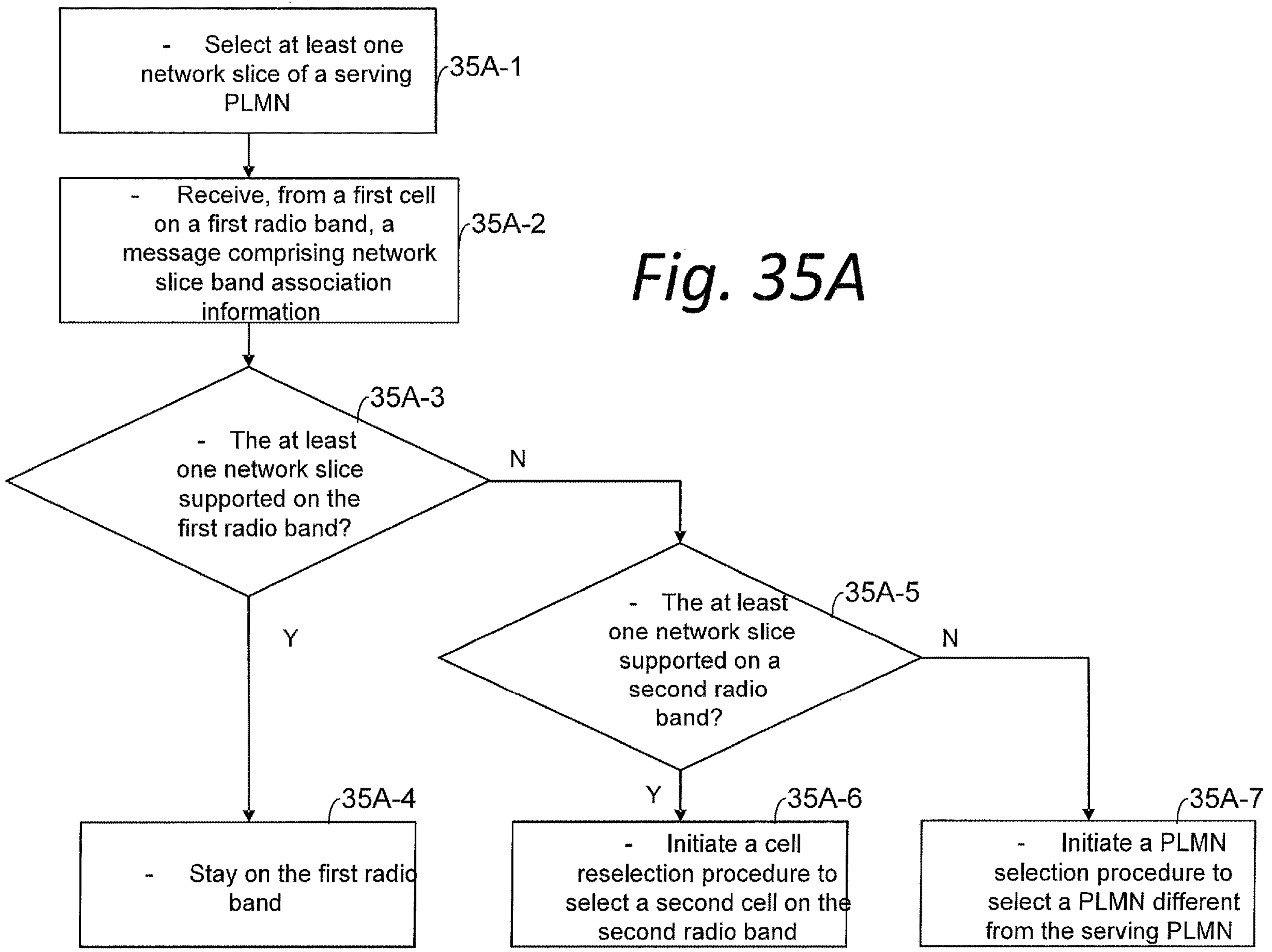
- Select at least one network slice of a serving PLMN
35A-1
- Receive, from a first cell on a first radio band, a message comprising network slice band association information
35A-2
Fig. 35A
- The at least one network slice supported on the first radio band?
35A-3
N
Y
- The at least one network slice supported on a second radio band?
35A-5
N
Y
35A-4
- Stay on the first radio band
35A-6
- Initiate a cell reselection procedure to select a second cell on the second radio band
35A-7
- Initiate a PLMN selection procedure to select a PLMN different from the serving PLMN GENERATING MINIMUM SYSTEM INFORMATION (SI) COMPRISING SERVING CELL NETWORK SLICE INFORMATION — 41-1

Figure 41:
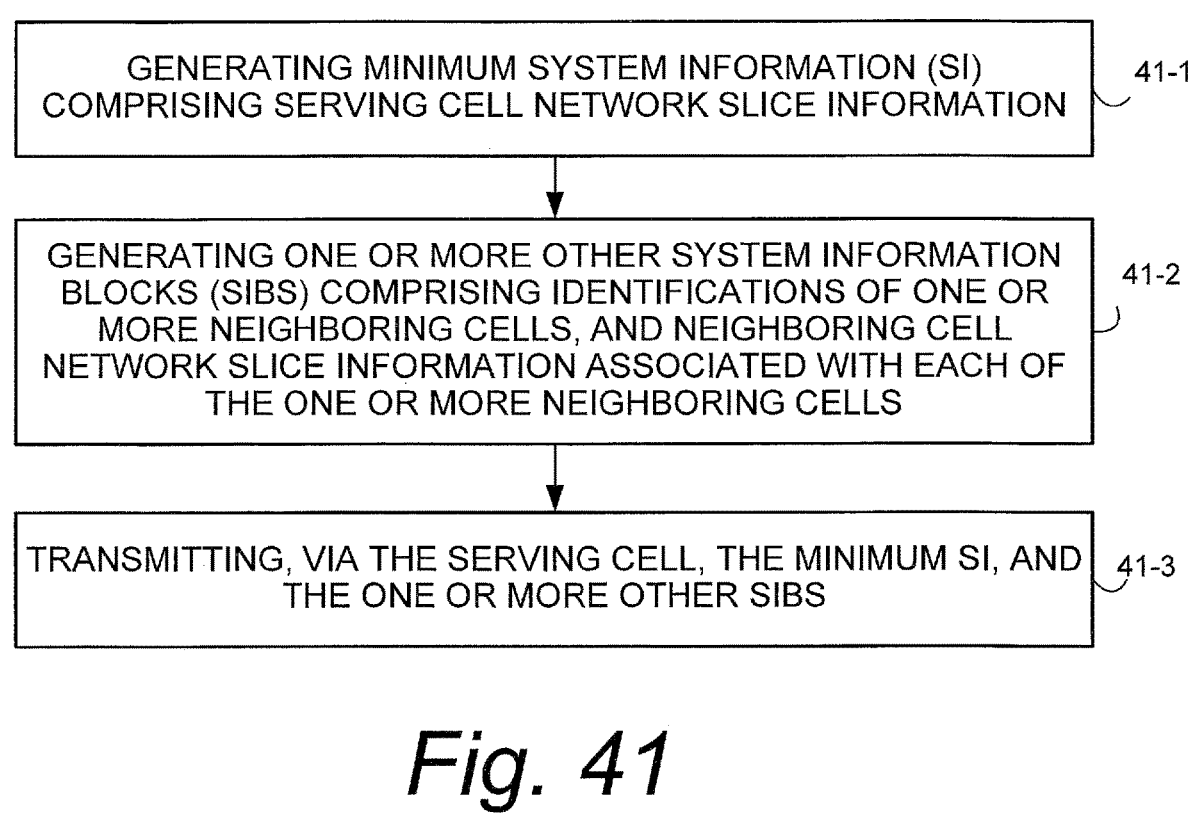

GENERATING ONE OR MORE OTHER SYSTEM INFORMATION BLOCKS (SIBS) COMPRISING IDENTIFICATIONS OF ONE OR MORE NEIGHBORING CELLS, AND NEIGHBORING CELL NETWORK SLICE INFORMATION ASSOCIATED WITH EACH OF THE ONE OR MORE NEIGHBORING CELLS — 41-2

TRANSMITTING, VIA THE SERVING CELL, THE MINIMUM SI, AND THE ONE OR MORE OTHER SIBS — 41-3

SELECTING AT LEAST ONE NETWORK SLICE AS AN INTENDED NETWORK SLICE

PERFORMING A CELL SELECTION PROCEDURE, TO DETERMINE WHETHER OR NOT TO RESELECT ONE OF THE ONE OR MORE NEIGHBORING CELLS, BASED ON THE INTENDED NETWORK SLICE AND THE THE PRIORITY INFORMATION ASSOCIATED WITH THE ONE OF THE ONE OR MORE NEIGHBORING CELLS 45-3

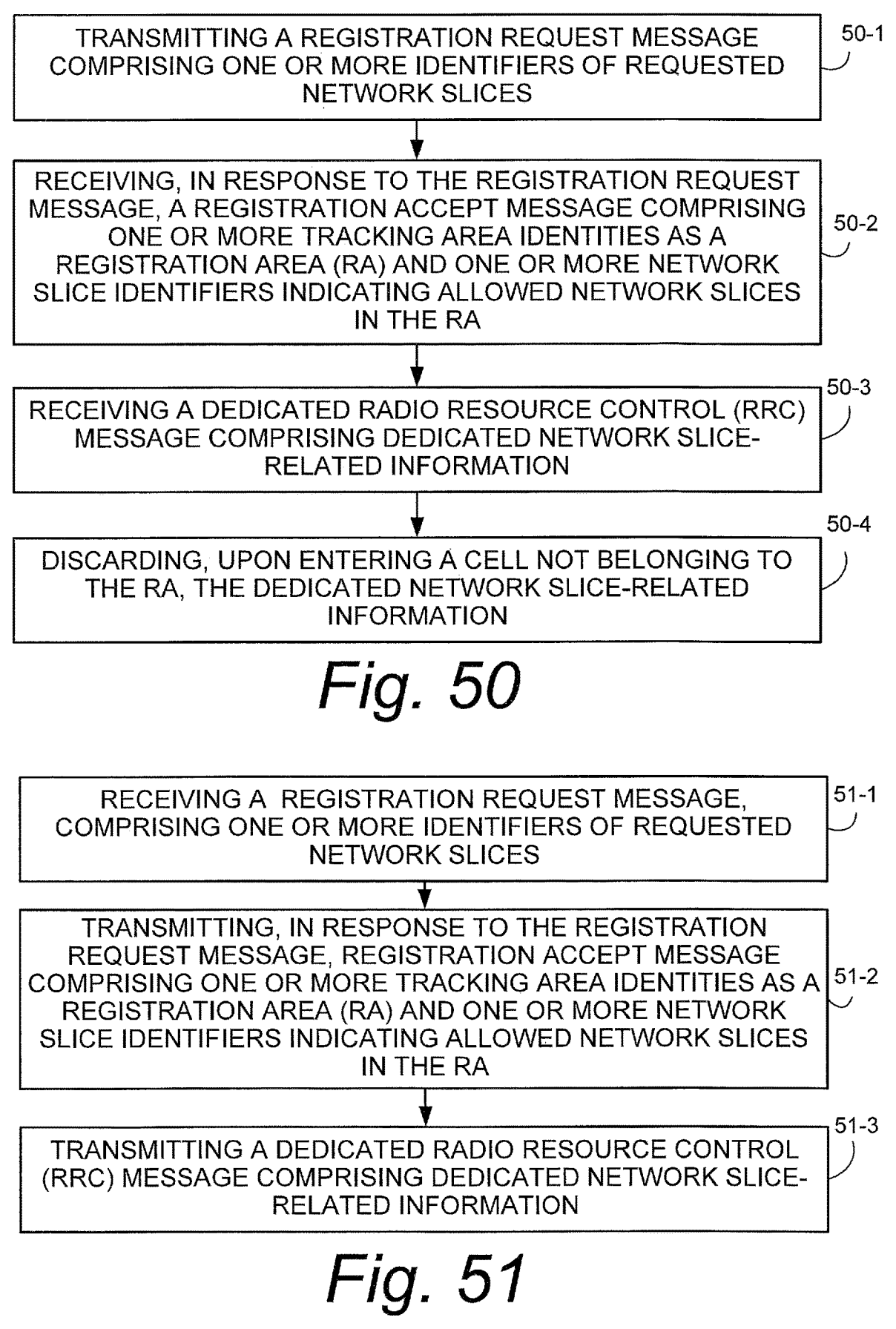

TRANSMITTING A REGISTRATION REQUEST MESSAGE COMPRISING ONE OR MORE IDENTIFIERS OF REQUESTED NETWORK SLICES 50-1

RECEIVING, IN RESPONSE TO THE REGISTRATION REQUEST MESSAGE, A REGISTRATION ACCEPT MESSAGE COMPRISING ONE OR MORE TRACKING AREA IDENTITIES AS A REGISTRATION AREA (RA) AND ONE OR MORE NETWORK SLICE IDENTIFIERS INDICATING ALLOWED NETWORK SLICES IN THE RA 50-2

RECEIVING A DEDICATED RADIO RESOURCE CONTROL (RRC) MESSAGE COMPRISING DEDICATED NETWORK SLICE-RELATED INFORMATION 50-3

DISCARDING, UPON ENTERING A CELL NOT BELONGING TO THE RA, THE DEDICATED NETWORK SLICE-RELATED INFORMATION 50-4

*Fig. 50*

RECEIVING A REGISTRATION REQUEST MESSAGE, COMPRISING ONE OR MORE IDENTIFIERS OF REQUESTED NETWORK SLICES 51-1

TRANSMITTING, IN RESPONSE TO THE REGISTRATION REQUEST MESSAGE, REGISTRATION ACCEPT MESSAGE COMPRISING ONE OR MORE TRACKING AREA IDENTITIES AS A REGISTRATION AREA (RA) AND ONE OR MORE NETWORK SLICE IDENTIFIERS INDICATING ALLOWED NETWORK SLICES IN THE RA 51-2

TRANSMITTING A DEDICATED RADIO RESOURCE CONTROL (RRC) MESSAGE COMPRISING DEDICATED NETWORK SLICE-RELATED INFORMATION 51-3

*Fig. 51*

VALIDITY OF NETWORK SLICE-RELATED INFORMATION PROVIDED BY DEDICATED SIGNALING

TECHNICAL FIELD

The technology relates to wireless communications, and particularly to resource utilization in sliced networks.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR" ] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 53, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations (i.e. gNB & ng-eNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

Network slicing is a network architecture adopted in the fifth generation (5G) cellular system that enables multiplexing of virtualized and independent logical networks on a same physical network infrastructure. Each network slice is an isolated end-to-end network tailored to fulfill diverse requirements requested by a particular application. Network operators will be able to deploy functions/services necessary to support particular customers/market segments.

A network slice could span across multiple parts of the network, such as terminals, radio access network (RAN), core network (CN), and transport network. A network slice may comprise dedicated and/or shared resources, in terms of processing power, storage, and bandwidth.

The 3$^{rd}$ Generation Partnership Project (3GPP) has been working on specifying architectural and functional elements that are essential for realization of basic network slicing functionality in Release 15 and 16. In Release 17, it is planned to enhance the functionality of the network slicing, based on a standardized list of attributes that can characterize a type of network slice. Some of the attributes, such as radio spectrum supported by a network slice to restrict terminals in terms of frequencies to be used, may impact the RAN functions and procedures.

What is needed are methods, apparatus, and/or techniques to enhance resource selection in a sliced network.

SUMMARY OF INVENTION

In one example, a wireless terminal of a cellular telecommunication network, the cellular telecommunication network supporting one or more network slices, each of the one or more network slices providing a designated service within a public land mobile network (PLMN), the wireless terminal comprising: transmitter circuitry configured to transmit a registration request message comprising one or more identifiers of requested network slices; receiver circuitry configured to: receive, in response to the registration request message, a registration accept message comprising: one or more tracking area identities as a registration area (RA), and; one or more network slice identifiers indicating allowed network slices in the RA, and; receive a dedicated Radio Resource Control (RRC) message comprising dedicated network slice-related information associated with the allowed network slices, the dedicated network slice-related information being used to perform a cell reselection procedure to reselect a cell; processor circuitry configured to discard, upon entering a cell not belonging to the RA, the dedicated network slice-related information.

In one example, an access node of a cellular telecommunication network, the cellular telecommunication network supporting one or more network slices, each of the one or more network slices providing a designated service within a public land mobile network (PLMN), the access node comprising: receiver circuitry configured to receive, from a wireless terminal, a registration request message comprising one or more identifiers of requested network slices; transmitter circuitry configured to: transmit, in response to the registration request message, a registration accept message comprising: one or more tracking area identities as a registration area (RA), and; one or more network slice identifiers indicating allowed network slices in the RA, and; transmit a dedicated Radio Resource Control (RRC) message comprising dedicated network slice-related information associated with the allowed network slices, the dedicated network slice-related information being used by the wireless terminal to perform a cell reselection procedure to reselect a cell, wherein; the dedicated network slice-related information is discarded by the wireless terminal upon the wireless terminal entering a cell not belonging to the RA.

In one example, a method for a wireless terminal of a cellular telecommunication network, the cellular telecommunication network supporting one or more network slices, each of the one or more network slices providing a designated service within a public land mobile network (PLMN), the method comprising: transmitting a registration request message comprising one or more identifiers of requested network slices; receiving, in response to the registration request message, a registration accept message comprising: one or more tracking area identities as a registration area (RA), and; one or more network slice identifiers indicating allowed network slices in the RA, and; receiving a dedicated Radio Resource Control (RRC) message comprising dedicated network slice-related information associated with the allowed network slices, the dedicated network slice-related information being used to perform a cell reselection procedure to reselect a cell; discarding, upon entering a cell not belonging to the RA, the dedicated network slice-related information.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 12 is a diagrammatic view showing an example format of optional information elements which shares a same structure shown as “NSSAI Band Association”.

FIG. 21A is a diagrammatic view showing a second implementation of how area scope indication may be indicated in system information including SIB1 and SIBx.

FIG. 24A is a diagrammatic view showing an example format of the optional information elements that may be included in a message in a case that a list of cell identities is used for the coverage area attribute.

FIG. 24B is a diagrammatic view showing an example format of the network slice coverage area configuration combined in the network slice band association information.

FIG. 35A is a flow chart showing example representative steps or acts performed by a wireless terminal of the example embodiment and mode of FIG. 26.

FIG. 41 is a flow chart showing example, representative steps or acts performed by an access node of the example embodiment and mode of FIG. 36.

FIG. 50 is a flow chart showing example representative steps or acts performed by a wireless terminal, e.g., UE, of the example embodiment and mode of FIG. 47.

FIG. 51 is a flow chart showing example representative steps or acts performed by an access node, e.g., gNB, of the example embodiment and mode of FIG. 47.

DESCRIPTION OF EMBODIMENTS

Figure 1:
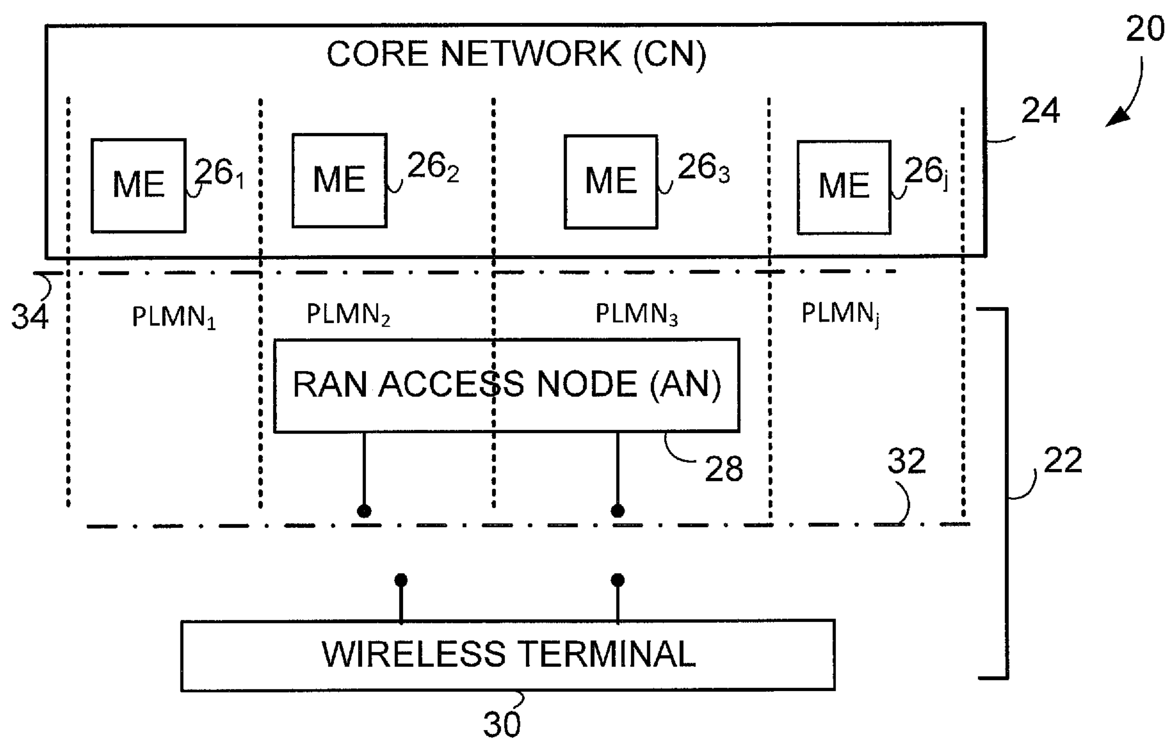
FIG. 1 is a schematic view of a communications system showing both a core network and radio access network.

In one of its example aspects, the technology disclosed herein concerns a wireless terminal which communicates with an access node of a radio access network (RAN). The RAN is configured to support one or more network slices. Each of the one or more network slices provides a designated service within a public land mobile network (PLMN). In an example embodiment and mode the wireless terminal comprises transmitter circuitry, receiver circuitry, and processor circuitry. The transmitter circuitry is configured to transmit a registration request message comprising one or more identifiers of requested network slices. The receiver circuitry is configured to receive, in response to the registration request message, a registration accept message comprising one or more tracking area identities as a registration area (RA) and one or more network slice identifiers indicating allowed network slices in the RA. The receiver circuitry is further configured to receive a dedicated Radio Resource Control (RRC) message comprising dedicated network slice-related information associated with the allowed network slices. The dedicated network slice-related information may be used to perform a cell reselection procedure to reselect a cell. The processor circuitry is configured to discard the dedicated network slice-related information upon occurrence of a predetermined event, such as the wireless terminal entering a cell not belonging to the RA. In another of its example aspects, the technology disclosed herein concerns modes of operating such wireless terminals.

In another of its example aspects the technology disclosed herein concerns an access node of a radio access network (RAN). The RAN is configured to support one or more network slices. Each of the network slices provides a designated service within a public land mobile network (PLMN). The access node is configured to communicate with a wireless terminal via a serving cell. In an example embodiment and mode the access node comprises receiver circuitry and transmitter circuitry. The receiver circuitry is configured to receive, from a wireless terminal, a registration request message comprising one or more identifiers of requested network slices. The transmitter circuitry is configured to transmit, in response to the registration request message, a registration accept message comprising one or more tracking area identities as a registration area (RA) and one or more network slice identifiers indicating allowed network slices in the RA. The transmitter circuitry is further configured to transmit a dedicated Radio Resource Control (RRC) message comprising dedicated network slice-related information associated with the allowed network slices. The dedicated network slice-related information may be used by the wireless terminal to perform a cell reselection procedure to reselect a cell. The dedicated network slice-related information is configured to be discarded by the wireless terminal occurrence of a predetermined event, such as the wireless terminal entering a cell not belonging to the RA. In another of its example aspects, the technology disclosed herein concerns modes of operating such access nodes.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

1.0 Introduction 1.1 Introduction: Network Architecture

FIG. 1 shows an example telecommunications system 20 comprising one or more radio access networks (RANs) 22 which is connected to one or more core networks (CNs) 24. The telecommunications system 20 may be utilized by one or more Public Land Mobile Networks (PLMNs). A Public Land Mobile Network (PLMN) is a combination of wireless communication services offered by a specific operator in a specific country. For sake of simplified illustration, FIG. 1 shows by vertical dotted lines that the radio access network (RAN) 22 and core network (CN) 24 may possibly be utilized by plural PLMNs such as $PLMN_1$-$PLMN_j$. In the core network (CN) 24 each PLMN has its own management entity 26. It should be noted that in some deployment scenarios the telecommunication system 20 may comprise one or more non-public networks (NPNs) or may comprise a combination of PLMNs and NPNs. Thus, herein the term "PLMN" is intended to be used interchangeably with "NPN" and/or such combination.

As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

A core network (CN) such as core network (CN) 24 may comprise numerous servers, routers, and other equipment. As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc. For sake of simplification and for pertinence to the technology disclosed herein core network (CN) 24 is shown as comprising one or more management entities, such as management entities $\mathbf{26}_1$-$\mathbf{26}_j$. In an example implementation and in any of the example embodiments and modes described herein, the management entity 26 may be an Access and Mobility Management Function (AMF). As mentioned above, each PLMN has its own one or more management entities 26 in core network (CN) 24.

A radio access network (RAN) such as the illustrated radio access network (RAN) 22 typically comprises plural access nodes, one example access node 28 being illustrated in FIG. 1. As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR" ] technology system), or some other similar terminology.

The radio access network (RAN) 22 with the management entity 26 serves wireless terminals, which also form part of the radio access network (RAN) 22. FIG. 1 shows an example wireless terminal 30. As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

The wireless terminal 30 communicates with its serving radio access network (RAN) 22 over a radio or air interface, illustrated by dashed-dotted line 32 in FIG. 1. Communication between radio access network (RAN) 22 and wireless terminal 30 over the radio interface 32 occurs by utilization of "resources". Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix In 5G New Radio ("NR"), a frame consists of 10 ms duration. A frame consists of 10 subframes with each having 1 ms duration similar to LTE. Each subframe consists of $2^{\mu}$ slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

The radio access network (RAN) 22 in turn communicates with one or more core networks (CN) 24 over a RAN-CN interface (e.g., N2 interface), illustrated by dashed-dotted line 34 in FIG. 1.

In general, communication protocols between the wireless terminal and the telecommunication system may be categorized into Access Stratum (AS) and Non-Access Stratum (NAS). AS protocols, such as Radio Resource Control (RRC) and Medium Access Control (MAC), may be used for the wireless terminal to communicate with access nodes of a RAN, whereas NAS protocol(s), such as the NAS protocol specified in 3GPP TS 24.501, may be used for the wireless terminal to communicate with entities (e.g., AMF) of a CN(s), via access nodes of a RAN. Consequently, the wireless terminal may comprise a function to manage the AS protocols, and a separate function to manage the NAS protocol(s). Herein, terminology "NAS" may be used in some context to refer to the function built into the wireless terminal to manage the NAS protocol(s). Similarly, "RRC" may be used in some context to refer to the function built into the wireless terminal to manage the RRC protocol.

1.2 Introduction: Typical Resource Selection

Figure 2:
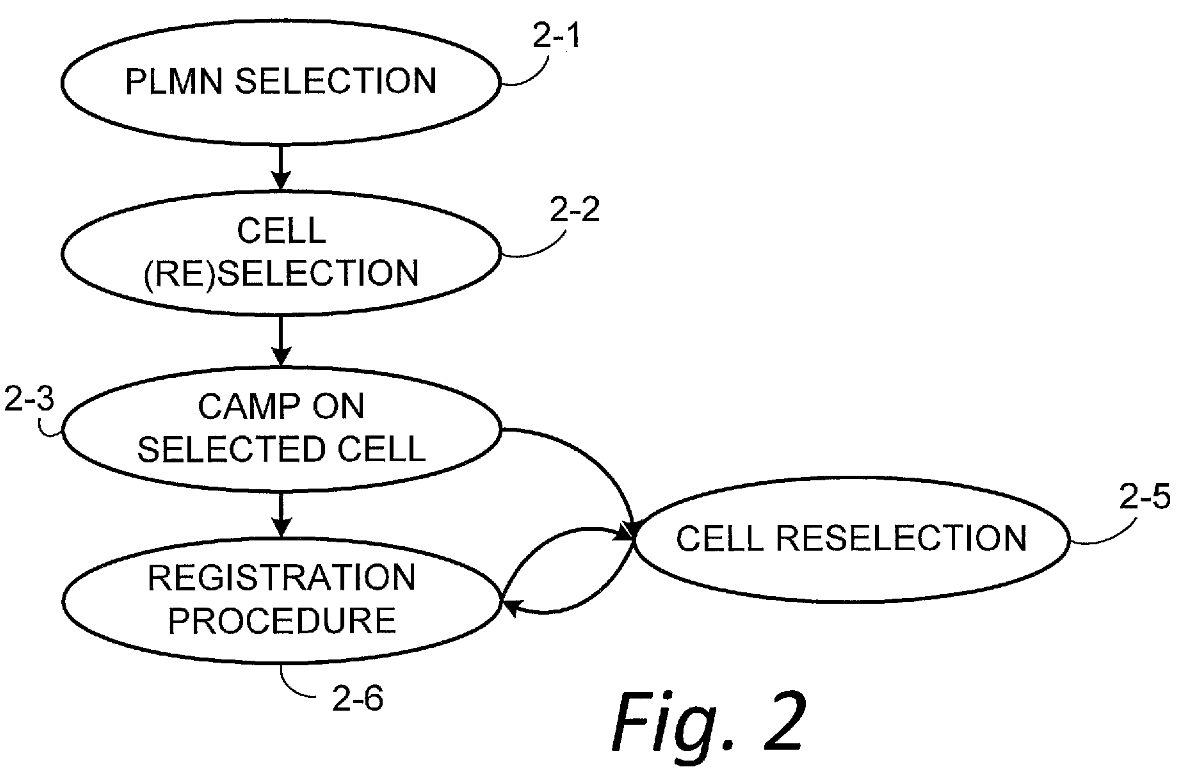
FIG. 2 is a diagrammatic view of operations performed by a wireless terminal of the system of FIG. 1 for resource selection.

FIG. 2 illustrates general acts or steps which may be performed by wireless terminal 30, a UE, in order to obtain appropriate resources for communication in a typical implementation. As shown by act 2-1, the wireless terminal in an idle state (e.g. RRC_IDLE) or in an inactive state (e.g. RRC_INACTIVE) may perform PLMN selection. During the PLMN selection procedure of act 2-1, the wireless terminal may scan all RF channels according to its capabilities to find available PLMNs. On each carrier, the wireless terminal may search for the strongest cell and read its system information (e.g., from SIB1), in order to find out which PLMN(s) the cell belongs to.

If the wireless terminal can read one or several PLMN identities in the strongest cell, each found PLMN may be reported to NAS as a high quality PLMN, but without the RSRP value, provided that a certain high-quality criterion is fulfilled. The high-quality criterion is that, for an NR cell, the measured RSRP value shall be greater than or equal to −110 dBm.

Found PLMNs that do not satisfy the high-quality criterion but for which the wireless terminal has been able to read the PLMN identities may be reported to the NAS together with their corresponding RSRP values. The quality measure reported to NAS may be the same for each PLMN found in one cell.

The search for PLMNs as illustrated by act 2-1 may be stopped on request from the NAS. The wireless terminal may optimize PLMN search of act 2-1 by using stored information, e.g., frequencies and optionally also information on cell parameters from previously received measurement control information elements.

Based on the report of available PLMNs provided by the wireless terminal, the NAS may choose a PLMN, or a list of equivalent PLMNs (if available), that the Access Stratum (AS) may use for cell selection and cell reselection.

After a successful completion of the PLMN selection procedure, the wireless terminal may proceed on a cell selection to search for a suitable cell of the selected PLMN as shown by act 2-2 of FIG. 2. In one configuration, the cell selection may be performed by one of two possible procedures, an initial cell selection procedure and a cell selection procedure using leveraging stored information.

The initial cell selection procedure does not require or involve prior knowledge of which RF channels are NR frequencies. In the initial cell selection procedure, (1) The wireless terminal may scan all RF channels in the NR bands according to its capabilities to find a suitable cell; (2) On each frequency, the wireless terminal may need only search for the strongest cell; and, (3) Once a suitable cell is found, this cell may be selected.

The cell selection that uses leveraging stored information may require stored information of frequencies and optionally also information on cell parameters from previously received measurement control information elements or from previously detected cells. Once the wireless terminal has found a suitable cell, the wireless terminal may select it. If no suitable cell is found, the initial cell selection procedure in a) may be started.

When the cell selection procedure of act 2-1 is successful, as act 2-3 the wireless terminal may choose the cell to receive available services and may monitor the control channel of the selected cell (i.e., act 2-3 shows the wireless terminal camping on the selected cell).

Figure 4:
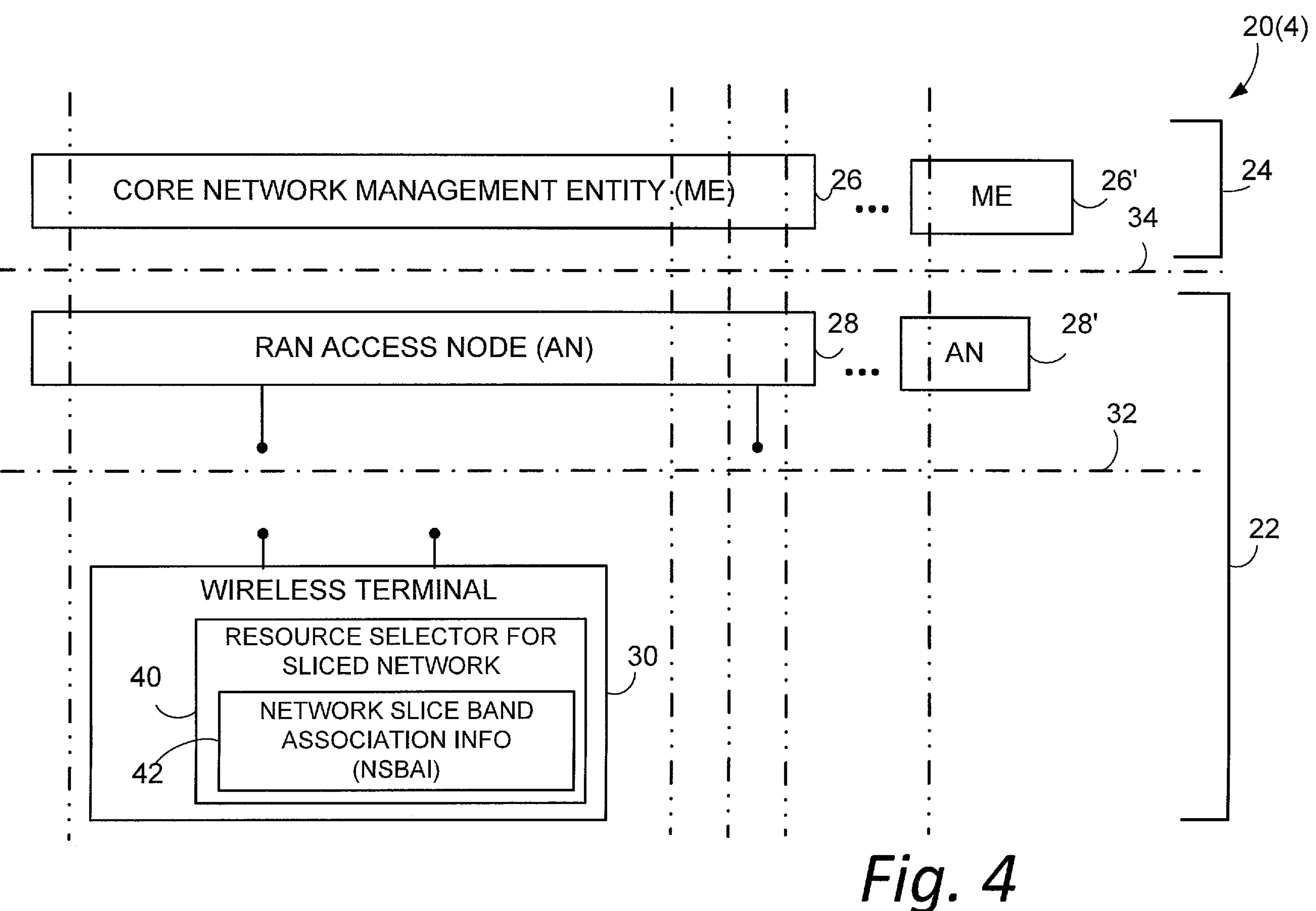
FIG. 4 is a schematic view of a generic communications system utilizing network slice technology and wherein a wireless terminal performs resource selection utilizing network slice band association information.

As act 2-4 of FIG. 4, the wireless terminal may, if necessary, register its presence by means of a registration procedure, in the tracking area of the chosen cell. As an outcome of a successful Location Registration, the selected PLMN then becomes the registered PLMN.

While camping on the selected cell as shown by act 2-4, if the wireless terminal finds a more suitable cell, according to cell reselection criteria (preferably configured by the network via system information), as shown by act 2-5 the wireless terminal may reselect onto that cell and camps on it. This act 2-5 may be referred as a cell reselection. If the new cell does not belong to at least one tracking area to which the wireless terminal is registered, a location registration may be performed, as illustrated by act 2-6. In RRC_INACTIVE state, if the new cell does not belong to the configured RAN-based Notification Area (RNA), an RNA update procedure is performed.

The wireless terminal may search for higher priority PLMNs at regular time intervals and search for a suitable cell if another PLMN has been selected by NAS. If the wireless terminal loses coverage of the registered PLMN, either a new PLMN is selected automatically (automatic mode), or an indication of available PLMNs is given to the user so that a manual selection can be performed (manual mode).

The cell reselection may be performed based on network-configured priorities. Absolute priorities of different NR frequencies or inter-RAT (Radio Access Technology) frequencies may be provided to the wireless terminal in the system information, in a connection release message (e.g., RRC Release message), or by inheriting from another RAT at inter-RAT cell (re)selection. In the case of system information, an NR frequency or inter-RAT frequency may be listed without providing a priority. If priorities are provided in dedicated signaling, the wireless terminal may ignore all the priorities provided in system information.

1.3 Introduction: Typical Cell Barring Technology

Cell barring, also known as cell reservation, is a mechanism for a radio access network (RAN) to preclude wireless terminals from camping on a cell. For example, 3GPP TS38.304 specifies the procedures shown in Table 1.

Table 1

5.3.1 Cell Status and Cell Reservations

Cell status and cell reservations are indicated in the MIB or SIB1 message as specified in TS 38.331 [3] by means of three fields:

cellBarred (IE type: "barred" or "not barred")

Indicated in MIB message. In case of multiple PLMNs indicated in SIB1, this field is common for all PLMNs cellReservedForOperatorUse (IE type: "reserved" or "not reserved")

Indicated in SIB1 message. In case of multiple PLMNs indicated in SIB1, this field is specified per PLMN.

cellReservedForOtherUse (IE type: "true")

Indicated in SIB1 message. In case of multiple PLMNs indicated in SIB1, this field is common for all PLMNs.

When cell status is indicated as "not barred" and "not reserved" for operator use and not "true" for other use, All UEs shall treat this cell as candidate during the cell selection and cell reselection procedures.

When cell status is indicated as "true" for other use,

The UE shall treat this cell as if cell status is "barred".

When cell status is indicated as "not barred" and "reserved" for operator use for any PLMN and not "true" for other use, UEs assigned to Access Identity 11 or 15 operating in their HPLMN/EHPLMN shall treat this cell as candidate during the cell selection and reselection procedures if the field cellReservedForOperatorUse for that PLMN set to "reserved".

UEs assigned to an Access Identity 1, 2 and 12 to 14 shall behave as if the cell status is "barred" in case the cell is "reserved for operator use" for the registered PLMN or the selected PLMN.

NOTE 1: Access Identities 11, 15 are only valid for use in the HPLMN/EHPLMN; Access Identities 12, 13, 14 are only valid for use in the home country as specified in TS 22.261 [12].

When cell status "barred" is indicated or to be treated as if the cell status is "barred", The UE is not permitted to select/reselect this cell, not even for emergency calls.

The UE shall select another cell according to the following rule:

If the cell is to be treated as if the cell status is "barred" due to being unable to acquire the MIB:

the UE may exclude the barred cell as a candidate for cell selection/reselection for up to 300 seconds.

the UE may select another cell on the same frequency if the selection criteria are fulfilled.

else:

If the cell is to be treated as if the cell status is "barred" due to being unable to acquire the SIB1:

The UE may exclude the barred cell as a candidate for cell selection/reselection for up to 300 seconds.

If the field intraFreqReselection in MIB message is set to "allowed", the UE may select another cell on the same frequency if re-selection criteria are fulfilled;

The UE shall exclude the barred cell as a candidate for cell selection/reselection for 300 seconds.

If the field intraFreqReselection in MIB message is set to "not allowed" the UE shall not re-select a cell on the same frequency as the barred cell;

The UE shall exclude the barred cell and the cells on the same frequency as a candidate for cell selection/reselection for 300 seconds.

The cell selection of another cell may also include a change of RAT.

1.4 Introduction: Network Slicing Technology

Network Slicing is a concept to allow differentiated treatment depending on each customer requirements. With slicing, it is possible for Mobile Network Operators (MNO) to consider customers as belonging to different tenant types with each having different service requirements that govern in terms of what slice types each tenant is eligible to use based on Service Level Agreement (SLA) and subscriptions. In some configurations, a network slice instance may be defined within a Public Land Mobile Network (PLMN) or a Stand-alone Non-public Network (SNPN).

1.4.1 Introduction: Network Slicing General Principles

The following key principles may apply for support of Network Slicing in RAN and provide understanding/explanation for terminology employed herein:

RAN awareness of slices

RAN supports a differentiated handling of traffic for different network slices which have been pre-configured. How RAN supports the slice enabling in terms of RAN functions (i.e. the set of network functions that comprise each slice) is implementation dependent.

Selection of RAN part of the network slice

RAN supports the selection of the RAN part of the network slice, by Network Slice Selection Assistance Information (NSSAI) provided by the UE or the CN which unambiguously identifies one or more of the pre-configured network slices in the PLMN/SNPN.

Resource management between slices

RAN supports policy enforcement between slices as per service level agreements. It should be possible for a single RAN node to support multiple slices. The RAN should be free to apply the best Radio Resource Management (RRM) policy for the SLA in place to each supported slice.

Support of QoS

RAN supports QoS differentiation within a slice.

RAN selection of CN entity

For initial attach, the UE may provide NSSAI to support the selection of an Access and Mobility Management Function (AMF). If available, NG-RAN uses this information for routing the initial NAS to an AMF. If the RAN is unable to select an AMF using this information or the UE does not provide any such information, the RAN sends the NAS signaling to one of the default AMFs.

For subsequent accesses, the UE provides a temporary ID, which is assigned to the UE by the CN, to enable the RAN to route the Non-Access Stratum (NAS) message to the appropriate Access and Mobility Management Function (AMF) as long as the temporary ID is valid (RAN is aware of and can reach the AMF which is associated with the temporary ID). Otherwise, the method for initial attach applies.

Resource isolation between slices

The RAN supports resource isolation between slices. RAN resource isolation may be achieved by means of RRM policies and protection mechanisms that should avoid that shortage of shared resources in one slice breaks the service level agreement for another slice. It should be possible to fully dedicate RAN resources to a certain slice. How RAN supports resource isolation is implementation dependent.

Access control

By means of the unified access control, operator-defined access categories can be used to enable differentiated handling for different slices. RAN may broadcast barring control information (i.e. a list of barring parameters associated with operator-defined access categories) to minimize the impact of congested slices.

Slice Availability

Some slices may be available only in part of the network. The RAN supported Single Network Slice Selection Assistance Information (S-NSSAI(s)) may be (pre)configured. Awareness in the RAN of the slices supported in the cells of its neighbors may be beneficial for inter-frequency mobility in connected mode. It is assumed that the slice availability does not change within the UE's registration area.

The RAN and the CN are responsible to handle a service request for a slice that may or may not be available in a given area. Admission or rejection of access to a slice may depend by factors such as support for the slice, availability of resources, support of the requested service by RAN.

Support for UE associating with multiple network slices simultaneously

In case a UE is associated with multiple slices simultaneously, only one signaling connection is maintained and for intra-frequency cell reselection, the UE always tries to camp on the best cell. For inter-frequency cell reselection, dedicated priorities can be used to control the frequency on which the UE camps.

Granularity of slice awareness

Slice awareness in RAN is introduced at Protocol Data Unit (PDU) session level, by indicating the S-NSSAI corresponding to the PDU Session, in all signaling containing PDU session resource information.

Validation of the UE rights to access a network slice

It is the responsibility of the CN to validate that the UE has the rights to access a network slice. Prior to receiving the Initial Context Setup Request message, the RAN may be allowed to apply some provisional/local policies, based on awareness of which slice the UE is requesting access to. During the initial context setup, the RAN is informed of the slice for which resources are being requested.

1.4.2: Introduction: Network Slicing Vs. Network Sharing

It should be noted that Network Slicing should not be confused with Network Sharing. Network Sharing allows multiple participating operators (e.g. multiple PLMNs) to share resources of a single shared network according to agreed allocation schemes. In contrast, as mentioned, a network Slicing may be defined within a PLMN/SNPN. Therefore, Network Slicing may be separately configured in a network, and may coexist with Network Sharing.

1.4.3: Introduction: Network Slice Identification

Within a PLMN, a network slice may be identified by an S-NSSAI, which may be comprised of a slice/service type, SST, and a slice differentiator, SD. A set of one or more S-NSSAIs is called the NSSAI. NSSAIs may be classified into one of the following types:

Configured NSSAI: NSSAI provisioned in the UE applicable to one or more PLMNs.

Default configured NSSAI: a configured NSSAI preconfigured by a home PLMN (HPLMN), commonly decided by all roaming partners, e.g. by the use of SST values standardized by 3GPP or other bodies. Each S-NSSAI in the default configured NSSAI may have a corresponding S-NSSAI as part of the subscribed S-NSSAI(s).

Requested NSSAI: NSSAI provided by the UE to the Serving PLMN during registration.

Allowed NSSAI: NSSAI provided by the Serving PLMN during e.g. a Registration procedure, indicating the S-NSSAIs values the UE could use in the Serving PLMN for the current Registration Area.

Subscribed S-NSSAIs: S-NSSAIs based on subscriber information, which a UE is subscribed to use in a PLMN.

An S-NSSAI can have standard values, i.e., such S-NSSAI is only comprised of an SST with a standardized SST value, and no SD, or non-standard values, i.e., such S-NSSAI is comprised of either both an SST and an SD or only an SST without a standardized SST value and no SD. An S-NSSAI with a non-standard value identifies a single Network Slice within the PLMN with which it is associated. An S-NSSAI with a non-standard value may not be used by the UE in access stratum procedures in any PLMN other than the one to which the S-NSSAI is associated.

The S-NSSAIs in the Subscribed S-NSSAIs (see clause 5.15.3) may contain only HPLMN S-NSSAI values. The S-NSSAIs in the Configured NSSAI, the Allowed NSSAI, the Requested NSSAI, the Rejected S-NSSAIs may contain only values from the Serving PLMN. The Serving PLMN can be the HPLMN or a VPLMN.

NSSAI configurations and management of NSSAIs between the UE and networks, including a home PLMN (HPLMN) and visited PLMNs (VPLMNs) may be handled by the Non-Access Stratum (NAS). For example, 3GPP TS24.501 (V15.4.0) specifies the procedures of Table 2.

Table 2

4.6 Network Slicing 4.6.1 General

The 5GS supports network slicing as described in 3GPP TS 23.501 [8]. Within a PLMN, a network slice is identified by an S-NSSAI, which is comprised of a slice/service type (SST) and a slice differentiator (SD). Inclusion of an SD in an S-NSSAI is optional. A set of one or more S-NSSAIs is called the NSSAI. The following NSSAIs are defined in 3GPP TS 23.501 [8]:

a) configured NSSAI;
b) requested NSSAI;
c) allowed NSSAI; and
d) subscribed S-NSSAIs;

The following NSSAIs are defined in the present document:

a) rejected NSSAI for the current PLMN; and
b) rejected NSSAI for the current registration area.

A serving PLMN may configure a UE with the configured NSSAI per PLMN. In addition, the HPLMN may configure a UE with a single default configured NSSAI, and consider the default configured NSSAI as valid in a PLMN for which the UE has neither a configured NSSAI nor an allowed NSSAI.

The allowed NSSAI and rejected NSSAI for the current registration area are managed per access type independently, i.e. 3GPP access or non-3GPP access, and is applicable for the registration area.

If the registration area contains TAIs belonging to different PLMNs, which are equivalent PLMNs, the allowed NSSAI and the rejected NSSAI for the current registration area are applicable to these PLMNs in this registration area.

The rejected NSSAI for the current PLMN is applicable for the whole registered PLMN, where the registration area shall only contain TAIs belonging to the registered PLMN.

4.6.2 Mobility Management Aspects 4.6.2.1 General

Upon registration to a PLMN, the UE shall send to the AMF the requested NSSAI which includes one or more S-NSSAIs of the allowed NSSAI for the PLMN or the configured NSSAI and corresponds to the network slice(s) to which the UE intends to register with, if:

a) the UE has a configured NSSAI for the current PLMN;
b) the UE has an allowed NSSAI for the current PLMN; or
c) the UE has neither allowed NSSAI for the current PLMN nor configured NSSAI for the current PLMN and has a default configured NSSAI. In this case the UE indicates to the AMF that the requested NSSAI is created from the default configured NSSAI;

If the UE has neither a configured NSSAI nor an allowed NSSAI valid for a PLMN and does not have any default configured NSSAI, the UE does not send a requested NSSAI when requesting registration towards the PLMN. In roaming scenarios, the UE shall also provide the mapped S-NSSAI(s) for the requested NSSAI, if available. The AMF verifies if the requested NSSAI is permitted based on the subscribed S-NSSAIs in the UE subscription and optionally the mapped S-NSSAI (s) provided by the UE, and if so then the AMF shall provide the UE with the allowed NSSAI for the PLMN, and shall also provide the UE with the mapped S-NSSAI (s) for the allowed NSSAI for the PLMN if available. The AMF shall ensure that there are no two or more S-NSSAIs of the allowed NSSAI which are mapped to the same S-NSSAI of the HPLMN. The AMF may also query the NSSF to determine the allowed NSSAI for a given registration area as defined in 3GPP TS 23.501 [8].

The set of network slice (s) for a UE can be changed at any time while the UE is registered to a PLMN, and the change may be initiated by the network, or the UE. In this case, the allowed NSSAI and associated registration area may be changed during the registration procedure. The network may notify the UE of the change of the supported network slice (s) in order to trigger the registration procedure. Change in the allowed NSSAI may lead to AMF relocation subject to operator policy. See subclause 5.4.4 describing the generic UE configuration update procedure for further details.

4.6.2.2 NSSAI Storage

If available, the configured NSSAI(s) shall be stored in a non-volatile memory in the ME as specified in annex C.

Each of the configured NSSAI stored in the UE is a set composed of at most 16 S-NSSAIs. Each of the allowed NSSAI stored in the UE is a set composed of at most 8 S-NSSAIs and is associated with a PLMN identity and an access type. Each of the configured NSSAI except the default configured NSSAI, and the rejected NSSAI is associated with a PLMN identity. The S-NSSAI(s) in the rejected NSSAI for the current registration area are further associated with a registration area where the rejected S-NSSAI(s) is not available. The S-NSSAI(s) in the rejected NSSAI for the current PLMN shall be considered rejected for the current PLMN regardless of the access type. There shall be no duplicated PLMN identities in each of the list of configured NSSAI(s), allowed NSSAI(s), rejected NSSAI(s) for the current PLMN, and rejected NSSAI(s) for the current registration area.

The UE stores NSSAIs as follows:

a) The configured NSSAI shall be stored until a new configured NSSAI is received for a given PLMN. The network may provide to the UE the mapped S-NSSAI (s) for the new configured NSSAI which shall also be stored in the UE. When the UE is provisioned with a new configured NSSAI for a PLMN, the UE shall:

1) replace any stored configured NSSAI for this PLMN with the new configured NSSAI for this PLMN;

2) delete any stored mapped S-NSSAI(s) for the configured NSSAI and, if available, store the mapped S-NSSAI(s) for the new configured NSSAI;

3) delete any stored allowed NSSAI for this PLMN and, if available, the stored mapped S-NSSAI(s) for the allowed NSSAI, if the UE received the new configured NSSAI for this PLMN and the "registration requested" indication in the same CONFIGURATION UPDATE COMMAND message but without any new allowed NSSAI for this PLMN included; and 4) delete any rejected NSSAI for the current PLMN, and rejected NSSAI for the current registration area.

If the UE receives an S-NSSAI associated with a PLMN ID from the network during the PDN connection establishment procedure in EPS as specified in 3GPP TS 24.301 [15], the UE may store the received S-NSSAI in the configured NSSAI for the PLMN identified by the PLMN ID associated with the S-NSSAI, if not already in the configured NSSAI;

The UE may continue storing a received configured NSSAI for a PLMN and associated mapped S-NSSAI (s), if available, when the UE registers in another PLMN.

NOTE 1: The maximum number of configured NSSAIs and associated mapped S-NSSAIs for PLMNs other than the HPLMN that need to be stored in the UE, and how to handle the stored entries, are up to UE implementation.

b) The allowed NSSAI shall be stored until a new allowed NSSAI is received for a given PLMN. The network may provide to the UE the mapped S-NSSAI (s) for the new allowed NSSAI (see subclauses 5.5.1.2 and 5.5.1.3) which shall also be stored in the UE. When a new allowed NSSAI for a PLMN is received, the UE shall:

1) replace any stored allowed NSSAI for this PLMN with the new allowed NSSAI for this PLMN;

2) delete any stored mapped S-NSSAI (s) for the allowed NSSAI and, if available, store the mapped S-NSSAI(s) for the new allowed NSSAI; and 3) remove from the stored rejected NSSAI, the rejected S-NSSAI(s), if any, included in the new allowed NSSAI for the current PLMN;

If the UE receives the CONFIGURATION UPDATE COMMAND message indicating "registration requested" and contains no other parameters (see subclauses 5.4.4.2 and 5.4.4.3), the UE shall delete any stored allowed NSSAI for this PLMN, and delete any stored mapped S-NSSAI(s) for the allowed NSSAI, if available;

NOTE 2: Whether the UE stores the allowed NSSAI and the mapped S-NSSAI(s) for the allowed NSSAI also when the UE is switched off is implementation specific.

c) When the UE receives the S-NSSAI(s) included in rejected NSSAI in the REGISTRATION ACCEPT message or in the CONFIGURATION UPDATE COMMAND message, the UE shall:

1) store the S-NSSAI(s) into the rejected NSSAI based on the associated rejection cause(s);

2) remove from the stored allowed NSSAI for the current PLMN, the rejected S-NSSAI (s), if any, included in the:

i) rejected NSSAI for the current PLMN, for each and every access type; and ii) rejected NSSAI for the current registration area, associated with the same access type;

Once the UE is deregistered over all access types, the rejected NSSAI for the current PLMN shall be deleted. Once the UE is deregistered over an access type, the rejected NSSAI for the current registration area corresponding to the access type shall be deleted. The UE shall delete, if any, the stored rejected NSSAI for the current registration area if the UE moves out of the registration area; and d) When the UE receives the Network slicing indication IE with the Network slicing subscription change indication set to "Network slicing subscription changed" in the REGISTRATION ACCEPT message or in the CONFIGURATION UPDATE COMMAND message, the UE shall delete the network slicing information for each of the PLMNs that the UE has slicing information stored for (excluding the current PLMN). The UE shall not delete the default configured NSSAI. Additionally, the UE shall update the network slicing information for the current PLMN (if received) as specified above in bullets a), b) and c):

4.6.2.3 Provision of NSSAI to Lower Layers in 5GMM-IDLE Mode

The UE NAS layer may provide the lower layers with an NSSAI (either requested NSSAI or allowed NSSAI) when the UE in 5GMM-IDLE mode sends an initial NAS message.

The AMF may indicate, via the NSSAI inclusion mode IE of a REGISTRATION ACCEPT message, an NSSAI inclusion mode in which the UE shall operate over the current access within the current PLMN, if any (see subclauses 5.5.1.2.4 and 5.5.1.3.4), where the NSSAI inclusion mode is chosen among the following NSSAI inclusion modes described in table 4.6.2.3.1.

Table 4.6.2.3.1: NSSAI inclusion modes and NSSAI which shall be provided to the lower layers

| Initial NAS message | NSSAI inclusion mode A | NSSAI inclusion mode B | NSSAI inclusion mode C | NSSAI inclusion mode D |
|---|---|---|---|---|
| REGISTRATION REQUEST message: i) including the 5GS registration type IE set to "initial registration" | Requested NSSAI | Requested NSSAI | Requested NSSAI | No NSSAI |
| REGISTRATION REQUEST message: i) including the 5GS registration type IE set to "mobility registration updating"; and ii) initiated by case other than case g) or n) in subclause 5.5.1.3.2 | Requested NSSAI | Requested NSSAI | Requested NSSAI | No NSSAI |
| REGISTRATION REQUEST message: i) including the 5GS registration type IE set to "mobility registration updating"; and ii) initiated by case g) or n) in subclause 5.5.1.3.2 | Allowed NSSAI | Allowed NSSAI | No NSSAI | No NSSAI |
| REGISTRATION REQUEST message: i) including the 5GS registration type IE set to "periodic registration updating" | Allowed NSSAI | Allowed NSSAI | No NSSAI | No NSSAI |
| SERVICE REQUEST message | Allowed NSSAI | See NOTE 1 | No NSSAI | No NSSAI |

NOTE 1:
All the S-NSSAIs of the PDU sessions that have the user-plane resources requested to be re-established by the service request procedure or the S-NSSAIs of a control plane interaction triggering the service request is related to (see 3GPP TS 23.501 [8])
NOTE 2:
For a REGISTRATION REQUEST message including the 5GS registration type IE set to "emergency registration" and a DEREGISTRATION REQUEST message, no NSSAI is provided to the lower layers.
NOTE 3:
The mapped configured S-NSSAI (s) from the S-NSSAI (s) of the HPLMN are not included as part of the S-NSSAIs in the requested NSSAI or the allowed NSSAI when it is provided to the lower layers.

The UE shall store the NSSAI inclusion mode:

a) indicated by the AMF, if the AMF included the NSSAI inclusion mode IE in the REGISTRATION ACCEPT message; or b) decided by the UE, if the AMF did not include the NSSAI inclusion mode IE in the REGISTRATION ACCEPT message;

together with the identity of the current PLMN and access type in a non-volatile memory in the ME as specified in annex C.

The UE shall apply the NSSAI inclusion mode received in the REGISTRATION ACCEPT message over the current access within the current PLMN and its equivalent PLMN(s), if any, in the current registration area.

When a UE performs a registration procedure to a PLMN which is not a PLMN in the current registration area, if the UE has no NSSAI inclusion mode for the PLMN stored in a non-volatile memory in the ME, the UE shall provide the lower layers with:

a) no NSSAI if the UE is performing the registration procedure over 3GPP access; or b) requested NSSAI if the UE is performing the registration procedure over non-3GPP access.

When a UE performs a registration procedure after an inter-system change from S1 mode to N1 mode, if the UE has no NSSAI inclusion mode for the PLMN stored in a non-volatile memory in the ME and the registration procedure is performed over 3GPP access, the UE shall not provide the lower layers with any NSSAI over the 3GPP access.

4.6.3 Session Management Aspects

In order to enable PDU transmission in a network slice, the UE may request establishment of a PDU session in a network slice towards a data network (DN) which is associated with an S-NSSAI and adatanetworkname (DNN) if there isnoestablishedPDUsession adequate for the PDU transmission. The S-NSSAI included is part of allowed NSSAI of the serving PLMN, which is an S-NSSAI value valid in the serving PLMN, and in roaming scenarios the mapped S-NSSAI is also included for the PDU session if available. See subclause 6.4.1 for further details. The UE determines whether to establish a new PDU session or use one of the established PDU session(s) based on the URSP rules which include S-NSSAIs, if any (see subclause 6.2.9), or based on UE local configuration, as described in subclause 4.2.2 of 3GPP TS 24.526 [19].

1.4.4: Introduction: Registration Procedure for Sliced Network

Figure 3:
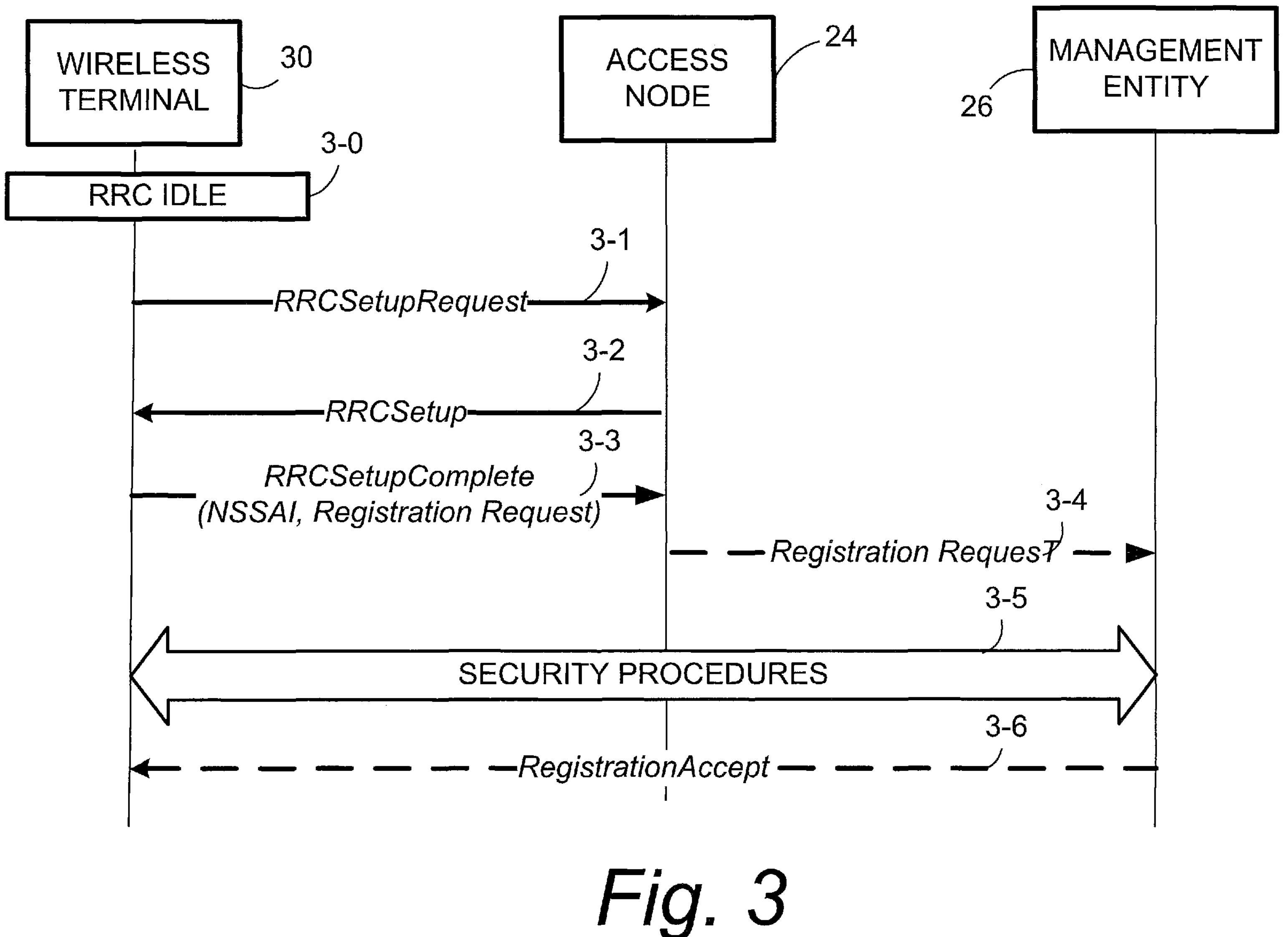
FIG. 3 shows an example scenario of a wireless terminal performing a registration procedure in a sliced network.

FIG. 3 shows an example scenario for the wireless terminal to perform a registration procedure. As shown in act 3-0, the wireless terminal is in RRC_IDLE state. Act 3-1 shows that the wireless terminal may send, triggered by NAS, an RRCSetupRequest message to the access node of the cell that the wireless terminal is currently camping on. In act 3-1, NAS may provide to RRC a Registration Request message and an NSSAI, e.g., Requested NSSAI. As act 3-2 the access node may then respond to the RRCSetupRequest message with an RRCSetup message. Upon receiving the RRCSetup message, as act 3-3 the wireless terminal may send an RRCSetupComplete message, which may include the provisioned NSSAI and the Registration Request message. The access node may use the NSSAI received in the RRCSetupComplete message to select a management entity (e.g., AMF). As act 3-4 the access node may then transparently forward the Registration Request message to the selected management entity. After the wireless terminal, the access node and the management entity perform a security procedure, shown as act 3-5, the management entity may respond to the Registration Request message with a Registration Accept message, illustrated as act 3-6.

In some configurations, the Registration Request message piggybacked in the RRCSetupComplete message (see act 3-3) may also comprise an NSSAI, e.g., Requested NSSAI, which may be used by the management entity and other core network entities to determine an Allowed NSSAI for the wireless terminal. The Allowed NSSAI may be included in the Registration Accept message. Table 3 shows an example format of the RRCSetupComplete message, wherein the information element s-NSSAI-List carries the NSSAI (e.g. Requested NSSAI). Table 4 shows an example format of the Registration Request message of act 3-4. Table 5 shows an example format of the Registration Accept message. The AMF may include a Rejected NSSAI to inform the wireless terminal of the S-NSSAIs that were included in the requested NSSAI in the REGISTRATION REQUEST message but were rejected by the network. In addition, the AMF may also include a Configured NSSAI if the network needs to provide the wireless terminal with a new configured NSSAI for the current PLMN.

TABLE 3

```
RRCSetupComplete ::=                    SEQUENCE {
    rrc-TransactionIdentifier               RRC-TransactionIdentifier,
    criticalExtensions                      CHOICE {
        rrcSetupComplete                        RRCSetupComplete-IEs,
        criticalExtensionsFuture                SEQUENCE { }
    }
}
RRCSetupComplete-IEs ::=                    SEQUENCE {
  selectedPLMN-Identity                 INTEGER (1..maxPLMN),
  registeredAMF                         RegisteredAMF
OPTIONAL,
    guami-Type                          ENUMERATED {native, mapped}
OPTIONAL,
    s-NSSAI-List                        SEQUENCE (SIZE (1..maxNrofS-NSSAI)) OF
S-NSSAI OPTIONAL,
  dedicatedNAS-Message                  DedicatedNAS-Message,
  ng-5G-S-TMSI-Value                    CHOICE {
      ng-5G-S-TMSI                        NG-5G-S-TMSI,
      ng-5G-S-TMSI-Part2                  BIT STRING (SIZE (9))
    }
OPTIONAL,
    lateNonCriticalExtension                OCTET STRING
OPTIONAL,
    nonCriticalExtension                    SEQUENCE{ }
OPTIONAL
}
RegisteredAMF ::=                     SEQUENCE {
    plmn-Identity                       PLMN-Identity
OPTIONAL,
    amf-Identifier                      AMF-Identifier
}
```

TABLE 4

| IEI | Information Element | Type/Reference | Presence | Format | Length |
|---|---|---|---|---|---|
| | Extended protocol discriminator | Extended Protocol discriminator 9.2 | M | V | 1 |
| | Security header type | Security header type 9.3 | M | V | ½ |
| | Spare half octet | Spare half octet 9.5 | M | V | ½ |
| | Registration request message identity | Message type 9.7 | M | V | 1 |

TABLE 4-continued

| IEI | Information Element | Type/Reference | Presence | Format | Length |
|---|---|---|---|---|---|
| | 5GS registration type | 5GS registration type 9.11.3.7 | M | V | ½ |
| | ngKSI | NAS key set identifier 9.11.3.32 | M | V | ½ |
| | 5GS mobile identity | 5GS mobile identity 9.11.3.4 | M | LV-E | 6-n |
| C- | Non-current native NAS key set identifier | NAS key set identifier 9.11.3.32 | O | TV | 1 |
| 10 | 5GMM capability | 5GMM capability 9.11.3.1 | O | TLV | 3-15 |
| 2E | UE security capability | UE security capability 9.11.3.54 | O | TLV | 4-10 |
| 2F | Requested NSSAI | NSSAI 9.11.3.37 | O | TLV | 4-74 |
| 52 | Last visited registered TAI | 5GS tracking area identity 9.11.3.8 | O | TV | 7 |
| 17 | S1 UE network capability | S1 UE network capability 9.11.3.48 | O | TLV | 4-15 |
| 40 | Uplink data status | Uplink data status 9.11.3.57 | O | TLV | 4-34 |
| 50 | PDU session status | PDU session status 9.11.3.44 | O | TLV | 4-34 |
| B- | MICO indication | MICO indication 9.11.3.31 | O | TV | 1 |
| 2B | UE status | UE status 9.11.3.56 | O | TLV | 3 |
| 77 | Additional GUTI | 5GS mobile identity 9.11.3.4 | O | TLV-E | 14 |
| 25 | Allowed PDU session status | Allowed PDU session status 9.11.3.13 | O | TLV | 4-34 |
| 18 | UE's usage setting | UE's usage setting 9.11.3.55 | O | TLV | 3 |
| 51 | Requested DRX parameters | 5GS DRX parameters 9.11.3.2A | O | TLV | 3 |
| 70 | EPS NAS message container | EPS NAS message container 9.11.3.24 | O | TLV-E | 4-n |
| 74 | LADN indication | LADN indication 9.11.3.29 | O | TLV-E | 3-811 |
| 8- | Payload container type | Payload container type 9.11.3.40 | 0 | TV | 1 |
| 7B | Payload container | Payload container 9.11.3.39 | O | TLV-E | 4-65538 |
| 9- | Network slicing indication | Network slicing indication 9.11.3.36 | O | TV | 1 |
| 53 | 5GS update type | 5GS update type 9.11.3.9A | O | TLV | 3 |
| 71 | NAS message container | NAS message container 9.11.3.33 | O | TLV-E | 4-n |
| 60 | EPS bearer context status | EPS bearer context status 9.11.3.23A | O | TLV | 4 |

| NSSAI information element | |
|---|---|
| 8 7 6 5 4 3 2 1 | |
| NSSAI IEI | octet 1 |
| Length of NSSAI contents | octet 2 |
| S-NSSAI value 1 | octet 3<br>octet m |
| S-NSSAI value 2 | octet m + 1*<br>octet n* |
| . . . | octet n + 1*<br>octet u* |
| S-NSSAI value n | octet u + 1*<br>octet v* |

-continued

| Network slicing indication | | | | | |
|---|---|---|---|---|---|
| 8 7 6 5 | 4 | 3 | 2 | 1 | |
| Network slicing indication IEI | 0 Spare | 0 Spare | DCNI | NSSCI | octet 1 |

| |
|---|
| Network slicing subscription change indication (NSSCI) (octet 1, bit 1) |
| Bit |
| 1 |
| 0 Network slicing subscription not changed |
| 1 Network slicing subscription changed |
| Default configured NSSAI indication (DCNI) (octet 1, bit 2) |
| Bit |
| 2 |
| 0 Requested NSSAI not created from default configured NSSAI |
| 1 Requested NSSAI created from default configured NSSAI |
| In the UE to network direction bit 1 is spare. The UE shall set this bit to zero. |
| In the network to UE direction bit 2 is spare. The network shall set this bit to zero. |
| Bits 3 and 4 are spare and shall be coded as zero. |

S-NSSAI information element

| 8 7 6 5 4 3 2 1 | |
|---|---|
| S-NSSAI IEI | octet 1 |
| Length of S-NSSAI contents | octet 2 |
| SST | octet 3 |
| | octet 4* |
| SD | |
| | octet 6* |
| Mapped HPLMN SST | octet 7* |
| | octet 8* |
| Mapped HPLMN SD | |
| | octet 10* |

TABLE 5

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | Registration accept message identity | Message type 9.7 | M | V | 1 |
| | 5GS registration result | 5GS registration result 9.11.3.6 | M | LV | 2 |
| 77 | 5G-GUTI | 5GS mobile identity 9.11.3.4 | O | TLV-E | 14 |
| 4A | Equivalent PLMNs | PLMN list 9.11.3.45 | O | TLV | 5-47 |
| 54 | TAI list | 5GS tracking area identity list 9.11.3.9 | O | TLV | 9-114 |
| 15 | Allowed NSSAI | NSSAI 9.11.3.37 | O | TLV | 4-74 |
| 11 | Rejected NSSAI | Rejected NSSAI 9.11.3.46 | O | TLV | 4-42 |
| 31 | Configured NSSAI | NSSAI 9.11.3.37 | O | TLV | 4-146 |
| 21 | 5GS network feature support | 5GS network feature support 9.11.3.5 | O | TLV | 3-5 |
| 50 | PDU session status | PDU session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |
| 79 | LADN information | LADN information 9.11.3.30 | O | TLV-E | 12-1715 |
| B- | MICO indication | MICO indication 9.11.3.31 | O | TV | 1 |
| 9- | Network slicing indication | Network slicing indication 9.11.3.36 | O | TV | 1 |
| 27 | Service area list | Service area list 9.11.3.49 | O | TLV | 6-114 |
| 5E | T3512 value | GPRS timer 3 9.11.2.5 | O | TLV | 3 |
| 5D | Non-3GPP de-registration timer value | GPRS timer 2 9.11.2.4 | O | TLV | 3 |
| 16 | T3502 value | GPRS timer 2 9.11.2.4 | O | TLV | 3 |
| 34 | Emergency number list | Emergency number list 9.11.3.23 | O | TLV | 5-50 |

TABLE 5-continued

| IEI | Information Element | Type/Reference | Presence | Format | Length |
|---|---|---|---|---|---|
| 7A | Extended emergency number list | Extended emergency number list 9.11.3.26 | O | TLV-E | 7-65538 |
| 73 | SOR transparent container | SOR transparent container 9.11.3.51 | O | TLV-E | 20-2048 |
| 78 | EAP message | EAP message 9.11.2.2 | O | TLV-E | 7-1503 |
| A- | NSSAI inclusion mode | NSSAI inclusion mode 9.11.3.37A | O | TV | 1 |
| 76 | Operator-defined access category definitions | Operator-defined access category definitions 9.11.3.38 | O | TLV-E | 3-n |
| 51 | Negotiated DRX parameters | 5GS DRX parameters 9.11.3.2A | O | TLV | 3 |
| D- | Non-3GPP NW policies | Non-3GPP NW provided policies 9.11.3.36A | O | TV | 1 |
| 60 | EPS bearer context status | EPS bearer context status 9.11.3.23A | O | TLV | 4 |

2.0 Cell (Re)Selection for Network Slicing

In some configurations or occasions, it is desired for network operators to designate one or more radio spectrums, e.g. frequencies, radio bands, to a network slice(s). For example, a network slice for Ultra-Reliable Low Latency Communication (URLLC) may be served by one or more specific radio frequencies. For this purpose, GSM Association has published the document NG.116, General Network Slice Template, which includes a template to specify radio spectrum(s) to be supported by a network slice, as shown in Table 6.

TABLE 6

| Parameters | |
|---|---|
| Value | {String, String, String, . . . } |
| Measurement unit | NA |
| Example | n1<br>n77<br>n38 |
| Tags | Scalability attribute |

Various example embodiments and modes described herein pertain to methods and procedures for UE/network to perform/control a cell selection under the restriction of radio spectrum(s) for network slicing. FIG. 4 shows a generic communications system 20(4) which utilizes network slice technology and wherein, according to one or more of various aspects of the technology disclosed herein, a wireless terminal performs resource selection utilizing network slice band association information. The communications system 20(4) of FIG. 4, like the communications system 20 of FIG. 1, comprises one or more radio access networks (RANs) 22 and one or more core networks (CNs) 24. Similarly, core network (CN) 24 of FIG. 4 is shown as comprising one or more management entities 26, 26', . . . . A management entity 26 may be, for example, an Access and Mobility Management Function (AMF). Radio access network (RAN) 22 is shown as comprising one or more access nodes 28, 28' . . . . Although not illustrated as such, the communications system 20(4) of FIG. 3 may be and usually is utilized by plural PLMNs, as indicated by the dashed and double dotted vertical lines.

In the generic communications system 20(4) and other example embodiments and modes encompassed thereby, wireless terminal 30 communicates with a management entity ME of a core network through an access node of a radio access network (RAN), such as one of the access nodes 28. The core network supports one or more network slices, each of the network slices providing a designated service within a public land mobile network (PLMN).

Since the communications system 20(4) is generic to various other example embodiments and modes described herein, it is again mentioned that the wireless terminal may take various forms as mentioned above, and likewise that the access node may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Thus, the radio access network (RAN) 22 may include or represent one or more IAB nodes, including an IAB-donor node which may provide interface to a core network to UEs and wireless backhauling functionality to other IAB-nodes.

Moreover, generic communications system 20(4), and any other communications system described herein, may be realized in virtualized and/or distributed and/or logical form. For example, any access node that serves as a donor node in connecting to the core network may comprise at least one Central Unit (CU) and at least one Distributed Unit (DU). The CU is a logical entity managing the DU collocated in the IAB-donor as well as the remote DUs resident in the IAB-nodes. The CU may also be an interface to the core network, behaving as a RAN base station (e.g., eNB or gNB). In some embodiments, the DU is a logical entity hosting a radio interface (backhaul/access) for other child IAB-nodes and/or UEs. In one configuration, under the control of CU, the DU may offer a physical layer and Layer-2 (L2) protocols (e.g., Medium Access Control (MAC), Radio Link Control (RLC), etc.) while the CU may manage upper layer protocols (such as Packet Data Convergence Protocol (PDCP), Radio Resource Control (RRC), etc.). Access nodes that are not Donor nodes, e.g., IAB-nodes, may comprise DU and Mobile-Termination (MT) functions, where in some embodiments the DU may have the same functionality as the DU in the IAB-donor, whereas MT may be a UE-like function that terminates the radio interface layers. As an example, the MT may function to perform at least one of: radio transmission and reception, encoding and decoding, error detection and correction, signaling, and access to a SIM.

Herein, the term "band" is used to define a set of one or more frequency domain intervals. For a frequency division duplex (FDD), a band may comprise a pair of separate intervals for uplink and downlink transmission respectively, whereas for a time division duplex (TDD), a band may comprise a single interval shared by uplink and downlink. A band may represent a radio spectrum(s) or a spectrum band, symbolized by letter(s) and/or numbers, such as n1, n77 and n38 in Table 6. Although it should be understood that throughout the description of the technology disclosed herein the term "band" can be replaced by any other form of interval(s), such as a radio channel with a channel number (e.g. absolute radio frequency channel number, ARFCN), or by a bandwidth part (BWP) of a radio band.

Figure 5:
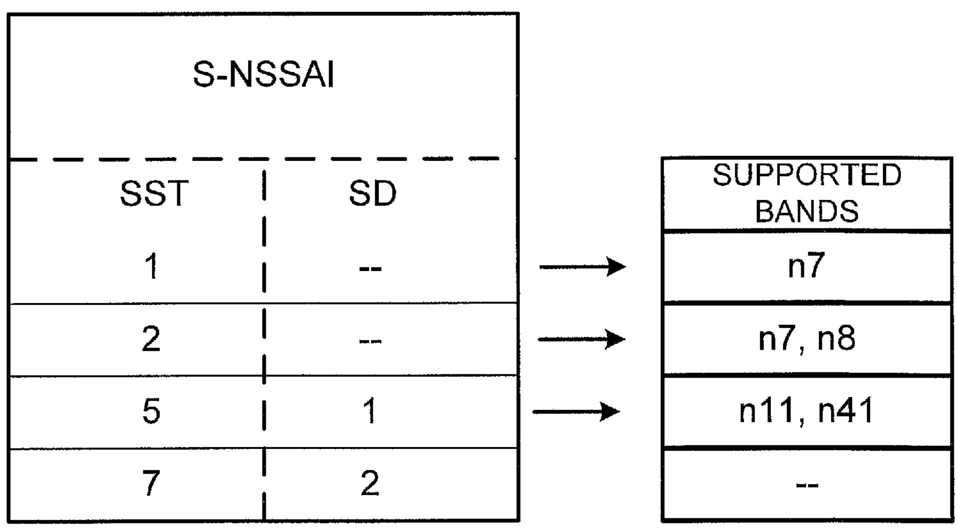
FIG. 5 is a diagrammatic view of an example implementation of the network slice band association information.

FIG. 4 simply illustrates by dashed and double dotted vertical lines that communications system 20(3) may utilize network slicing technology. For the generic embodiment of FIG. 4 and other example embodiments and modes described herein, the wireless terminal 30 may be configured with network slice band association information, NSBAI, also referred to as "network slice availability information", in order to instruct the wireless terminal 30 how to select a band supported by a network slice(s) of interest. The network slice band association information may comprise one or more S-NSSAIs, wherein each of the S-NSSAIs may optionally be associated with one or more supported bands. FIG. 5 shows an example implementation of the network slice band association information, wherein each entry of S-NSSAIs is associated with a list of supported bands. An S-NSSAI not associated with any supported bands (e.g. SST=7) may indicate that the S-NSSAI is not bounded to specific bands.

The generic example embodiment and mode of FIG. 4 shows that wireless terminal 30 comprises terminal resource selector 40 for use in a sliced network. As indicated above, the wireless terminal performs resource selection utilizing network slice band association information. As such, FIG. 4 shows that terminal resource selector 40 has access to network slice band association information 42, which is abbreviated for sake of convenience as NSBAI. The network slice band association information (NSBAI) 42 may be stored in a memory or memory circuitry.

As understood with reference to FIG. 5, the network slice band association information comprises a list of network slice identifiers, the network slice identifiers being shown in FIG. 5 as S-NSSAIs. Each of the network slice identifiers identifies a network slice, and each of at least some of the network slice identifiers are associated with a corresponding radio band(s), as shown by the rightwardly-pointing arrows in FIG. 5. The one or more radio bands are determined from a corresponding radio band(s) associated with the network slice identifier(s) of the at least one network slice.

Figure 6:
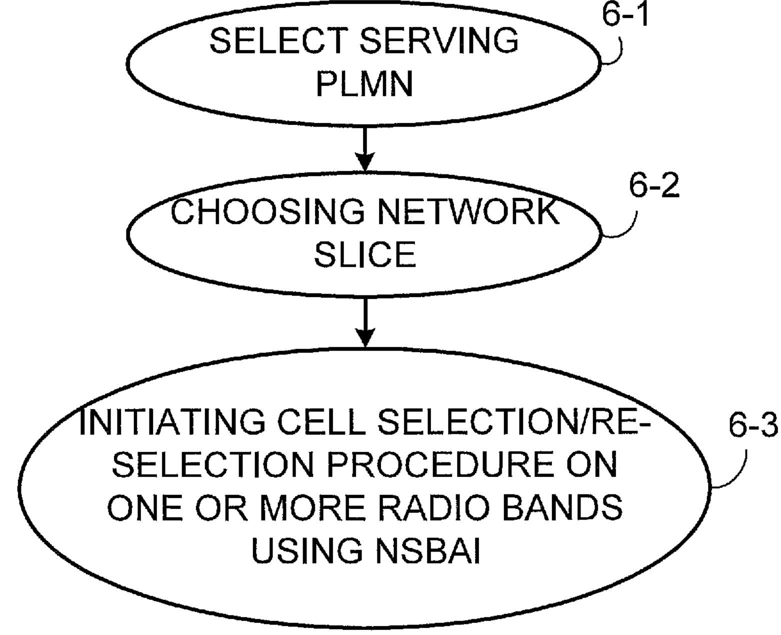
FIG. 6 is a diagrammatic view showing representative, example steps or acts performed by a wireless terminal of the generic communications system of FIG. 4.

FIG. 6 shows representative, example steps or acts performed by the wireless terminal 30 of the generic communications system 20(4). Act 6-1 comprises select a serving PLMN. Act 6-2 comprises choosing at least one network slice. Act 6-3 comprises initiating, based on network slice band association information, a cell selection/reselection procedure on one or more radio bands.

Figure 7:
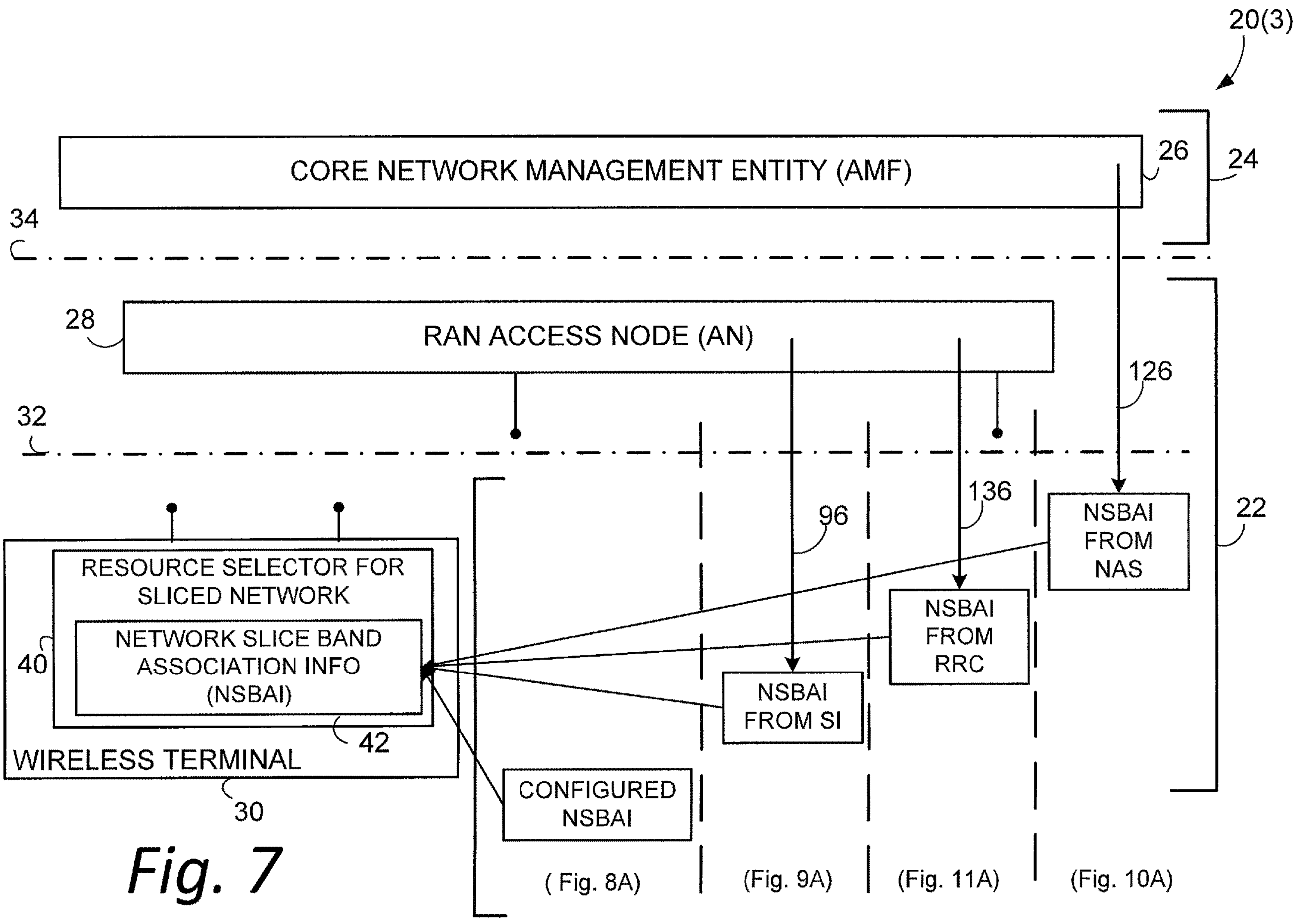
FIG. 7 is a schematic view of the generic communications system of FIG. 4 and further showing various example ways in which a wireless terminal may acquire network slice band association information.

FIG. 7 shows, in simplified diagrammatic form, various example ways in which the wireless terminal 30 may acquire the network slice band association information 42. In an example embodiment and mode depicted by FIG. 8A and FIG. 8B, the network slice band association information (NSBAI) 42 is configured at the wireless terminal 30. In an example embodiment and mode depicted by FIG. 9A and FIG. 9B, the network slice band association information (NSBAI) 42 is provided to the wireless terminal 30 by system information (SI). In an example embodiment and mode depicted by FIG. 10A and FIG. 10B, the network slice band association information (NSBAI) 42 is provided to the wireless terminal 30 by the non-access stratum (NAS). In an example embodiment and mode depicted by FIG. 11A and FIG. 11B, the network slice band association information (NSBAI) 42 is provided to the wireless terminal 30 by radio resource control (RRC) signaling.

Figure 8A:
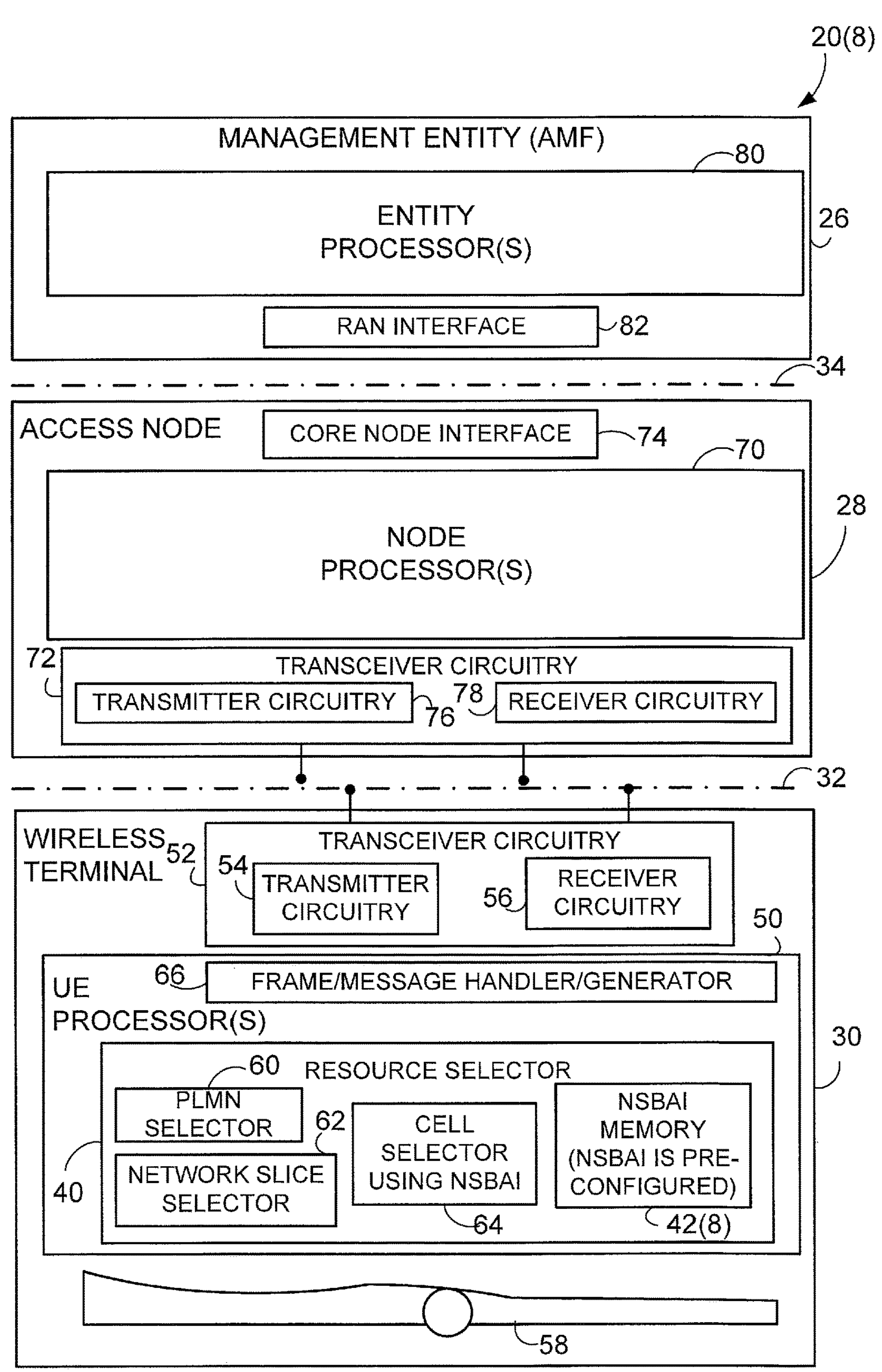
FIG. 8A is a schematic view of an example communications system in which network slice band association information (NSBAI) is configured at the wireless terminal 30.
Figure 8B:
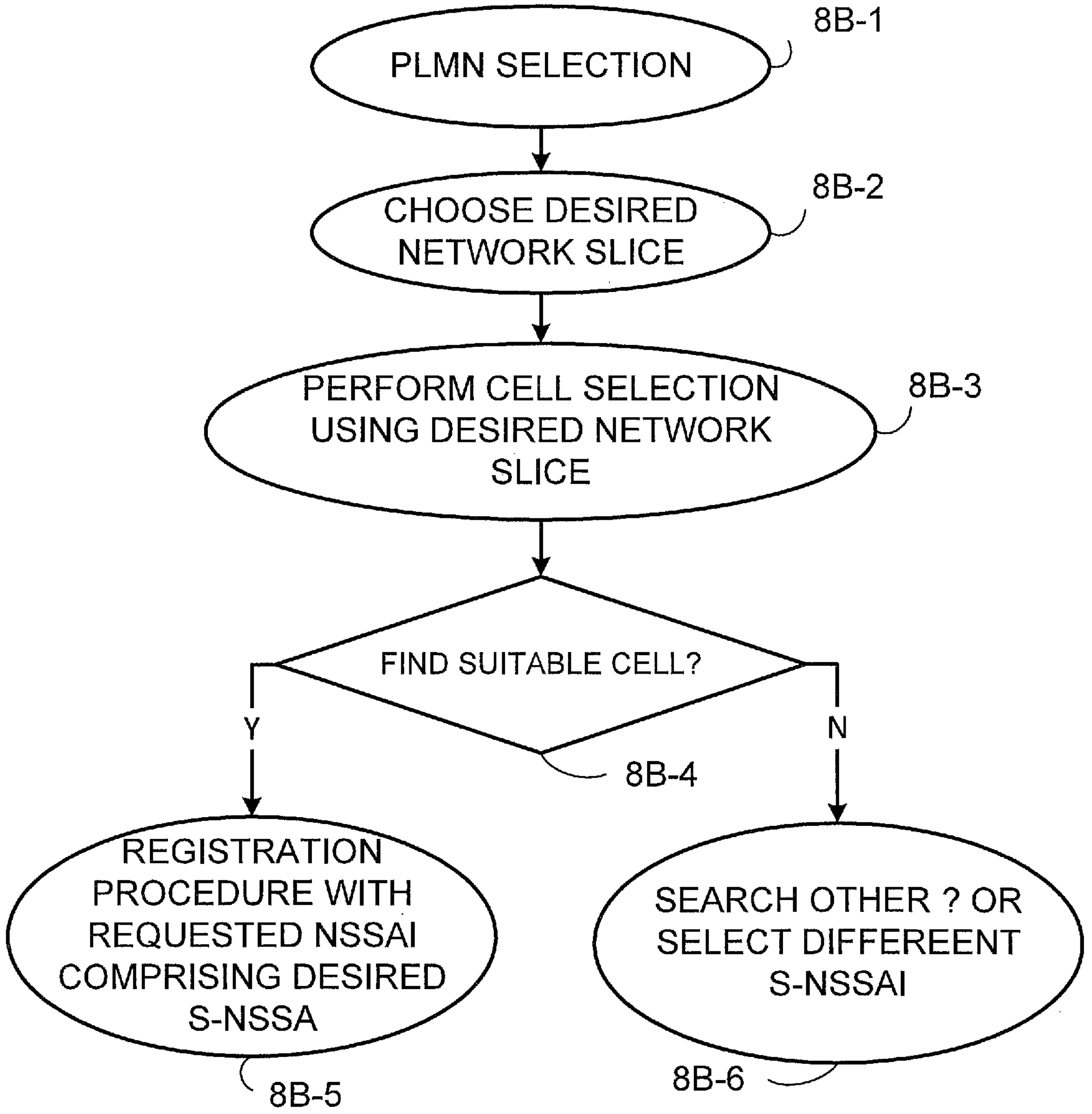
FIG. 8B is a diagrammatic view of example, representative acts or steps that are performed for resource selection for the communications system of FIG. 8A.

2.1 Configured NSBAI FIG. 8A shows, in more detail, an example communications system 20(8) in which network slice band association information (NSBAI) 42 is configured at the wireless terminal 30. FIG. 8B shows example, representative acts or steps that are performed for resource selection for the communications system 20(6) of FIG. 8B.

FIG. 8A shows that wireless terminal 30 comprises terminal processor circuitry 50 and terminal transceiver circuitry 52. The terminal processor circuitry 50 may be realized or comprise one or more processors and at least one memory. The memory includes computer program code, wherein the memory and the computer program code are configured to, working with the at least one processor, cause the decoding device to perform at least at least the operations described herein.

The transceiver circuitry 52 in turn may comprise terminal transmitter circuitry 54 and terminal receiver circuitry 56. The transceiver circuitry 52 includes antenna(e) for the wireless transmission. Transmitter circuitry 54 may include, e.g., amplifier(s), modulation circuitry and other conventional transmission equipment. Receiver circuitry 56 may comprise, e.g., amplifiers, demodulation circuitry, and other conventional receiver equipment. FIG. 8A further shows that wireless terminal 30 may also comprise terminal interfaces 58. Such user interfaces may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The terminal processor circuitry 50 of FIG. 8A is shown as including terminal resource selector 40. In addition to network slice band association information (NSBAI) 42, the terminal resource selector 40 comprises PLMN selector 60; network slice selector 62; and cell selector 64 which uses network slice band association information (NSBAI) 42. In addition, terminal processor circuitry 50 may include frame/message generator/handler 66, as well as many other unillustrated functionalities including those not strictly germane to the technology disclosed herein.

The access node 28 of communications system 20(6) comprises node processor circuitry 70; node transceiver circuitry 72; and interface 74 to core network (CN) 24. The node processor circuitry 70 may be realized or comprise one or more processors and at least one memory. The memory includes computer program code, wherein the memory and the computer program code are configured to, working with the at least one processor, cause the decoding device to perform at least at least the operations described herein.

The node transceiver circuitry 72 may comprise node transmitter circuitry 76 and node receiver circuitry 78. The transceiver circuitry 72 includes antenna(e) for the wireless transmission. Transmitter circuitry 76 may include, e.g., amplifier(s), modulation circuitry and other conventional transmission equipment. Receiver circuitry 78 may comprise, e.g., amplifiers, demodulation circuitry, and other conventional receiver equipment. As indicated above, various aspects of access node 28 including the node transceiver circuitry 72 may be realized by a distributed unit (DU) and a central unit (CU).

The management entity 26 of communications system 20(8) may comprise core network entity processor circuitry 80 and interface 82 toward the radio access network (RAN) 22. The core network entity processor circuitry 80 may be realized or comprise one or more processors and at least one memory. The memory includes computer program code, wherein the memory and the computer program code are configured to, working with the at least one processor, cause the decoding device to perform at least at least the operations described herein.

In one example implement of the embodiment of FIG. 8A, the network slice band association information may be pre-configured to the wireless terminal 30. The network slice band association information (NSBAI) 42 is preferably preconfigured to the wireless terminal 30 by a home PLMN, HPLMN. In some deployment scenarios, the network slice band association information may be common to the HPLMN and roaming partners, e.g. VPLMNs. In this case, S-NSSAIs in the network slice band association information may be considered to be, or derived from, a default NSSAI with standardized SST values. In other scenarios, the network slice band association information is configured per PLMN, i.e., a separate network slice band association information may be configured for a specific PLMN, HPLMN or VPLMN. In this case, the network slice band association information may include S-NSSAIs with standardized and/or non-standardized SST values.

FIG. 8B shows example, representative acts or steps performed by the wireless terminal 30 of the communications system 20(8). Act 8B-1 shows wireless terminal 30 performing a PLMN selection procedure. After performing the PLMN selection procedure to choose a PLMN, as act 8B-2 the wireless terminal 30 may choose desired network slice(s). Based on the chosen desired network slice(s) of act 8B-2, as act 8B-3 the wireless terminal 30 may perform the cell selection procedure, only on or prioritizing the band(s) associated with the chosen network slice(s). For example, suppose that the wireless terminal 30 chooses the S-NSSAI with its SST value 2 in FIG. 5, which instructs the wireless terminal 30 to search cells on bands n7 and n8. Act 8B-4 comprises wireless terminal 30 checking to determine if a suitable cell was successfully found in either of the bands. If the wireless terminal 30 successfully finds a suitable cell in either of the bands, as act 8B-5 the wireless terminal 30 may proceed to performing the aforementioned registration procedure with a requested NSSAI comprising the chosen S-NSSAI (with SST=2). If the wireless terminal 30 fails to find a suitable cell in those bands, as act 8B-6 the wireless terminal 30 may search for other bands, or may select a different S-NSSAI (such as the S-NSSAI with SST=5 associated with n11 and n41).

2.2 NSBAI Obtained from System Information

Figure 9A:
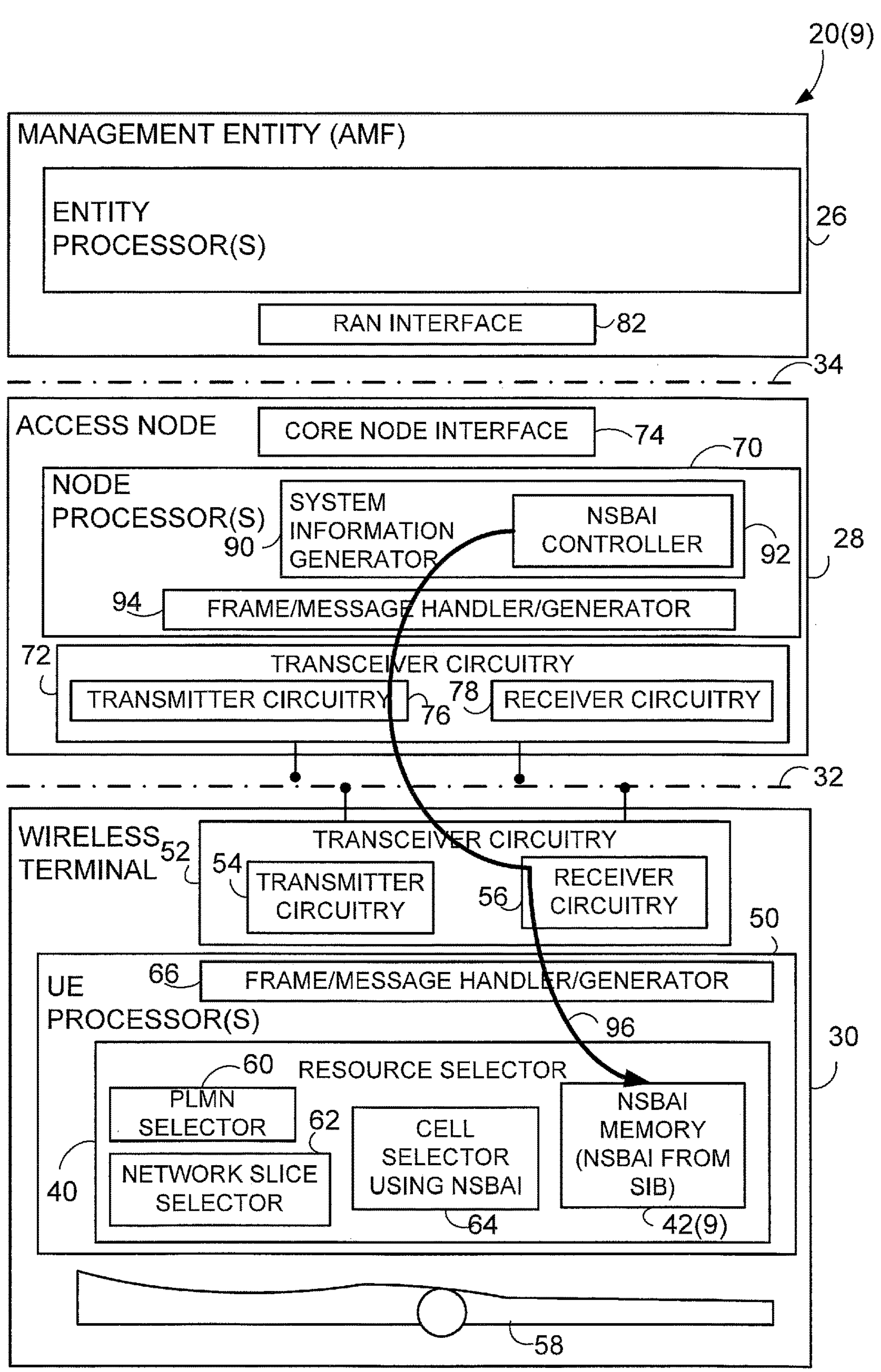
FIG. 9A is a schematic view of an example communications system in which network slice band association information (NSBAI) is obtained by a wireless terminal from system information.
Figure 9B:
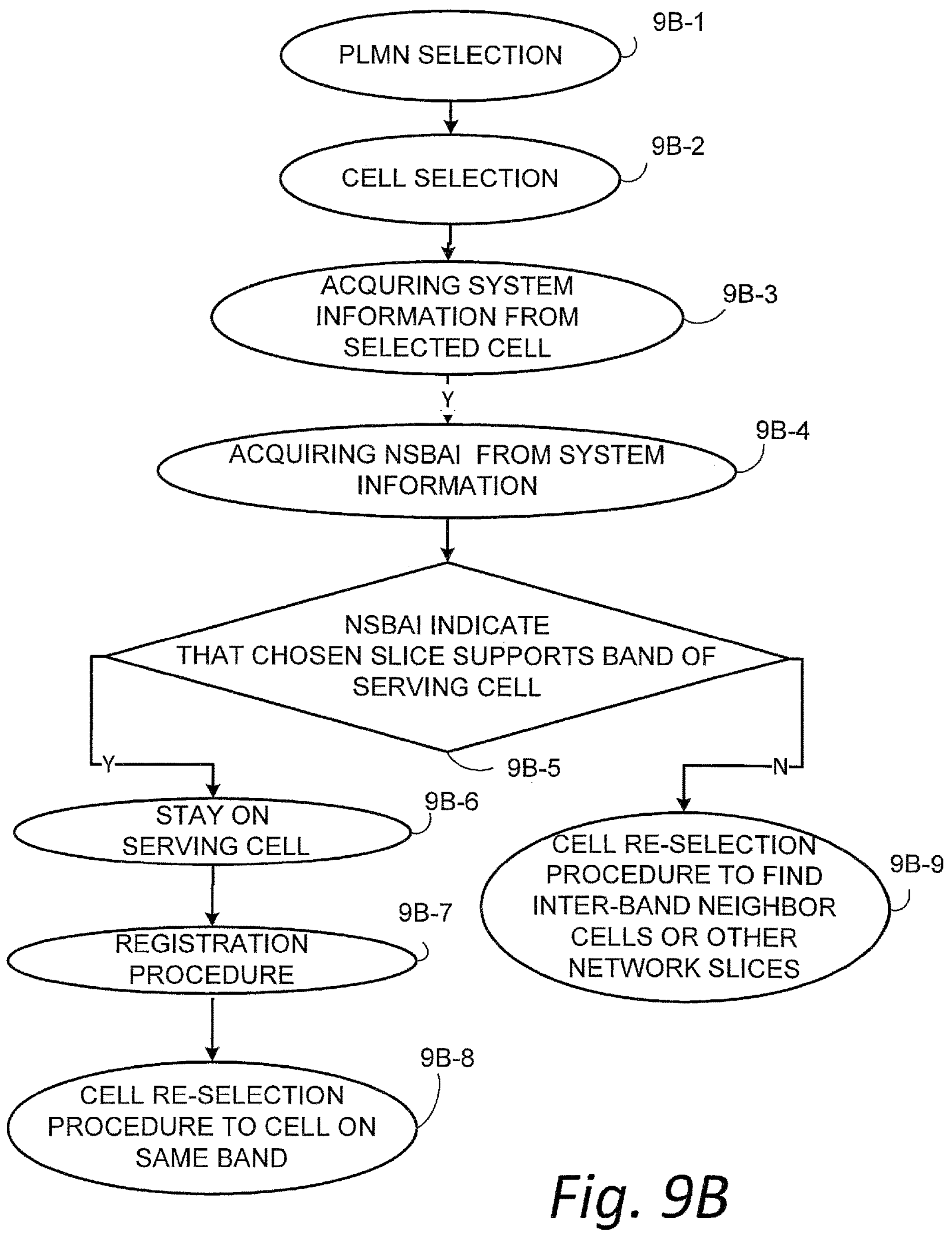
FIG. 9B is a diagrammatic view of example, representative acts or steps that are performed for resource selection for the communications system of FIG. 9A.

FIG. 9A is a schematic view of an example communications system 20(9) in which network slice band association information (NSBAI) is obtained by a wireless terminal from system information. FIG. 9B is a diagrammatic view of example, representative acts or steps that are performed for resource selection for the communications system of FIG. 9A.

Structures and functionalities of the communications system 20(9) of FIG. 9A which are common or essentially the same as one of more of the preceding example embodiments have the same reference numerals and may not be again discussed with reference to FIG. 9A. For example, much of the structure of wireless terminal 30 of FIG. 9A is similar to preceding example embodiments. In view of the fact that in the example embodiment of FIG. 9A the wireless terminal 30 receives its network slice band association information (NSBAI) 42 from system information, FIG. 9A further shows access node 28 as comprising system information generator 90, which is configured to generate system information such as system information blocks, e.g., SIBs, for the cell(s) served by access node 28. The system information generator 90 includes a unit or functionality herein known as node NSBAI controller 92 which controls the formatting or inclusion of the network slice band association information (NSBAI) 42 in the system information generated by system information generator 90. In some example modes, implementations, or scenarios, the NSBAI may be generated by the access node based on (pre)configurations from the management entity. For example, the NSBAI may be generated by the node NSBAI controller 92 based on (pre) configurations from the management entity. In other example modes, implementations, or scenarios, the NSBAI may be generated by the management entity and provided to the access node, e.g., provided to node NSBAI controller 92 so that node NSBAI controller 92 may include the NSBAI in the system information. The system information generator 90 with its node NSBAI controller 92 preferably comprises or is included in node processor circuitry 70 of access node 28. FIG. 9A further illustrates that the node processor circuitry 70 of access node 28 typically also includes a frame/message handler/generator 94, which may serve to format the system information in transmissions of access node 28. The arrow 96 of FIG. 9A shows that wireless terminal 30 of FIG. 9A receives its network slice band association information in memory (NSBAI) 42(9).

In the example embodiment and mode of FIG. 9A the network slice band association information may be broadcasted in system information, e.g. in one or more system information blocks, SIBs. In the FIG. 9A embodiment and mode, the network slice band association information may be specific, e.g., valid (1) within the serving PLMN, (2) within a registration area of the serving PLMN, or (3) within a cell(s) served by an access node, e.g., cells served by the access node. In an example embodiment and mode a network entity, e.g. an AMF 26, may (pre)configure access nodes with available network slices and supported band information, as explained above.

FIG. 9B shows example acts or steps that may be performed by the communications system 20(9) of FIG. 9A. Act 9B-1 shows wireless terminal 30 performing a PLMN selection procedure; act 9B-2 comprises the wireless terminal 30 performing a cell selection procedure as disclosed above. Act 9B-3 comprises the wireless terminal 30 acquiring, from a selected cell, a system information message(s). Act 9B-4 comprises wireless terminal 30 obtaining the network slice band association information from the system information.

The cell that provides the network slice band association information via system information may advertise more than one PLMN. For example, SIB1 may possibly indicate multiple PLMNs. For this case, SIB(s) including the network slice band association information may additionally comprise information indicating which PLMN(s) the network slice band association information may be applied to. Preferably, the system information may include multiple instances of the network slice band association information, each of the instances being applied to one or more designated PLMNs.

For example, Table 7 shows an example format of the SIB1 comprising NetworkSliceBandAssociationInfoList per PLMN, NetworkSliceBandAssociationInfoList further comprising a list of S-NSSAIs and associated bands (frequencyBandList) for each S-NSSAI.

TABLE 7

```
SIB1 ::=          SEQUENCE {
  cellSelectionInfo                   SEQUENCE {
    q-RxLevMin                          Q-RxLevMin,
    q-RxLevMinOffset                      INTEGER (1..8)
OPTIONAL,                             -- Need S
    q-RxLevMinSUL                         Q-RxLevMin
OPTIONAL,                             -- Need R
    q-QualMin                           Q-QualMin
OPTIONAL,                             -- Need S
    q-QualMinOffset                       INTEGER (1..8)
OPTIONAL                              -- Need S
  }
OPTIONAL,                             -- Cond Standalone
  cellAccessRelatedInfo                   CellAccessRelatedInfo
  connEstFailureControl                   ConnEstFailureControl
OPTIONAL,                             -- Need R
  si-SchedulingInfo                     SI-SchedulingInfo
OPTIONAL,                             -- Need R
  servingCellConfigCommon                 ServingCellConfigCommonSIB
OPTIONAL,                             -- Need R
  ims-EmergencySupport                    ENUMERATED {true}
OPTIONAL,                             -- Need R
  eCallOverIMS-Support                    ENUMERATED {true}
OPTIONAL,                             -- Cond Absent
  ue-TimersAndConstants                   UE-TimersAndConstants
OPTIONAL,                             -- Need R
  uac-BarringInfo                       SEQUENCE {
    uac-BarringForCommon                      UAC-BarringPerCatList
OPTIONAL,                             -- Need S
   uac-BarringPerPLMN-List                      UAC-BarringPerPLMN-List
OPTIONAL,                             -- Need S
    uac-BarringInfoSetList                      UAC-BarringInfoSetList,
    uac-AccessCategory1-SelectionAssistanceInfo CHOICE {
    plmnCommon
UAC-AccessCategory1-selectionAssistanceInfo,
      individualPLMNList SEQUENCE (SIZE (2..maxPLMN)) OF
UAC-AccessCategory1-SelectionAssistanceInfo
    }
OPTIONAL                              -- Need S
  }
OPTIONAL,                             -- Need R
  use FullResumeID                          ENUMERATED {true}
OPTIONAL,                             -- Need N
  lateNonCriticalExtension                    OCTET STRING
OPTIONAL,
  nonCriticalExtension                      SEQUENCE{ }
OPTIONAL
}
CellAccessRelatedInfo   ::=                 SEQUENCE {
  plmn-IdentityList                           PLMN-IdentityInfoList,
  cellReservedForOtherUse                     ENUMERATED {true} OPTIONAL,
-- Need R
  ...
}
PLMN-IdentityInfoList ::=                   SEQUENCE (SIZE (1..maxPLMN)) OF
PLMN-IdentityInfo
PLMN-IdentityInfo ::=                     SEQUENCE {
  plmn-IdentityList                           SEQUENCE (SIZE (1..maxPLMN))
OF PLMN-Identity,
  trackingAreaCode                            TrackingAreaCode
OPTIONAL,                             -- Need R
  ranac                                     RAN-AreaCode
OPTIONAL,                             -- Need R
  cellIdentity                                CellIdentity,
  cellReservedForOperatorUse                      ENUMERATED {reserved,
notReserved},
  networkSliceBandAssociationInfoList         SEQUENCE (SIZE
```

TABLE 7-continued

```
(1.. maxNrofS-NSSAI) OF NetworkSliceBandAssociationInfo
OPTIONAL,
  ...
}
NetworkSliceBandAssociationInfo                    SEQUENCE {
  s-NSSAI                                   S-NSSAI,
  frequencyBandList MultiFrequencyBandListNR-SIB, OPTIONAL
  ...
}
```

Upon acquiring the system information message(s), as act 9B-5 the wireless terminal 30 may determine if the network slice band association information indicates that the chosen network slice(s) supports the band of the serving cell. If the result of act 9B-5 is affirmative, as act 9B-6 the wireless terminal 30 may stay on the serving cell. Further, as act 9B-7 the wireless terminal 30 may proceed to perform a registration procedure with the requested NSSAI including the S-NSSAI(s) supported on the band. As further shown by act 9B-8, the wireless terminal 30 may further perform a cell reselection procedure to a cell on the same band. If the determination of act 9B-5 is negative, e.g., if the system information indicates that the network slice(s) is (are) not supported in the band of the serving cell, as act 9B-9 the wireless terminal 30 may perform the cell reselection to find other inter-band neighbor cells, or may attempt to choose other network slice(s).

It should be noted that S-NSSAIs in the network slice band association information provided via system information may be specific to the serving PLMN. That is, non-standardized SST values can be used. Meanwhile, an S-NSSAI of interest to the wireless terminal 30 may be based on a list of S-NSSAIs, such as subscribed S-NSSAIs or a default configured NSSAI, configured by the HPLMN. The following shows alternative conditions for an S-NSSAI to be still valid, e.g., recognizable, within the serving PLMN:

- the serving PLMN is the HPLMN, or one of the equivalent PLMNs of the HPLMN;
- the S-NSSAI comprises a standardized SST value; or
- the S-NSSAI has been already configured by the serving PLMN via a registration procedure (the registration procedure may have provided the wireless terminal a mapping of the S-NSSAI to a corresponding S-NSSAI in the serving PLMN).

Otherwise, the wireless terminal 30 may not be able to know which entry in the network slice band association information maps to the S-NSSAI of interest. In this case, after receiving the system information and prior to performing a cell reselection, the wireless terminal 30 may perform the registration procedure, wherein the Registration Accept message may comprise mappings of serving PLMN S-NSSAIs to HPLMN S-NSSAIs. Using the mappings, the wireless terminal 30 may determine if the chosen S-NSSAI(s) supports the band of the serving cell. If positive, the wireless terminal may stay on the cell and/or perform a cell reselection on the same band. Otherwise, the wireless terminal may perform the cell reselection to find other inter-band neighbor cells, or may attempt to choose other network slice(s).

2.3 NSBAI Obtained from Non-Access Stratum

Figure 10A:
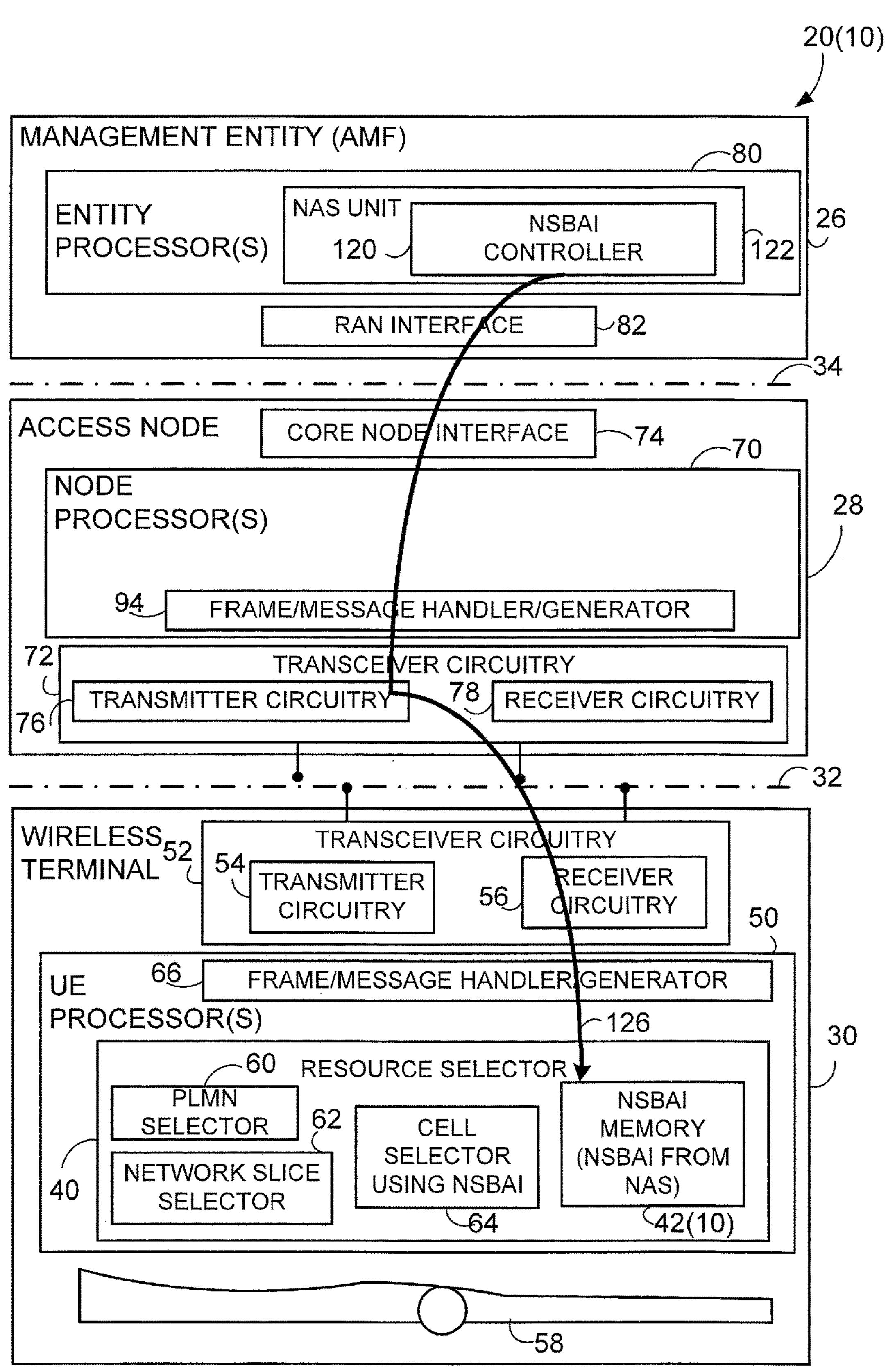
FIG. 10A is a schematic view of an example communications system in which network slice band association information (NSBAI) is obtained by a wireless terminal from the non-access stratum (NAS).
Figure 10B:
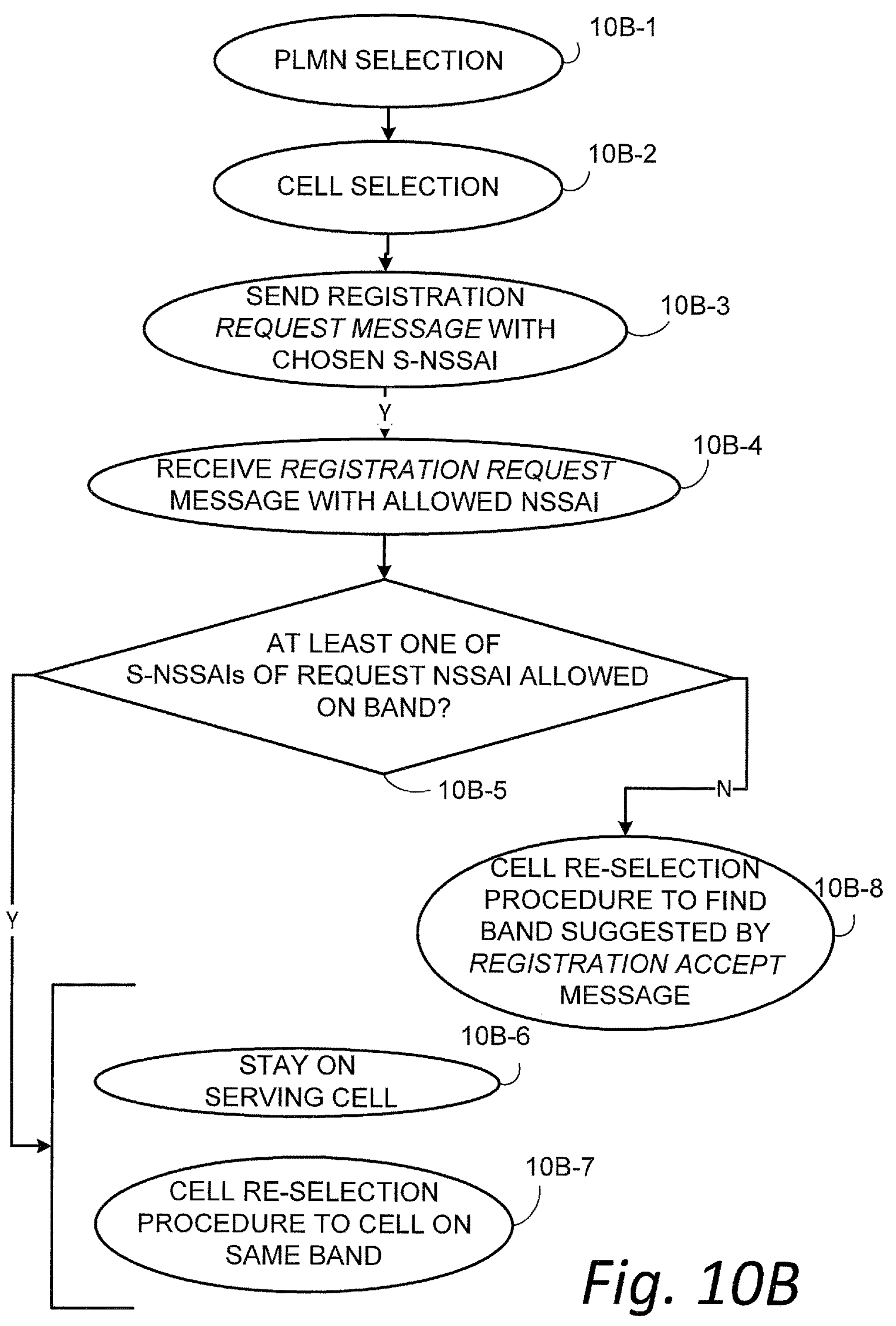
FIG. 10B is a diagrammatic view of example, representative acts or steps that are performed for resource selection for the communications system of FIG. 10A.

FIG. 10A is a schematic view of an example communications system 20(10) in which network slice band association information (NSBAI) is obtained by a wireless terminal from the non-access stratum (NAS), e.g., in a non-access stratum message. FIG. 10B is a diagrammatic view of example, representative acts or steps that are performed for resource selection for the communications system of FIG. 10A.

Structures and functionalities of the communications system 20(10) of FIG. 10A which are common or essentially the same as one of more of the preceding example embodiments have the same reference numerals. For example, much of the structure of wireless terminal 30 of FIG. 10A is similar to preceding example embodiments.

In view of the fact that in the example embodiment of FIG. 10A the wireless terminal 30 receives its network slice band association information (NSBAI) 42 from the non-access stratum (NAS), FIG. 10A further shows management entity 26 as comprising system the non-access stratum (NAS) unit 120, which includes a unit or functionality herein known as core NSBAI controller 122 which controls the formatting or inclusion of the network slice band association information (NSBAI) 42 in the non-access stratum information generated by non-access stratum (NAS) unit 120. The non-access stratum (NAS) unit 120 with its core NSBAI controller 122 preferably comprises or is included in node processor circuitry 70 of management entity 26. The arrow 126 of FIG. 10A shows that wireless terminal 30 of FIG. 10A receives its network slice band association information in memory (NSBAI) 42(10).

As an example implement of the FIG. 10A embodiment and mode, in terms of the network slice band association information (NSBAI) being provided in a non-access stratum message, the network slice band association information may be provided during the registration procedure, preferably provided in a Registration Accept message. In this example implementation, as shown by act 10B-1 in FIG. 10B the wireless terminal 30 may perform PLMN selection and then as act 10B-2 perform cell selection, e.g., using the aforementioned regular cell selection with no limitation on frequencies/bands in terms of network slices. As act 10B-3, the wireless terminal 30 sends a Registration Request message through access node 28 to management entity 26. The Registration Request message may comprise the chosen S-NSSAI(s) as at least a part of the Requested NSSAI. In response to the Registration Request message, as act 10B-4 the wireless terminal 30 receives a Registration Accept message. In the Registration Accept message, each S-NSSAI in the Allowed NSSAI and/or the Configured NSSAI information element(s) may be associated with supported band(s). The network slice band association information (NSBAI) received in the Registration Accept message is stored in network slice band association information (NSBAI) memory 42(10) of wireless terminal 30.

As an exemplary implementation of the network slice band association information, a NAS message, e.g. the Registration Accept message, may comprise an optional information element, such as “Allowed NSSAI Band Association” information element, for the Allowed NSSAI, and/or may comprise another optional “Configured NSSAI Band Association" information element for the Configured NSSAI. FIG. 12 illustrates an example format of the optional information elements, which shares the same structure shown as "NSSAI Band Association". Herein, each S-NSSAI value in the NSSAI information element is associated, in the order of the S-NSSAI fields, with one entry of the NSSAI Band Association information element, wherein each entry comprises one or more bands. If a particular S-NSSAI has no band association, the length of the corresponding Association x field in the NSSAI Band Association information element may be set to zero.

Upon receiving the Registration Accept message in act 10B-4 in the implementation scenario of FIG. 10B, wireless terminal 30 may stay on the currently serving cell as indicated by act 10B-6, and/or as indicated by act 10B-7 may perform a cell reselection on the same band of the currently serving cell, if it is determined as act 10B-5 that the Registration Accept message indicates that at least one of the S-NSSAIs in the Requested NSSAI is allowed on the band. Otherwise, as act 10B-8 the UE may initiate a cell reselection to one of the bands suggested by the Registration Accept message, or may attempt to choose other network slice(s).

For example, suppose that 30 wireless terminal 30 desires a network slice with S-NSSAI=(SST:1, SD: n/a) and wireless terminal 30 is currently camping on a cell on band n7. The wireless terminal 30 may initiate, on the cell, the registration procedure by sending the Registration Request message, which may include a Requested NSSAI being set to the S-NSSAI. If the Registration Accept message includes an Allowed NSSAI with the S-NSSAI (or a serving PLMN specific S-NSSAI mapped from the S-NSSAI), and if the corresponding entry in the Allowed NSSAI Band Association includes n7, wireless terminal 30 may consider that the S-NSSAI is supported in n7 and may not initiate a cell reselection. On the other hand, if the corresponding entry does not include n7, but does include n8, wireless terminal 30 may initiate a cell reselection to find a cell on n8.

2.3 NSBAI Obtained from RRC Signaling

Figure 11A:
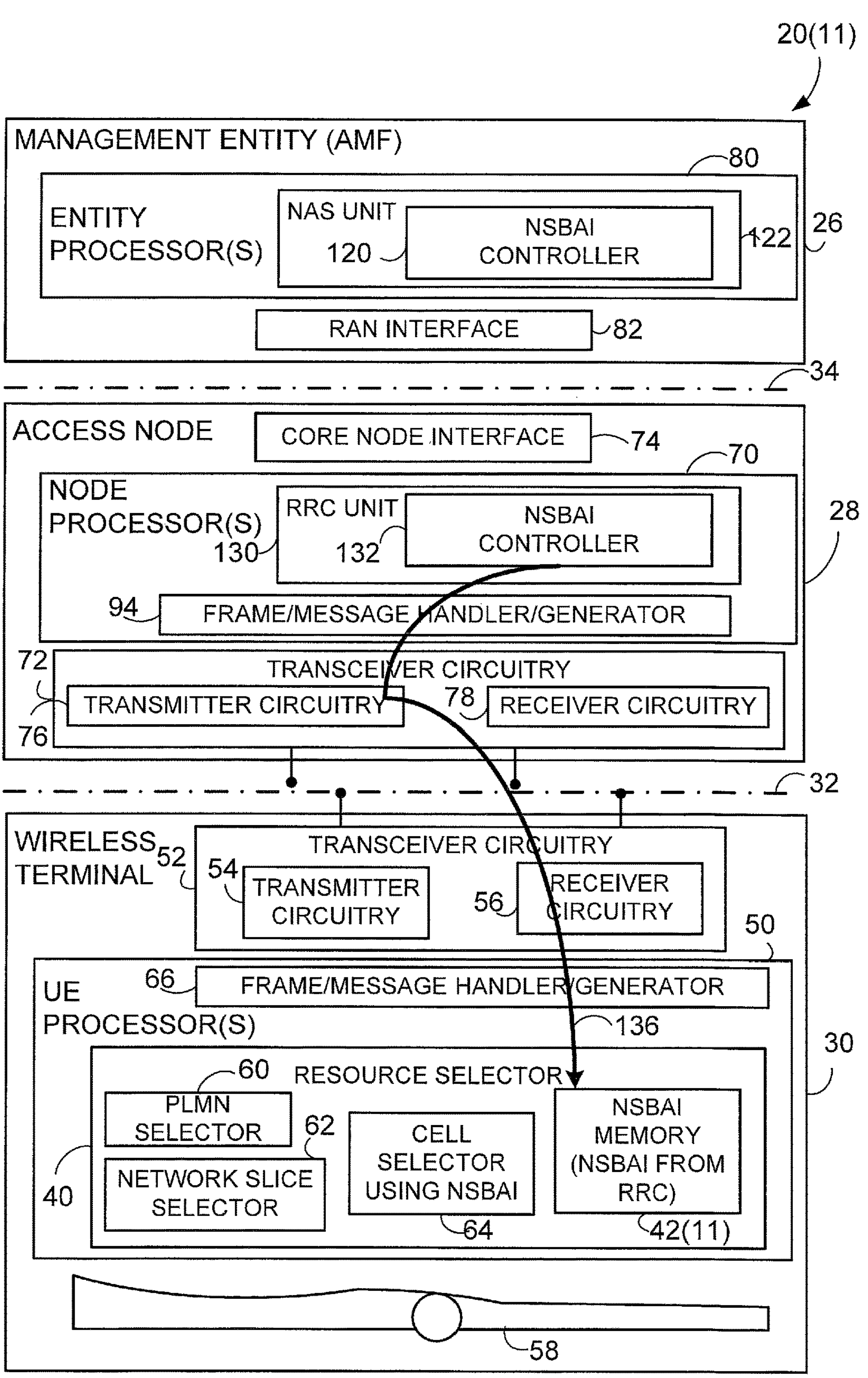
FIG. 11A is a schematic view of an example communications system in which network slice band association information (NSBAI) is obtained by a wireless terminal from radio resource control (RRC) signaling.
Figure 11B:
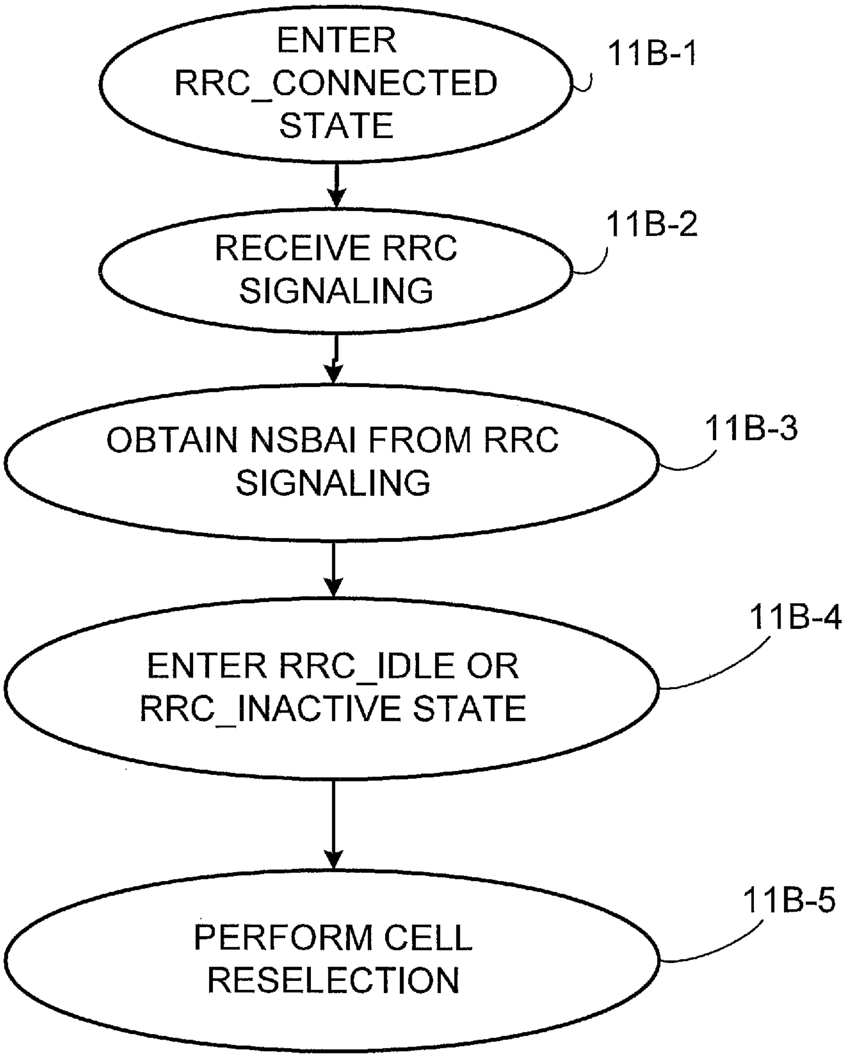
FIG. 11B is a diagrammatic view of example, representative acts or steps that are performed for resource selection for the communications system of FIG. 11A.

FIG. 11A is a schematic view of an example communications system 20(11) in which network slice band association information (NSBAI) is obtained by a wireless terminal from radio resource control (RRC) signaling. FIG. 11B is a diagrammatic view of example, representative acts or steps that are performed for resource selection for the communications system of FIG. 11A.

Structures and functionalities of the communications system 20(11) of FIG. 11A which are common or essentially the same as one of more of the preceding example embodiments have the same reference numerals and may not be again discussed with reference to FIG. 11A. For example, much of the structure of wireless terminal 30 of FIG. 11A is similar to preceding example embodiments. In view of the fact that in the example embodiment of FIG. 11A the wireless terminal 30 receives its network slice band association information (NSBAI) 42 from RRC signaling received from access node 28, FIG. 11A further shows access node 28 as comprising radio resource control (RRC) unit 130, which is configured to generate RRC signals for transmission to wireless terminal 30 and to process RRC signals received from wireless terminal 30. The radio resource control (RRC) unit 130 includes a unit or functionality herein known as node NSBAI controller 132 which controls the formatting or inclusion of the network slice band association information (NSBAI) 42 in the RRC signal(s) generated by system radio resource control (RRC) unit 130. In some example modes, implementations, or scenarios, the NSBAI may be generated by the access node based on (pre)configurations from the management entity. For example, the NSBAI may be generated by the node NSBAI controller 132 based on (pre) configurations from the management entity. In other example modes, implementations, or scenarios, the NSBAI may be generated by the management entity and provided to the access node, e.g., provided to node NSBAI controller 132 so that node NSBAI controller 132 may include the NSBAI in the RRC signal or messages. The radio resource control (RRC) unit 130 with its node NSBAI controller 132 preferably comprises or is included in core node processor circuitry 70 of access node 28. The arrow 136 of FIG. 11A shows that wireless terminal 30 of FIG. 11A receives its network slice band association information in memory (NSBAI) 42(11).

In the example embodiment and mode of FIG. 11A, the network slice band association information may be provided by a dedicated RRC signaling during the RRC_CONNECTED state, such as RRCReconfiguration message and/or RRCRelease message. FIG. 11B shows example acts which may be performed in the communications system 20(11) of FIG. 11A. Act 11B-1 shows wireless terminal 30 entering the RRC_CONNECTED state. Act 11B-2 shows wireless terminal 30 receiving RRC signaling, such as an RRCReconfiguration message. Act 11B-3 depicts the wireless terminal 30 obtaining the network slice band association information (NSBAI) from the RRC signaling for use by wireless terminal 30. Act 11B-4 shows that wireless terminal 30 may enter RRC_IDLE or RRC_INACTIVE state. Act 11B-5 further shows that wireless terminal 30 may perform a cell reselection based on the network slice band association information.

2.4 NSBAI Considerations

For the example embodiments and modes disclosed above, such as FIG. 8A, FIG. 9A, FIG. 10A, and FIG. 11A, if the network slice band association information does not list an S-NSSAI of interest, or if it lists an S-NSSAI of interest with no band associations, the network slice identified by the S-NSSAI may be considered to be not bounded to specific bands.

Furthermore, as an alternative implementation of any of the foregoing example embodiments and modes, the network slice band association information may comprise an entry with an S-NSSAI and one or more associated bands not supported for the S-NSSAI, i.e., blacklist. The network slice identified by the S-NSSAI may be considered to be supported in any available bands, except for those one or more associated bands.

Figures 13, 14, 15:
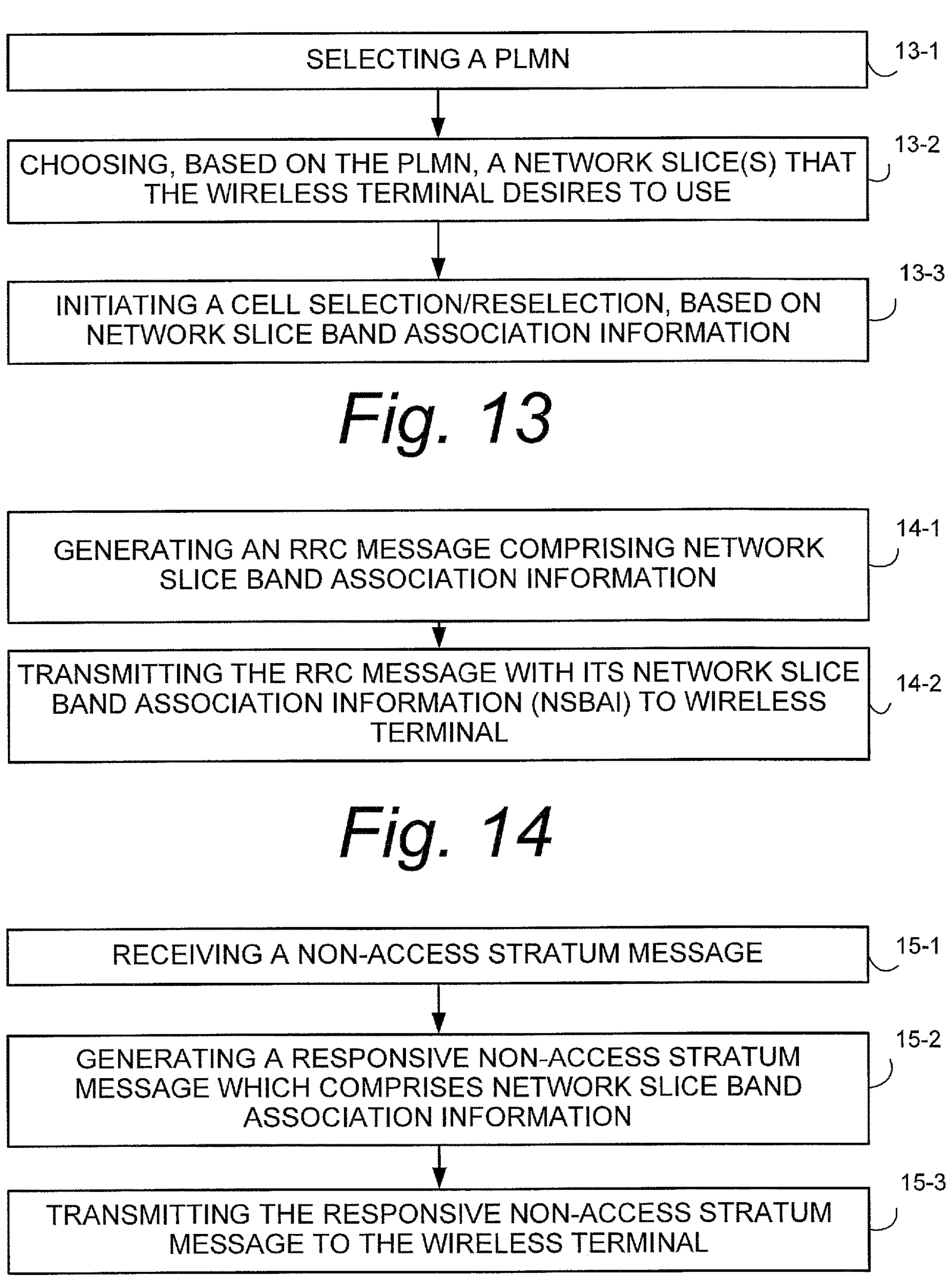
FIG. 13 is a flowchart showing example, representative acts or steps that may be performed by a wireless terminal according to generic embodiments and modes described herein including embodiments and modes of FIG. 4, FIG. 8A-FIG. 8B, FIG. 9A-FIG. 9B, FIG. 10A-FIG. 10B, and FIG. 11A-FIG. 11B.
FIG. 14 is a flowchart showing example, representative acts or steps that may be performed by an access node according to the example embodiment and mode of FIG. 11A-FIG. 11B.
FIG. 15 is a flowchart showing example, representative acts or steps that may be performed by a management entity of a core network according to the example embodiment and mode of FIG. 10A-FIG. 10B.

FIG. 13 shows example representative steps or acts which may be performed by a generic wireless terminal, e.g., UE, of FIG. 4. A generic wireless terminal 30 encompasses and is capable of operation according any one of the foregoing example embodiments and modes, including FIG. 8A-FIG. 8B, FIG. 9A-FIG. 9B, FIG. 10A-FIG. 10B, and FIG. 11A-FIG. 11B. Act 13-1 comprises selecting a PLMN. Act 13-2 comprises choosing, based on the PLMN, a network slice(s) that the wireless terminal desires to use. Act 13-3 comprises initiating a cell selection/reselection, based on network slice band association information. The network slice band association information (NSBAI) 42 may either be preconfigured to the wireless terminal (as in the case of FIG. 8A-FIG. 8B), provided in an RRC message, e.g. a system information message (as in the case of FIG. 9A-FIG. 9B) or a dedicated RRC message(s) (as in the case of FIG. 11A-FIG. 11B), or provided in a NAS message (as in the case of FIG. 10A-FIG. 10B). Examples of RRC message(s) include a reconfiguration message, a release message, or any other RRC message(s). An example of a NAS message is a registration accept message.

FIG. 14 shows example representative steps or acts which may be performed by an access node 28 according to the example embodiment and mode of FIG. 9A-FIG. 9B or FIG. 11A-FIG. 11B. The access node 28 may, for example, be a gNB. Act 14-1 comprises generating an RRC message comprising network slice band association information. Such an RRC message may be a system information message, a reconfiguration message, release message or any other RRC message. The network slice band association information may comprise a list of network slice identifiers, each of the network slice identifiers identifying a network slice, each of some of the network slice identifiers being associated with a corresponding radio band(s). The network slice band association information may be used by the wireless terminal to perform a cell selection/reselection procedure. Act 4B-2 comprises transmitting the RRC message with its network slice band association information (NSBAI) to wireless terminal 30.

FIG. 15 shows example representative steps or acts which may be performed by a management entity of a core network, such as management entity 26 of the example embodiment and mode of FIG. 10A-FIG. 10B. As indicated above, the management entity 26 may be an Access and Mobility Management Function (AMF). Act 15-1 comprises receiving a non-access stratum message from wireless terminal 30. The non-access stratum message may be a registration request message, for example. Act 15-2 comprising generating a responsive non-access stratum message, such as a registration accept message, which comprises network slice band association information. The network slice band association information may comprise a list of network slice identifiers, each of the network slice identifiers identifying a network slice, each of some of the network slice identifiers being associated with a corresponding radio band(s). Act 15-3 comprises transmitting the responsive non-access stratum message, e.g., the registration accept message, to wireless terminal 30. The network slice band association information included in the non-access stratum signaling of the registration accept message may be used by the wireless terminal to perform a cell selection/reselection procedure.

3.0 Cell Barring (Cell Reservation) for Network Slicing

Figure 16:
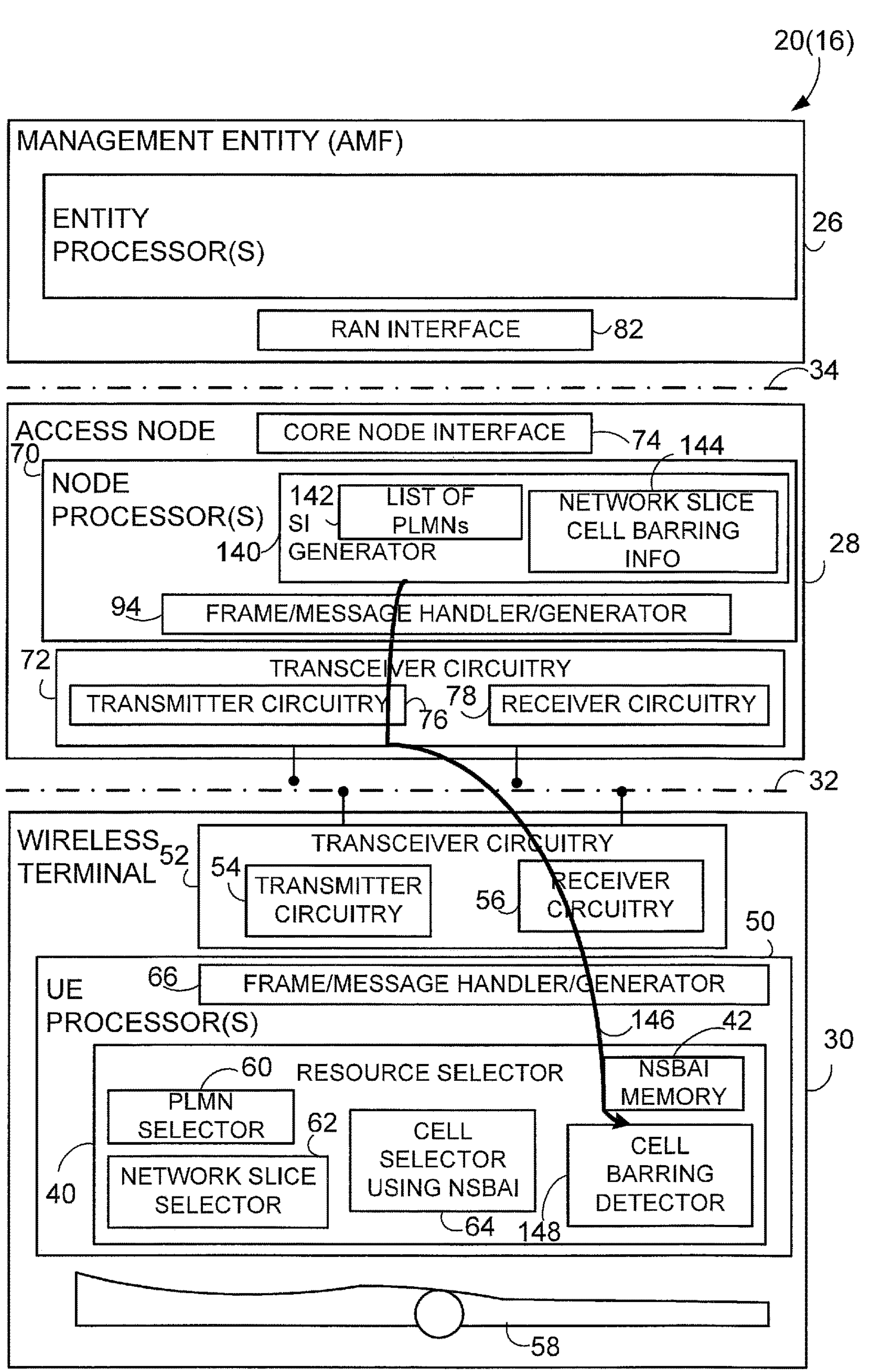
FIG. 16 is a schematic view of an example communications system in which a wireless terminal utilizes network slice cell barring information obtain from system information broadcast from an access node in conjunction with resource selection.

In some example embodiments and modes, such as that of FIG. 16, it may be desired to restrict camping on certain cells for wireless terminals supporting specific network slices. For example, a network operator may not want to use some cells for a network slice designated for a particular purpose, such as a purpose of V2X, vehicle-to-everything, communications, for example. FIG. 16 shows an example embodiment and mode configured to enable cell barring for one or more network slices within a cell. The example embodiment and mode of FIG. 16 is an example implementation of the generic example embodiment and mode of FIG. 4 and FIG. 5, and as such explanations of FIG. 4 and FIG. 5 are applicable to communications system 20(16) of FIG. 16 as well. For example, the communications system 20(16) of FIG. 16, comprises one or more radio access networks (RANs) 22 and one or more core networks (CNs) 24, with one management entities 26 being shown in the core network (CN) 24 by way of example and one access node 28 being shown by way of example in radio access network (RAN) 22. Although not illustrated as such, the communications system 20(16) of FIG. 16 may be and usually is utilized by plural PLMNs. In FIG. 16, wireless terminal 30 communicates with a management entity of a core network through an access node of a radio access network (RAN). The core network supports one or more network slices, each of the network slices providing a designated service within a public land mobile network (PLMN).

Since the communications system 20(4) is generic to various other example embodiments and modes described herein, it is again mentioned that the wireless terminal may take various forms as mentioned above, and likewise that the access node may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. Moreover, communications system 20(16) may be realized in virtualized and/or distributed and/or logical form.

Structures and functionalities of the communications system 20(16) of FIG. 16 which are common or essentially the same as one of more of the preceding example embodiments have the same reference numerals. For example, much of the structure of wireless terminal 30 of FIG. 16 and much of the structure of access node 28 of FIG. 16 is similar to preceding example embodiments. However, in in the example embodiment of FIG. 16 the access node 28 generates system information which comprises a list of one or more PLMN identifiers and an association of each of the PLMN identifiers with corresponding network slice cell barring information. The network slice cell barring information comprises one or more network slice identifiers of network slices for which the cell is barred. Accordingly, in the example embodiment and mode of FIG. 16 node processor circuitry 70 is shown as comprising system information generator 140, with system information generator 140 having access to list 142 of one or more PLMN identifiers and access to an association of each of the PLMN identifiers with corresponding network slice cell barring information 142, so that the system information generated by system information generator 140 includes both the list 142 and the associated corresponding network slice cell barring information 144. The access node 28 also comprises node transmitter circuitry 76, which transmits the system information to a cell. Arrow 146 of FIG. 16 shows the transmission of the system information, which includes network slice cell barring information 142 and the network slice cell barring information 144, to wireless terminal 30.

The wireless terminal 30 of communications system 20(16) of FIG. 16 comprises receiver circuitry, e.g., terminal receiver circuitry 56, and processor circuitry, e.g., terminal processor circuitry 50. The receiver circuitry is configured to receive, from a cell served by the access node 28, system information comprising a list of one or more PLMN identifiers and an association of each of the PLMN identifiers with corresponding network slice cell barring information. As indicated above, the network slice cell barring information comprises one or more network slice identifiers of network slices for which the cell is barred. The terminal processor circuitry 50, and terminal resource selector 40 in particular, comprises PLMN selector 60; network slice selector 62; cell selector 64 which uses network slice band association information (NSBAI) 42; and cell barring detector 148. As such, the processor terminal circuitry 50 serves to select a serving PLMN; choose a network slice(s); and to determine, based on a network slice identifier(s) identifying the network slice(s) and the network slice cell barring information associated with the serving PLMN, whether or not the cell is barred for the network slice(s). The cell barring detector 148 of terminal processor circuitry 50 may perform the determination whether or not the cell is barred for the network slice(s).

It should be understood that this network slice-based cell barring as shown, by way of example, with reference to FIG. 16, differences in some regards from the resource selection of the previous embodiments. In the FIG. 16 embodiment and mode, the barring affects a particular network slice within a cell that advertises the barring. Therefore, in the FIG. 16 example embodiment and mode, the wireless terminal that discovers the particular network slice being barred in the cell may look for other cells in bands including the band of the barring cell. On the other hand, in the earlier-described embodiments, if the network slice band association information indicates that a particular network slice is not supported in a band, the wireless terminal may not search for cells on that band at all.

In one example implementation, a cell may broadcast system information comprising one or more identities of network slices barred in the cell. For example, as shown in Table 8, SIB1 may include, for each of supported PLMNs, network slice cell barring information, a list of identities of network slices (S-NSSAIs) barred in the cell (e.g. cellReservedForNetworkSlices).

TABLE 8

```
SIB1 ::=                                    SEQUENCE {
  cellSelectionInfo                           SEQUENCE {
    q-RxLevMin                                  Q-RxLevMin,
    q-RxLevMinOffset                              INTEGER (1..8)
OPTIONAL,                                   -- Need S
    q-RxLevMinSUL                                 Q-RxLevMin
OPTIONAL,                                   -- Need R
    q-QualMin                                   Q-QualMin
OPTIONAL,                                   -- Need S
    q-QualMinOffset                               INTEGER (1..8)
OPTIONAL                                    -- Need S
  }
OPTIONAL,                                   -- Cond Standalone
  cellAccessRelatedInfo                         CellAccessRelatedInfo,
  connEstFailureControl                         ConnEstFailureControl
OPTIONAL,                                   -- Need R
  si-SchedulingInfo                           SI-SchedulingInfo
OPTIONAL,                                   -- Need R
  servingCellConfigCommon
ServingCellConfigCommonSIB
OPTIONAL,                                   -- Need R
  ims-EmergencySupport                          ENUMERATED {true}
OPTIONAL,                                   -- Need R
  eCallOverIMS-Support                          ENUMERATED {true}
OPTIONAL,                                   -- Cond Absent
  ue-TimersAndConstants                         UE-TimersAndConstants
OPTIONAL,                                   -- Need R
  uac-Barring Info                            SEQUENCE {
    uac-BarringForCommon                        UAC-BarringPerCatList
OPTIONAL,                                   -- Need S
    uac-BarringPerPLMN-List                     UAC-BarringPerPLMN-List
OPTIONAL,                                   -- Need S
    uac-BarringInfoSetList                      UAC-BarringInfoSetList,
    uac-AccessCategory1-SelectionAssistanceInfo CHOICE {
      plmnCommon
UAC-AccessCategory1-SelectionAssistanceInfo,
      individualPLMNList                        SEQUENCE (SIZE
(2..maxPLMN)) OF UAC-AccessCategory1-SelectionAssistanceInfo
    }
OPTIONAL                                    -- Need S
  }
OPTIONAL,                                   -- Need R
  useFullResumeID                               ENUMERATED {true}
OPTIONAL,                                   -- Need N
  lateNonCriticalExtension                      OCTET STRING
OPTIONAL,
  nonCriticalExtension                          SEQUENCE { }
OPTIONAL
}
CellAccessRelatedInfo ::=                   SEQUENCE {
  plmn-IdentityList                           PLMN-IdentityInfoList,
  cellReservedForOtherUse                     ENUMERATED {true} OPTIONAL,
-- Need R
  ...
}
PLMN-IdentityInfoList ::=                       SEQUENCE (SIZE
(1..maxPLMN)) OF PLMN-IdentityInfo
PLMN-IdentityInfo ::=                           SEQUENCE {
  plmn-IdentityList                               SEQUENCE (SIZE
(1..maxPLMN)) OF PLMN-Identity,
  trackingAreaCode                                TrackingAreaCode
OPTIONAL,                                   -- Need R
  ranac                                         RAN-AreaCode
OPTIONAL,                                   -- Need R
```

TABLE 8-continued

```
  cellIdentity                               CellIdentity,
  cellReservedForOperatorUse                 ENUMERATED {reserved,
notReserved},
  cellReservedForNetworkSlices               SEQUENCE (SIZE (1..
maxNrofS-NSSAI) OF S-NSSAI,
  ...
}
```

Upon selecting a cell, the wireless terminal 30 may decide whether or not a network slice of interest is barred by the using the network slice cell barring information, specifically whether or not the S-NSSAI of the network slice is included in the network slice cell barring information. However, values of S-NSSAIs in the network slice cell barring information, that are assigned by the serving PLMN of the cell, may or may not be known to the wireless terminal 30, which may affect the decision and subsequent actions by the wireless terminal 30.

In the above regard, an S-NSSAI of interest to the wireless terminal 30 may be based on a list of S-NSSAIs, such as subscribed S-NSSAIs or a default configured NSSAI, which is configured by the home PLMN, HPLMN. The wireless terminal 30 may be configured to use the condition for an S-NSSAI to be valid, e.g., recognizable, within the serving PLMN, as disclosed in one or more of the preceding embodiments. In a case an S-NSSAI of interest is valid, the wireless terminal 30 may check if this S-NSSAI is included in the network slice cell barring information advertised by the serving cell. If positive, e.g., if the S-NSSAI is valid, the wireless terminal 30 may proceed to make a determination whether the serving cell is "barred" or "not barred" based on the network slice cell barring information 144. Thereafter the wireless terminal 30 may proceed to the procedure disclosed above (5.3.1 Cell status and cell reservations in TS 38.304).

On the other hand, if the S-NSSAI of interest is not valid, the wireless terminal 30 may defer the decision of whether the network slice identified by the S-NSSAI is barred in the serving cell until after the wireless terminal 30 completes a registration procedure, as disclosed in one or more of the preceding embodiments. In the case of the S-NSSAI of interest not being valid, the registration accept message received from management entity 26, e.g., an Access and Mobility Management Function (AMF), may provide mapping information that allows mapping between the S-NSSAI of interest, presumably configured by the HPLMN, and a corresponding S-NSSAI for the serving PLMN. Based on the mapping information, the wireless terminal 30 may then check if the S-NSSAI mapped for the serving PLMN is included in the network slice cell barring information advertised by the serving cell. If positive, the wireless terminal 30 may consider the serving cell as "barred", otherwise the wireless terminal 30 may consider the serving cell as "not barred", and thereafter may proceed to the procedure disclosed above (5.3.1 Cell status and cell reservations in TS 38.304).

Figures 17, 18:
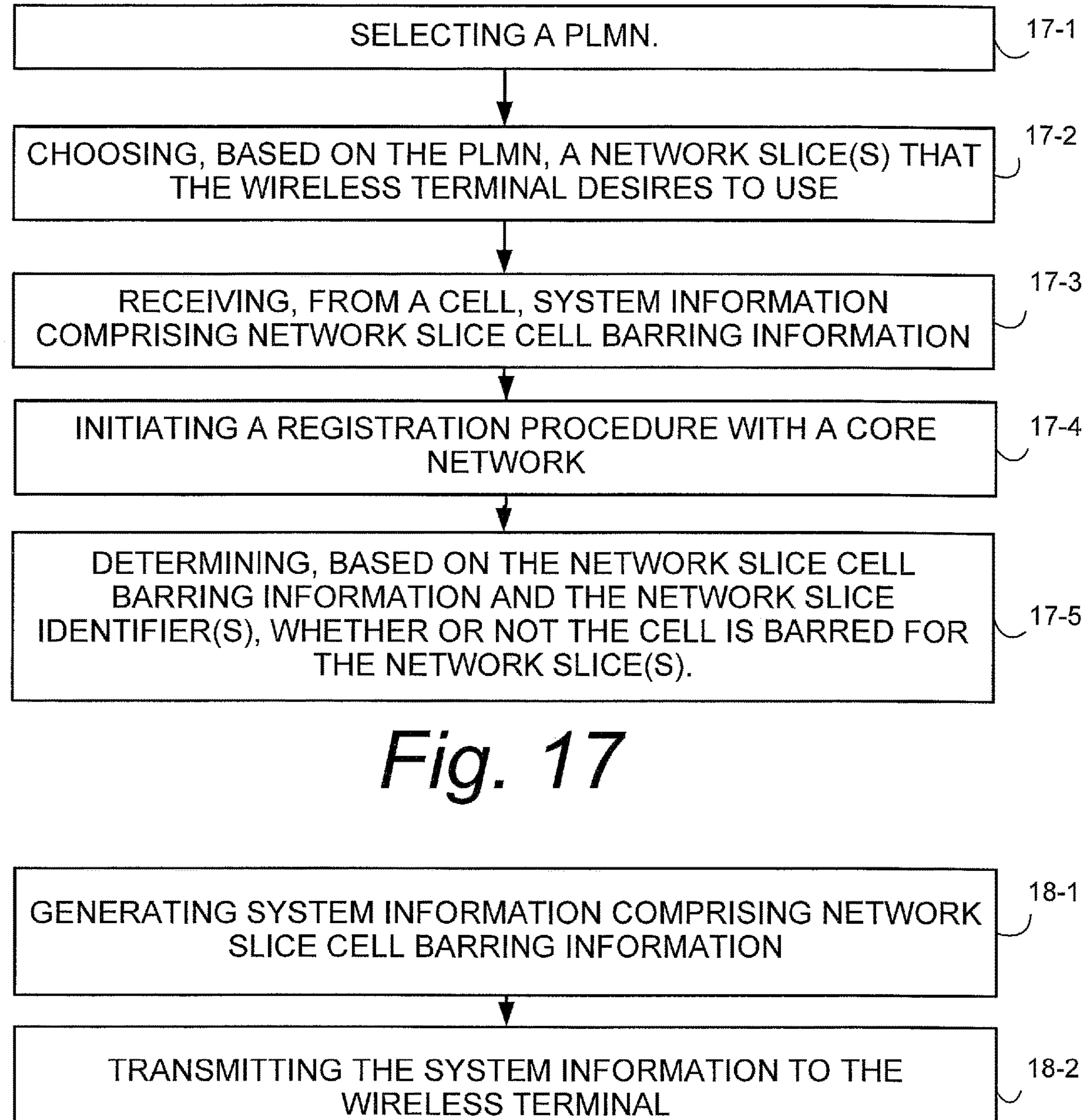
FIG. 17 is a flowchart showing example, representative acts or steps that may be performed by a wireless terminal according to the example embodiment and mode of FIG. 16.
FIG. 18 is a flowchart showing example, representative acts or steps that may be performed by an access node according to the example embodiment and mode of FIG. 16.

FIG. 17 is a flow chart showing example representative steps or acts performed by a wireless terminal, e.g., a user equipment, of the communications system 20(16) of FIG. 16. Act 17-1 comprises selecting a PLMN. Act 17-2 comprises choosing, based on the PLMN, a network slice(s) that the wireless terminal desires to use. Act 16-3 comprises receiving, from a cell, system information comprising network slice cell barring information. The network slice cell barring information further comprises one or more network slice identifiers of network slices for which the cell is barred. Act 17-4 is an optional act that may be executed in a case that the network slice identifier(s) that identifies the network slice(s) assigned by a HPLMN is not valid/unknown/not recognized in a serving PLMN. Act 17-4 comprises initiating a registration procedure with a core network. The registration procedure of act 17-4 may allow the wireless terminal to obtain a network slice identifier(s) for the serving PLMN that maps to the network slice identifier(s) assigned by the HPLMN. Act 16-5, executed after either act 17-3 or act 17-4 as the case may be, comprises determining, based on the network slice cell barring information and the network slice identifier(s), whether or not the cell is barred for the network slice(s).

FIG. 18 is a flow chart showing example representative steps or acts performed by an access node 28 of communications system 20(16). The access node 28 may be, for example, a gNB. Act 18-1 comprises generating system information comprising network slice cell barring information. The network slice cell barring information further comprises one or more network slice identifiers of network slices for which the cell is barred. Act 18-2 comprises transmitting the system information to the wireless terminal 30.

4.0 Area Scope for Band Associations for Network Slicing

The preceding embodiment discloses that the network slice band association information may be valid within a PLMN, a registration area, a cell, or some other form of an area. In the example embodiments and modes of FIG. 19A the network slice band association information is configured by the network, and a recipient wireless terminal, e.g., UE, is advantageously informed of an area scope of the network slice band association information. The "area scope" of the network slice band association information is used to indicate a validity area, e.g., an area/coverage wherein the configured network slice band association information is valid. In doing so, within such an area the network may not need to re-configure the information, and/or the wireless terminal may not to attempt to obtain the band association information again.

Figure 19A:
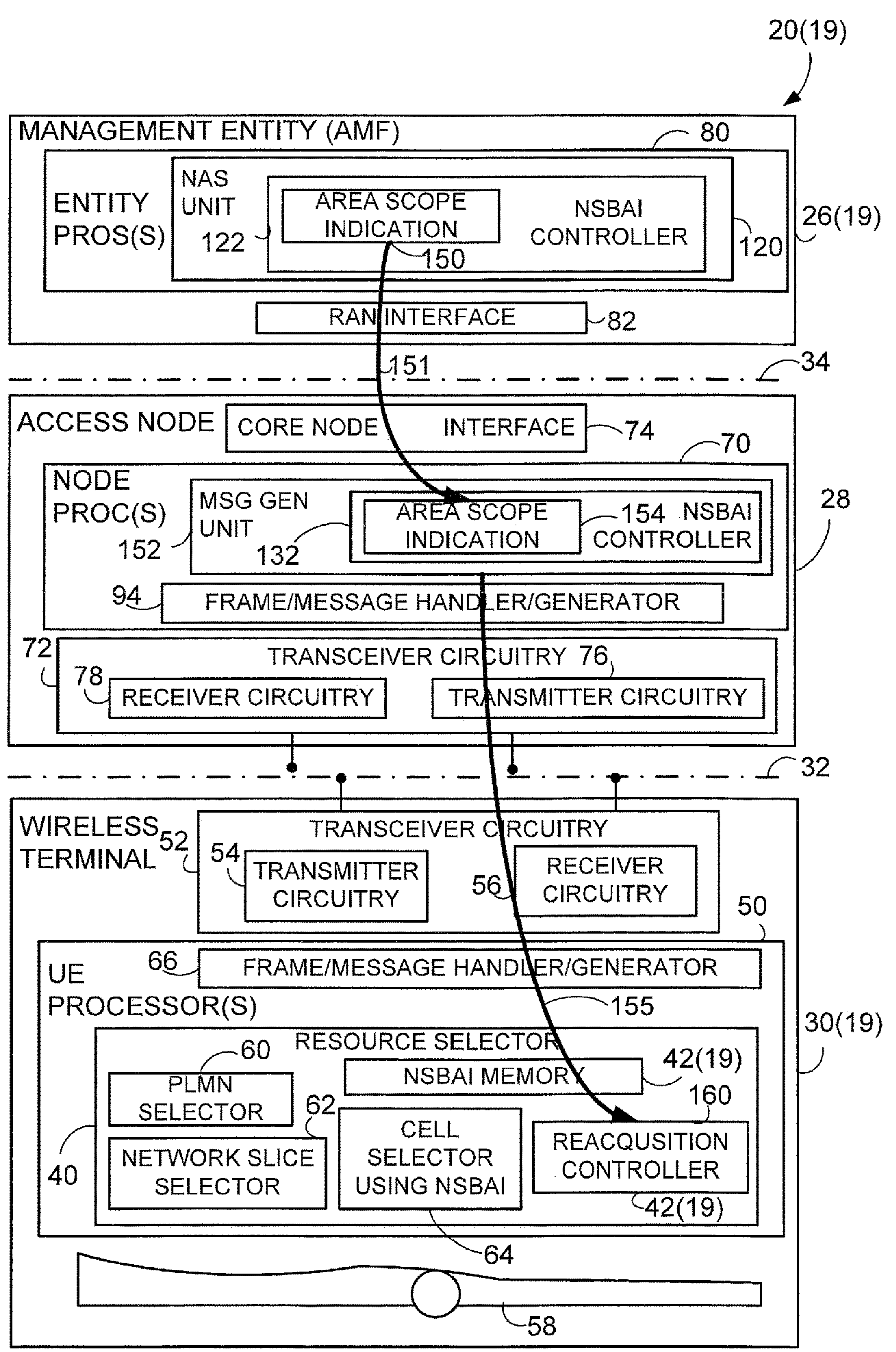
FIG. 19A is a schematic view of an example generic communications system in which a wireless terminal utilizes an area scope indicator included in network slice band association information, NSBAI, to determine whether to perform a reacquisition procedure.
Figure 19B:
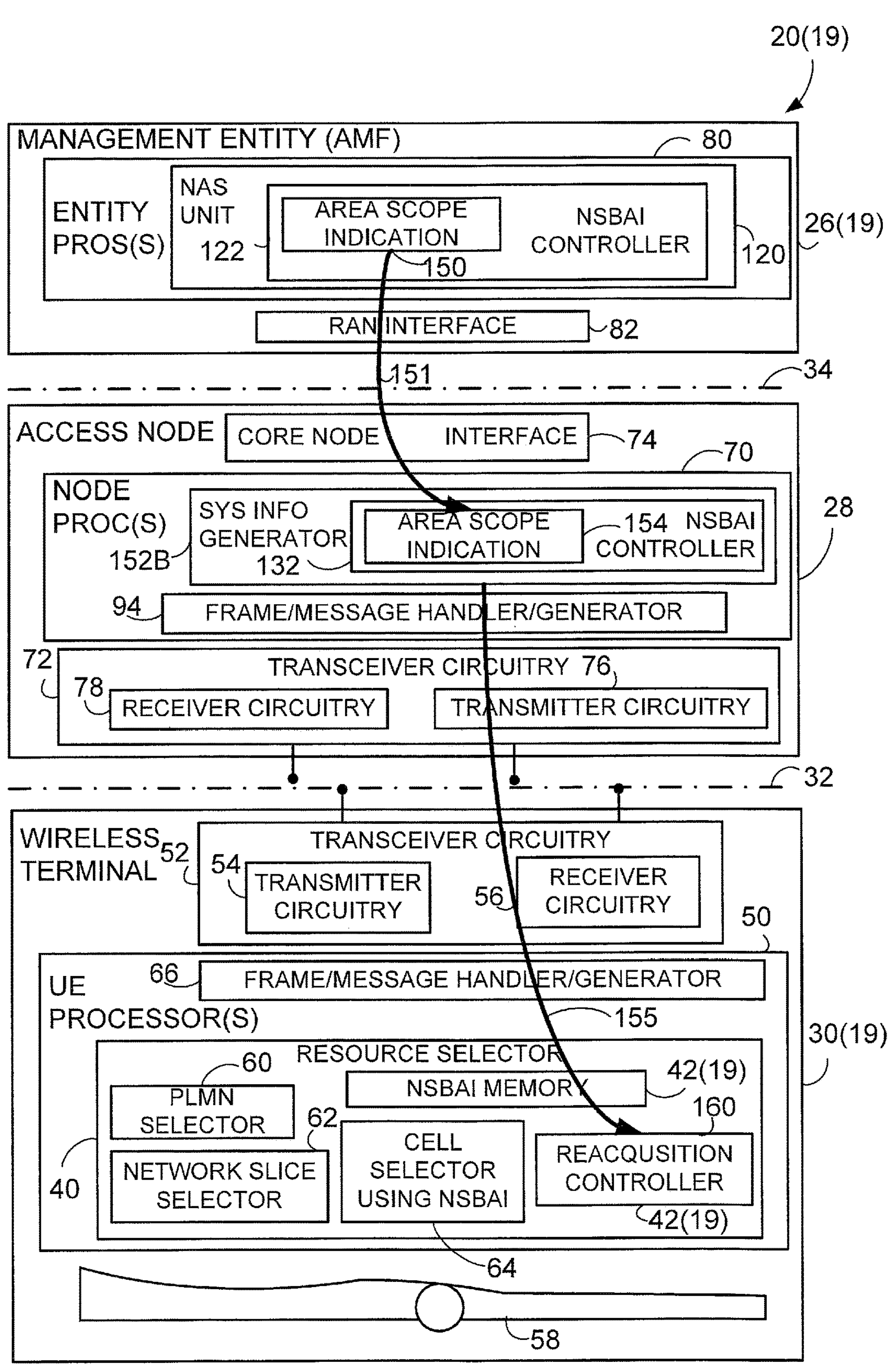
FIG. 19B is a schematic view of an example communications system in which the network slice band association information, NSBAI, including the area scope indication is carried in system information.
Figure 19C:
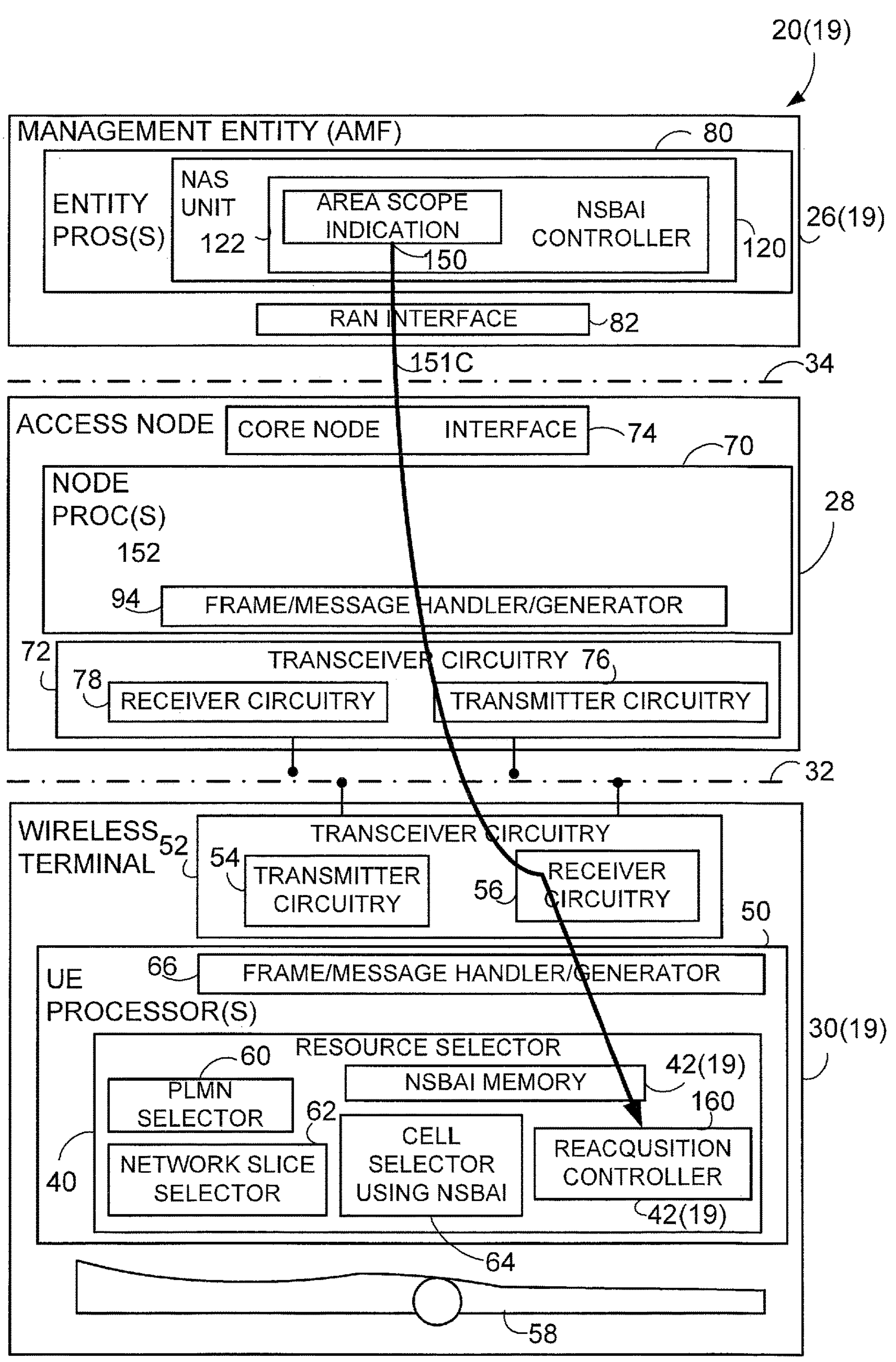
FIG. 19C is a schematic view of an example communications system in which the network slice band association information, NSBAI, including the area scope indication is carried in a non-access stratum message.
Figure 19D:
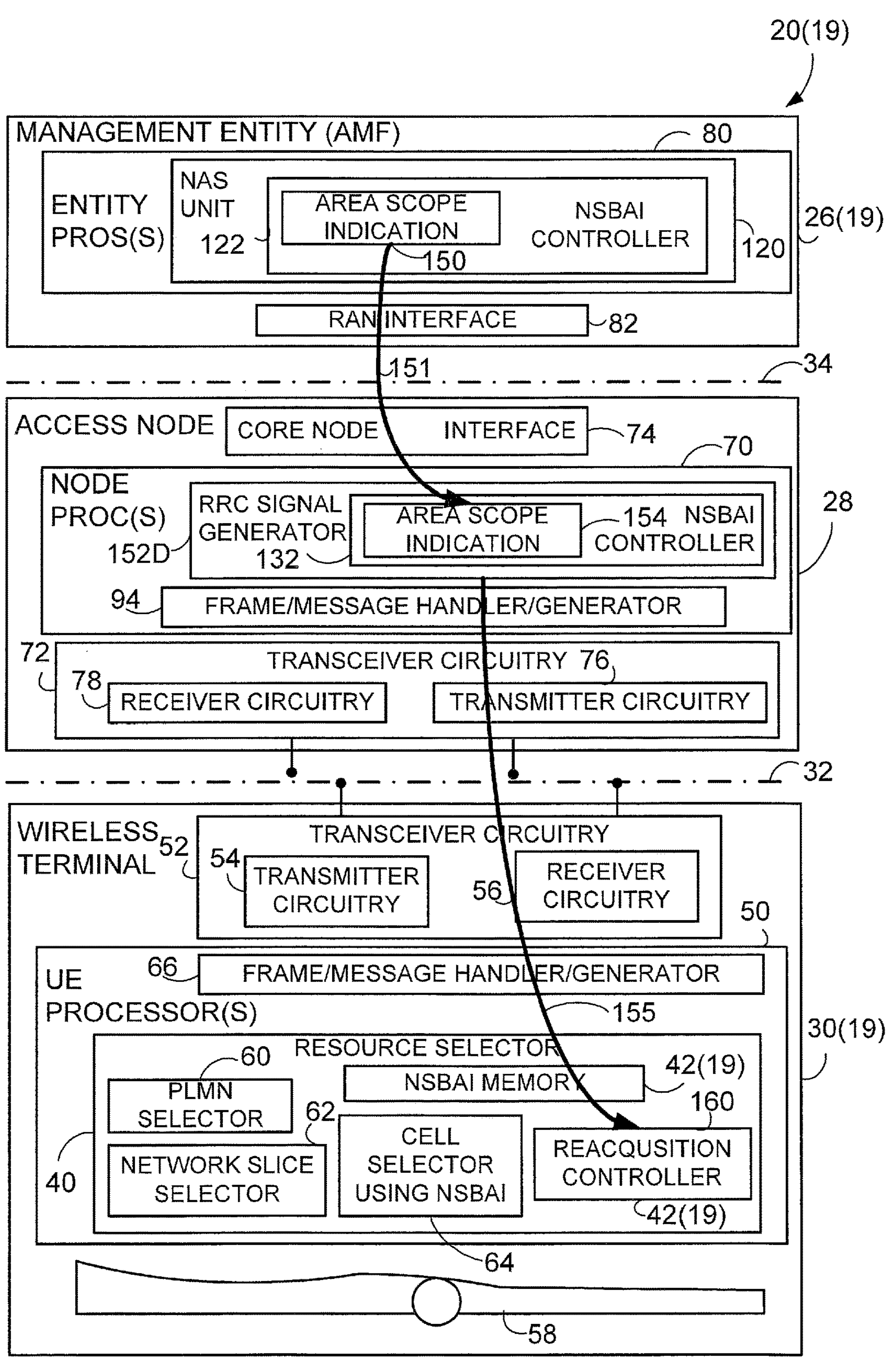
FIG. 19D is a schematic view of an example communications system in which the network slice band association information, NSBAI, including the area scope indication is carried in dedicated RRC signaling during the RRC_CONNECTED state.

The example embodiment and mode of FIG. 19A is generic to the example embodiments and modes of FIG. 19B-FIG. 19D, and therefore all comments concerning FIG. 19A are applicable to the example embodiments and modes of FIG. 19B-FIG. 19D as well. Moreover, the example embodiment and mode of FIG. 19A is itself an example implementation of the generic example embodiment and mode of FIG. 4 and FIG. 5, and as such explanations of FIG. 4 and FIG. 5 are applicable to communications system 20(19) of FIG. 19A as well. For example, the communications system 20(19) of FIG. 19A comprises one or more radio access networks (RANs) 22 and one or more core networks (CNs) 24, with one management entities 26 being shown in the core network (CN) 24 by way of example and one access node 28 being shown by way of example in radio access network (RAN) 22. Although not illustrated as such, the communications system 20(19) of FIG. 19A may be and usually is utilized by plural PLMNs. In FIG. 19A, wireless terminal 30 communicates with a management entity of a core network through an access node of a radio access network (RAN). The core network supports one or more network slices, each of the network slices providing a designated service within a public land mobile network (PLMN).

Since the communications system 20(4) is generic to various other example embodiments and modes described herein, it is again mentioned that the wireless terminal may take various forms as mentioned above, and likewise that the access node may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. Moreover, communications system 20(19) may be realized in virtualized and/or distributed and/or logical form.

Structures and functionalities of the communications system 20(19) of FIG. 19A which are common or essentially the same as one of more of the preceding example embodiments have the same reference numerals. For example, much of the structure of wireless terminal 30 of FIG. 19A and much of the structure of access node 28 of FIG. 19A is similar to preceding example embodiments. However, in in the example embodiment of FIG. 19A the management entity 26(19) generates an area scope indication which indicates an area in which the network slices is supported on the radio band(s).

The management entity 26(19) of communications system 20(19) may comprise core network entity processor circuitry 80 and interface 82 toward the radio access network (RAN) 22. The core network entity processor circuitry 80 may be realized or comprise one or more processors and at least one memory. The memory includes computer program code, wherein the memory and the computer program code are configured to, working with the at least one processor, cause the decoding device to perform at least at least the operations described herein. FIG. 19A further shows management entity 26(19) as comprising system the non-access stratum (NAS) unit 120, which includes the core NSBAI controller 122. The core NSBAI controller 122 controls the formatting or inclusion of the network slice band association information (NSBAI) 42 in the non-access stratum information generated by non-access stratum (NAS) unit 120. In the example embodiment and mode of FIG. 19A and other embodiments and modes to which FIG. 19A is generic, the network slice band association information, NSBAI, includes the area scope indication. FIG. 19A therefore illustrates core NSBAI controller 122 as including area scope indication generator/memory 150. The non-access stratum (NAS) unit 120 with its core NSBAI controller 122 including the area scope indication generator/memory 150 preferably comprises or is included in node processor circuitry 70 of management entity 26(19). The arrow 151 of FIG. 19A shows that management entity 26(19) provides the network slice band association information, NSBAI, including the area scope indication to radio access network (RAN) 22, e.g., to access node 28.

The access node 28 of the example embodiment and mode of FIG. 19A comprises node processor circuitry 70, node transceiver circuitry 72, and interface 74 to core network (CN) 24. The node transceiver circuitry 72 may comprise node transmitter circuitry 76 and node receiver circuitry 78. The transceiver circuitry 72 includes antenna(e) for the wireless transmission. Transmitter circuitry 76 may include, e.g., amplifier(s), modulation circuitry and other conventional transmission equipment. Receiver circuitry 78 may comprise, e.g., amplifiers, demodulation circuitry, and other conventional receiver equipment. As indicated above, various aspects of access node 28 including the node transceiver circuitry 72 may be realized by a distributed unit (DU) and a central unit (CU).

The node processor circuitry 70 of the access node 28 of FIG. 19A is shown as comprising, among other units and functionalities, frame/message handler/generator 94 and message generator 152. The message generator 152 in turn comprises the node NSBAI controller 132. In the example embodiment and mode of FIG. 19A, the node NSBAI controller 132 receives the network slice band association information, NSBAI, from the management entity 26(19), which includes the area scope indication. Thus, FIG. 19A shows node NSBAI controller 132 as comprising area scope indication manager/memory 154. The network slice band association information, NSBAI, including the area scope indication, is included in a message generated by message generator 152, transmitted by access node 28 to wireless terminal 30(19), as shown by arrow 155 in FIG. 19A.

The wireless terminal 30(19) of communications system 20(19) of FIG. 19A comprises terminal transceiver circuitry 52 and processor circuitry, e.g., terminal processor circuitry 50. The transceiver circuitry 52 in turn may comprise terminal transmitter circuitry 54 and terminal receiver circuitry 56. The transceiver circuitry 52 includes antenna(e) for the wireless transmission. Transmitter circuitry 54 may include, e.g., amplifier(s), modulation circuitry and other conventional transmission equipment. Receiver circuitry 56 may comprise, e.g., amplifiers, demodulation circuitry, and other conventional receiver equipment. FIG. 19A further shows that wireless terminal 30(19) may also comprise terminal interfaces 58. Such user interfaces may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The receiver circuitry 56 of wireless terminal 30(19) is configured to receive, from a cell served by the access node 28, a message comprising network slice band association information, NSBAI, including the area scope indication. The message received by wireless terminal 30(19) which comprising network slice band association information, NSBAI, including the area scope indication, is depicted by arrow 155 in FIG. 19A.

The terminal processor circuitry 50 of FIG. 19A is shown as including terminal resource selector 40. In addition to memory or registers 42(19) for storing network slice band association information (NSBAI), the terminal resource selector 40 comprises PLMN selector 60; network slice selector 62; cell selector 64 which uses network slice band association information (NSBAI) 42; and reacquisition controller 160. In addition, terminal processor circuitry 50 may include frame/message generator/handler 66, as well as many other unillustrated functionalities including those not strictly germane to the technology disclosed herein.

In the example embodiment and mode of FIG. 19, the network slice band association information comprises one or more network slice identifiers. Each of the one or more network slice identifiers serves to identify a network slice. Each of the one or more network slice identifiers is associated with a radio band(s) and an area scope indication. The radio band(s) indicate a frequency domain interval(s) on which a network slice identified by the each of the one or more network slice identifiers is supported. The area scope indication indicates an area in which the network slices is supported on the radio band(s).

As exemplified herein, the area scope indicator, also herein referred to as "area scope", may indicate an area(s)/coverage(s), such as one or more PLMNs, one or more tracking/registration areas, one or more cells, one or more system information areas, one or more RAN notification areas, or any other geographical area/coverage. In some cases, the area scope may comprise an identity or a list of identities that directly specifies the area/coverage. For example, the area scope may comprise a list of tracking area identities or cell identities. In other cases, the area scope may indicate just a type of area/coverage identities, such as "PLMN" and "Registration Area". For example, if the area scope is type "PLMN", the validity area may be the area served by the serving PLMN. Likewise, if the area scope is type "Registration Area", the validity area may be the current registration area (specified by one or more tracking area identities (TAIs) or tracking area codes (TACs)).

It should be understood though that an area scope of network slice band association information instructs an area of validity for band associations; it does not indicate a validity area of associated network slices (which will be covered in the following embodiment). Indeed, the S-NSSAI(s) associated with the network slice band association information may or may not be valid outside of the area indicated by the area scope, but the network slice band association information becomes invalid outside of the area.

The management entity 26(19) of FIG. 19A thus comprises core network (CN) 24 and communicates with a wireless terminal 30 via a cell of radio access network (RAN) 22. The core network (CN) 24 supports one or more network slices, each of the network slices providing a designated service within a public land mobile network (PLMN). The management entity 26(19) of FIG. 19A thus comprises receiver circuitry and transmitter circuitry, both of which may comprise interface 82 toward the radio access network (RAN) 22, and core network entity processor circuitry 80. The receiver circuitry is configured to receive, from the wireless terminal 30, a non-access stratum (NAS) request message. The processor circuitry 80, including area scope indication generator/memory 150, is configured to generate a NAS response message comprising network slice band association information. The transmitter circuitry is configured to transmit, to the wireless terminal, the NSA response message.

The access node 28 of FIG. 19A thus belongs to or comprises a radio access network (RAN). The access node of the example embodiment and mode of FIG. 19A comprises processor circuitry and transmitter circuitry. The processor circuitry, e.g., message generator 152, is configured to generate a message comprising network slice band association information, including the area scope indication. The transmitter circuitry is configured to transmit, to the wireless terminal, the message in a cell. As described in other embodiments and modes hereof to which FIG. 19A is generic, the message generated by message generator 152 may take different forms, such as a system information message, a radio resource control (RRC) message, e.g., a dedicated RRC message such as an RRCReconfiguration message or a RRCRelease message, for example.

The wireless terminal 30(19) of the example embodiment and mode of FIG. 19A thus communicates with a management entity of a core network, e.g., management entity 26(19), through an access node of a radio access network (RAN), e.g., through access node 28. The core network supports one or more network slices, each of the network slices providing a designated service within a public land mobile network (PLMN). In the example embodiment and mode of FIG. 19, the wireless terminal comprises receiver circuitry and processor circuitry. The receiver circuitry is configured to receive, from a first cell of the RAN, a message comprising network slice band association information. As indicated above, the network slice band association information further comprises one or more network slice identifiers, each of the one or more network slice identifiers identifying a network slice, each of the one or more network slice identifiers being associated with a radio band(s) and an area scope indication. The radio band(s) indicate a frequency domain interval(s) on which a network slice identified by the each of the one or more network slice identifiers is supported. The area scope indication indicating an area in which the network slices is supported on the radio band(s).

The processor circuitry of wireless terminal 30(19), e.g., terminal processor circuitry 50, is configured to select from the network slice band association information at least one network slice identifier of a serving PLMN, and then to store the network slice band association information. Upon the wireless terminal camping on a second cell of the RAN, the processor circuitry is configured to initiate a reacquisition procedure to reacquire, from the second cell, the network slice band association information based on an area scope indication corresponding to the selected at least one network slice identifier, comprised in the stored network slice band association information. In other words, based on the area scope indication corresponding to the selected at least one network slice identifier, which is included in the stored network slice band association information, the processor circuitry and reacquisition controller 160 in particular is configured to make a determination whether to initiate a reacquisition procedure to reacquire, from the second cell, the network slice band association information.

In the example embodiment and mode of FIG. 19A, the reacquisition procedure is initiated by reacquisition controller 160 in a case that the second cell is not within an area indicated by the area scope indication corresponding to the selected at least one network slice identifier. The stored network slice band association information is used in the second cell to perform a cell (re)selection procedure, in a case that the second cell is within the area indicated by the area scope indication corresponding to the selected at least one network slice identifier 4.1 Area Scope Indication Carried by System Information FIG. 19B shows an example embodiment and mode of the generic system of FIG. 19A in which the network slice band association information, NSBAI, including the area scope indication is carried in system information transmitted by access node 28. FIG. 19B thus shows that access node 28 comprises system information generator 152B, which in turn manages and stores the area scope indication manager/memory 154. Thus, in the example embodiment and mode of FIG. 19B the message 155 is broadcasted system information.

In a case, such as that illustrated in FIG. 19B, that an instance of network slice band association information for a serving PLMN is provided in a system information block(s) (SIB(s)), an area scope indication(s) associated with the instance may be also provided in a SIB(s), preferably in the same SIB(s) that carries the instance of network slice band association. Upon receiving the SIB(s) from a cell, the wireless terminal may store the instance of the network slice band association information and the associated area scope indication(s) in its memory, e.g., network slice band association information memory 42(19A). In an event that the wireless terminal selects a new cell, if the stored area scope indication(s) indicates that the instance of the network slice association information is valid in the new cell, the wireless terminal may not need to reacquire the SIB(s) from this cell. Instead, the wireless terminal may use the saved instance of network slice band association information in the new cell.

As described in the preceding embodiments, a network slice may be defined within a PLMN, and thus multiple instances of network slice band association information may be present in system information in a case that there are more than one PLMN sharing a radio access network (RAN). Therefore, each instance may be associated with a designated area scope indication(s).

In one example implementation, one area scope indication may indicate a validity area of all network slices defined in one instance of network slice band association information. The validity area may be within a PLMN (serving PLMN), a current registration area, an area specified by a list of tracking area codes or an area specified by a list of cells. For example, Table 9A shows an example format of system information, specifically SIB1 that carries PLMN identities and SIBx (preferably different from SIB1) that carries one or more instances of network slice band association information.

TABLE 9A

```
SIB1 ::=                    SEQUENCE {
...
  cellAccessRelatedInfo        CellAccessRelatedInfo,
...
}
CellAccessRelatedInfo ::=      SEQUENCE {
  plmn-IdentityList              PLMN-IdentityInfoList,
  cellReservedForOtherUse          ENUMERATED {true} OPTIONAL,
-- Need R
  ...
}
PLMN-IdentityInfoList ::=      SEQUENCE (SIZE (1..maxPLMN)) OF
PLMN-IdentityInfo
PLMN-IdentityInfo ::=       SEQUENCE {
  plmn-IdentityList         SEQUENCE (SIZE (1..maxPLMN)) OF
PLMN-Identity,
  trackingAreaCode          TrackingAreaCode
OPTIONAL,                   -- Need R
  ranac                        RAN-AreaCode
OPTIONAL,                   -- Need R
  cellIdentity                   CellIdentity,
  cellReservedForOperatorUse           ENUMERATED {reserved,
notReserved},
  ...
}
SIBx ::=                    SEQUENCE {
...
  networkSliceBandAssociationInfoListForPLMNs      SEQUENCE
(SIZE (1..maxPLMN)) OF
NetworkSliceBandAssociationInfoListPerPLMN
...
}
NetworkSliceBandAssociationListPerPLMN::= SEQUENCE {
  networkSliceBandAssociationInfoList
NetworkSliceBandAssociationInfoList,
  areaScope ENUMERATED {PLMN, RegistrationArea, TACs, Cells}
OPTIONAL,
  TAC-List SEQUENCE (SIZE (1..maxNrofTAC))OF TrackingAreaCode
OPTIONAL, - Cond TACs
  cellList SEQUENCE (SIZE (1..maxNrofCell)) OF phyCellId
OPTIONAL, - Cond Cells
}
NetworkSliceBandAssociationInfoList::=         SEQUENCE (SIZE
(1.. maxNrofS-NSSAI) OF NetworkSliceBandAssociationInfo
NetworkSliceBandAssociationInfo SEQUENCE {
```

TABLE 9A-continued

```
  s-NSSAI                    S-NSSAI         OPTIONAL,
  frequencyBandList            MultiFrequencyBandListNR-SIB
OPTIONAL,
  ...
}
```

Figure 20A:
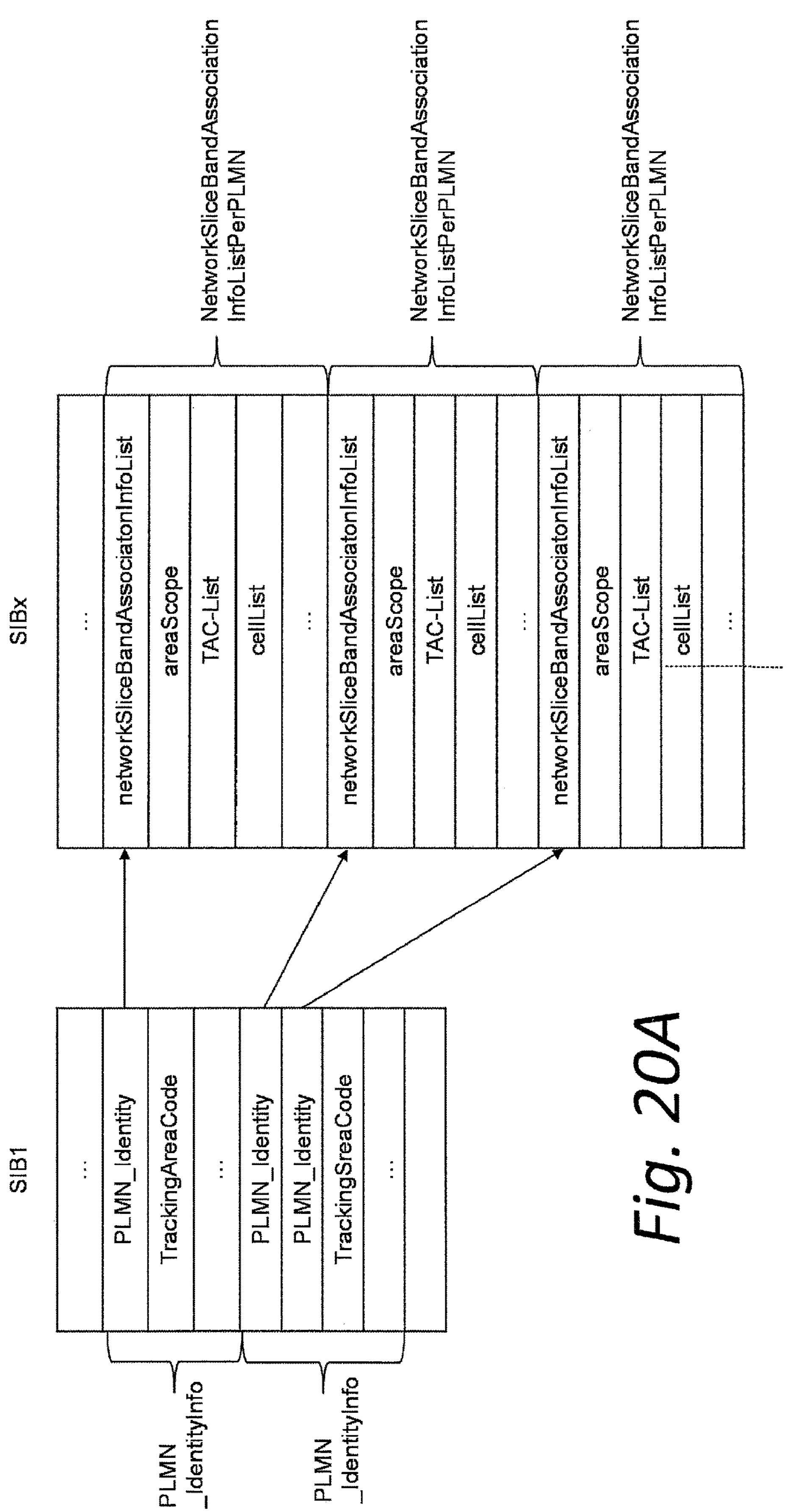
FIG. 20A is a diagrammatic view showing a graphical representation of a first implementation of how area scope indication may be indicated in system information including SIB1 and SIBx.

FIG. 20A shows a graphical representation of SIB1 and SIBx disclosed in Table 9A, wherein each of networkSliceBandAssociationInfoListPerPLMN information elements (IEs) in SIBx may be associated with one PLMN_Identity field in SIB1, by the order of presences. Each of the networkSliceBandAssociationInfoListPerPLMN IEs may comprise networkSliceBandAssociationInfoList, areaScope, optional TAC-List and optional cellList. The areaScope IE may indicate that the corresponding networkSliceBandAssociationInfoList is valid within a serving PLMN, a current registration area, within tracking area codes identified by TAC-List or within cells identified by cellist. The TAC-List IE may be conditionally present when areaScope="TACs". Likewise, the cellList IE may be conditionally present, only when areaScope="Cells".

In another example implementation of the embodiment and mode of FIG. 19B, an area scope indication may be assigned for each network slice, instead of network slice band association information). Table 9B shows an example format of SIB1 and SIBx for this other example implementation.

TABLE 9B

```
SIB1 ::=         SEQUENCE {
...
  cellAccessRelatedInfo    CellAccessRelatedInfo,
...
}
CellAccessRelatedInfo    ::= SEQUENCE {
 plmn-IdentityList         PLMN-IdentityInfoList,
 cellReservedForOtherUse    ENUMERATED {true}OPTIONAL,
 -- Need R
  ...
}
PLMN-IdentityInfoList ::= SEQUENCE (SIZE (1..maxPLMN)) OF
PLMN-IdentityInfo
PLMN-IdentityInfo ::=                   SEQUENCE {
  plmn-IdentityList                     SEQUENCE (SIZE
                                        (1..maxPLMN)) OF
PLMN-Identity,
  trackingAreaCode                      TrackingAreaCode
OPTIONAL,                              -- Need R
  ranac                                RAN-AreaCode
OPTIONAL,                              -- Need R
  cellIdentity                          CellIdentity,
  cellReservedForOperatorUse ENUMERATED {reserved,
notReserved},
  ...
}
SIBx ::=                               SEQUENCE {
...
  networkSliceBandAssociationInfoListForPLMNs      SEQUENCE
(SIZE (1..maxPLMN)) OF NetworkSliceBandAssociationInfoList
...
}
NetworkSliceBandAssociationInfoList::=         SEQUENCE (SIZE
(1.. maxNrofS-NSSAI) OF NetworkSliceBandAssociationInfo
NetworkSliceBandAssociationInfo             SEQUENCE {
  s-NSSAI            S-NSSAI          OPTIONAL,
  frequencyBandList   MultiFrequencyBandListNR-SIB
OPTIONAL,
  areaScope          ENUMERATED {PLMN, RegistrationArea,
TACs, Cells}     OPTIONAL,
  TAC-List SEQUENCE (SIZE (1..maxNrofTAC)) OF
  TrackingAreaCode
OPTIONAL, - Cond TACs
```

TABLE 9B-continued

```
  cellList SEQUENCE (SIZE (1..maxNrofCell)) OF phyCellId
OPTIONAL - Cond Cells
  ...
}
```

Figure 20B:
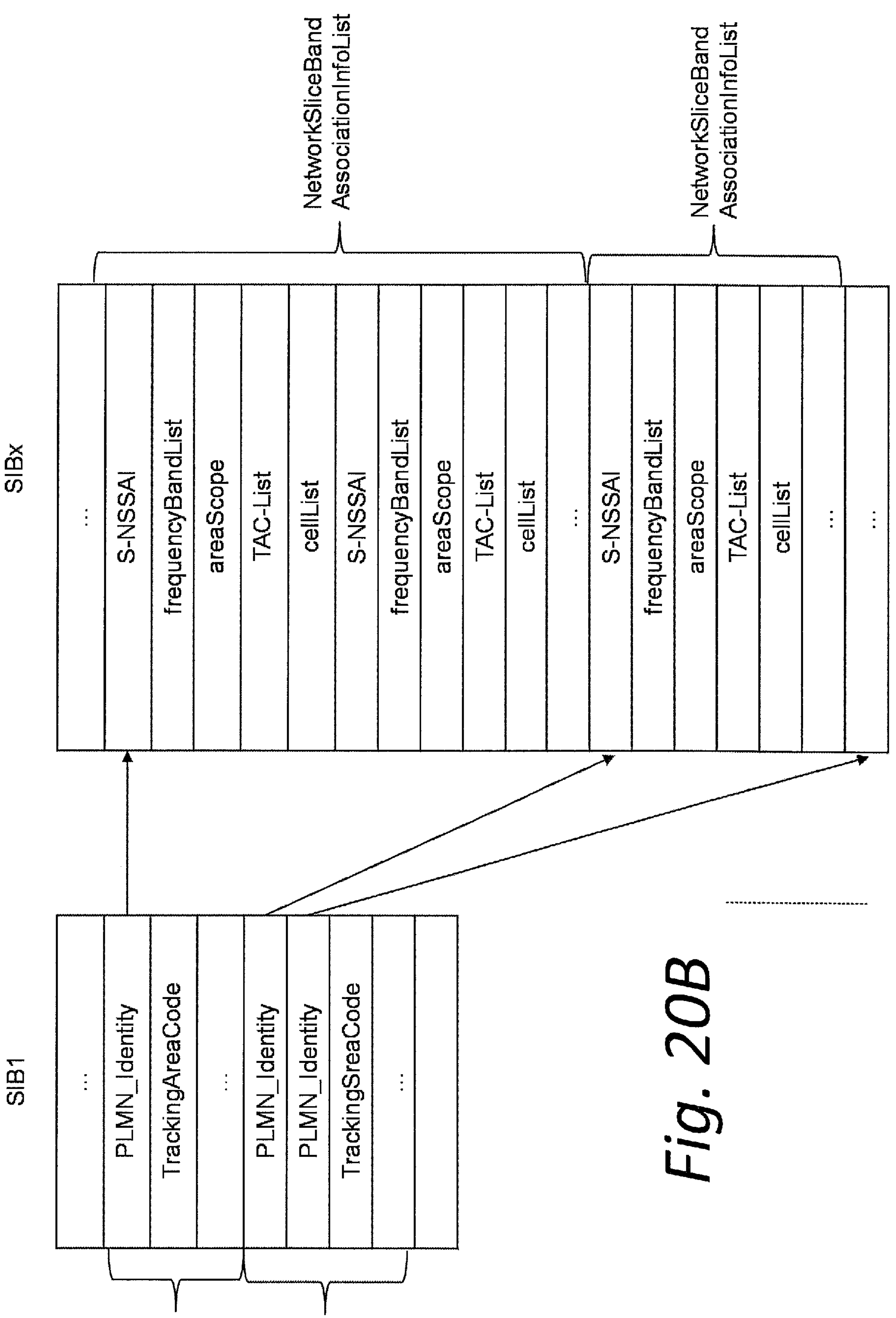
FIG. 20B is a diagrammatic view showing a first implementation of how area scope indication may be indicated in system information including SIB1 and SIBx.

FIG. 20B shows a graphical representation of SIB1 and SIBx disclosed in Table 9, wherein areaScope and cellList may be included inside of NetworkSliceBandAssociation-Info. The areaScope IE may indicate that the corresponding network slice (S-NSSAI) is valid within a serving PLMN, a current registration area, within tracking area codes identified by TAC-List or within cells identified by cellList. The TAC-List IE may be conditionally present when areaScope="TACs". Likewise, the cellList IE may be conditionally present, only when areaScope="Cells".

4.2 Area Scope Indication Carried by NAS Message

FIG. 19C shows an example embodiment and mode of the generic system of FIG. 19A in which the network slice band association information, NSBAI, including the area scope indication is carried in a non-access stratum message. FIG. 19C thus shows that based on information of area scope indication generator/memory 150, management entity 26(19) generates a non-access stratum message 151C that carries the network slice band association information, NSBAI, including the area scope indication, to the wireless terminal 30(19). The non-access stratum message 151C is transmitted from management entity 26(19) by interface 82 toward the radio access network (RAN) 22 to access node 28, and is transmitted by access node 28 to wireless terminal 30(19). At wireless terminal 30(19) the network slice band association information, NSBAI, is stored in network slice band association information (NSBAI) memory 42(19), and is used by reacquisition controller 160 in its determination of whether a reacquisition procedure is necessary in view of the area scope indication.

In the example embodiment and mode of FIG. 19C, therefore, area scope indication(s) for the network slice band association information may be provided from a core network by a NAS message, such as message 151C. Similar to the preceding embodiment, the area scope indication(s) may be configured during the registration procedure, preferably along with provisioning of the network slice band association information.

As an exemplary implementation of the FIG. 19C example embodiment and mode, the Registration Accept message may comprise the NSSAI Band Association IE, as disclosed earlier, with additional Area Scope and Cell List fields as shown in FIG. 21A, wherein the Area Scope IE may take one of the following values: {"PLMN", "RegistrationArea", "TACs" "Cells" }. The TAC List field may be conditionally present when Area Scope is "TACs". Likewise, the Cell List field may be conditionally present when the Area Scope is "Cells".

Figure 21B:
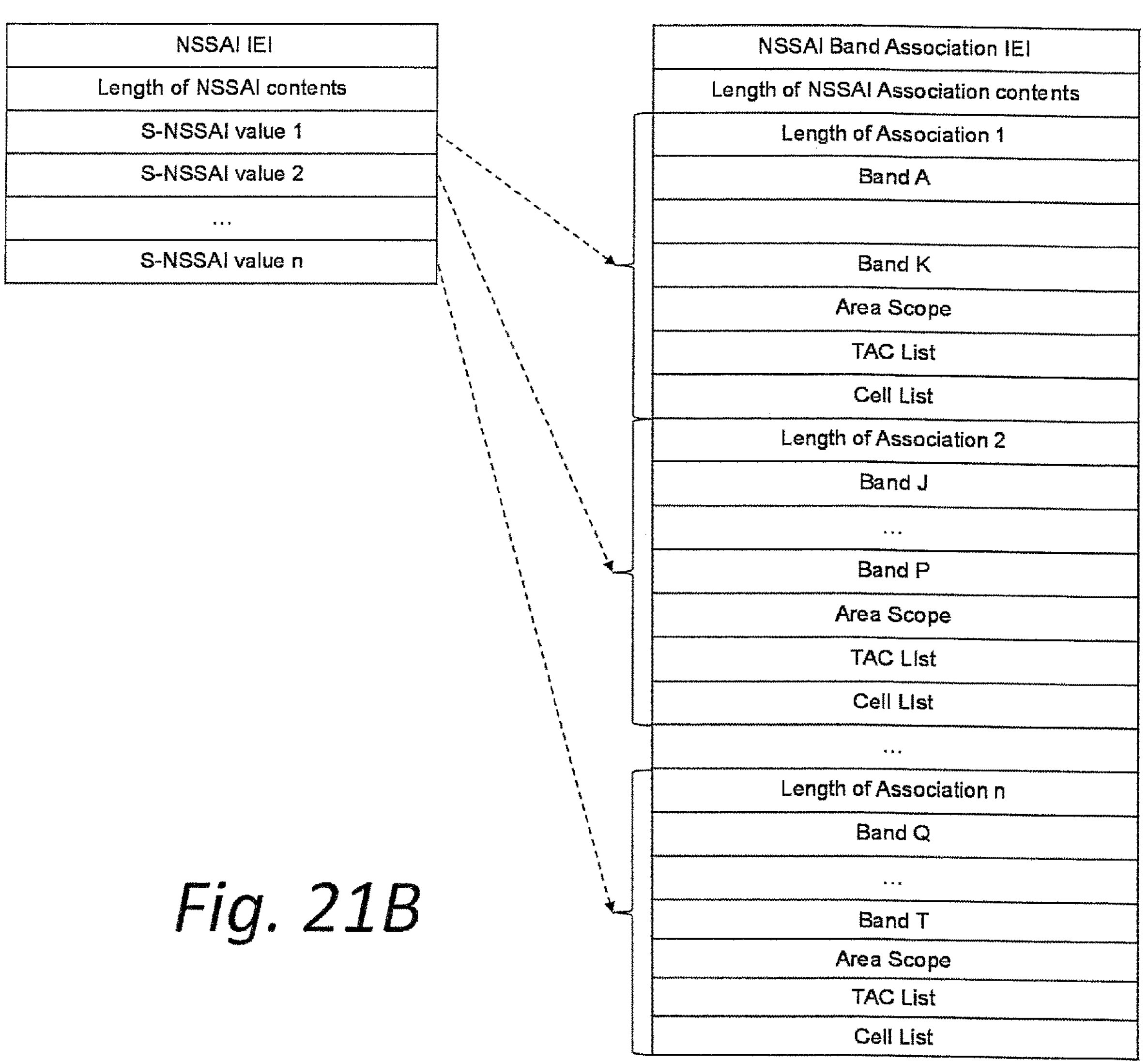
FIG. 21B is a diagrammatic view showing a second implementation of how area scope indication may be indicated in a non-access stratum message.

Another exemplary implementation of the example embodiment and mode of FIG. 19C is shown in FIG. 21B, wherein the additional Area Scope field and the optional TAC List or Cell List are associated with each of S-NSSAI fields in the NSSAI IE.

In an example embodiment and mode such as that of FIG. 19C wherein the network slice band association information and area scope indication(s) are configured by a NAS message, the Area Scope field may be optional. If omitted, i.e., the area scope of a band association may follow the scope of the corresponding NSSAI. For example, if the "Association 1" in FIG. 21B has no Area Scope field, and if the corresponding NSSAI IE is an Allowed NSSAI, the band associations under "Association 1" may be valid in the current registration area, since the scope of an Allowed NSSAI is within the current registration area. Similarly, if the "Association 1" in FIG. 21B has no Area Scope field, and if the corresponding NSSAI IE is a Configured NSSAI, the band associations under "Association 1" may be valid in the serving PLMN.

4.3 Area Scope Indication Carried by RRC Message

FIG. 19D shows an example embodiment and mode of the generic system of FIG. 19A in which the network slice band association information, NSBAI, including the area scope indication is carried in dedicated RRC signaling during the RRC_CONNECTED state. FIG. 19D thus shows that access node 28 comprises RRC signaling generator 152D, which in turn manages and stores the area scope indication manager/memory 154. Thus, in the example embodiment and mode of FIG. 19D the message 155 is dedicated RRC signaling during the RRC_CONNECTED state.

In the example embodiment and mode of FIG. 19D, the network slice band association information and associated area scope indication(s) may be provided by a dedicated RRC signaling during the RRC_CONNECTED state, such as RRCReconfiguration message and/or RRCRelease message. Such a dedicated RRC message may comprise a list of PLMN identities and an instance of the network slice band association information with an area scope indication(s) (e.g. NetworkSliceBandAssociationListPerPLMN in Table 9A, or NetworkSliceBandAssociationInfoList in Table 9B) for each of the PLMN identities.

4.4 Area Scope Indication: Area Identities

When receiving the network slice band association information with an area scope indication(s), the wireless terminal 30(19) may store the network slice band association information and the area scope indication(s) in its memory, e.g., network slice band association information (NSBAI) memory 42(19). In addition, the wireless terminal may store one or more area identities based on the area scope(s), wherein the one or more area identities to be stored may be: (1) the serving PLMN identity (if the area scope is "PLMN"), (2) the tracking area codes (TACs) of the current registration area (if the area scope is "Registration Area"), (3) the TACs included in the TAC list (if the area scope is "TACs"), or (4) the cell identities included in the Cell List (if the area scope is "Cells").

4.5 Area Scope Indication: Node Operations

Then upon entering a new cell, the wireless terminal may determine if the stored network slice band association information is valid in the new cell, based on the stored area scope indication(s). For example, if the stored area scope is "PLMN" and if the new cell advertises (via system information) the same PLMN identity as the one stored in the wireless terminal, the stored network slice band association information may be considered to be valid in the new cell. Likewise, if the stored area scope is "Registration Area" or "TACs" and if the new cell advertises one of the stored TACs, the stored network slice band association information may be considered to be valid in the new cell. Similarly, if the stored area scope is "Cell List" and if the identity of the new cell is in the stored cell list, the stored network slice band association information may be considered to be valid in the new cell. Otherwise, the stored network slice band association information may be considered to be invalid in the new cell.

In a case that the stored network slice band association information turns to be valid in a new cell, the wireless terminal may follow the operation and mode disclosed in the preceding embodiment, as if the stored network slice band association information were provided by the new cell. Otherwise, the UE may attempt to obtain network slice band association information by system information acquisition, and/or through the registration procedure to the core network, as disclosed previously.

Figure 22A:
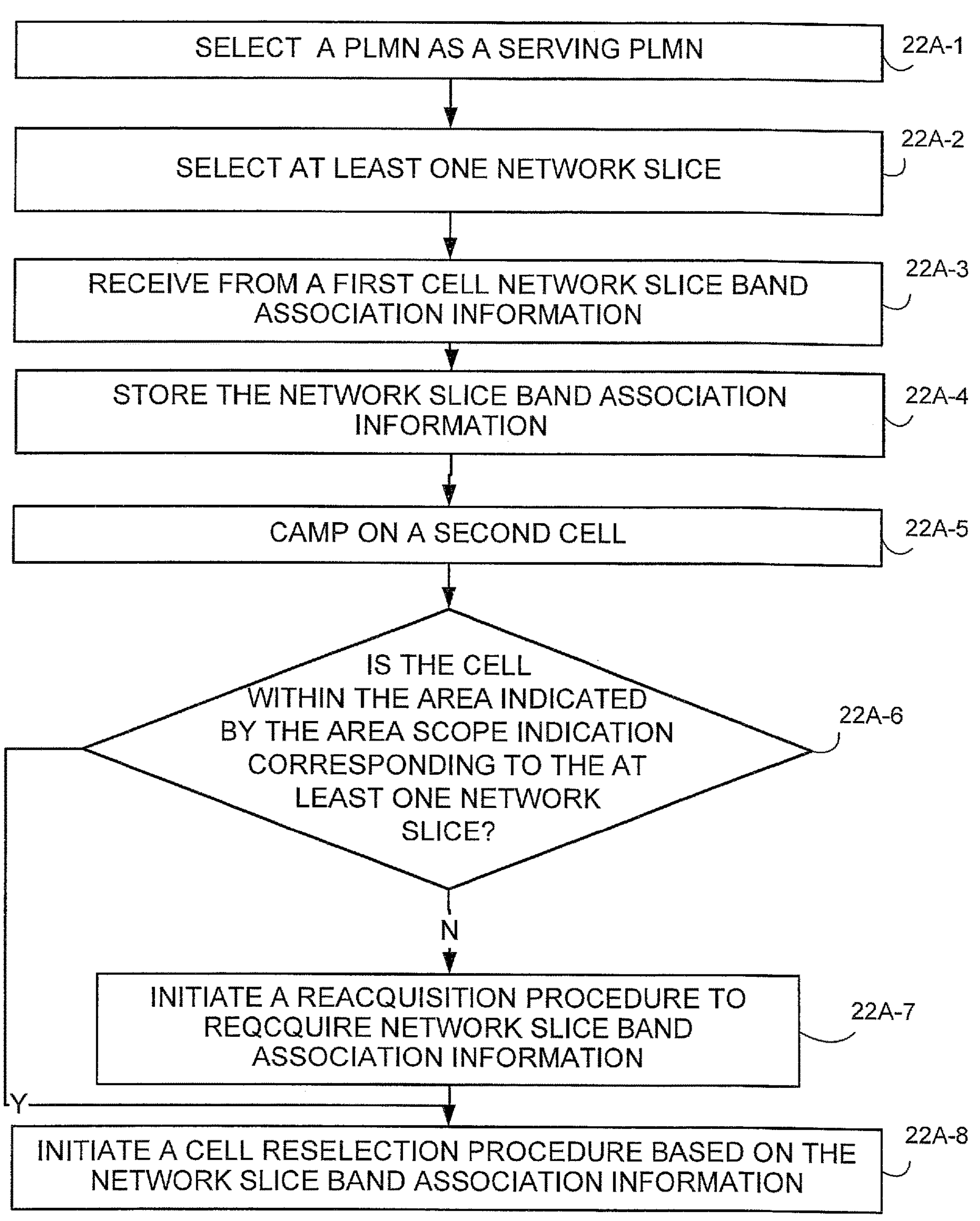
FIG. 22A is a flow chart showing example representative steps or acts performed by a wireless terminal of the example embodiment and mode of FIG. 14A.

FIG. 22A is a flow chart showing example representative steps or acts performed by a wireless terminal, e.g. UE, of the example generic embodiment and mode of FIG. 19A. As such, the acts of FIG. 22A are performed by the wireless terminals of the example embodiments and modes of FIG. 19B-FIG. 19D. Act 22A-1 comprises selecting a PLMN as a serving PLMN. Act 22A-2 comprises choosing, based on the serving PLMN, a network slice(s) that the wireless terminal desires to use. Act 22A-3 comprises receiving, from a first cell, a message comprising network slice band association. The message may be a system information message (e.g. SIB1/SIBx), a NAS message (e.g. Registration Accept message) or a dedicated RRC message. The network slice band association information may comprise one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s). Act 22A-4 comprises storing the network slice band association information. Act 22A-5 comprises camping on a second cell. Act 22A-6 comprises determining whether or not the network slice band association information needs to be reacquired from the second cell. The determination is based on the area scope indication in the stored network slice band association information, the area scope indication corresponding to the selected at least one network slice. If the second cell is within the area indicated by the area scope indication, as shown in Act 22A-7, a reacquisition procedure is initiated to reacquire the network slice band association information from the second cell. The reacquired network slice band association information may be stored in the wireless terminal, and may coexist with or replace a previously stored version(s). Act 22A-8 comprises initiating a cell reselection procedure to reselect a third cell, if necessary, using the stored network slice band association information. The stored network slice band association information may be the one received in Act 22A-3, or the one reacquired in Act 22A-7. The cell reselection procedure in Act 22A-8 may follow the preceding embodiment: preferably triggered based on (i) regular neighbor cell measurements (to select a cell with better signal quality) or (ii) the network slice band association information (in a case that the band of the currently camped cell does not support the network slice(s) of interest).

Figure 22B:
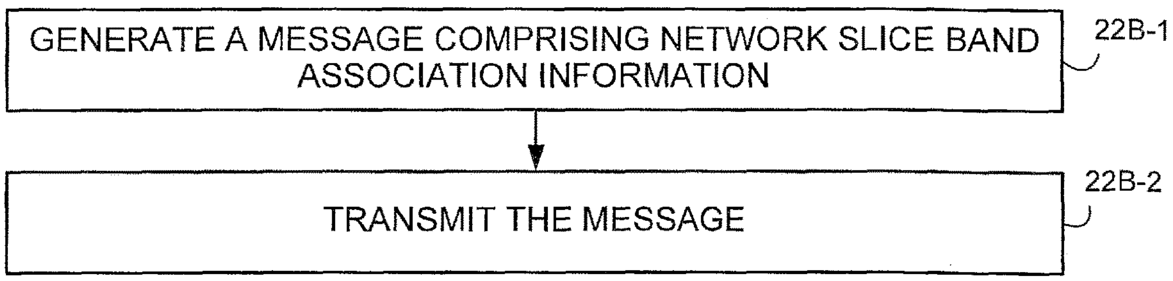
FIG. 22B is a flow chart showing example representative steps or acts performed by an access node of the example embodiment and mode of FIG. 14A.

FIG. 22B is a flow chart showing example representative steps or acts performed by an access node, e.g. gNB, of the example generic embodiment and mode of FIG. 19A. As such, the acts of FIG. 22A are performed by access nodes of the example embodiments and modes of FIG. 19B-FIG. 19D. Act 22B-1 comprises generating at least one message comprising network slice band association information. Such a message may be a system information message as shown, for example, in FIG. 19B, or a dedicated RRC message as shown, for example, in FIG. 19D. The dedicated RRC message may be, for example, a reconfiguration message or a release message. The network slice band association information may comprise one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s). Act 22B-2 comprises transmitting the message, such as message 155.

Figure 22C:
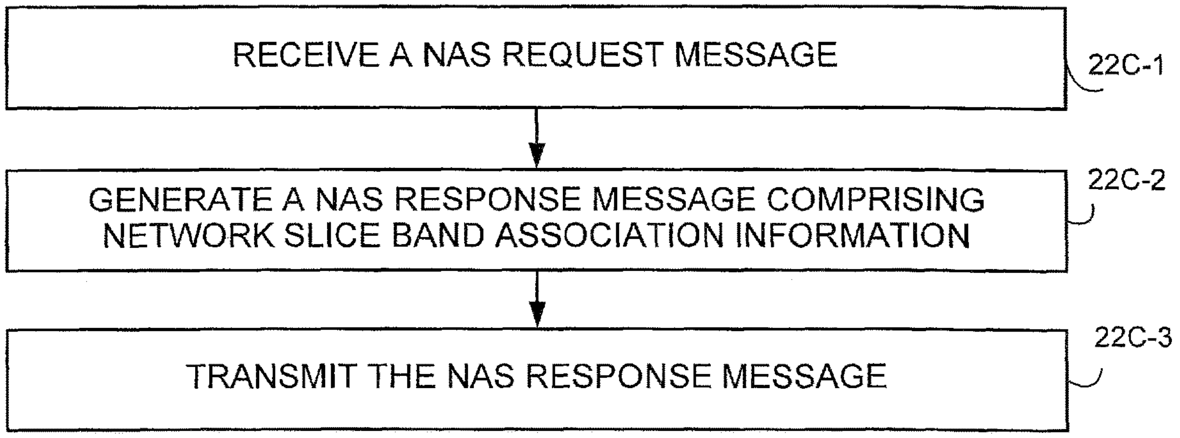
FIG. 22C is a flow chart showing example representative steps or acts performed by a management entity of the example embodiment and mode of FIG. 14A.

FIG. 22C is a flow chart showing example representative steps or acts performed by a management entity of a core network, e.g., AMF, of the example generic embodiment and mode of FIG. 19A. As such, the acts of FIG. 22A are performed by the management entities of the example embodiments and modes of FIG. 19C. Act 22C-1 comprises receiving a non-access stratum (NAS) request message, e.g., a Registration Request message, from a wireless terminal. Act 22C-2 comprises generating a NAS response message, such as, for example, a Registration Accept message. The NAS response message comprises network slice band association information. The network slice band association information may comprise one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s). Act 22C-3 comprises transmitting the NAS response message, as shown by message 151C of FIG. 19C.

5.0 Coverage Area for Network Slicing

The aforementioned GSMA NG.116, General Network Slice Template, also describes another attribute, an "area of service" attribute, which may be used to specify a network slice with a list of the countries where the service of a network slice will be provided. Table 11 is an example template of the "area of service" attribute.

TABLE 11

| Parameter | |
|---|---|
| Value | {String, String . . . } |
| Measurement unit | NA |
| Example | Canada |
| | France |
| | Japan |
| | UK |
| Tags | Character Attribute/Operation |
| | Scalability Attribute |
| | KPI |

Table 11

The example embodiment and mode of FIG. 23 goes beyond GSMA NG.116 in that, e.g., the communications network 20(23) provides one or more network slice coverage area configurations, in which each of the one or more network slice coverage configuration(s) indicate a coverage area of a corresponding network slice. As used herein, the "network slice coverage area configuration" may also be referred to as "coverage area attribute", or "slice coverage area attribute", or "region attribute". The network slice coverage area configuration(s) provided by the example embodiment and mode of FIG. 23 is beneficial, for example, in providing, for a country listed in the area of service attribute of Table 11, for example, a further indication of whether the service is provided in the whole country or just in part of the country. The network slice coverage area configuration may be provided for one or more, and perhaps all, of the countries listed in the area of service attribute of Table 11. Thus, if a specific location is required, this network slice coverage area configuration or area coverage attribute may be used to specify regions of the country. Table 12 is an example template of such a region specification.

TABLE 12

| Parameters | |
|---|---|
| Value | Integer |
| Measurement unit | NA |
| Example | 1. full country<br>2. list of regions |
| Tags | Character Attribute/Operation<br>Scalability Attribute<br>KPI |

Figure 23A:
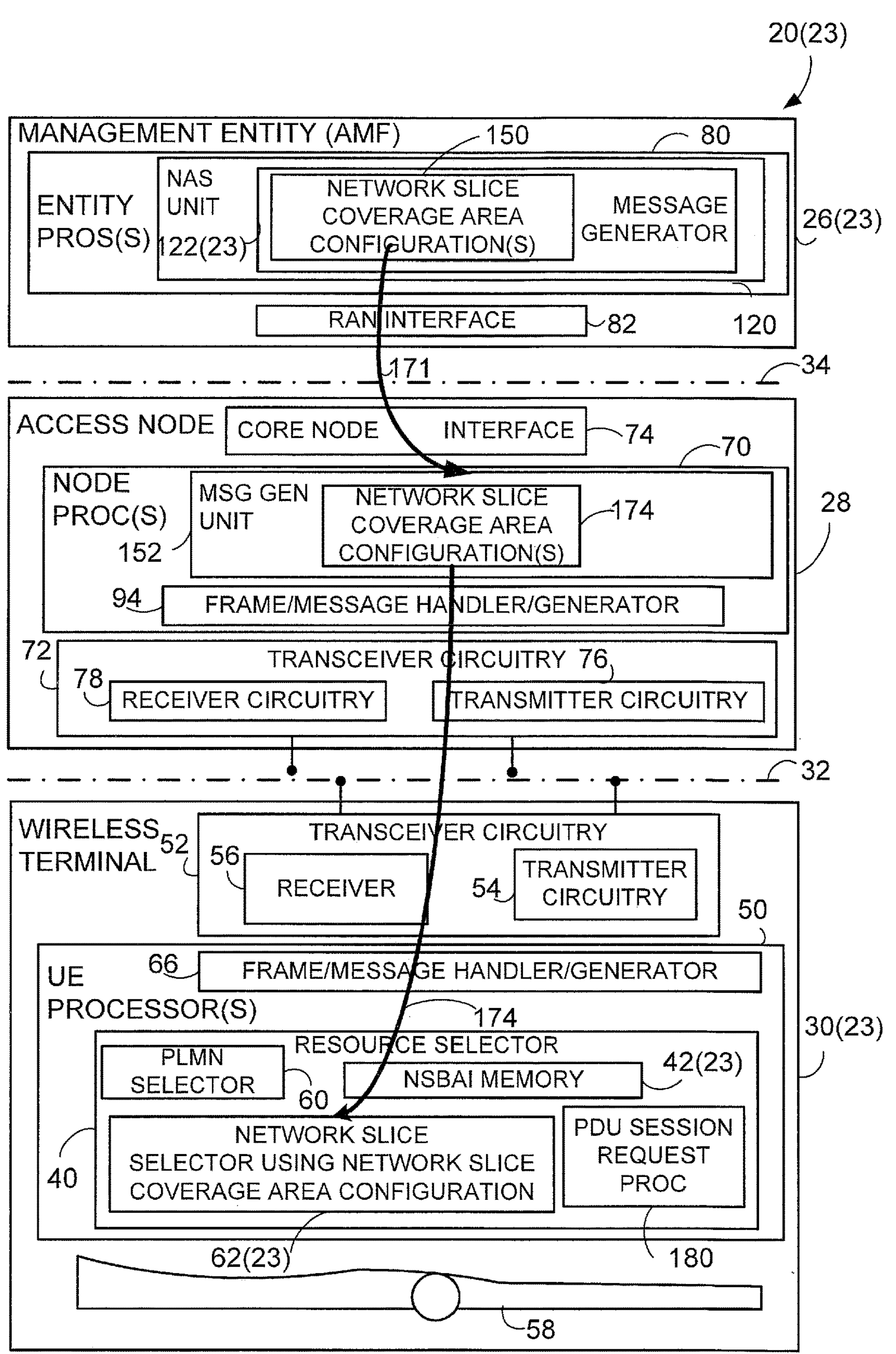
FIG. 23A is a schematic view of an example generic communications system in which a wireless terminal is provided with network slice coverage area configuration to indicate a coverage area of a corresponding network slice.
Figure 23B:
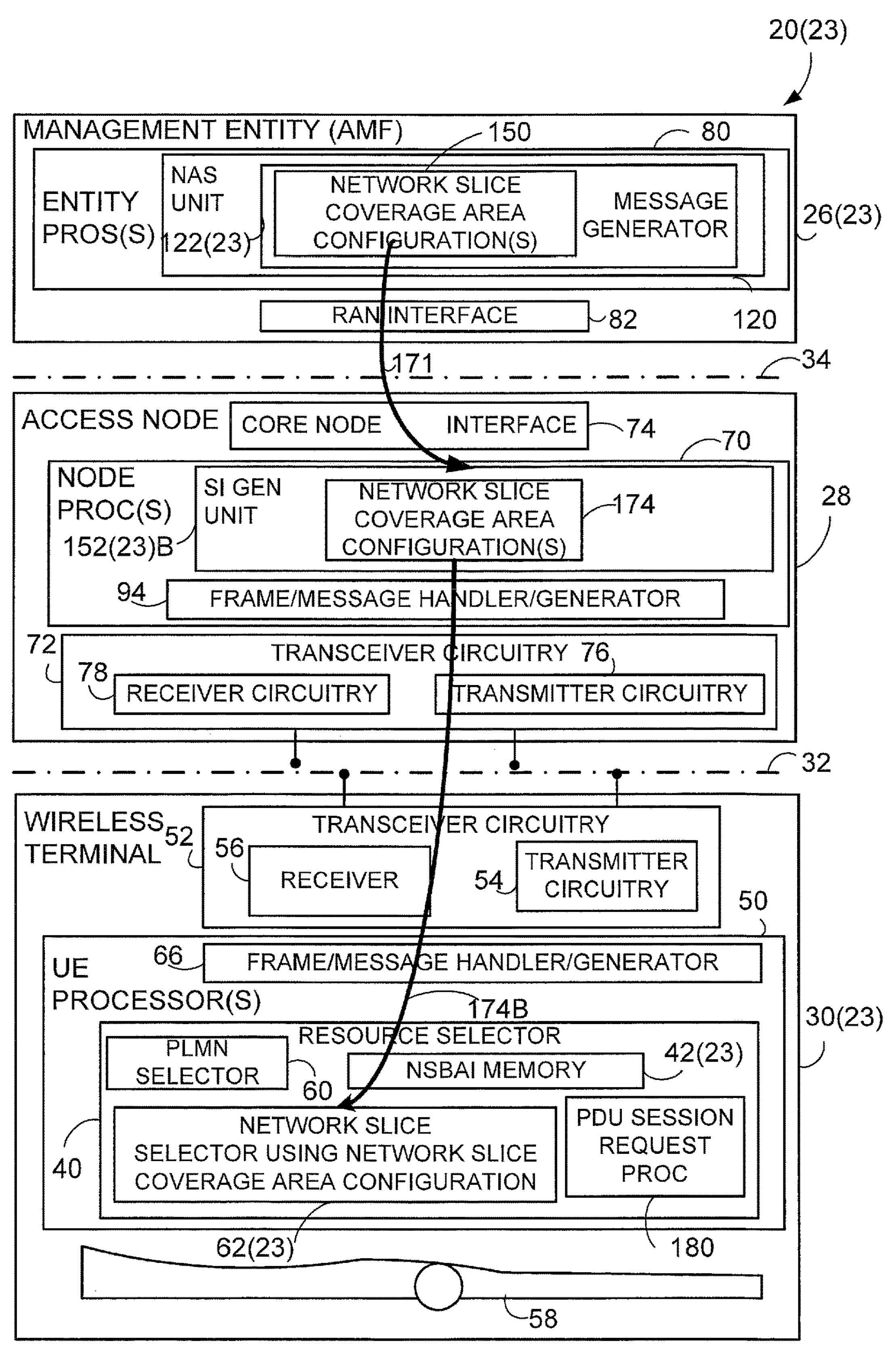
FIG. 23B is a schematic view of an example communications system in which the network slice coverage area configuration is carried in system information.
Figure 23C:
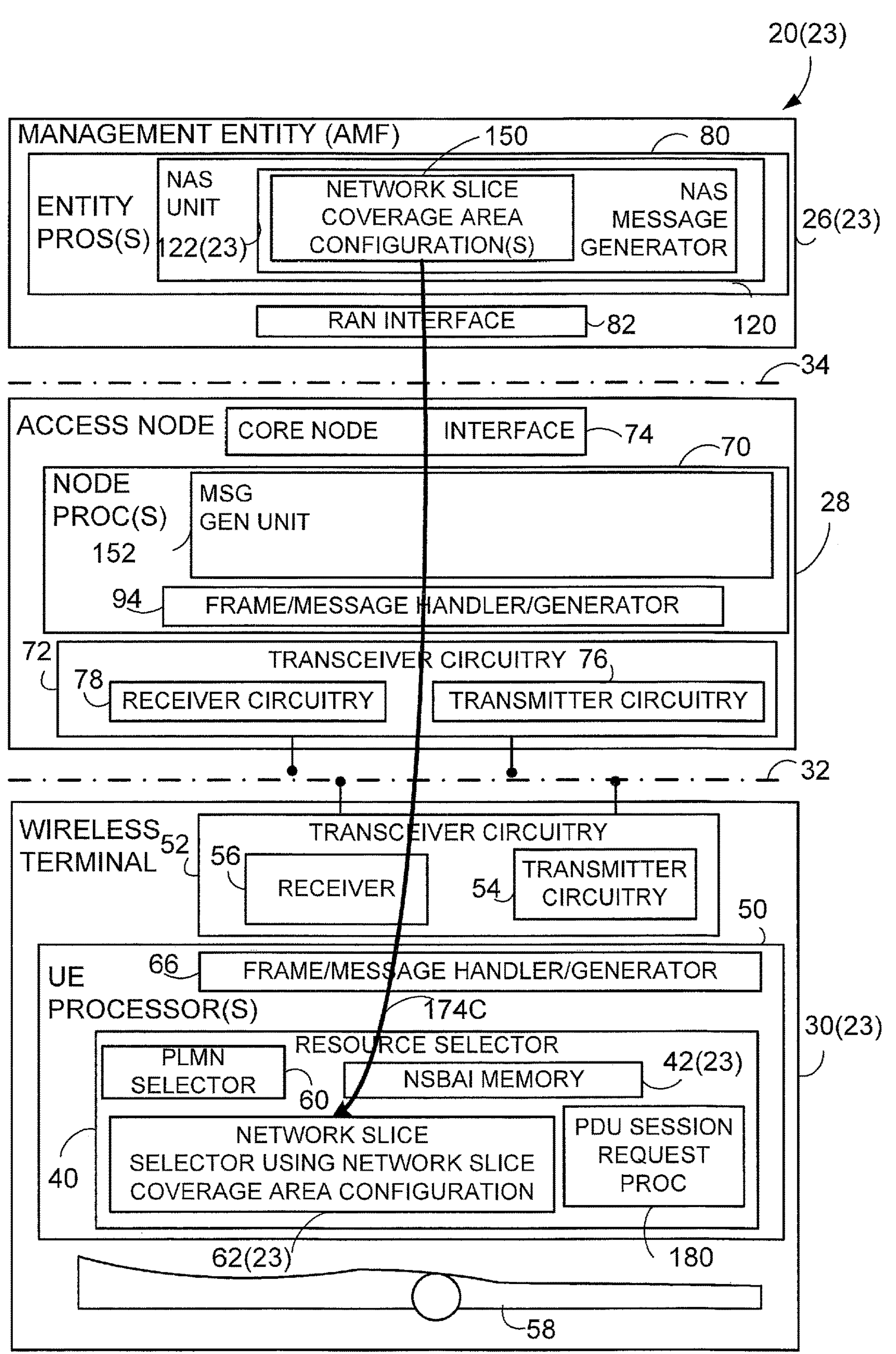
FIG. 23C is a schematic view of an example communications system in which the network slice coverage area configuration is carried in a non-access stratum message.
Figure 23D:
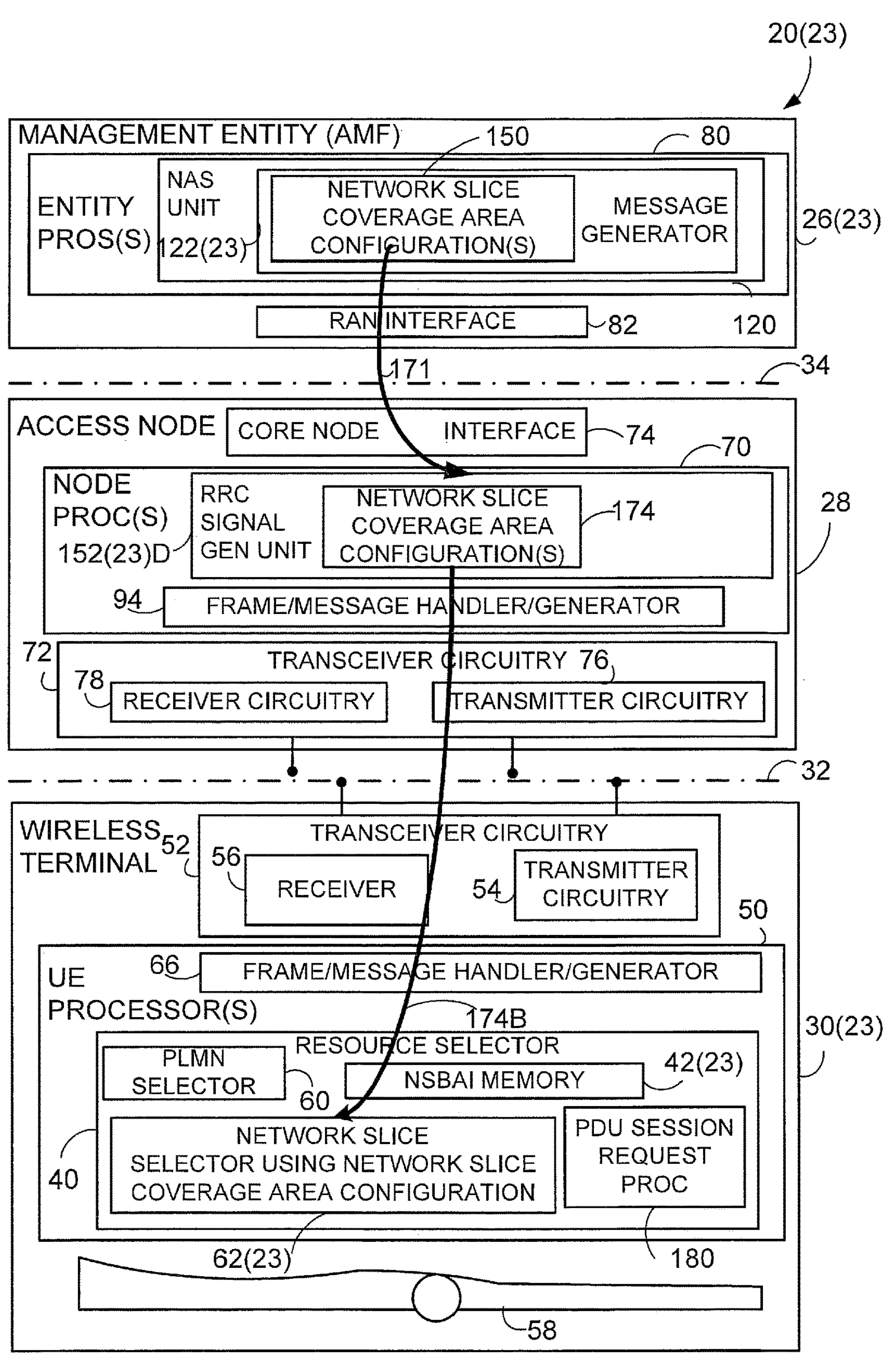
FIG. 23D is a schematic view of an example communications system in which the network slice coverage area configuration is carried in dedicated RRC signaling.

The example embodiment and mode of FIG. 23A is generic to the example embodiments and modes of FIG. 23B-FIG. 23D, and therefore all comments concerning FIG. 23A are applicable to the example embodiments and modes of FIG. 23B-FIG. 23D as well. Moreover, the example embodiment and mode of FIG. 23A is itself an example implementation of the generic example embodiment and mode of FIG. 4 and FIG. 5, and as such explanations of FIG. 4 and FIG. 5 are applicable to communications system 20(23) of FIG. 23A as well.

For example, the communications system 20(23) of FIG. 23A comprises one or more radio access networks (RANs) 22 and one or more core networks (CNs) 24, with one management entities 26 being shown in the core network (CN) 24 by way of example and one access node 28 being shown by way of example in radio access network (RAN) 22. Although not illustrated as such, the communications system 20(23) of FIG. 23A may be and usually is utilized by plural PLMNs. In FIG. 23A, wireless terminal 30 communicates with a management entity of a core network through an access node of a radio access network (RAN). The core network supports one or more network slices, each of the network slices providing a designated service within a public land mobile network (PLMN).

Since the communications system 20(4) is generic to various other example embodiments and modes described herein, it is again mentioned that the wireless terminal may take various forms as mentioned above, and likewise that the access node may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. Moreover, communications system 20(23) may be realized in virtualized and/or distributed and/or logical form.

Structures and functionalities of the communications system 20(23) of FIG. 23A which are common or essentially the same as one of more of the preceding example embodiments have the same reference numerals. For example, much of the structure of wireless terminal 30 of FIG. 23A and much of the structure of access node 28 of FIG. 23A is similar to preceding example embodiments. However, in in the example embodiment of FIG. 23A the management entity 26(23) generates a network slice coverage area configuration, or area coverage attribute, which indicates a coverage area of a corresponding network slice.

The management entity 26(23) of communications system 20(23) may comprise core network entity processor circuitry 80 and interface 82 toward the radio access network (RAN) 22. The core network entity processor circuitry 80 may be realized or comprise one or more processors and at least one memory. The memory includes computer program code, wherein the memory and the computer program code are configured to, working with the at least one processor, cause the decoding device to perform at least at least the operations described herein. FIG. 23A further shows management entity 26(23) as comprising system the non-access stratum (NAS) unit 120, which may include message generator 122(23). The AS message generator 122(23) controls generation, formatting, and/or inclusion of the network slice coverage area configuration in a message, such as a non-access stratum message. FIG. 23A therefore illustrates core non-access stratum (NAS) unit 120 with its message generator 122(23) as including network slice coverage area configuration generator/memory 170. The non-access stratum (NAS) unit 120 with its network slice coverage area configuration generator/memory 170 preferably comprises or is included in node processor circuitry 70 of management entity 26(23). The arrow 171 of FIG. 23A shows that management entity 26(23) provides the network slice coverage area configuration to radio access network (RAN) 22, e.g., to access node 28.

There three possible implementations regarding the message(s) which carry the network slice coverage area configuration. In a first example implementation, the network slice band association information (NSBAI) and the coverage area configuration are in separate messages. In a second example implementation, the network slice band association information (NSBAI) and the coverage area configuration are included in a same message but as separate information elements. In a third example implementation, the network slice band association information (NSBAI) and the coverage area configuration are included in a same message and are combined in one information element. Thus, for the above second and third example implementations, in which the message may include both the network slice band association information and the network slice coverage area configuration, the message generator 122(23) may comprise or be included in the core NSBAI controller 122 of previously described embodiments and modes. In such case, the network slice band association information, NSBAI, may include the network slice coverage area configuration.

The access node 28 of the example embodiment and mode of FIG. 23A comprises node processor circuitry 70, node transceiver circuitry 72, and interface 74 to core network (CN) 24. The node transceiver circuitry 72 may comprise node transmitter circuitry 76 and node receiver circuitry 78. The transceiver circuitry 72 includes antenna(e) for the wireless transmission. Transmitter circuitry 76 may include, e.g., amplifier(s), modulation circuitry and other conventional transmission equipment. Receiver circuitry 78 may comprise, e.g., amplifiers, demodulation circuitry, and other conventional receiver equipment. As indicated above, various aspects of access node 28 including the node transceiver circuitry 72 may be realized by a distributed unit (DU) and a central unit (CU).

The node processor circuitry 70 of the access node 28 of FIG. 23A is shown as comprising, among other units and functionalities, frame/message handler/generator 94 and message generator 152. In the example embodiment and mode of FIG. 23A, the access node 28 receives the network slice coverage area configuration from the management entity 26(23), as indicated by arrow 171, and is stored in network slice coverage area configuration manager/memory 174. The network slice coverage area configuration as stored in network slice coverage area configuration manager/memory 174 is included in a message generated by message generator 152 which transmitted by access node 28 to wireless terminal 30(23), as shown by arrow 175 in FIG. 23A. In an example implementation, the network slice coverage area configuration may optionally be included in a same massage that carries the network slice band association information (NSBAI).

The wireless terminal 30(23) of communications system 20(23) of FIG. 23A comprises terminal transceiver circuitry 52 and processor circuitry, e.g., terminal processor circuitry 50. The transceiver circuitry 52 in turn may comprise terminal transmitter circuitry 54 and terminal receiver circuitry 56. The transceiver circuitry 52 includes antenna(e) for the wireless transmission. Transmitter circuitry 54 may include, e.g., amplifier(s), modulation circuitry and other conventional transmission equipment. Receiver circuitry 56 may comprise, e.g., amplifiers, demodulation circuitry, and other conventional receiver equipment. FIG. 23A further shows that wireless terminal 30(23) may also comprise terminal interfaces 58. Such user interfaces may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The receiver circuitry 56 of wireless terminal 30(23) is configured to receive, from a cell served by the access node 28, a message comprising the network slice coverage area configuration, as indicated by arrow 175 in FIG. 23A. As indicated above, the network slice coverage area configuration may optionally be included in a same massage that carries the network slice band association information (NSBAI).

The terminal processor circuitry 50 of FIG. 23A is shown as including terminal resource selector 40. In addition to memory or registers 42(23) for storing network slice band association information (NSBAI), the terminal resource selector 40 comprises PLMN selector 60; network slice selector 62(23) which uses the network slice coverage area configuration, and protocol data unit (PDU) session establishment request procedure unit 180, also known as PDU session request procedure unit 180.

As understood from the foregoing and further described herein, the management entity 26(23) thus belongs to core network (CN) 24 and communicates with a wireless terminal, e.g., wireless terminal 30(23), via a cell of a radio access network (RAN). The core network supports one or more network slices, each of the network slices providing a designated service within a public land mobile network (PLMN). In an example basic embodiment and mode, the management entity comprises receiver circuitry, processor circuitry, and transmitter circuitry. The receiver circuitry is configured to receive, from the wireless terminal, a non-access stratum (NAS) request message. The processor circuitry is configured to generate a NAS response message comprising one or more network slice coverage area configurations. The transmitter circuitry is configured to transmit, to the wireless terminal, the NAS response message. The one or more network slice coverage area configurations are used by the wireless terminal to determine whether or not a network slice is available in a serving cell that the wireless terminal camps on.

As understood from the foregoing and further described herein, in a basic example embodiment and mode the access node 28 thus comprises processor circuitry and transmitter circuitry. The processor circuitry is configured to generate a message comprising one or more network slice coverage area configurations, each of the one or more network slice coverage configurations indicating a coverage area of a corresponding network slice. The transmitter circuitry is configured to transmit, to a wireless terminal, the message in a cell served by the access node. The once or more network slice coverage area configurations are used by the wireless terminal to determine whether or not a network slice is available in a serving cell that the wireless terminal camps on.

As understood from the foregoing and further described herein, the wireless terminal 30(23) communicates with a management entity of a core network through an access node of a radio access network (RAN). As mentioned, the core network supports one or more network slices, each of the network slices providing a designated service within a public land mobile network (PLMN). In a basic example embodiment and mode the wireless terminal 30(23) comprises receiver circuitry and processor circuitry. The receiver circuitry is configured to receive a message comprising one or more network slice coverage area configurations. Each of the one or more network slice coverage configurations indicates a coverage area of a corresponding network slice. The processor circuitry is configured to: select at least one network slice of a serving PLMN; camp on a serving cell of the RAN, and; determine, based the one or more network slice coverage area configurations, whether or not the at least one network slice is available in the serving cell.

5.1 Types of Messages Carrying Coverage Area Identities

Various methods can be used to provide the configuration of the coverage area attribute, such as NAS signaling, system information broadcast and dedicated RRC signaling.

FIG. 23B shows the network slice coverage area configuration is carried in system information. In FIG. 23B, the access node 28 comprises system information message generator 152(23)B which includes the network slice coverage area configuration in system information such as a system information block (SIB). In FIG. 23B the network slice coverage area configuration is thus broadcast as system information as indicated by arrow 174B.

FIG. 23C is a schematic view of an example communications system in which the network slice coverage area configuration is carried in a non-access stratum message, e.g., non-access stratum signaling. In the case of using the NAS signaling, a NAS message, such as the aforementioned Registration Accept message may be used, wherein the NAS message may further comprise an optional information element (IE), "Allowed NSSAI Coverage Area" IE, for the Allowed NSSAI, and/or may comprise another optional "Configured NSSAI Coverage Area" IE for the Configured NSSAI.

FIG. 23D is a schematic view of an example communications system in which the network slice coverage area configuration is carried in dedicated RRC signaling. In FIG. 23D, the access node 28 comprises RRC message generator 152(23)D which includes the network slice coverage area configuration in RRC signaling. In FIG. 23D the network slice coverage area configuration is thus transmits the RRC signaling carrying the network slice coverage area configuration as indicated by arrow 174D.

5.2 Types of Coverage Area Identities

As mentioned above, the network slice coverage area configuration may also be referred to as the region attribute region or the coverage area attribute. The network slice coverage area configuration may be preferably be described by a listing of area identities, such as identities of tracking areas, base stations/access nodes, cells, sectors, beams or any other types of areas via which the network slice is provided. It will be understood from the preceding embodiments that an S-NSSAI in an Allowed NSSAI is effective in the current registration area, and an S-NSSAI in a Configured NSSIA is effective in the serving PLMN. Therefore, this embodiment is aimed to provide different kinds of granularity for the coverage area attribute.

In one configuration, a coverage area attribute for a network slice may be configured to the wireless terminal as a list of area identities, such as a list of tracking area codes and/or a list of cell identities. Each of the cell identities may be a physical cell ID, global cell ID or any other type of identity that identify a cell.

FIG. 24A illustrates an example format of the optional information elements in a case that a list of cell identities is used for the coverage area attribute. The format, shown as "NSSAI Coverage Area", may be shared by the Allowed NSSAI Coverage Area IE and the Configured NSSAI Coverage Area IE. Herein, each S-NSSAI value in the NSSAI IE is associated, in the order of the S-NSSAI fields, with one entry of the NSSAI Coverage Area IE, wherein each entry comprises one or more cell identities. If a particular S-NSSAI has no specific coverage area, the length of the corresponding Association x field in the NSSAI Coverage Area IE may be set to zero.

FIG. 24B illustrates another example format of the network slice coverage area configuration combined in the aforementioned network slice band association information (NSBAI), wherein each of the S-NSSAIs in the NSSAI IE (e.g., Allowed NSSAI IE or Configured NSSAI IE) may be associated with one of the Association x (x: 1-n) fields in the NSBAI. The Association x fields may comprise one or more sub-associations, where each of the sub-associations may possess the same structure as the Association x field of FIG. 21B. The structure shown in FIG. 24B should be understood in such a way that each sub-association indicates an area/coverage for the corresponding S-NSSAI, and thus the union of such sub-associations corresponding to the same S-NSSAI may form the total coverage area of the S-NSSAI. Any other area (e.g., a cell, or a tracking area) not covered by the union may be considered as an unsupported area for the S-NSSAI. It is also worth noting that in this structure each sub-association can have designated band associations or no band association at all.

In another example implementation, instead of configuring a list of area identities as a coverage area attribute, each area may transmit/broadcast network slice identifiers, e.g., S-NSSAIs, that are supported/available in the area. For example, each cell of a radio access network (RAN) may broadcast system information comprising supported network slice identifiers. One non-limiting implementation of this example is to repurpose the network slice band association information disclosed in Table 9A or Table 9B. That is, each of S-NSSAIs listed in the network slice band association information in system information broadcasted in a cell, regardless of whether or not a band(s) is associated, may be considered as an S-NSSAI supported in the cell. On the other hand, any S-NSSAI not listed in the network slice band association information may be considered as unsupported/unavailable in the cell. For this operation and mode, the wireless terminal of this embodiment may perform an additional step to check whether an S-NSSAI of interest is listed in the network slice band association information.

5.3 Coverage Area Identities Indicating Support or Non-Support

The foregoing example embodiments and modes concerning network slice coverage area configuration have been described from the perspective of the network slice coverage area configuration identifies providing an indication of support in the specified area(s). In yet another example embodiment and mode, each area may transmit/broadcast network slice identifiers, e.g., S-NSSAIs, which are NOT supported/available in the area. For example, each cell of a radio access network (RAN) may broadcast system information comprising unsupported/unavailable network slice identifiers for each PLMN. Table 13 shows an example format of a SIB, e.g., SIBy, carrying the unsupported/unavailable network slice identifiers, wherein networkSliceForbiddenInfoForPLMNs is a list of one or more NetworkSliceForbiddenInfo IEs. Similar to FIG. 20A, each of the on one or more NetworkSliceForbiddenInfo IEs may be associated with one PLMN_Identity IE in SIB1, by the order of presences. Each NetworkSliceForbiddenInfo IE comprises a list of S-NSSAIs that are unsupported/unavailable in the cell for the associated PLMN. SIBy may be an independent SIB, or may be a part of another SIB (e.g., SIB1 or SIBx).

Accordingly, in this example embodiment and mode typified by Table 13, if an S-NSSAI of interest is in an Allowed NSSAI or in a Configured NSSAI of a serving PLMN (obtained in the aforementioned registration process) and the S-NSSAI is listed in the NetworkSliceForbiddenInfo for the serving PLMN, the S-NSSAI may be considered to be unsupported/unavailable in the cell that broadcasts the system information (e.g., SIBy). If the S-NSSAI is in the Allowed NSSAI or in the Configured NSSAI of the serving PLMN and the S-NSSAI is not listed in the NetworkSlice-ForbiddenInfo for the serving PLMN, the S-NSSAI may be considered to be supported/available in the cell.

TABLE 13

```
SIBy ::=        SEQUENCE {
...
  networkSliceForbiddenInfoForPLMNs      SEQUENCE (SIZE
(1..maxPLMN)) OF NetworkSliceForbiddenInfo
...
}
NetworkSliceForbiddenInfo::=         SEQUENCE (SIZE (1..
maxNrofS-NSSAI) OF S-NSSAI
```

In any of the configurations in this embodiment, in a case that a network slice of interest for a PLMN turns out to be supported/available in a cell, the wireless terminal may be allowed to use services offered by the network slice. For example, the wireless terminal may be allowed to initiate a packet data unit (PDU) session establishment procedure to establish a PDU session for the network slice with the core network. On the other hand, in the case that a network slice of interest for a PLMN turns out to be unsupported/unavailable in a cell, the wireless terminal may not be allowed to use services offered by the network slice, and thus may refrain from initiating a PDU session establishment procedure in the cell.

5.3 Operations of Nodes Using Coverage Area Attribute

Figure 25A:
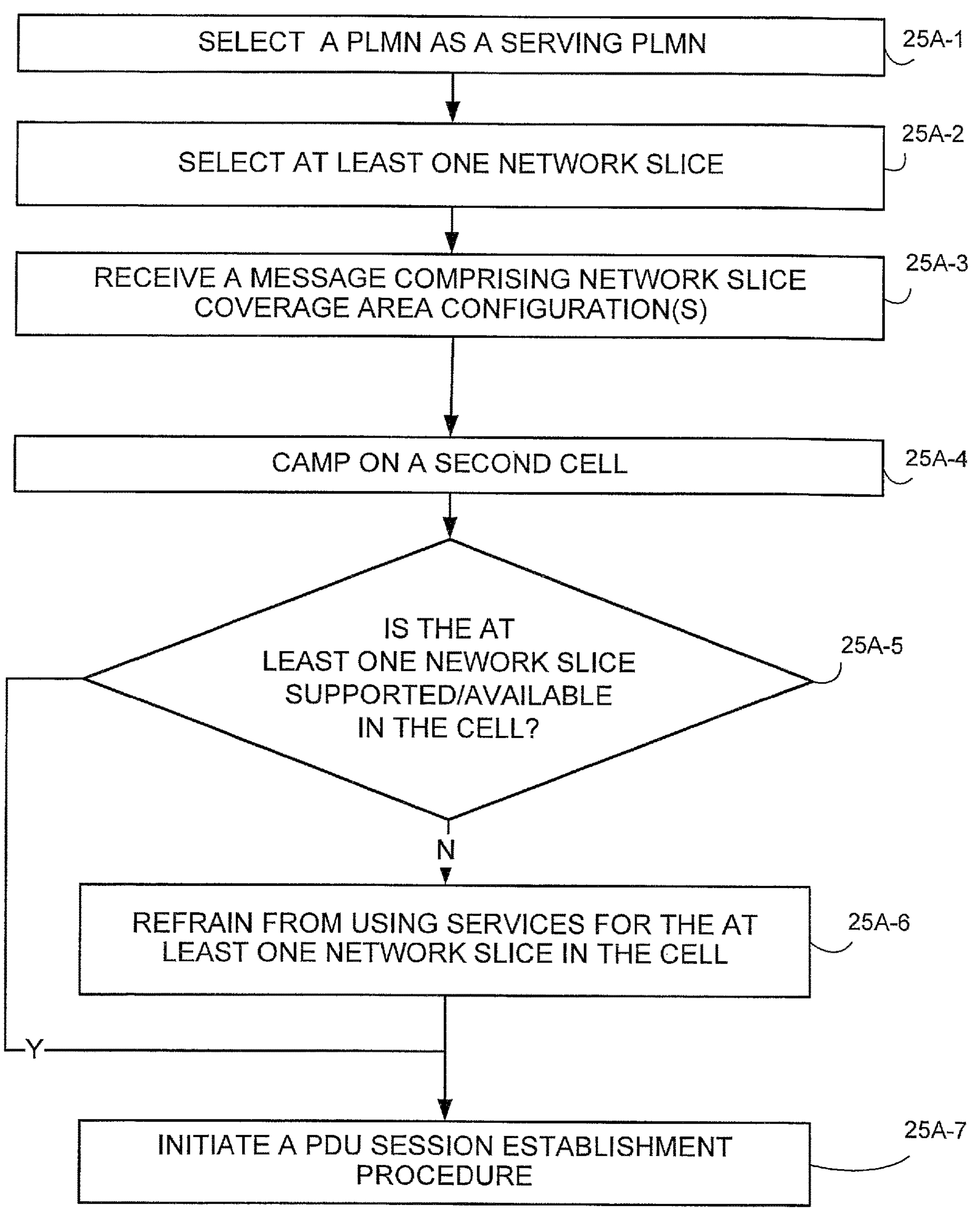
FIG. 25A is a flow chart showing example representative steps or acts performed by a wireless terminal of the example embodiment and mode of FIG. 23A.

FIG. 25A is a flow chart showing example representative steps or acts performed by a wireless terminal, wireless terminal 30(23) of the example embodiment and mode of generic FIG. 23A, and thus of the example embodiments and modes of FIG. 23B-FIG. 23D. Act 25A-1 comprises selecting a PLMN as a serving PLMN. Act 25A-2 comprises choosing, based on the serving PLMN, at least one network slice that the wireless terminal desires to use. Act 25A-3 comprises receiving a message comprising one or more network slice coverage area configurations. The message may be a system information message (e.g. SIB1/SIBx), a NAS message (e.g. Registration Accept message) or a dedicated RRC message. Each of the network slice coverage area configurations may indicate a coverage area of a corresponding network slice. In one example implementation, the each of the network slice coverage area configurations may comprise a list of area identities, such as a list of tracking area codes and a list of cell identities, in which the corresponding network slice is supported/available. In another example implementation, the each of the network slice coverage area configurations may comprise a network slice identifier supported/available in a cell that transmit/broadcast the message. In yet another example implementation, the each of the network slice coverage area configurations may comprise a network slice identifier unsupported/unavailable in a cell that transmit/broadcast the message. Act 25A-4 comprises camping on a cell. This cell may or may not be the same cell from which the wireless terminal received the message in Act 25A-3. Act 25A-5 comprises determining, based on the one or more network slice coverage area configurations, whether or not the at least one network slice is supported/available in the cell. If the determination is affirmative, the wireless terminal may be allowed to use services of the at least one network slice, and as shown in Act 25A-6, may initiate a PDU session establishment procedure to establish, with a core network, a PDU session for the at least one network slice. If the determination is negative, as shown in Act 25A-7, the wireless terminal may refrain from using services for the at least one network slice in the cell. For example, the wireless terminal may not initiate a PDU session establish procedure while camping in the cell.

Figure 25B:
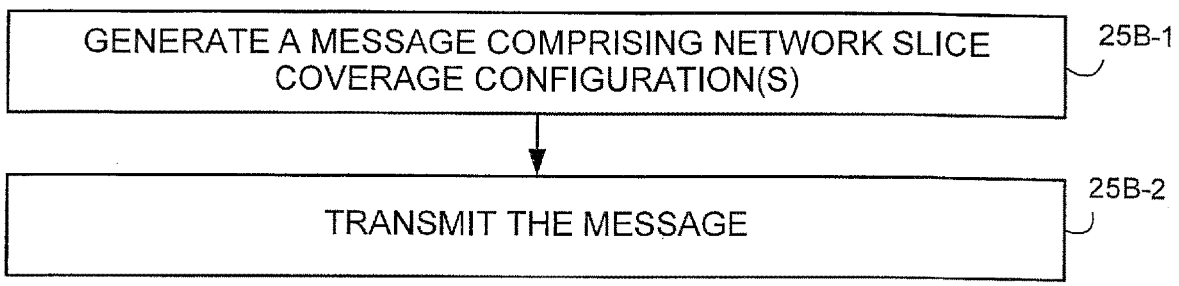
FIG. 25B is a flow chart showing example representative steps or acts performed by an access node of the example embodiment and mode of FIG. 23A.

FIG. 25B is a flow chart showing example representative steps or acts performed by an access node, e.g. gNB, of the example embodiment and mode of FIG. 23A, and thus of the example embodiments and modes of FIG. 23B-FIG. 23D. Act 25B-1 comprises generating a message comprising one or more network slice coverage area configurations. The message may be a system information message (e.g. SIB1/SIBx) or a dedicated RRC message. Each of the network slice coverage area configurations may indicate a coverage area of a corresponding network slice. In one configuration, the each of the network slice coverage area configurations may comprise a list of area identities, such as a list of tracking area codes and a list of cell identities, in which the corresponding network slice is supported/available. In another configuration, the each of the network slice coverage area configurations may comprise a network slice identifier supported/available in a cell that transmit/broadcast the message. In yet another example implementation, the each of the network slice coverage area configurations may comprise a network slice identifier unsupported/unavailable in a cell that transmit/broadcast the message. Act 25B-2 comprises transmitting the message.

Figure 25C:
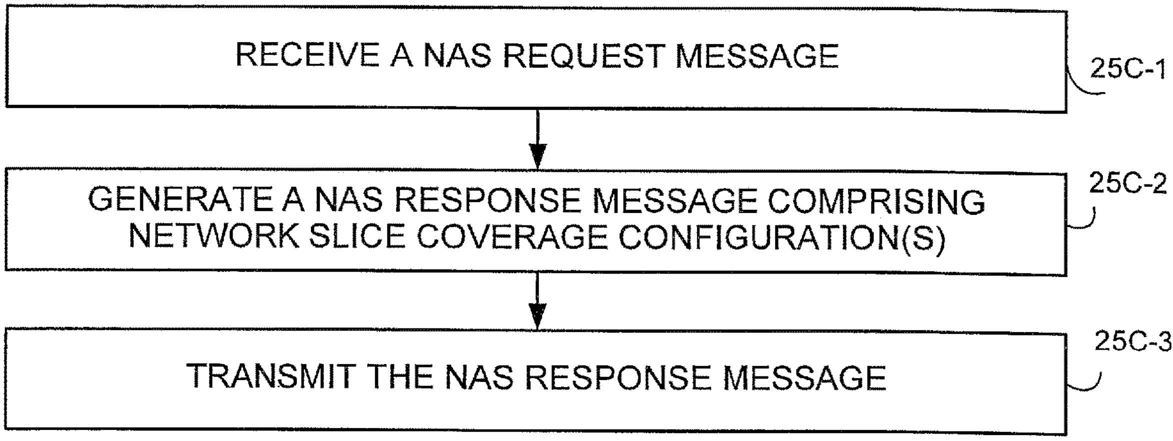
FIG. 25C is a flow chart showing example representative steps or acts performed by a management entity of the example embodiment and mode of FIG. 23A.

FIG. 25C is a flow chart showing example representative steps or acts performed by a management entity 26(23) of a core network e.g., of an AMF, of the example embodiment and mode of FIG. 23A, and thus of the example embodiments and modes of FIG. 23B-FIG. 23D). Act 25C-1 comprises receiving a non-access stratum (NAS) request message (e.g., Registration Request message) from a wireless terminal. Act 25C-2 comprises generating a NAS response message (e.g., Registration Accept message) comprising one or more network slice coverage area configurations. Each of the network slice coverage area configurations may indicate a coverage area of a corresponding network slice. Preferably, the each of the network slice coverage area configurations may comprise a list of area identities, such as a list of tracking area codes and a list of cell identities, in which the corresponding network slice is supported/available. Act 8C-3 comprises transmitting the NAS response message.

6.0 Determining Network Slice Support/Non-Support in a Currently Serving Radio Band As understood from one or more of preceding example embodiments and modes, a wireless terminal may be provisioned with information regarding available network slices and associated radio bands for a given area, e.g. a cell(s), a tracking area(s), a registration area(s) or a PLMN(s). The example embodiment and mode of FIG. 26 discloses wireless terminals that are configured to make a determination regarding support of a network slice in a currently serving radio band, including a potential determination that a network slice is unsupported in a currently serving radio band, and operations resulting from such determination(s), as well as structure and method suitable for a situation where some or all of the network slice(s) that the wireless terminal desires to use is(are) unsupported (unavailable) on a currently serving radio band in such an area.

Figure 26:
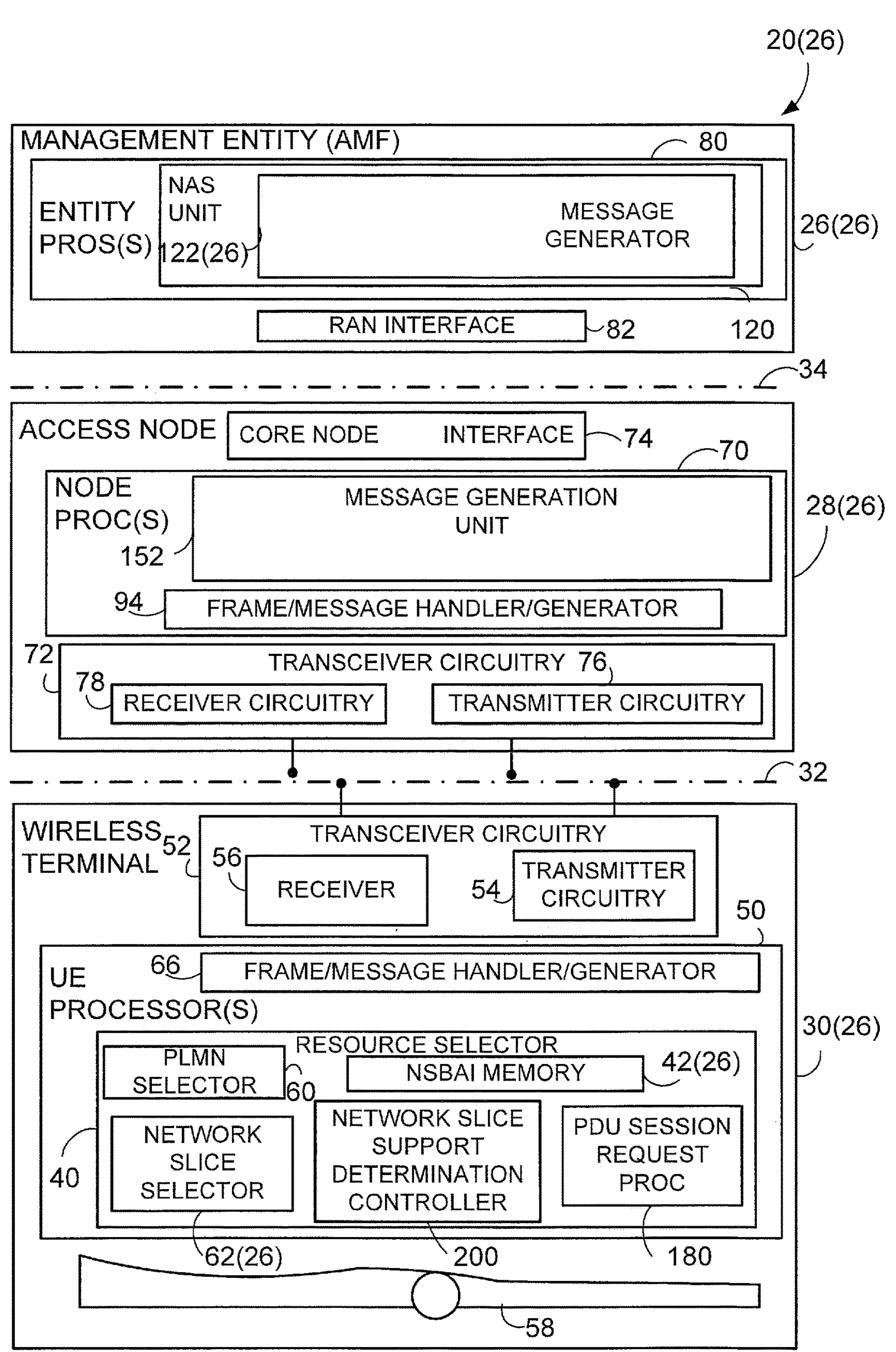
FIG. 26 is a schematic view of an example generic communications system in which a wireless terminal is provided with network slice support determination capability.

Specifically, based on the network slice band association information, e.g., the network slice band association information 42 of at least some of the preceding example embodiments and modes, the wireless terminal of the example embodiment and mode of FIG. 26 includes a network slice support determination controller 200 which may make a determination of one of the following conditions for each of desired network slices:

(a) The network slice is supported in the radio band (first radio band) of the serving cell, (b) The network slice is not supported in the first radio band but is supported in another (collocated) cell operated on a different radio band (second radio band), or (c) The network slice is not supported at the location in any radio bands.

For the example embodiment and mode of FIG. 26, in a case that at least one of the desired network slices falls into condition (a), the wireless terminal may stay on the first radio band, e.g., staying on the serving cell, and may further proceed on establishing a PDU session(s) for the at least one desired network slice. In a case that all of the desired network slices do not meet condition (a) but at least one desired network slice falls into condition (b), the wireless terminal may perform a cell reselection procedure to select a cell operated on the second radio band. In a case that all of the desired network slices fall into condition (c), the wireless terminal may perform a PLMN selection procedure to select a PLMN other than the serving PLMN.

Figure 27:
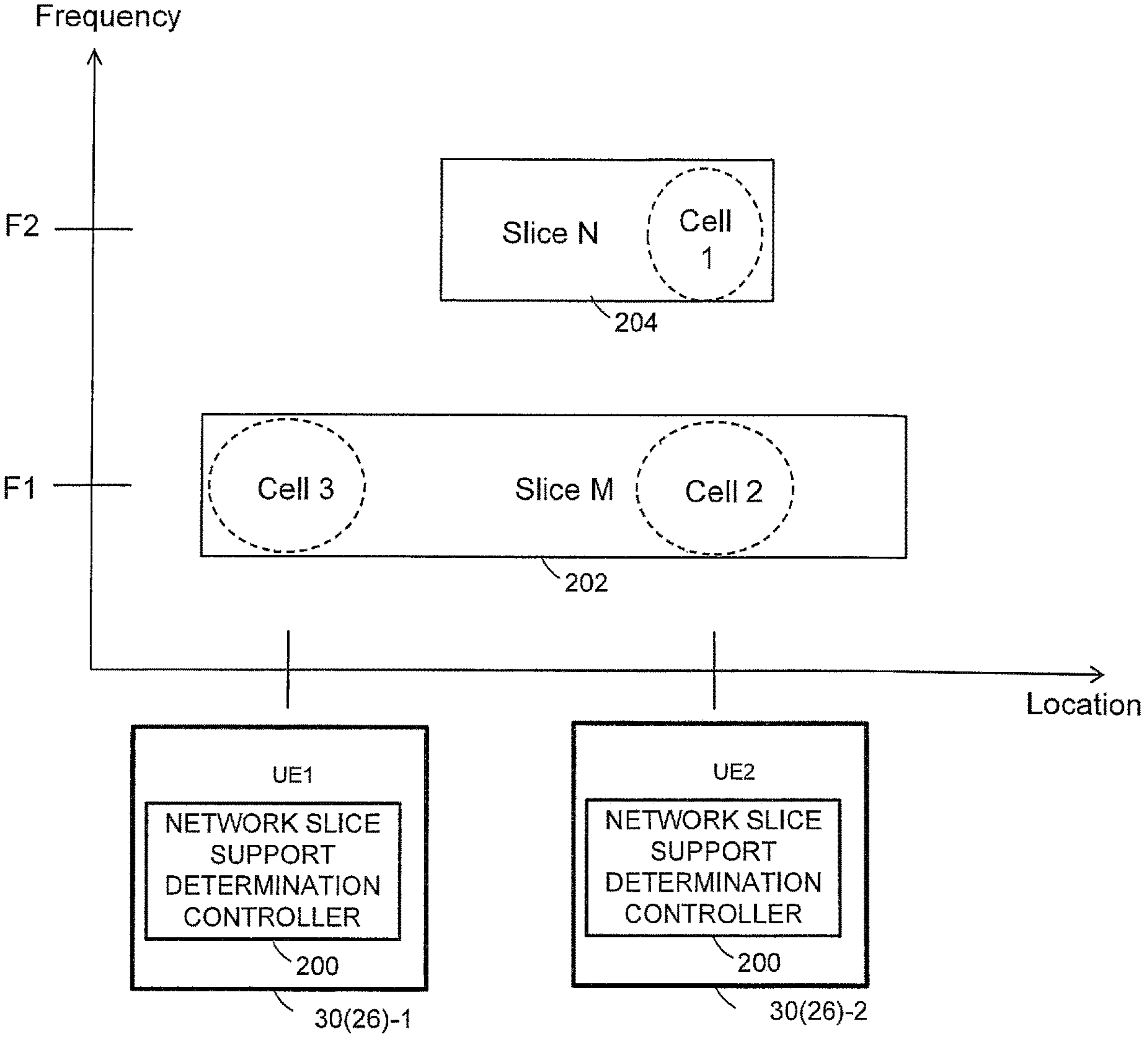
FIG. 27 is a diagrammatic view of an example deployment scenario of network slices, radio frequency bands, and wireless terminal locations.

FIG. 27 shows an example deployment scenario of network slices. In the FIG. 27 scenario, a network slice, "Slice M", is deployed in the area 202 indicated by its associated rectangle, on a radio band with a representing frequency F1. Likewise, another network slice, "Slice N", is deployed in the area 204 indicated by its associated rectangle, on another radio band with a representing frequency F2. Two wireless terminals, e.g. UEs, UE1 and UE2, illustrated as wireless terminal 30(26)-1 and wireless terminal 30(26)-2, respectively, are located as shown in FIG. 27, wherein only Slice M is available for the location of UE1 while both Slice M and Slice N are available for the location of UE2.

In the scenario of FIG. 27 each of the wireless terminals wireless terminal 30(26)-1 and wireless terminal 30(26)-2 subscribes to Slice N, but neither wireless terminal 30(26)-1 nor wireless terminal 30(26)-2 subscribes to Slice M. In a case that wireless terminal 30(26)-2 selects a cell in F2, e.g., Cell 1 in FIG. 27, wireless terminal 30(26)-2 may recognize that the selected band F2 indeed supports the desired (subscribed) Slice N and thus wireless terminal 30(26)-2 may stay on a cell on F2 as a suitable cell and may be allowed to initiate a PDU session establishment for Slice N. On the other hand, in a case that wireless terminal 30(26)-2 selects a cell on F1, Cell 2 in FIG. 11, wireless terminal 30(26)-2 may recognize that the desired (subscribed) Slice N is available at the location of UE2 on a band F2. The wireless terminal 30(26)-2 may then perform a cell reselection procedure to reselect a cell, e.g. Cell 1 in FIG. 27, on F2 where Slice N is supported.

At the location of wireless terminal 30(26)-1, however, only Slice M is available on F1 and wireless terminal 30(26)-1 is out of coverage for Slice N on F2. The wireless terminal 30(26)-1 may discover that there is no available network slice other than Slice M on F1 and thus wireless terminal 30(26)-1 may then perform a PLMN selection procedure.

The example embodiment and mode of FIG. 26 is an example implementation of the generic example embodiment and mode of FIG. 4 and FIG. 5, and as such explanations of FIG. 4 and FIG. 5 are applicable to communications system 20(26) of FIG. 26 as well.

For example, the communications system 20(26) of FIG. 26 comprises one or more radio access networks (RANs) 22 and one or more core networks (CNs) 24, with one management entities 26(26) being shown in the core network (CN) 24 by way of example and one access node 28(26) being shown by way of example in radio access network (RAN) 22. Although not illustrated as such, the communications system 20(26) of FIG. 26 may be and usually is utilized by plural PLMNs. In FIG. 26, wireless terminal 30 communicates with a management entity 26(26) of a core network through an access node 28(26) of a radio access network (RAN). The core network supports one or more network slices, each of the network slices providing a designated service within a public land mobile network (PLMN).

Since the communications system 20(4) is generic to various other example embodiments and modes described herein, it is again mentioned that the wireless terminal may take various forms as mentioned above, and likewise that the access node may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. Moreover, communications system 20(26) may be realized in virtualized and/or distributed and/or logical form.

Structures and functionalities of the communications system 20(26) of FIG. 26 which are common or essentially the same as one of more of the preceding example embodiments have the same reference numerals. For example, much of the structure of wireless terminal 30(26) of FIG. 26 and much of the structure of access node 28(26) of FIG. 26 are similar to preceding example embodiments. However, in in the example embodiment of FIG. 26, the wireless terminal 30(26) comprises network slice support determination controller 200.

The management entity 26(26) of communications system 20(26) may comprise core network entity processor circuitry 80 and interface 82 toward the radio access network (RAN) 22. The core network entity processor circuitry 80 may be realized or comprise one or more processors and at least one memory. The memory includes computer program code, wherein the memory and the computer program code are configured to, working with the at least one processor, cause the decoding device to perform at least at least the operations described herein. FIG. 26 further shows management entity 26(26) as comprising the non-access stratum (NAS) unit 120, which may include message generator 122(26). The AS message generator 122(26) controls generation, formatting, and/or inclusion of the network slice coverage area configuration in a message, such as a non-access stratum message. The non-access stratum (NAS) unit 120 preferably comprises or is included in core network entity processor circuitry 80 of management entity 26(26). The arrow 171 of FIG. 26 shows that management entity 26(26) provides the non-access stratum message to radio access network (RAN) 22, e.g., to access node 28(26).

The access node 28(26) of the example embodiment and mode of FIG. 26 comprises node processor circuitry 70, node transceiver circuitry 72, and interface 74 to core network (CN) 24. The node transceiver circuitry 72 may comprise node transmitter circuitry 76 and node receiver circuitry 78. The transceiver circuitry 72 includes antenna(e) for the wireless transmission. Transmitter circuitry 76 may include, e.g., amplifier(s), modulation circuitry and other conventional transmission equipment. Receiver circuitry 78 may comprise, e.g., amplifiers, demodulation circuitry, and other conventional receiver equipment. As indicated above, various aspects of access node 28(26) including the node transceiver circuitry 72 may be realized by a distributed unit (DU) and a central unit (CU).

The node processor circuitry 70 of the access node 28(26) of FIG. 26 is shown as comprising, among other units and functionalities, frame/message handler/generator 94 and message generator 152. In the example embodiment and mode of FIG. 26, in one example implementation the access node 28(26) receives the network slice band association information from the management entity 26(26). The network slice band association information is included in a message generated by message generator 152 which transmitted by access node 28(26) to wireless terminal 30(26).

The wireless terminal 30(26) of communications system 20(26) of FIG. 26 comprises terminal transceiver circuitry 52 and processor circuitry, e.g., terminal processor circuitry 50. The transceiver circuitry 52 in turn may comprise terminal transmitter circuitry 54 and terminal receiver circuitry 56. The transceiver circuitry 52 includes antenna(e) for the wireless transmission. Transmitter circuitry 54 may include, e.g., amplifier(s), modulation circuitry and other conventional transmission equipment. Receiver circuitry 56 may comprise, e.g., amplifiers, demodulation circuitry, and other conventional receiver equipment. FIG. 26 further shows that wireless terminal 30(26) may also comprise terminal interfaces 58. Such user interfaces may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The receiver circuitry 56 of wireless terminal 30(26) is configured to receive, from a cell served by the access node 28(26), a message comprising the network slice band association information.

The terminal processor circuitry 50 of FIG. 26 is shown as including terminal resource selector 40. In addition to memory or registers 42(26) for storing network slice band association information (NSBAI), the terminal resource selector 40 comprises PLMN selector 60; network slice selector 62(26), network slice support determination controller 200, and protocol data unit (PDU) session establishment request procedure unit 180, also known as PDU session request procedure unit 180.

As understood from the foregoing and further described herein, the management entity 26(26) thus belongs to core network (CN) 24 and communicates with a wireless terminal, e.g., wireless terminal 30(26), via a cell of a radio access network (RAN). The core network supports one or more network slices, each of the network slices providing a designated service within a public land mobile network (PLMN). In an example basic embodiment and mode, the management entity comprises receiver circuitry, processor circuitry, and transmitter circuitry. The receiver circuitry is configured to receive, from the wireless terminal, via a first cell operated on a first radio band, a non-access stratum (NAS) request message. The processor circuitry is configured to generate a NAS response message comprising network slice band association information. The network slice band association information further comprises one or more network slice identifiers, each of the one or more network slice identifiers identifying a network slice. Each of the one or more network slice identifiers is associated with a radio band(s), the radio band(s) indicating a frequency domain interval(s) on which a network slice identified by the each of the one or more network slice identifiers is supported. The transmitter circuitry is configured to transmit, to the wireless terminal, the NAS response message. The NAS response message is configured to be used by the wireless terminal to make a determination of whether at least one network slice selected by the wireless terminal is: (1) supported on the first radio band; (2) supported on a second radio band but not supported on the first radio band, the second radio band being different from the first radio band, or; (3) not supported on any radio band(s). The NAS response message is further configured to be used by the wireless terminal to initiate a cell reselection procedure to select a second cell on the second radio band, in a case that the at least one network slice is supported on the second radio band but not supported on the first radio band, and; to initiate a PLMN selection procedure to select a PLMN different from a currently serving PLMN, in a case that at least one network slice is not supported in any radio band(s).

As understood from the foregoing and further described herein, in a basic example embodiment and mode the access node 28(26) thus comprises processor circuitry and transmitter circuitry. The processor circuitry is configured to generate a message comprising network slice band association information. The network slice band association information further comprises one or more network slice identifiers. Each of the one or more network slice identifies a network slice, each of the one or more network slice identifiers being associated with a radio band(s). The radio band(s) indicate a frequency domain interval(s) on which a network slice identified by the each of the one or more network slice identifiers is supported. The transmitter circuitry is configured to transmit, to a wireless terminal, the message in a first cell, the first cell being operated on a first radio band. The message is configured to be used by the wireless terminal to make a determination of whether at least one network slice selected by the wireless terminal is: (1) supported on the first radio band; (2) supported on a second radio band but not supported on the first radio band, the second radio band being different from the first radio band, or; (3) not supported on any radio band(s). The message is further configured to be used by the wireless terminal to initiate a cell reselection procedure to select a second cell on the second radio band, in a case that the at least one network slice is supported on the second radio band but not supported on the first radio band, and; to initiate a PLMN selection procedure to select a PLMN different from a currently serving PLMN, in a case that at least one network slice is not supported in any radio band(s).

As understood from the foregoing and further described herein, the wireless terminal 30(26) communicates with a management entity of a core network through an access node of a radio access network (RAN). As mentioned, the core network supports one or more network slices, each of the network slices providing a designated service within a public land mobile network (PLMN). In a basic example embodiment and mode the wireless terminal 30(26) comprises receiver circuitry and processor circuitry. The receiver circuitry is configured to receive, from a first cell of the RAN, a message comprising network slice band association information. The network slice band association information further comprises one or more network slice identifiers, each of the one or more network slice identifiers identifying a network slice. Each of the one or more network slice identifiers is associated with a radio band(s), the radio band(s) indicating a frequency domain interval(s) on which a network slice identified by the each of the one or more network slice identifiers is supported. The first cell is operated on a first radio band. The processor circuitry is configured to select at least one network slice of a serving PLMN and, based on the message, make a determination of whether the at least one network slice is: (1) supported on the first radio band; (2) supported on a second radio band but not supported on the first radio band, the second radio band being different from the first radio band, or; (3) not supported on any radio band(s). The processor circuitry is further configured to initiate a cell reselection procedure to select a second cell on the second radio band, in a case that the at least one network slice is supported on the second radio band but not supported on the first radio band, and; to initiate a PLMN selection procedure to select a PLMN different from the serving PLMN, in a case that at least one network slice is not supported in any radio band(s).

Various methods can be used to provide the configuration of the coverage area attribute, such as NAS signaling, system information broadcast, and dedicated RRC signaling.

6.1 Determining Network Slice Support/Non-Support Using NAS Signaling

In the scenarios of the example implementation shown in FIG. 21A, FIG. 21B or FIG. 24A, wherein the wireless terminal sends a non-access stratum, NAS, request message, e.g., Registration Request message, to a management entity, e.g., AMF management entity 26, via a currently serving cell, the NAS request message may comprise a Requested NSSAI with S-NSSAI(s) of desired network slices. In response, the management entity 26 may send to the wireless terminal a NAS response message, e.g., Registration Accept message or Registration Reject message. Upon receipt of the NAS response message the wireless terminal may make a determination of one of the aforementioned conditions (a), (b) and (c) for each of the desired S-NSSAIs, for each of the S-NSSAIs in the Requested NSSAI. For example, Table 14 shows example criteria for a determination of each of the conditions.

TABLE 14

| Criteria | Condition to be determined |
|---|---|
| The NAS response message is a Registration Accept message; The Allowed NSSAI in the Registration Accept message includes the desired S-NSSAI, AND; The network slice band association information indicates an association of the desired S-NSSAI and the band of the currently serving cell. The NAS response message is a Registration Accept message; The Allowed NSSAI in the Registration Accept message includes the desired S-NSSAI, AND; No band association for the desired S-NSSAI is indicated in the Registration Accept message. | (a) |
| The NAS response message is a Registration Accept message; The Allowed NSSAI in the Registration Accept message includes the desired S-NSSAI, AND; The network slice band association information does not indicate an association of the desired S-NSSAI and the band of the currently serving cell but indicates an association of the desired S-NSSAI and a band (s) different from the currently serving cell. The NAS response message is a Registration Reject message; The Rejected NSSAI in the Registration Reject message includes the desired S-NSSAI, AND; The network slice band association information indicates an association of the desired S-NSSAI and a band (s) different from the currently serving cell. | (b) |
| The NAS response message is a Registration Reject message; The Rejected NSSAI in the Registration Reject message includes the desired S-NSSAI, AND; No band association for the desired S-NSSAI is indicated in the Registration Reject message. | (c) |

Based on the criteria and the actions listed in Table 14, the following cases describes scenarios and acts for wireless terminal 30(26)-1, UE1, and wireless terminal 30(26)-2, UE2, illustrated in FIG. 27.

6.1.1 Determining Network Slice Support/Non-Support Using Nas Signaling: Case 1: UE2 on Cell 1

Figure 28:
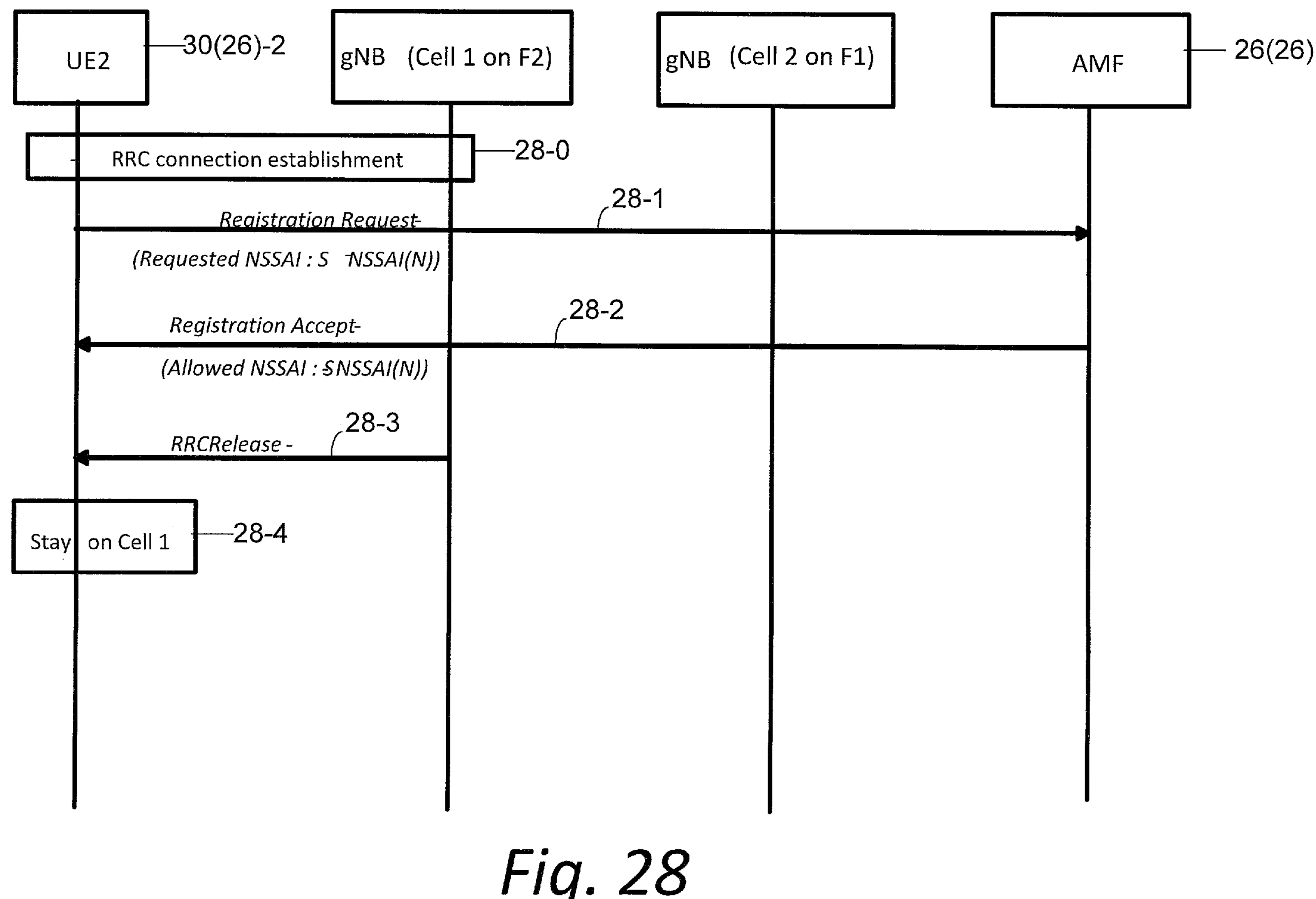
FIG. 28 is a diagrammatic view of an example message sequence in a case of FIG. 27 that a UE2 performs the registration procedure while camping on a Cell 1.

FIG. 28 shows an example message sequence in a case that UE2 performs the registration procedure while camping on Cell 1 of FIG. 27. Act 28-0 comprises wireless terminal 30(26)-2 establishing an RRC connection with Cell 1 using the procedure shown in FIG. 3. Act 28-1 comprises wireless terminal 30(26)-2 sending a Registration Request message to the AMF 26(26) via Cell 1, the Registration Request message comprising a Requested NSSAI including S-NSSAI(N). Act 28-2 comprises the AMF 26(26) responding with a Registration Accept message comprising an Allowed NSSAI including S-NSSAI(N). In one implementation, the Registration Accept message may comprise the network slice band association information indicating F2 being associated with S-NSSAI(N). In another implementation, the Registration Accept message may not include a band association with S-NSSAI(N), indicating that the allowed network slice(s) is available on the currently camped radio band by default. In either implementation, after receiving an RRCRelease message shown in Act 28-2, wireless terminal 30(26)-2 UE2 may recognize that the condition (a) is met and thus stay on Cell 1 as shown in Act 28-4.

6.1.2 Determining Network Slice Support/Non-Support Using Nas Signaling: Case 2: UE2 on Cell 2

If wireless terminal 30(26)-2 performs the registration procedure while camping on Cell 2 of FIG. 27, the NAS response message may comprise the network slice band association information, where S-NSSAI(N) is associated with a band F2.

Figure 29A:
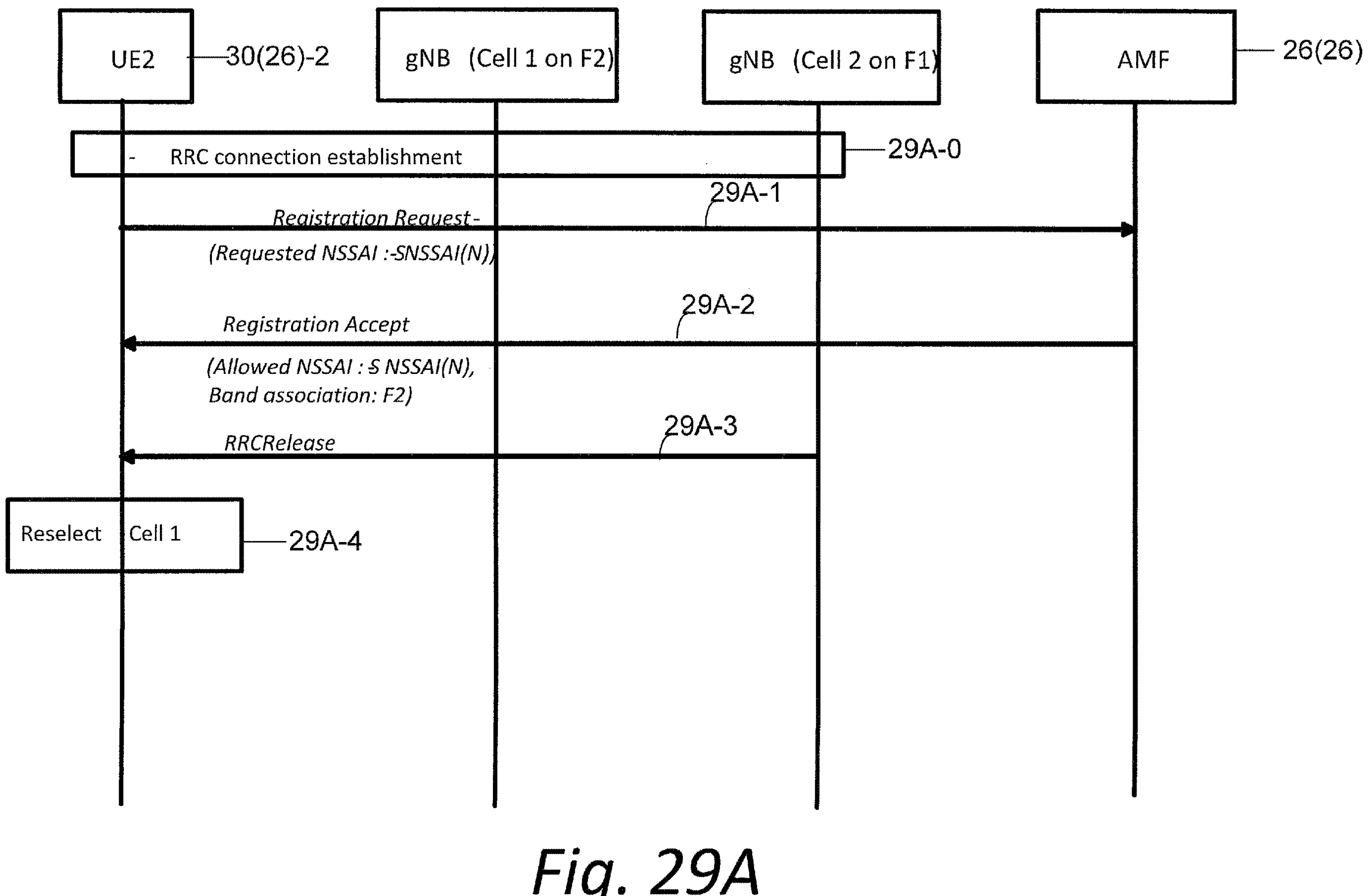
FIG. 29A is a diagrammatic view an example message sequence for an example configuration in which an NAS response message may be an Registration Accept message with the S-NSSAI(N) included in the Allowed NSSAI.

FIG. 29A shows an example message sequence for an example configuration in which an NAS response message may be a Registration Accept message with the S-NSSAI(N) included in the Allowed NSSAI. Act 29A-0 comprises wireless terminal 30(26)-2 establishing an RRC connection with Cell 2 using the procedure shown in FIG. 3. Act 29A-1 comprises wireless terminal 30(26)-2 sending a Registration Request message to the AMF 26(26) via Cell 2, the Registration Request message comprising a Requested NSSAI including S-NSSAI(N). Act 29A-2 comprises the AMF 26(26) responding with a Registration Accept message comprising an Allowed NSSAI including S-NSSAI(N) and the network slice band association information indicating F2 being associated with S-NSSAI(N). This may mean that the AMF 26(26) accepts use of S-NSSAI(N) on F2, and therefore S-NSSAI(N) is included in the Allowed NSSAI. Upon receiving the Registration Accept message, wireless terminal 30(26)-2 may recognize that the criteria for (b) is met. After receiving an RRCRelease message as shown in Act 29A-3, wireless terminal 30(26)-2 may initiate a cell reselection as shown in Act 29A-4, and eventually reselect Cell 1 that supports S-NSSAI(N).

Figure 29B:
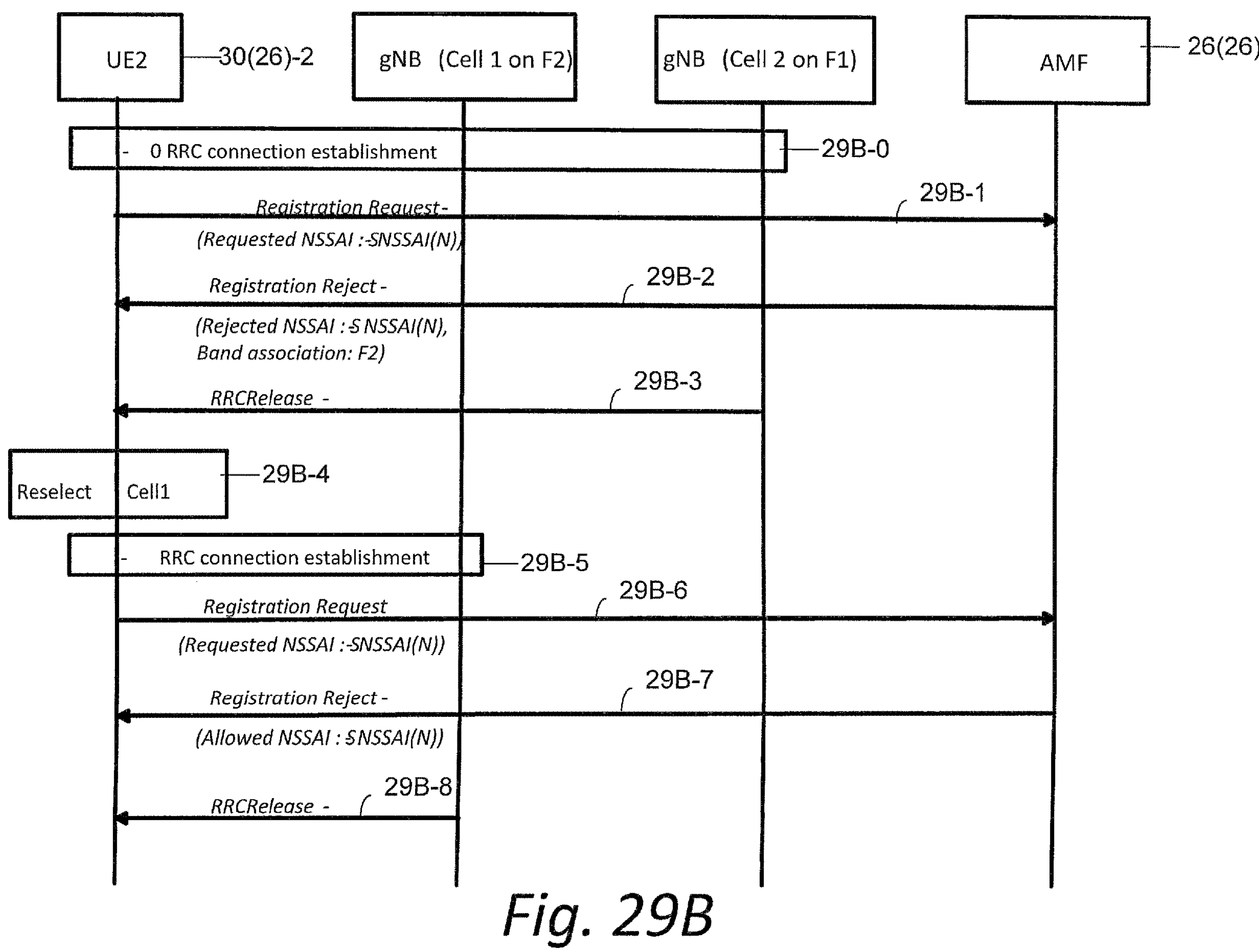
FIG. 29B is a diagrammatic view an example message sequence for an example configuration in which a NAS response message may be a Registration Reject message with the S-NSSAI(N) included in the Rejected NSSAI.

In another configuration, the NAS response message may be a Registration Reject message with the S-NSSAI(N) included in the Rejected NSSAI. FIG. 29B shows an example message sequence for this configuration. Act 29B-0 and Act 29B-1 are identical to Act 29A-0 and Act 29A-1, respectively. Act 29B-2 comprises the AMF 26(26) responding with a Registration Reject message comprising a Rejected NSSAI including S-NSSAI(N) and the network slice band association information indicating S-NSSAI(N) being associated with F2. This may mean that the AMF rejects the registration but suggests the wireless terminal to move on F2 for use of S-NSSAI(N), and therefore S-NSSAI (N) is included in the Rejected NSSAI. Upon receiving the Registration Reject message, wireless terminal 30(26)-2 may recognize that the criteria for (b) is met. After receiving an RRCRelease message from Cell 2, as shown in Act 29B-3, wireless terminal 30(26)-2 may initiate a cell reselection as shown in Act 29B-4, and eventually reselect Cell 1 that supports S-NSSAI(N). Wireless terminal 30(26)-2 may then further attempt to initiate the registration procedure again while camping on Cell 1, as shown in the acts from Act 29B-5 to Act 29B-8.

6.1.3 Determining Network Slice Support/Non-Support Using Nas Signaling: Case 3: UE1 on Cell 3

Figure 30:
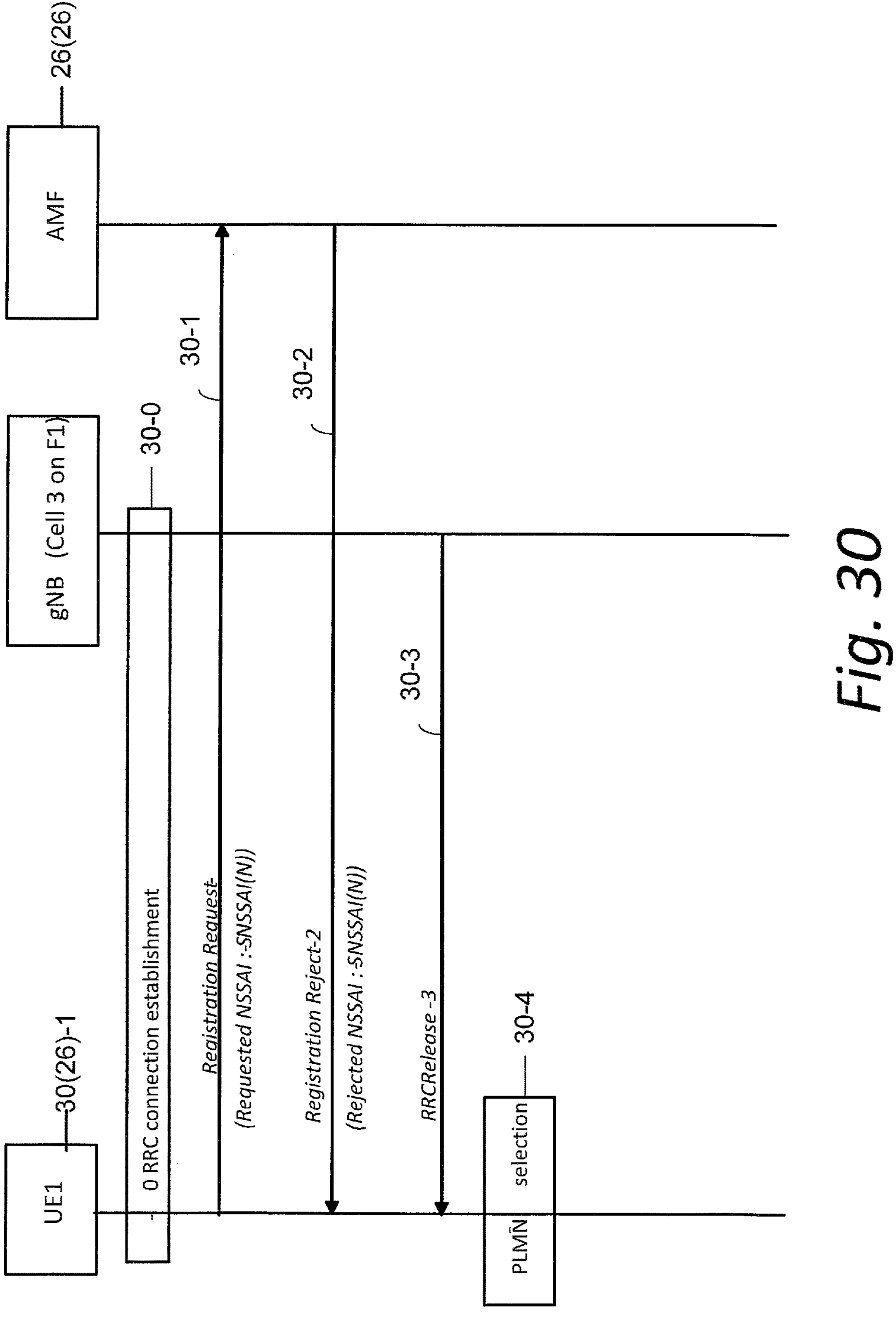
FIG. 30 is a diagrammatic view of an example message sequence in a case that a UE1 of FIG. 27 performs a registration procedure while camping on a Cell 3 of FIG. 27.

FIG. 30 shows an example message sequence in a case that wireless terminal 30(26)-1 performs the registration procedure while camping on Cell 3 of FIG. 27. Act 30-0 comprises wireless terminal 30(26)-1 establishing an RRC connection with Cell 3 using the procedure shown in FIG. 3. Act 30-1 comprises wireless terminal 30(26)-1 sending a Registration Request message to the AMF 26(26) via Cell 3, the Registration Request message comprising a Requested NSSAI including S-NSSAI(N). Act 29-2 comprises the AMF 26(26) responding with a Registration Reject message comprising a Rejected NSSAI including S-NSSAI(N). In the scenario of FIG. 30, the network slice band association information may not be present in the Registration Reject message, since there is no radio band to suggest/propose for Slice N, which leads wireless terminal 30(26)-1 to determine (c). After receiving an RRCRelease message from Cell 3, as shown in Act 30-3, wireless terminal 30(26)-1 may initiate the PLMN selection procedure as shown in Act 30-4.

6.2 Determining Network Slice Support/Non-Support Using System Information

In the scenario of the example implementation shown in Table 9A or Table 9B, wherein the network slice band association information is provided by system information, a wireless terminal of an example embodiment and mode of FIG. 26 and FIG. 27 may make a determination of one of the aforementioned conditions (a), (b) and (c) based on the network slice band association information in the system information.

Specifically, upon receiving the system information comprising the network slice band association information, the wireless terminal may select the entry (NetworkSliceBandAssociationInfoList and/or NetworkSliceForbiddenInfo) corresponding to the PLMN selected during the PLMN selection procedure. Using the selected entry, the wireless terminal may make a determination of one of the conditions (a), (b) and (c) for each of desired network slices, based on the criteria shown in Table 15.

TABLE 15

| Criteria | Condition to be determined |
|---|---|
| The NetworkSliceBandAssociationInfoList includes:<br>The desired S-NSSAI, AND;<br>An association of the desired S-NSSAI and the band of the currently serving cell; | (a) |
| The NetworkSliceBandAssociationInfoList includes:<br>The desired S-NSSAI;<br>No association of the desired S-NSSAI and the band of the currently serving cell,<br>AND;<br>An association of the desired S-NSSAI and a band (s) different from the band of the currently serving cell. | (b) |
| The NetworkSliceBandAssociationInfoList does not include the desired S-NSSAI.<br>The desired S-NSSAI is listed in the NetworkSliceForbiddenInfo | (c) |
| No NetworkSliceBandAssociationInfoList present for the selected PLMN.<br>No network slice band association information present in system information. | Use another implementation (e.g., NAS signaling or RRC dedicated signaling) |

Figure 31A:
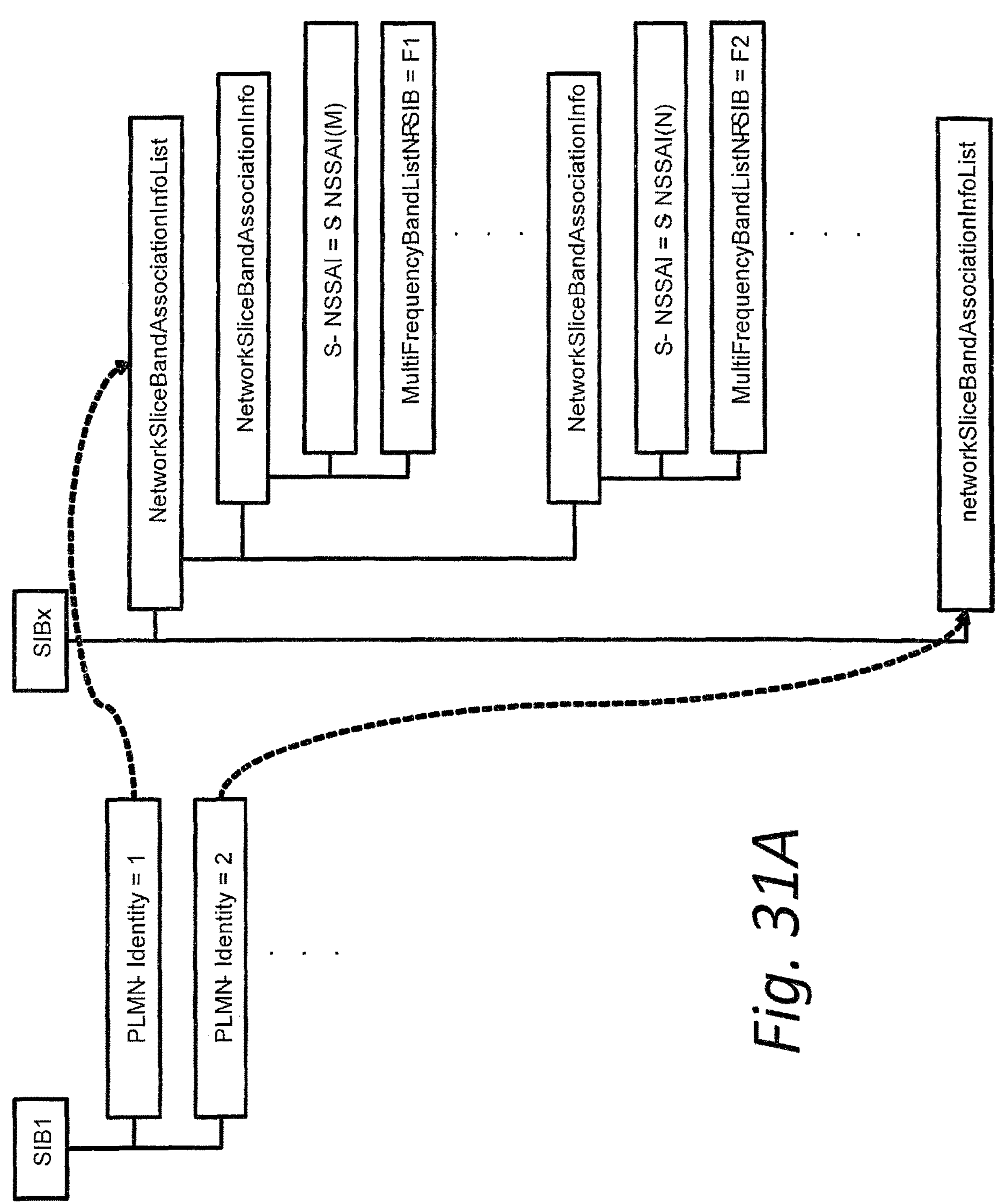
FIG. 31A is diagrammatic view of differing implementations of example system information contents in scenarios in which a wireless terminal is provided with network slice support determination capability by system information.

For example, FIG. 31A shows an example system information contents that wireless terminal 30(26)-2 of FIG. 27 may receive, e.g., from Cell 1 or Cell 2 of FIG. 27, based on the format shown in Table 9B. It is assumed that wireless terminal 30(26)-2 may have already selected the PLMN with PLMN-Identity=1 as a serving PLMN (PLMN1 hereafter). The system information (SIB1 and SIBx) indicates that for PLMN1 two network slice are available: Slice M on the band represented by F1, and Slice N on the band represented by F2. If wireless terminal 30(26)-2 receives the system information from Cell 1, wireless terminal 30(26)-2 may be allowed to use the services of Slice N, e.g., condition (a), on the radio band of Cell 1. If wireless terminal 30(26)-2 receives the system information from Cell 2, wireless terminal 30(26)-2 may choose F2 to search for a new cell, e.g., condition (b).

Figure 31B:
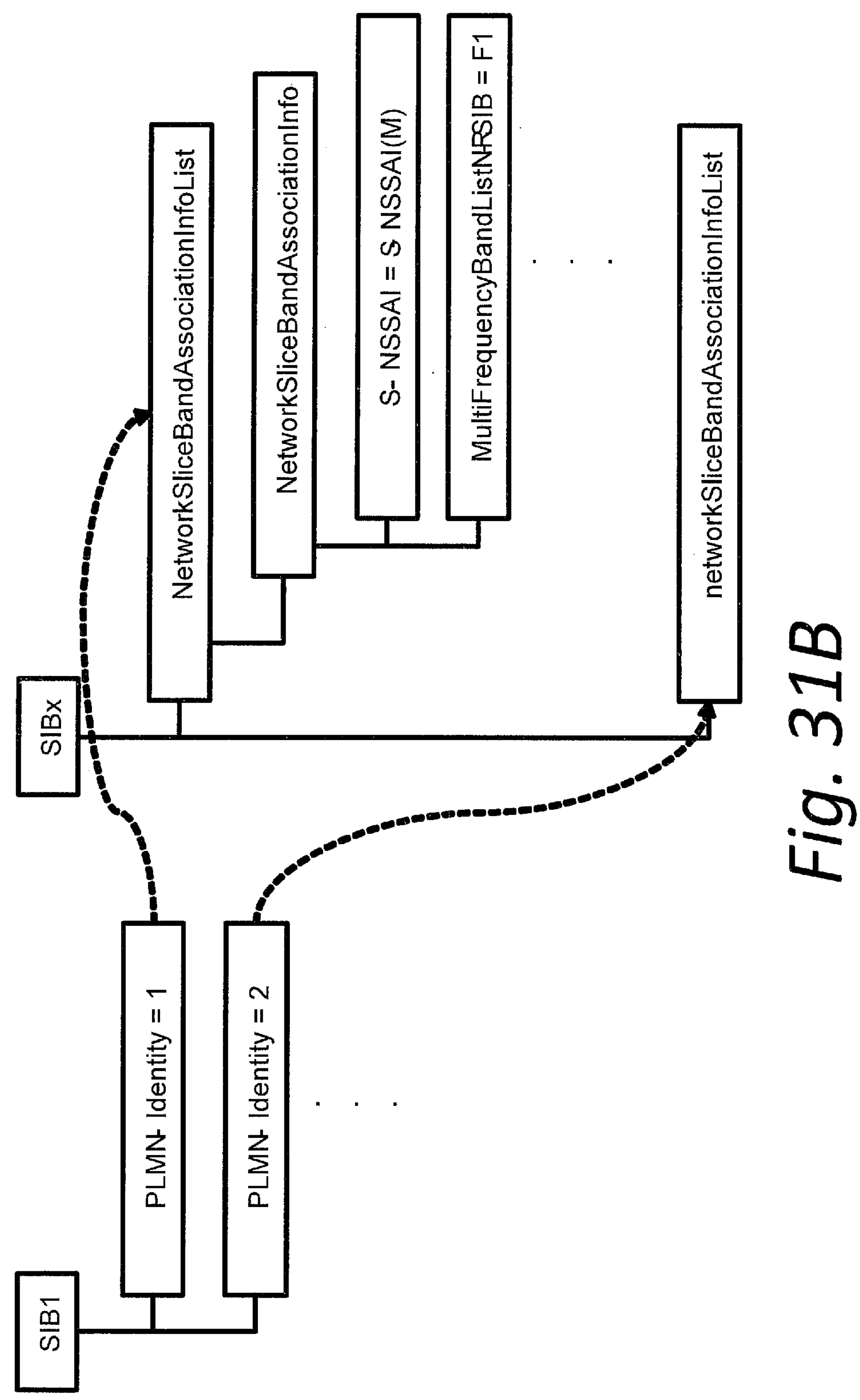
FIG. 31B is diagrammatic view of differing implementations of example system information contents in scenarios in which a wireless terminal is provided with network slice support determination capability by system information.

FIG. 31B shows an example system information contents that wireless terminal 30(26)-1 of FIG. 27 may receive, e.g., from Cell 3 of FIG. 27, based on the format shown in Table 9B. Similarly, it is assumed that wireless terminal 30(26)-1 may have already selected PLMN1 as a serving PLMN. Herein the system information, e.g., SIB1 and SIBx, indicates that for PLMN1 only one network slice, i.e., Slice M, is available. Due to its subscription, wireless terminal 30(26)-1 is allowed to use only Slice N, and thus at the given location wireless terminal 30(26)-1 cannot make use of Slice M, condition (c). As a wireless terminal of this embodiment, wireless terminal 30(26)-1 may initiate a PLMN selection to look for another PLMN, e.g., PLMN2.

6.3 Determining Network Slice Support/Non-Support Using Dedicated RRC Signaling

Various preceding embodiments also disclose the network slice band association information to be provided by a dedicated signaling, e.g., by an RRCRelease message, as an example implementation. Consistent with such an implementation, a wireless terminal 30(26) of example embodiment and mode of FIG. 26 may make a determination one of the aforementioned conditions (a), (b) and (c) based on the network slice band association information.

Table 16 shows an example format of the RRCRelease message, wherein the information element NetworkSliceBandAssociationInfoList comprises a list of S-NSSAIs and an associated band list, frequencyBandList, for each of the S-NSSAIs. It should be noted that the NetworkSliceBandAssociationInfoList is for the currently serving PLMN, since the during the RRC connection establishment procedure taking place before sending the RRCRelease message, the network already knows the PLMN that the wireless terminal has selected. In addition, the information element CellReselectionPriorities provides parameters for a non-network-slice-based cell selection.

TABLE 16

```
RRCRelease ::=                        SEQUENCE {
  rrc-TransactionIdentifier             RRC-TransactionIdentifier,
  criticalExtensions                      CHOICE {
    rrcRelease                              RRCRelease-IEs,
    criticalExtensionsFuture                SEQUENCE { }
  }
}
RRCRelease-IEs ::=                    SEQUENCE {
  redirected CarrierInfo                                  RedirectedCarrierInfo
OPTIONAL,                             -- Need N
  cellReselectionPriorities                         CellReselectionPriorities
OPTIONAL,                             -- Need R
  suspendConfig                                               SuspendConfig
OPTIONAL,                             -- Need R
  deprioritisationReq                SEQUENCE {
```

TABLE 16-continued

```
    deprioritisationType                ENUMERATED {frequency, nr},
    deprioritisationTimer               ENUMERATED {min5, min10, min15, min30}
  }
OPTIONAL,                   -- Need N
  lateNonCriticalExtension                    OCTET      STRING
OPTIONAL,
  nonCriticalExtension                        RRCRelease-v1540-IEs
OPTIONAL
}
CellReselectionPriorities ::=         SEQUENCE {
  freqPriorityListEUTRA                       FreqPriorityListEUTRA
OPTIONAL,                      -- Need M
  freqPriorityListNR                                  FreqPriorityListNR
OPTIONAL,                      -- Need M
  t320                                  ENUMERATED {min5, min10, min20, min30, min60,
min120, min180, spare1}        OPTIONAL,      -- Need R
  networkSliceBandAssociationInfoList NetworkSliceBandAssociationInfoList
  ...
}
...
NetworkSliceBandAssociationInfoList::=   SEQUENCE (SIZE (1.. maxNrofS-NSSAI) OF
NetworkSliceBandAssociationInfo
NetworkSliceBandAssociationInfo    SEQUENCE {
  s-NSSAI                             S-NSSAI        OPTIONAL,
  frequencyBandList MultiFrequencyBandListNR-SIB   OPTIONAL,
  areaScope                       ENUMERATED {PLMN, RegistrationArea, TACs, Cells}
OPTIONAL,
  TAC-List SEQUENCE (SIZE (1..maxNrofTAC)) OF TrackingAreaCode   OPTIONAL,
- Cond TACs
  cellList                              SEQUENCE (SIZE (1..maxNrofCell)) OF phyCellId
OPTIONAL - Cond Cells
  ...
}
```

Upon receiving the RRCRelease message, the wireless terminal 30(26) may make the determination based on the criteria shown in Table 17.

TABLE 17

| Criteria | Condition to be determined |
|---|---|
| The NetworkSliceBandAssociationInfoList includes:<br>The desired S-NSSAI, AND;<br>An association of the desired S-NSSAI and the band of the currently serving cell; | (a) |
| The NetworkSliceBandAssociationInfoList includes:<br>The desired S-NSSAI;<br>No association of the desired S-NSSAI and the band of the currently serving cell, AND;<br>An association of the desired S-NSSAI and a band (s) different from the band of the currently serving cell. | (b) |
| The NetworkSliceBandAssociationInfoList does not include the desired S-NSSAI.<br>The desired S-NSSAI is listed in the NetworkSlice ForbiddenInfo | (c) |
| No NetworkSliceBandAssociationInfoList present for the selected PLMN.<br>No network slice band association information present in the Release message. | Follow the instruction given by CellReselectionPriorities in the Release message. |

Figure 32:
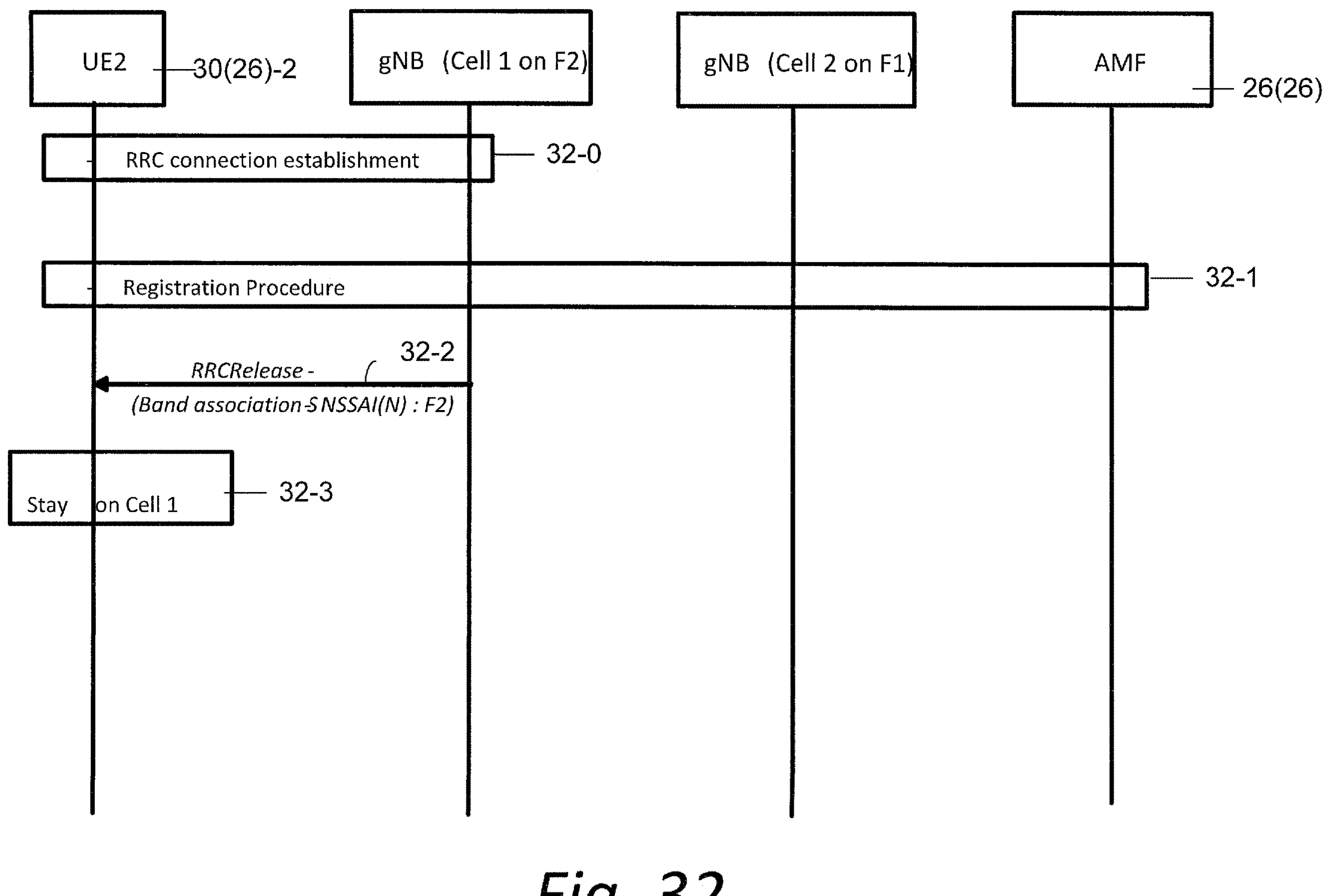
FIG. 32 is a diagrammatic view an example message sequence for a wireless terminal UE 2 of FIG. 27 which performs a registration procedure while camping on a Cell 1 of FIG. 27.

FIG. 32 is an example message sequence for wireless terminal 30(26)-2 of FIG. 27, wherein wireless terminal 30(26)-2 performs the registration procedure while camping on Cell 1. Act 32-0 comprises wireless terminal 30(26)-2 establishing an RRC connection with Cell 1 using the procedure shown in FIG. 3. Act 32-1 comprises wireless terminal 30(26)-2 performing the aforementioned registration procedure to register to the AMF 26(26). Act 32-2 shows that, after completing the registration procedure, wireless terminal 30(26)-2 receives an RRCRelease message. The RRCRelease message may comprise NetworkSliceBandAssociationInfoList, a network slice band association information instance for a selected PLMN, including the band F2 associated with S-NSSAI(N). Wireless terminal 30(26)-2 may recognize that the condition (a) is met and thus stay on the radio band of Cell 1 as shown in Act 32-3.

Figure 33:
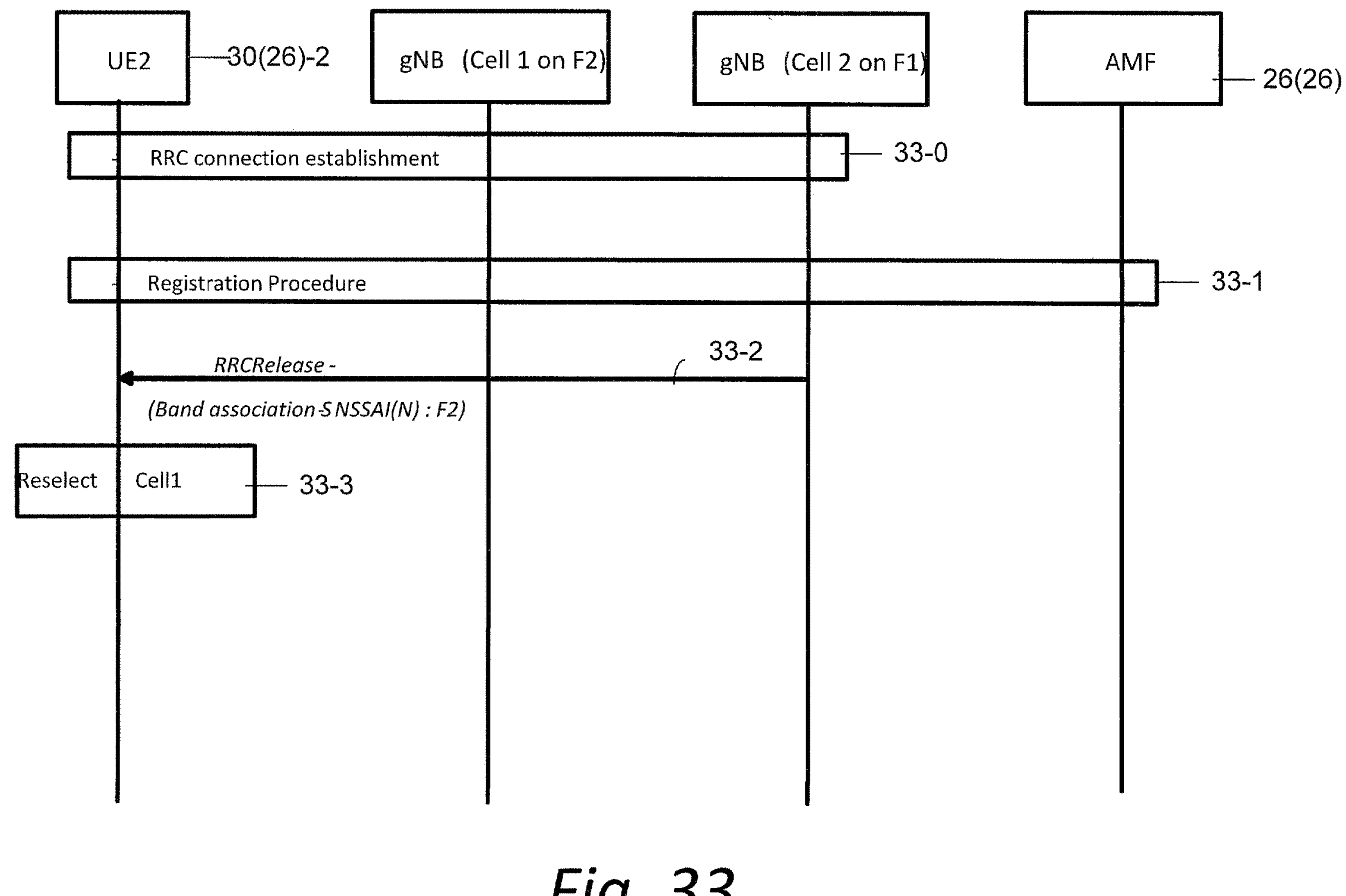
FIG. 33 is a diagrammatic view of an example message sequence for a wireless terminal UE2 of FIG. 27 which performs a registration procedure while camping on Cell 2 of FIG. 27.

FIG. 33 is an example message sequence for wireless terminal 30(26)-2 of FIG. 27, wherein wireless terminal 30(26)-2 performs the registration procedure while camping on Cell 2 of FIG. 27. Act 33-0 comprises wireless terminal 30(26)-2 establishing an RRC connection with Cell 2 using the procedure shown in FIG. 3. Act 33-1 comprises UE2 performing the aforementioned registration procedure to register to the AMF 26(26). Act 33-2 shows that, after completing the registration procedure, wireless terminal 30(26)-2 receives an RRCRelease message. The RRCRelease message may comprise NetworkSliceBandAssociationInfoList, a network slice band association information instance for a selected PLMN, including the band F2 associated with S-NSSAI(N). The wireless terminal 30(26)-2 may recognize that the condition (b) is met and thus initiate a cell reselection to reselect Cell 1 on F2 as shown in Act 33-3.

Figure 34:
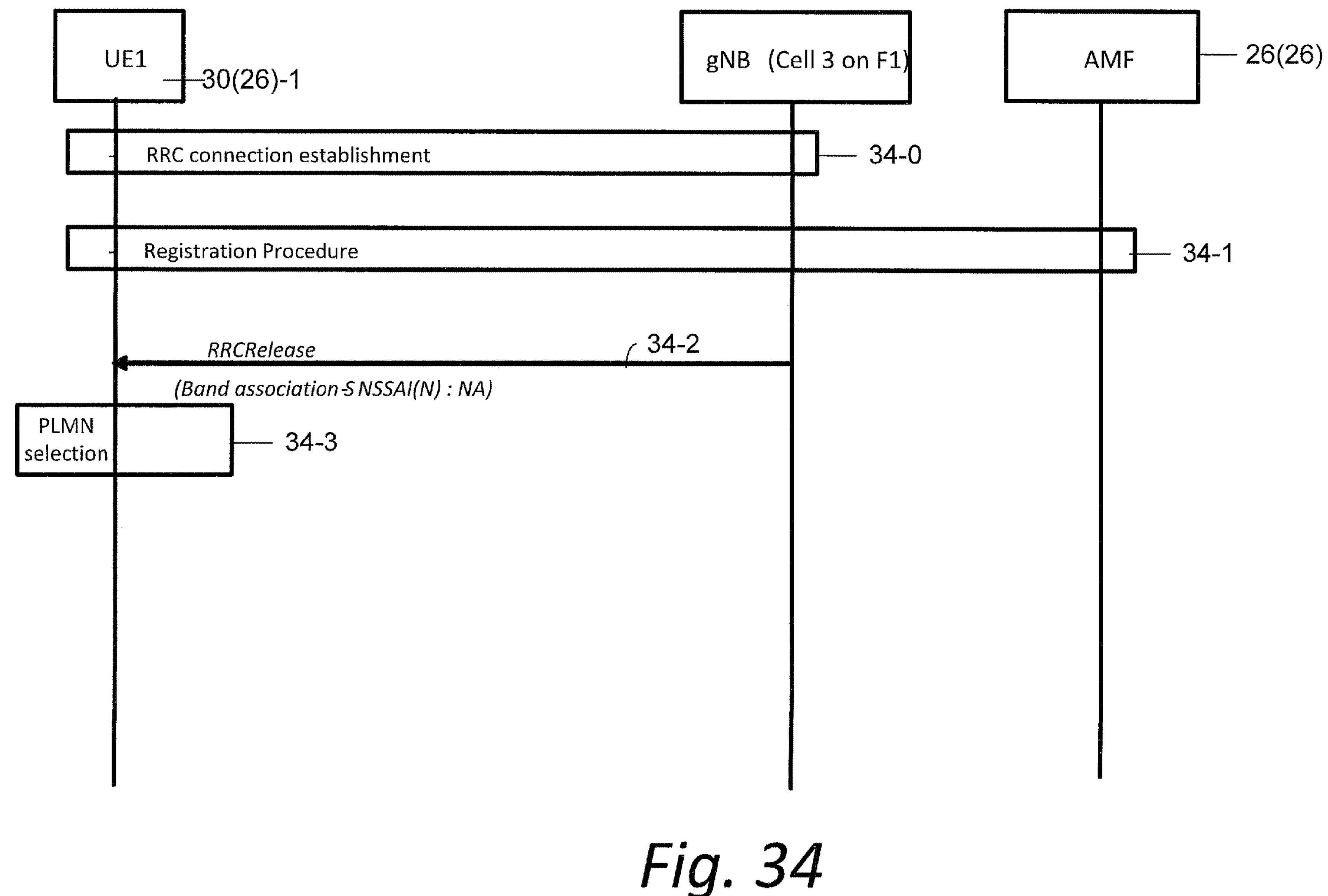
FIG. 34 is a diagrammatic view of an example message sequence for a wireless terminal UE1 of FIG. 27 which performs a registration procedure while camping on Cell 3 of FIG. 27.

FIG. 34 is an example message sequence for wireless terminal 30(26)-1 of FIG. 27, wherein wireless terminal 30(26)-1 performs the registration procedure while camping on Cell 3 of FIG. 27. Act 34-0 comprises wireless terminal 30(26)-1 establishing an RRC connection with Cell 3 using the procedure shown in FIG. 3. Act 34-1 comprises wireless terminal 30(26)-1 performing the aforementioned registration procedure to register to the AMF 26(26). Act 34-2 shows that, after completing the registration procedure, wireless terminal 30(26)-1 receives an RRCRelease message. In this case, the NetworkSliceBandAssociationInfo-List comprised in the RRCRelease message may not include S-NSSAI(N). The wireless terminal 30(26)-1 may recognize that the condition (c) is met and thus initiate a PLMN selection to look for another PLMN as shown in Act 34-3.

6.4 Operations of Nodes Support/not Supporting Network Slice in Currently Serving Radio Band FIG. 35A is a flow chart showing example representative steps or acts performed by a wireless terminal 30(26), e.g., a UE such as UE1 or UE2 of FIG. 27, of the example embodiment and mode of FIG. 26 and the wireless terminal 30(26) FIG. 27. Act 35A-1 comprises the wireless terminal 30(26) choosing at least one network slice for a serving PLMN that the wireless terminal desires to use. Act 35A-2 comprises receiving, from a first cell operated on a first radio band, a message comprising network slice band association information. As explained above by respective sections 6.1, 6.2, and 6.3, the message may be at least one of a NAS message, e.g., a Registration Accept message or a Registration Reject message; a system information message, e.g., SIB1/SIBx; or a dedicated RRC message, e.g., RRCRelease message. The network slice band association information may further comprise one or more network slice identifiers, each of the one or more network slice identifiers identifying a network slice, each of the one or more network slice identifiers being associated with a radio band(s), the radio band(s) indicating a frequency domain interval(s) on which a network slice identified by the each of the one or more network slice identifiers is supported. Act 35A-3 comprises the wireless terminal 30(26) determining, based on the message, whether or not the at least one network slice is supported in the first radio band. Act 35A-3 may be performed using the network slice support determination controller 200 of the wireless terminal 30(26). If the determination is affirmative, the wireless terminal 30(26) may stay on the first radio band as shown in Act 35A-4 and may further be allowed to initiate a PDU session establishment procedure to establish, with a core network, a PDU session for the at least one network slice. If the determination of act 35A-3 is negative, as shown in Act 35A-5, the wireless terminal 30(26) may make another determination of whether or not the at least one network slice is supported in a second radio band, the second radio band being different from the first radio band. If this determination of act 35A-5 is affirmative, the wireless terminal 30(26) may initiate a cell reselection procedure to select a second cell on the second radio band, as shown in act 35A-6. Otherwise, the wireless terminal 30(26) may initiate a PLMN selection procedure to select a PLMN different from the serving PLMN, as shown in act 35A-7.

Figure 35B:
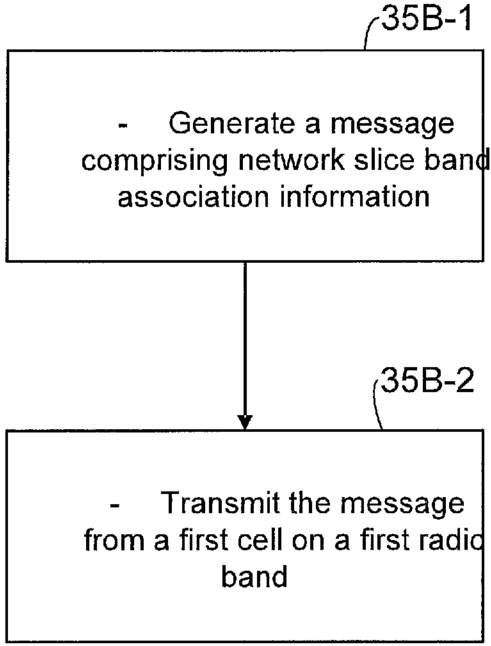
FIG. 35B is a flow chart showing example representative steps or acts performed by an access node of the example embodiment and mode of FIG. 26.

FIG. 35B is a flow chart showing example representative steps or acts performed by an access node 28(26), e.g., a gNB, of the example embodiment and mode of FIG. 26 and FIG. 27. Act 35B-1 comprises generating a message comprising network slice band association information. As explained with reference to sections 6.2 and 6.3, respectively, the message may be at least one system information message, e.g., a SIB1/SIBx; or a dedicated RRC message e.g., a RRCRelease message. The network slice band association information may further comprise one or more network slice identifiers, each of the one or more network slice identifiers identifying a network slice, each of the one or more network slice identifiers being associated with a radio band(s), the radio band(s) indicating a frequency domain interval(s) on which a network slice identified by the each of the one or more network slice identifiers is supported. Act 35B-2 comprises the access node 28(26) transmitting the message to the wireless terminal 30(26), from a first cell operated on a first radio band. The message may be used by the wireless terminal 30(26) to make a determination of whether at least one network slice selected by the wireless terminal is supported on the first radio band, supported on a second radio band (different from the first radio band) but not supported on the first radio band, or not supported on any radio band(s). The message may be further used by the wireless terminal 30(26) to initiate a cell reselection procedure to select a second cell operated on the second radio band, in a case that the at least one network slice is supported on the second radio band but not supported on the first radio band. In addition, the message may be further used by the wireless terminal 30(26) to initiate a PLMN selection procedure to select a PLMN different from a currently serving PLMN, in a case that at least one network slice is not supported in any radio band(s).

Figure 35C:
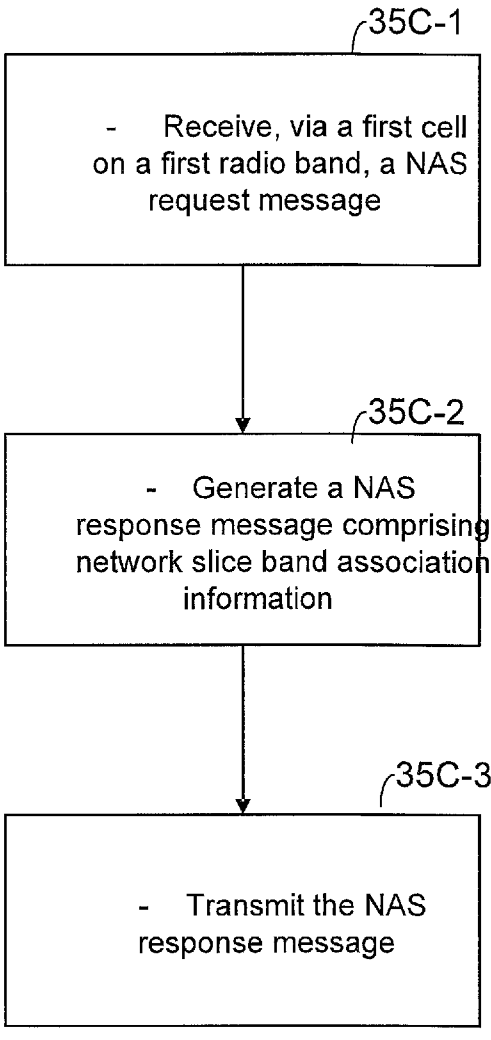
FIG. 35C is a flow chart showing example representative steps or acts performed by a management entity of the example embodiment and mode of FIG. 26.

FIG. 35C is a flow chart showing example representative steps or acts performed by a management entity of a core network, e.g., AMF 26(26) of the example embodiment and mode of FIG. 26 and FIG. 27. Act 35C-1 comprises the AMF 26(26) receiving, from a wireless terminal 30(26), via a first cell operated on a first radio band, a non-access stratum (NAS) request message, e.g., a Registration Request message. Act 35C-2 comprises the AMF 26(26) generating a NAS response message, e.g., a Registration Accept message or a Registration Reject message, comprising network slice band association information. The network slice band association information may further comprise one or more network slice identifiers, each of the one or more network slice identifiers identifying a network slice, each of the one or more network slice identifiers being associated with a radio band(s), the radio band(s) indicating a frequency domain interval(s) on which a network slice identified by the each of the one or more network slice identifiers is supported. Act 35C-3 comprises the AMF 26(26) transmitting the NAS response message to the wireless terminal 30(26), e.g., through an access node such as access node 28(26). The message may be used by the wireless terminal 30(26) to make a determination of whether at least one network slice selected by the wireless terminal is supported on the first radio band, supported on a second radio band (different from the first radio band) but not supported on the first radio band, or not supported on any radio band(s). The message may be further used by the wireless terminal 30(26) to initiate a cell reselection procedure to select a second cell operated on the second radio band, in a case that the at least one network slice is supported on the second radio band but not supported on the first radio band. In addition, the message may be further used by the wireless terminal 30(26) to initiate a PLMN selection procedure to select a PLMN different from a currently serving PLMN, in a case that at least one network slice is not supported in any radio band(s).

7.0 Network Slice Information in Multiple System Blocks

One or more of the preceding embodiments disclose NetworkSliceBandAssociationInfo. NetworkSliceBandAssociationInfo may comprise one or more fields or information elements of Single Network Slice Selection Assistance Information, S-NSSAIs, each of which may be associated with a supported frequency band(s) and/or an area scope indicating an area, Tracking Area Code, TACs, cells, public land mobile network, PLMN, or registration area, RA, where the corresponding network slice is available/supported. See, for example, Table 7, Table 9A, Table 9B, and Table 16. When broadcasted in system information, NetworkSliceBandAssociationInfo may be comprised in, e.g., included in, a system information block (SIB).

In a case that a wireless terminal performs the aforementioned cell selection procedure, e.g., after successfully selecting a PLMN, the wireless terminal may attempt to find a suitable cell, where a suitable cell may be defined as shown in Table 18 below. Table 18 is taken from 3GPP TS 38.304 v16.3.0 (2020-12), 3rd Generation Partnership Project; Technical Specification Group Radio Access Network; NR; User Equipment (UE) procedures in Idle mode and RRC; Inactive state (Release 16), which is incorporated herein in its entirety by reference.

TABLE 18

| |
|---|
| For UE not operating in SNPN Access Mode, a cell is considered as suitable if the following conditions are fulfilled: |
| The cell is part of either the selected PLMN or the registered PLMN or PLMN of the Equivalent PLMN list, and for that PLMN either: |
| The PLMN-ID of that PLMN is broadcast by the cell with no associated CAG-IDs and CAG-only indication in the UE for that PLMN (TS 23.501 [10]) is absent or false; |
| Allowed CAG list in the UE for that PLMN (TS 23.501 [10]) includes a CAG-ID broadcast by the cell for that PLMN; |
| The cell selection criteria are fulfilled, see clause 5.2.3.2. |
| According to the latest information provided by NAS: |
| The cell is not barred, see clause 5.3.1; |
| The cell is part of at least one TA that is not part of the list of “Forbidden Tracking Areas” (TS 22.261 [12]), which belongs to a PLMN that fulfils the first bullet above. |
| For UE operating in SNPN Access Mode, a cell is considered as suitable if the following conditions are fulfilled: |
| The cell is part of either the selected SNPN or the registered SNPN of the UE; |
| The cell selection criteria are fulfilled, see clause 5.2.3.2; |
| According to the latest information provided by NAS: |
| The cell is not barred, see clause 5.3.1; |
| The cell is part of at least one TA that is not part of the list of “Forbidden Tracking Areas” which belongs to either the selected SNPN or the registered SNPN of the UE. |

The definition of a suitable cell shown above indicates that, in order to determine if a found cell is a suitable cell, the wireless terminal may need to acquire sufficient information, such as PLMN identities, or NPN identities, cell barring status and tracking areas, from signals broadcasted by the cell. Typically, such information may be preferably included in minimum system information (SI), e.g., MIB and/or SIB1. As used herein, “minimum system information is information which may be periodically broadcasted and may comprise basic information required for initial access and scheduling information to acquire any other SI or Other SIBs.

After a successful cell selection to select a suitable cell, the wireless terminal may perform the cell reselection procedure, as disclosed in one or more of the preceding embodiments, wherein the wireless terminal attempts to find a cell more suitable than the currently camped cell, i.e., to find a cell more suitable than the serving cell. A “more suitable” cell may be a neighboring cell that is ranked higher than the serving cell based on network-configured criteria, e.g., better signal quality/strength.

In the example embodiment and mode of FIG. 36-FIG. 41, neighboring cell network slice information associated with each of the one or more neighboring cells may be utilized to perform a cell reselection procedure to determine whether or not to reselect one of the one or more neighboring cells. The cell reselection procedure may be based on an intended network slice and the neighboring cell network slice information associated with the one of the one or more neighboring cells. The neighboring cell network slice information associated with the one or more neighboring cells may be obtained from system information obtained from a serving cell, and preferably from system information which is other than minimal system information, e.g., “Other system information”. As explained herein, the neighboring cell network slice information may indicate one or more network slices supported by the associated neighboring cell, and may do so in various ways, such as comprising one or more lists of network slice identifier(s) or comprising one or more indices, each of the one or more indices refers to a subset of the one or more lists of network slice identifier(s) comprised in the minimum SI.

Figure 36:
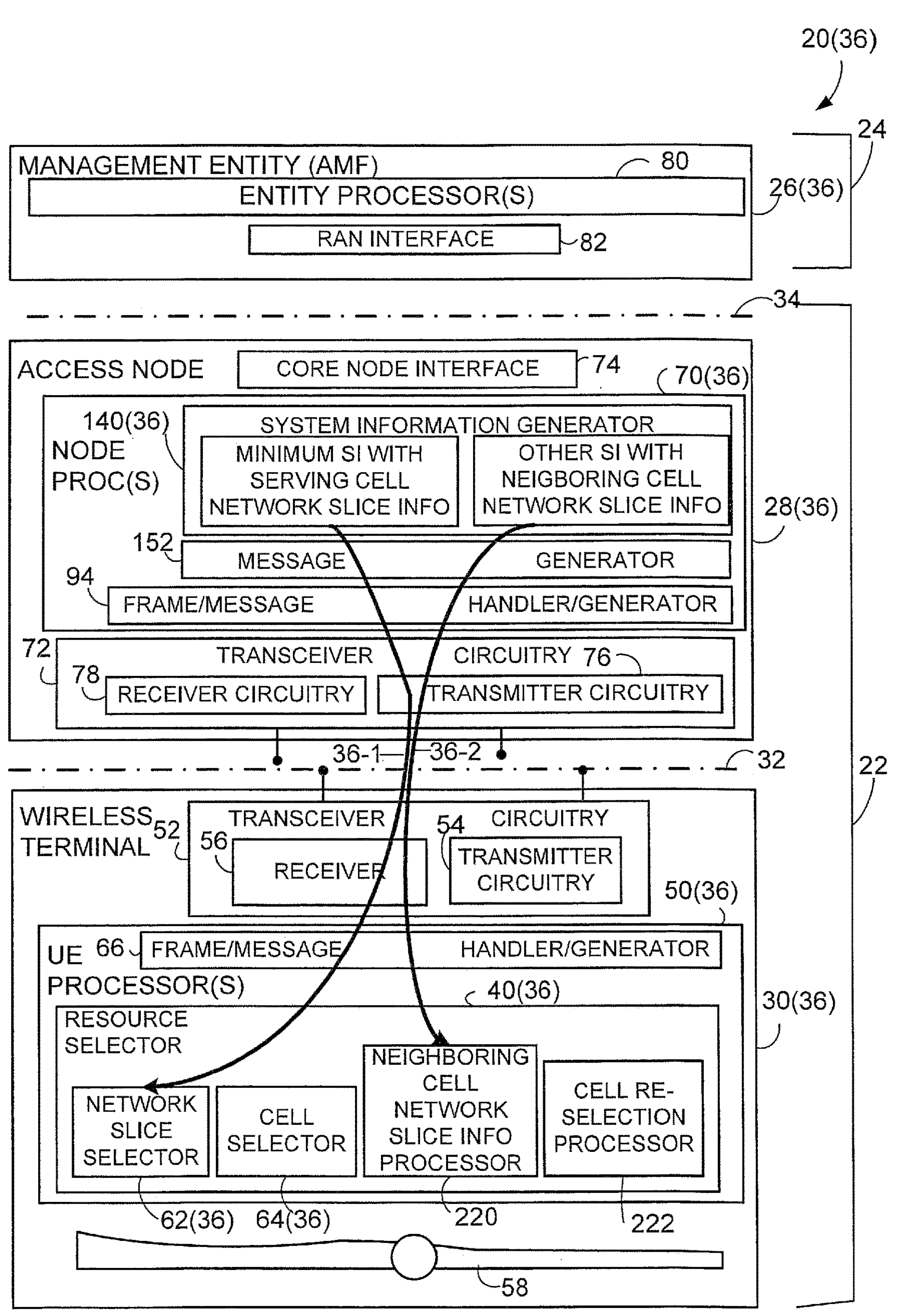
FIG. 36 is a schematic view of an example generic communications system in which neighboring cell network slice information associated with one or more neighboring cells may be utilized to perform a cell reselection procedure to determine whether or not to reselect one of the one or more neighboring cells.

The example embodiment and mode of FIG. 36-FIG. 41 is an example implementation of the generic example embodiment and mode of FIG. 4 and FIG. 5, and as such explanations of FIG. 4 and FIG. 5 are applicable to communications system 20(36) of FIG. 36 as well.

For example, the communications system 20(36) of FIG. 36 comprises one or more radio access networks (RANs) 22 and one or more core networks (CNs) 24, with one management entities 26(36) being shown in the core network (CN) 24 by way of example and one access node 28(36) being shown by way of example in radio access network (RAN) 22. Although not illustrated as such, the communications system 20(36) of FIG. 36 may be and usually is utilized by plural PLMNs. In FIG. 36, wireless terminal 30 communicates with a management entity 26(36) of a core network through an access node 28(36) of a radio access network (RAN). The core network supports one or more network slices, each of the network slices providing a designated service within a public land mobile network (PLMN).

Since the communications system 20(4) is generic to various other example embodiments and modes described herein, it is again mentioned that the wireless terminal may take various forms as mentioned above, and likewise that the access node may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. Moreover, communications system 20(36) may be realized in virtualized and/or distributed and/or logical form.

Structures and functionalities of the communications system 20(36) of FIG. 36 which are common or essentially the same as one of more of the preceding example embodiments have the same reference numerals. For example, much of the structure of wireless terminal 30(36) of FIG. 36 and much of the structure of access node 28(36) of FIG. 36 are similar to preceding example embodiments.

The management entity 26(36) of communications system 20(36) may comprise core network entity processor circuitry 80 and interface 82 toward the radio access network (RAN) 22. The core network entity processor circuitry 80 may be realized or comprise one or more processors and at least one memory.

The access node 28(36) of the example embodiment and mode of FIG. 36 comprises node processor circuitry 70(36), node transceiver circuitry 72, and interface 74 to core network (CN) 24. The node transceiver circuitry 72 may comprise node transmitter circuitry 76 and node receiver circuitry 78. The transceiver circuitry 72 includes antenna(e) for the wireless transmission. Transmitter circuitry 76 may include, e.g., amplifier(s), modulation circuitry and other conventional transmission equipment. Receiver circuitry 78 may comprise, e.g., amplifiers, demodulation circuitry, and other conventional receiver equipment. As indicated above, various aspects of access node 28(36) including the node transceiver circuitry 72 may be realized by a distributed unit (DU) and a central unit (CU).

The node processor circuitry 70(36) of the access node 28(36) of FIG. 36 is shown as comprising, among other units and functionalities, system information generator 140(36); frame/message handler/generator 94 and message generator 152. In the example embodiment and mode of FIG. 36, the access node 28(26) generates both minimum system information, e.g., SIB1, to include serving cell network slice information of the cell served by access node 28(26), as well as "other" system information, e.g., system information blocks other than SIB1. The "other" system information is generated to include, e.g., neighboring cell network slice information. The access node 28(36) may include memory, e.g., either memory integrated with node processor circuitry 70(36) or separate or associated therewith, which in turn includes computer program code, wherein the memory and the computer program code are configured to, working with the at least one processor, cause the access node 28(36) to perform at least at least the operations described herein.

The wireless terminal 30(36) of communications system 20(36) of FIG. 36 comprises terminal transceiver circuitry 52 and processor circuitry, e.g., terminal processor circuitry 50. The transceiver circuitry 52 in turn may comprise terminal transmitter circuitry 54 and terminal receiver circuitry 56. The transceiver circuitry 52 includes antenna(e) for the wireless transmission. Transmitter circuitry 54 may include, e.g., amplifier(s), modulation circuitry and other conventional transmission equipment. Receiver circuitry 56 may comprise, e.g., amplifiers, demodulation circuitry, and other conventional receiver equipment. FIG. 36 further shows that wireless terminal 30(36) may also comprise terminal interfaces 58. Such user interfaces may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The receiver circuitry 56 of wireless terminal 30(36) is configured to receive, from a cell served by the access node 28(36), the system information generated by system information generator 140(36).

The terminal processor circuitry 50(36) of FIG. 36 is shown as including terminal resource selector 40(36). The terminal resource selector 40(36) comprises network slice selector 62(36), cell selector 64(36); neighboring cell network slice information processor 220; and, cell re-selection processor 222, the functions of which are described below. The wireless terminal 30(36) may include memory, e.g., either memory integrated with terminal processor circuitry 50(36) or separate or associated therewith, which in turn includes computer program code, wherein the memory and the computer program code are configured to, working with the at least one processor, cause the wireless terminal 30(36) to perform at least at least the operations described herein.

In order for the cell re-selection processor 222 of wireless terminal 30(36) of FIG. 36 to effectively perform the cell reselection procedure, the serving cell, e.g., access node 28, may provide, preferably in one or more Other SIBs, other information such as neighboring cell information. The neighboring cell information may comprise cell identities, e.g., Physical Cell Identities, PCIs, frequency bands and channel numbers, e.g., ARFCNs. Such Other SIBs such as, e.g., SIB3, SIB4 and SIB5 in the 5G cellular system, may be broadcasted periodically or provided on-demand-basis. The neighboring cell network slice information processor 220 of wireless terminal may acquire the Other SIBs after completing a cell selection procedure performed by cell selector 64, i.e., after successfully camping on the serving cell. With the neighboring cell information provided by the serving cell, the wireless terminal may just need to measure the strength of synchronization signals and decode a PCI for each neighboring cell. The wireless terminal may not be required to proceed to acquiring all of the minimum SI, e.g., the wireless terminal may acquire MIB but not SIB1, until a neighboring cell becomes a highest ranked cell.

In a case that network slices come into play as a part of the cell selection procedure, the wireless terminal may attempt to select/prioritize a suitable cell that supports a desired or intended network slice(s). One approach is to implement network slice-related information, such as NetworkSliceBandAssociationInfo, into the minimum SI. In doing so, the wireless terminal may be able to avoid acquiring Other SIBs for obtaining the network slice-related information. However, the capacity of the minimum SI is typically limited, and thus the entire network slice-related information may not be fit into the minimum SI. This leads to a need of implementing only selective information in the minimum SI.

Meanwhile, during the cell reselection procedure, the wireless terminal that has a desired or intended network slice(s) attempts to find a more suitable neighboring cell supporting the desired or intended network slice(s). When evaluating a neighboring cell, it is ideal that the serving cell provides network slice-related information for neighboring cells, in order to avoid necessity for acquiring minimum SI from all of the candidate neighboring cells.

A general principle of the example embodiment and mode of FIG. 36-FIG. 41 includes a separation of network slice-related information into appropriate parts, e.g., appropriate blocks, of system information. Specifically, a serving cell may broadcast, via the minimum SI, network slice-related information for the serving cell itself, herein referred as serving cell network slice information. The serving cell may also broadcast network slice-related information for neighboring cells, herein referred as neighboring cell network slice information, using Other SIBs. The serving cell network slice information may comprise one or more identifications of a network slices, e.g., S-NSSAIs, supported in the serving cell. Meanwhile, the neighboring cell network slice information may comprise one or more identifications of network slices, e.g., S-NSSAIs, supported in each of the neighboring cells.

In one example implementation, the SIB1 and SIBx disclosed in Table 9B can be modified to separate S-NSSAIs from NetworkSliceBandAssociationInfo and to place the S-NSSAIs into SIB1. An example of such modification is shown in the listing of Table 19, wherein in SIB1 one or more S-NSSAI lists, S-NSSAI-ListGroup, is included in PLMN-IdentityInfo as an implementation of the serving cell network slice information. Each of the NetworkSliceBandAssociationInfo instances in SIBx herein refers to an instance of S-NSSAI-List, in the order of occurrence, except an instance that includes optional plmn-IdentityList and S-NSSAI-List. This exception is used to cover a case where in some area, e.g., an area defined by areaScope, a supported network slice(s) may be different from the network slice(s) supported by the serving cell and thus there is no instance of S-NSSAI-List in SIB1 to refer to.

Figure 37:
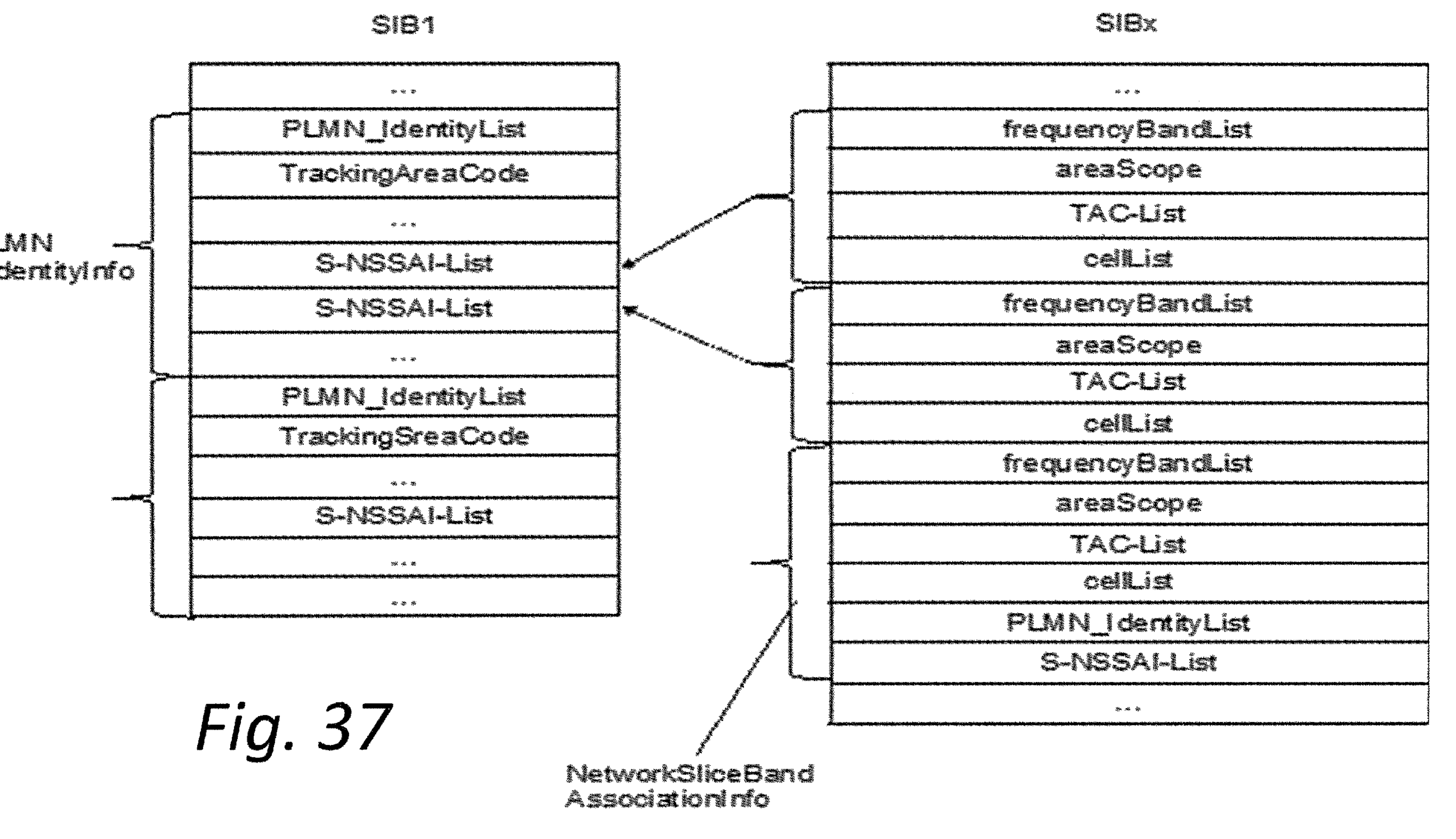
FIG. 37 is a diagrammatic view showing NetworkSliceBandAssociationInfo in other system information referring to S-NSSAI-List information elements or fields in SIB1 for the example embodiment and mode of FIG. 36.

A graphical representation of the listing of Table 19 is shown in FIG. 37. In FIG. 37, each bracket to the left of the rectangle depicting SIB1 represents a grouping of the information elements or field comprising PLM_IdentifyInfo; and each bracket to the left of the rectangle depicting SIBx represents a grouping of the information elements or field comprising NetworkSliceBandAssociationInfo. As shown in FIG. 37, the first two, e.g., uppermost two, brackets of corresponding to NetworkSliceBandAssociationInfo are depicted with arrows which point to S-NSSAI-List information elements or fields in SIB1, thereby referring to an instance of S-NSSAI-List as described above. Moreover, in FIG. 37, the last instance or bracket of NetworkSliceBandAssociationInfo has no reference to SIB1, e.g., no arrow to an S-NSSAI-List information element or field in SIB1.

TABLE 19

```
SIB1 ::=            SEQUENCE {
...
    cellAccessRelatedInfo                    CellAccessRelatedInfo,
...
}
CellAccessRelatedInfo::= SEQUENCE {
  plmn-IdentityList         PLMN-IdentityInfoList,
  cellReservedForOtherUse   ENUMERATED {true}
  OPTIONAL, --Need R
    ...
}
PLMN-IdentityInfoList ::= SEQUENCE (SIZE (1..maxPLMN)) OF
PLMN-IdentityInfo
PLMN-IdentityInfo ::=   SEQUENCE {
  plmn-IdentityList              SEQUENCE (SIZE (1..maxPLMN)) OF
PLMN-Identity,
    trackingAreaCode          TrackingAreaCode
OPTIONAL,       -- Need R
    ranac                     RAN-AreaCode
OPTIONAL,       -- Need R
    cellIdentity                CellIdentity,
    cellReservedForOperatorUse    ENUMERATED {reserved,
notReserved},
    ...
}
SIBx ::=            SEQUENCE {
...
    networkSliceBandAssociationInfoListForPLMNs    SEQUENCE
(SIZE (1..maxPLMN)) OF NetworkSliceBandAssociationInfoList
...
}
NetworkSliceBandAssociationInfoList::=          SEQUENCE (SIZE
(1.. maxNrofS-NSSAI) OF NetworkSliceBandAssociationInfo
NetworkSliceBandAssociationInfo   SEQUENCE {
    s-NSSAI                     S-NSSAI         OPTIONAL,
    frequencyBandList             MultiFrequencyBandListNR-SIB
```

TABLE 19-continued

```
OPTIONAL,
    areaScope    ENUMERATED {PLMN, RegistrationArea, TACs,
    Cells}
OPTIONAL,
    TAC-List SEQUENCE (SIZE (1..maxNrofTAC)) OF
    TrackingAreaCode
OPTIONAL, - Cond TACs
    cellList SEQUENCE (SIZE (1..maxNrofCell)) OF phyCellId
OPTIONAL - Cond Cells
    ...
}
```

As previously discussed in the listing of Table 9B and its graphical representation shown in FIG. 20B, FIG. 37 shows that areaScope and cellList may be included inside of NetworkSliceBandAssociationInfo. The areaScope IE may indicate that the corresponding network slice, S-NSSAI, is valid within a serving PLMN, a current registration area, within tracking area codes identified by TAC-List, or within cells identified by cellList. The TAC-List IE may be conditionally present when areaScope="TACs". Likewise, the cellList IE may be conditionally present, only when areaScope="Cells".

In an alternative example implementation, instead of using the aforementioned SIBx, the system information block SIB3, which generally includes intra-frequency neighboring cell information, and the system information block SIB4, which generally includes inter-frequency neighboring cell information, may be used as baselines to specify the neighboring cell network slice information. The SIB3 and SIB4 may be as expressed in 3GPP TS 38.331 v16.3.1 (2021-01), 3rd Generation Partnership Project; Technical Specification Group Radio Access Network; NR; Radio Resource Control (RRC) protocol specification (Release 16), which is incorporated herein by reference in its entirety. The listing of Table 20A shows example formats/structures of SIB1, SIB3 and SIB4. Similar to the listing of Table 19, SIB1 may comprise an optional information element s-NSSAI-ListGroup as an implementation of the serving cell network slice information, wherein s-NSSAI-ListGroup may further comprise one or more lists of one or more S-NSSAIs supported by the serving cell for a corresponding PLMN(s). It should be noted that s-NSSAI-ListGroup may be assigned to each PLMN or each group of PLMNs e.g., for plmn-IdentityList in each PLMN-IdentityInfo, since a network slice is defined within a PLMN or a group of PLMNs. Furthermore, the neighboring cell network slice information to be used for a cell reselection procedure may be included in SIB3, e.g., for intra-frequency cell reselection, and SIB4, e.g., for intra-frequency cell reselection. In SIB3 or SIB4, each neighboring cell identified by its cell identification, e.g., physCellId, may be optionally associated with one or more PLMN identifiers, e.g., plmn-IdentityList, and one or more lists of S-NSSAIs, wherein each of the network slices identified by each of the one or more lists of S-NSSAI may be supported by the neighboring cell and may be provided within the PLMN(s) identified by plmn-IdentityList.

TABLE 20A

```
SIB1 ::=            SEQUENCE {
...
    cellAccessRelatedInfo       CellAccessRelatedInfo,
...
}
CellAccessRelatedInfo       ::=   SEQUENCE {
  plmn-IdentityList         PLMN-IdentityInfoList,
```

TABLE 20A-continued

```
   cellReservedForOtherUse ENUMERATED {true}
   OPTIONAL, --Need R
      ...
}
PLMN-IdentityInfoList ::= SEQUENCE (SIZE (1..maxPLMN)) OF
PLMN-IdentityInfo
PLMN-IdentityInfo ::=      SEQUENCE {
      plmn-IdentityList         SEQUENCE (SIZE (1..maxPLMN)) OF
PLMN-Identity,
      trackingAreaCode          TrackingAreaCode
OPTIONAL,      -- Need R
      ranac                     RAN-AreaCode
OPTIONAL,      -- Need R
      cellIdentity              CellIdentity,
      cellReservedForOperatorUse ENUMERATED {reserved,
notReserved},
      s-NSSAI-ListGroup SEQUENCE (SIZE (1..maxNrofS-NSSAI)) OF
S-NSSAI-List OPTIONAL,       -- Need R
      ...
}
S-NSSAI-List ::= SEQUENCE (SIZE (1..maxNrofS-NSSAI)) OF
S-NSSAI
SIB3 ::=                   SEQUENCE {
      intraFreqNeighCellList   IntraFreqNeighCellList
OPTIONAL,    -- Need R
      intraFreqBlackCellList   IntraFreqBlackCellList
OPTIONAL,    -- Need R
      lateNonCriticalExtension    OCTET STRING
OPTIONAL,
      ...,
}
IntraFreqNeighCellList ::=       SEQUENCE (SIZE (1..maxCellIntra))
OF IntraFreqNeighCellInfo
IntraFreqNeighCellList-v1610::=       SEQUENCE (SIZE
(1..maxCellIntra)) OF IntraFreqNeighCellInfo-v1610
IntraFreqNeighCellInfo ::= SEQUENCE {
      physCellId              PhysCellId,
      q-OffsetCell            Q-OffsetRange,
      q-RxLevMinOffsetCell        INTEGER (1..8) OPTIONAL, -- Need R
      q-RxLevMinOffsetCellSUL    INTEGER (1..8) OPTIONAL, --
      Need R
      q-QualMinOffsetCell           INTEGER (1..8) OPTIONAL, --
      Need R
      neighCellSliceInfoList    NeighCellSliceInfoList    OPTIONAL,
-- Need R
      ...
}
NeighCellSliceInfoList ::= SEQUENCE (SIZE (1..maxPLMN)) OF
NeighCellSliceInfo
NeighCellSliceInfo ::=        SEQUENCE {
      plmn-IdentityList          SEQUENCE (SIZE (1..maxPLMN)) OF
PLMN-Identity,
      s-NSSAI-ListGroup       SEQUENCE (SIZE (1..maxNrofS-NSSAI))
OF S-NSSAI-List,
      ...
}
SIB4 ::=                   SEQUENCE {
      interFreqCarrierFreqList       InterFreqCarrierFreqList,
      lateNonCriticalExtension       OCTET STRING OPTIONAL,
      ...,
}
InterFreqCarrierFreqList ::= SEQUENCE (SIZE (1..maxFreq)) OF
InterFreqCarrierFreqInfo
InterFreqCarrierFreqInfo ::=   SEQUENCE
      { dl-CarrierFreq              ARFCN-ValueNR,
      frequencyBandList           MultiFrequencyBandListNR-SIB
OPTIONAL,    -- Cond Mandatory
      frequencyBandListSUL        MultiFrequencyBandListNR-SIB
OPTIONAL,    -- Need R
      nrofSS-BlocksToAverage              INTEGER
(2..maxNrofSS-BlocksToAverage)                    OPTIONAL,
-- Need S
      absThreshSS-BlocksConsolidation ThresholdNR
OPTIONAL,    -- Need S
      smtc                              SSB-MTC
OPTIONAL,    -- Need S
      ssbSubcarrierSpacing              SubcarrierSpacing,
      ssb-ToMeasure                    SSB-ToMeasure
OPTIONAL,    -- Need S
      deriveSSB-IndexFromCell          BOOLEAN,
```

TABLE 20A-continued

```
      ss-RSSI-Measurement              SS-RSSI-Measurement
OPTIONAL,
      q-RxLevMin                 Q-RxLevMin,
      q-RxLevMinSUL              Q-RxLevMin
OPTIONAL,    -- Need R
      q-QualMin                  Q-QualMin
OPTIONAL,    -- Need S
      p-Max                      P-Max
OPTIONAL,    -- Need S
      t-ReselectionNR            T-Reselection,
      t-ReselectionNR-SF         SpeedStateScaleFactors
OPTIONAL, -- Need S
      threshX-HighP              ReselectionThreshold,
      threshX-LowP               ReselectionThreshold,
      threshX-Q                  SEQUENCE {
            threshX-HighQ            ReselectionThresholdQ,
            threshX-LowQ             ReselectionThresholdQ
      }
OPTIONAL,    -- Cond RSRQ
      cellReselectionPriority          CellReselectionPriority
OPTIONAL,    -- Need R
      cellReselectionSubPriority
CellReselectionSubPriority
OPTIONAL,    -- Need R
      q-OffsetFreq               Q-OffsetRange
DEFAULT dB0,
      interFreqNeighCellList           InterFreqNeighCellList
OPTIONAL,    -- Need R
      interFreqBlackCellList           InterFreqBlackCellList
OPTIONAL,    -- Need R
      ...
}
InterFreqNeighCellList ::=          SEQUENCE (SIZE
(1..maxCellInter)) OF InterFreqNeighCellInfo
InterFreqNeighCellInfo ::=          SEQUENCE {
      physCellId                       PhysCellId,
      q-OffsetCell                     Q-OffsetRange,
      q-RxLevMinOffsetCell             INTEGER (1..8)
OPTIONAL,    -- Need R
      q-RxLevMinOffsetCellSUL          INTEGER (1..8)
OPTIONAL,    -- Need R
      neighCellSliceInfoList           NeighCellSliceInfoList
OPTIONAL,    -- Need R
      ...
}
```

In a typical deployment scenario, it is expected that for a given PLMN a set of network slices supported in cells within one area is similar or identical. Such an area may be a collection of coverages served by adjacent cells. For example, a same set of network slices may be supported within a tracking area, TA, comprising cells having a same tracking area identity, TAI, or within a registration area, RA, consisting of one or more TAs. For example, 3GPP S2-2006526, entitled "LS on Cell Configuration within TA/RA to Support Allowed NSSAI", has stated the following assumption: "The design of the 5GS in SA2 has assumed that the UE obtains an Allowed NSSAI depending on the TA where the UE is under. SA2's assumption is that all S-NSSAIs in the Allowed NSSAI are supported with the TA and also in all TAs of the RA (the RA is constructed based on the TAs that support the Allowed NSSAI determined for the current TA)".

Figure 38:
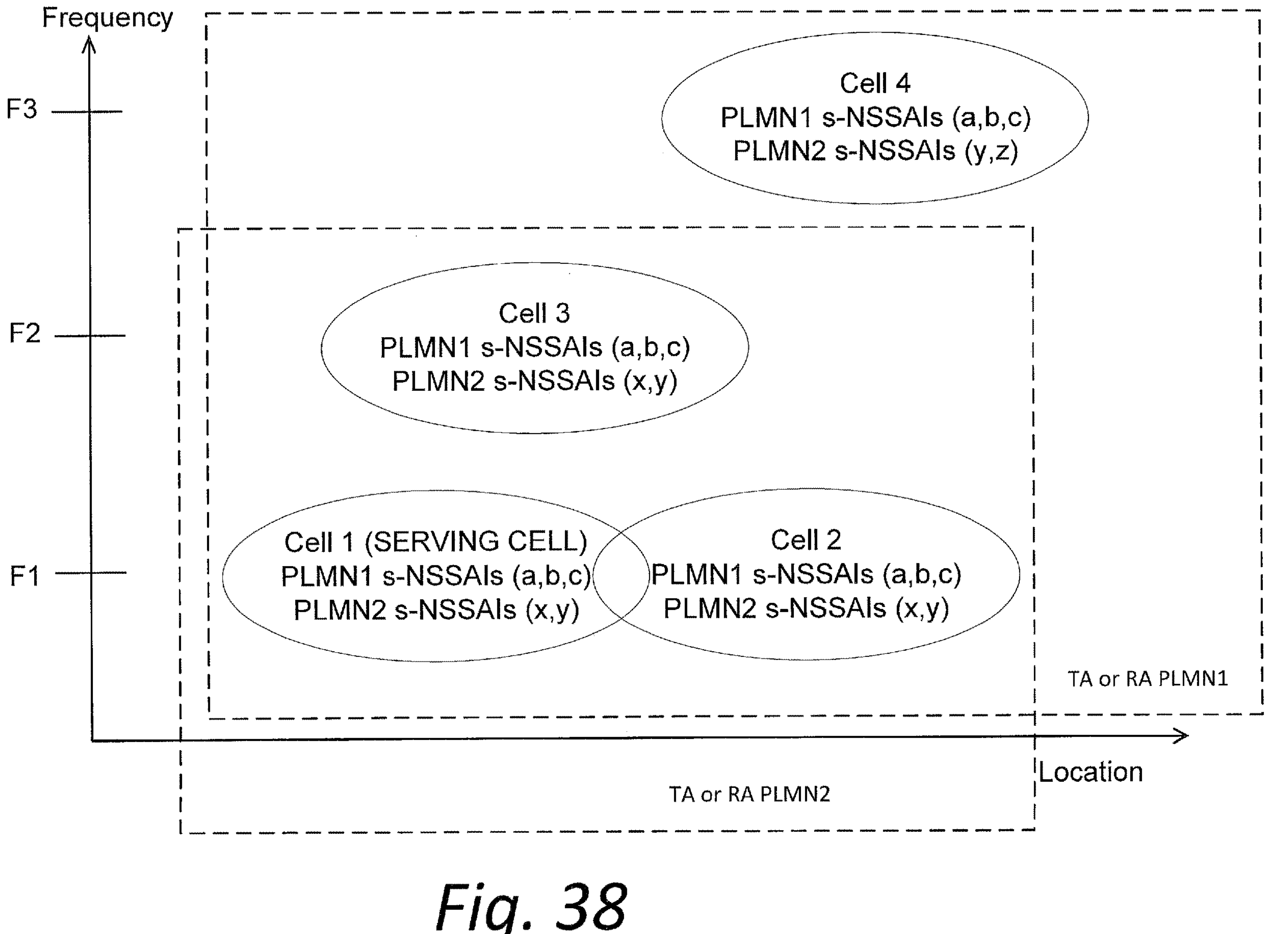
FIG. 38 is a diagrammatic view of an example PLMN/cell deployment scenario for the example embodiment and mode of FIG. 36.

FIG. 38 shows an example deployment scenario based on the assumption above, wherein two PLMNs (PLMN1 and PLMN2) share the four cells, e.g., Cell 1, 2, 3 and 4. In PLMN1, all of the four cells belong to a same TA or RA, whereas in PLMN2 only Cell 1, 2 and 3 belong to a same TA or RA, i.e., Cell 4 is in a different TA/RA. For PLMN1, all the four cells support a same set of S-NSSAIs, e.g., S-NSSAI a, b and c. For PLMN 2, Cell 1, 2 and 3 support a same set of S-NSSAIs, e.g., S-NSSAI x, S-NSSAI y, and Cell 4 supports a different set of S-NSSAIs, e.g., S-NSSAI y, S-NSSAI z)

The assumption of a same set of S-NSSAIs likely to be supported in an area, such as a Tracking Area, TA, or Registration area, RA, makes it feasible to improve coding schemes of the neighboring cell network slice information, especially on the formats/structures shown in the listing of Table 20A. Without the improvement, for example, SIB3 and SIB4 of Listing 6A would repeatedly specify the same set of S-NSSAI, e.g., S-NSSAI-List, for each of such neighboring cells in the area, which would result in wasteful use of resources on the air interface.

As an enhancement of this example embodiment and mode, a method to minimize redundant network slice information for neighboring cells in system information broadcast is disclosed herein. That is, in principle, one or more subsets of the serving cell network slice information in a system information block, preferably a system information block which carries minimum SI, may be shared by the neighboring cell network slice information by referencing, in a case that the serving cell and the neighboring cell share a common network slice(s) within a same PLMN(s). For example, as shown in the listing of Table 20B, a neighboring cell defined in SIB3 or SIB4 may use one or more explicit indices, e.g., S-NSSAI-ListIndex, to refer one or more lists of S-NSSAIs, S-NSSAI-List. defined in SIB1.

TABLE 20B

```
SIB1 ::=            SEQUENCE {
...
  cellAccessRelatedInfo       CellAccessRelatedInfo,
...
}
CellAccessRelatedInfo   ::=   SEQUENCE {
  plmn-IdentityList             PLMN-IdentityInfoList,
  cellReservedForOtherUse       ENUMERATED {true} OPTIONAL,
-- Need R
  ...
}
PLMN-IdentityInfoList ::= SEQUENCE (SIZE (1..maxPLMN)) OF
PLMN-IdentityInfo
PLMN-IdentityInfo ::=       SEQUENCE {
  plmn-IdentityList             SEQUENCE (SIZE (1..maxPLMN)) OF
PLMN-Identity,
  trackingAreaCode          TrackingAreaCode
OPTIONAL,       -- Need R
  ranac                  RAN-AreaCode
OPTIONAL,       -- Need R
  cellIdentity              CellIdentity,
  cellReservedForOperatorUse ENUMERATED {reserved,
notReserved},
  s-NSSAI-ListGroup       SEQUENCE (SIZE (1..maxNrofS-NSSAI))
OF S-NSSAI-List   OPTIONAL,        -- Need R
  ...
}
S-NSSAI-List ::= SEQUENCE (SIZE (1..maxNrofS-NSSAI)) OF
S-NSSAI
SIB3 ::=                  SEQUENCE {
  intraFreqNeighCellList       IntraFreqNeighCellList
OPTIONAL,     -- Need R
  intraFreqBlackCellList       IntraFreqBlackCellList
OPTIONAL,   -- Need R
  lateNonCriticalExtension   OCTET STRING
OPTIONAL,
  ...,
}
IntraFreqNeighCellList ::=   SEQUENCE (SIZE (1..maxCellIntra))
OF IntraFreqNeighCellInfo
IntraFreqNeighCellList-v1610::= SEQUENCE (SIZE
(1..maxCellIntra)) OF IntraFreqNeighCellInfo-v1610
IntraFreqNeighCellInfo ::=   SEQUENCE {
  physCellId                 PhysCellId,
  q-OffsetCell                Q-OffsetRange,
  q-RxLevMinOffsetCell         INTEGER (1..8)OPTIONAL,-- Need R
  q-RxLevMinOffsetCellSUL       INTEGER (1..8)OPTIONAL,-- Need R
  q-QualMinOffsetCell          INTEGER (1..8)OPTIONAL,-- Need R
  neighCellSliceInfoList         NeighCellSliceInfoList
```

TABLE 20B-continued

```
OPTIONAL,    -- Need R
  ...
}
NeighCellSliceInfoList ::=       SEQUENCE (SIZE (1..maxPLMN)) OF
NeighCellSliceInfo
NeighCellSliceInfo ::=         SEQUENCE {
  C1                         CHOICE {
    s-NSSAI-ListIndex        INTEGER (0..maxPLMN−1),
    sliceInfoPerPLMN          SEQUENCE {
      plmn-IdentityList           SEQUENCE (SIZE (1..maxPLMN))
OF PLMN-Identity,
      s-NSSAI-ListGroup       SEQUENCE (SIZE
(1..maxNrofS-NSSAI)) OF S-NSSAI-List,
    }
  ...
  }
}
SIB4 ::=                       SEQUENCE {
  interFreqCarrierFreqList      InterFreqCarrierFreqList,
  lateNonCriticalExtension       OCTET STRING OPTIONAL,
  ...,
}
InterFreqCarrierFreqList ::=       SEQUENCE (SIZE (1..maxFreq)) OF
InterFreqCarrierFreqInfo
InterFreqCarrierFreqInfo ::=       SEQUENCE {
  dl-CarrierFreq                 ARFCN-ValueNR,
  frequencyBandList              MultiFrequencyBandListNR-SIB
OPTIONAL,   -- Cond Mandatory
  frequencyBandListSUL             MultiFrequencyBandListNR-SIB
OPTIONAL,   -- Need R
  nrofSS-BlocksToAverage INTEGER
(2..maxNrofSS-BlocksToAverage)
OPTIONAL,   -- Need S
  absThreshSS-BlocksConsolidation          ThresholdNR
OPTIONAL,   -- Need S
  smtc                                SSB-MTC
OPTIONAL,   -- Need S
  ssbSubcarrierSpacing                SubcarrierSpacing,
  ssb-ToMeasure                  SSB-ToMeasure
OPTIONAL,   -- Need S
  deriveSSB-IndexFromCell            BOOLEAN,
  ss-RSSI-Measurement             SS-RSSI-Measurement
OPTIONAL,
  q-RxLevMin                   Q-RxLevMin,
  q-RxLevMinSUL                  Q-RxLevMin
OPTIONAL,   -- Need R
  q-QualMin                     Q-QualMin
OPTIONAL,   -- Need S
  p-Max                 P-Max
OPTIONAL,   -- Need S
  t-ReselectionNR               T-Reselection,
  t-ReselectionNR-SF            SpeedStateScaleFactors
OPTIONAL,   -- Need S
  threshX-HighP              ReselectionThreshold,
  threshX-LowP              ReselectionThreshold,
  threshX-Q                  SEQUENCE {
    threshX-HighQ            ReselectionThresholdQ,
    threshX-LowQ               ReselectionThresholdQ
  }
OPTIONAL,   -- Cond RSRQ
  cellReselectionPriority          CellReselectionPriority
OPTIONAL,   -- Need R
  cellReselectionSubPriority       CellReselectionSubPriority
OPTIONAL,   -- Need R
  q-OffsetFreq                    Q-OffsetRange
DEFAULT dB0,
  interFreqNeighCellList            InterFreqNeighCellList
OPTIONAL,   -- Need R
  interFreqBlackCellList            InterFreqBlackCellList
OPTIONAL,   -- Need R
  ...
}
InterFreqNeighCellList ::=          SEQUENCE (SIZE
(1..maxCellInter)) OF InterFreqNeighCellInfo
InterFreqNeighCellInfo ::=          SEQUENCE {
  physCellId                       PhysCellId,
  q-OffsetCell                  Q-OffsetRange,
  q-RxLevMinOffsetCell               INTEGER (1..8)
OPTIONAL,   -- Need R
  q-RxLevMinOffsetCellSUL             INTEGER (1..8)
```

TABLE 20B-continued

```
OPTIONAL,   -- Need R
  neighCellSliceInfoList                    NeighCellSliceInfoList
OPTIONAL,   -- Need R
  ...
}
```

In the listing of Table 20B, NeighCellSliceInfo may comprise either sNSSAI-ListIndex or sliceInfoPerPLMN (see keyword CHOICE), wherein sNSSAI-ListIndex is used as a reference to (s-NSSAI-ListIndex+1)$^{th}$ instance of 5-NSSAI-List in SIB1, and sliceInfoPerPLMN is used to explicitly specify plmn-IdentityList and one or more s-NSSAI-List(s) for a corresponding neighboring cell without using referencing. The element sliceInfoPerPLMN may be used in a case that there is no S-NSSAI-List instance in SIB1 that can be used for referencing.

Alternatively, other types of indices can be used instead of s-NSSAI-ListIndex, which refers to S-NSSAI-List in SIB1. For example, although not listed or illustrated herein, such an index may refer to an instance of PLMN-IdentityInfo, which comprises one or more S-NSSAI-List(s).

Figure 39:
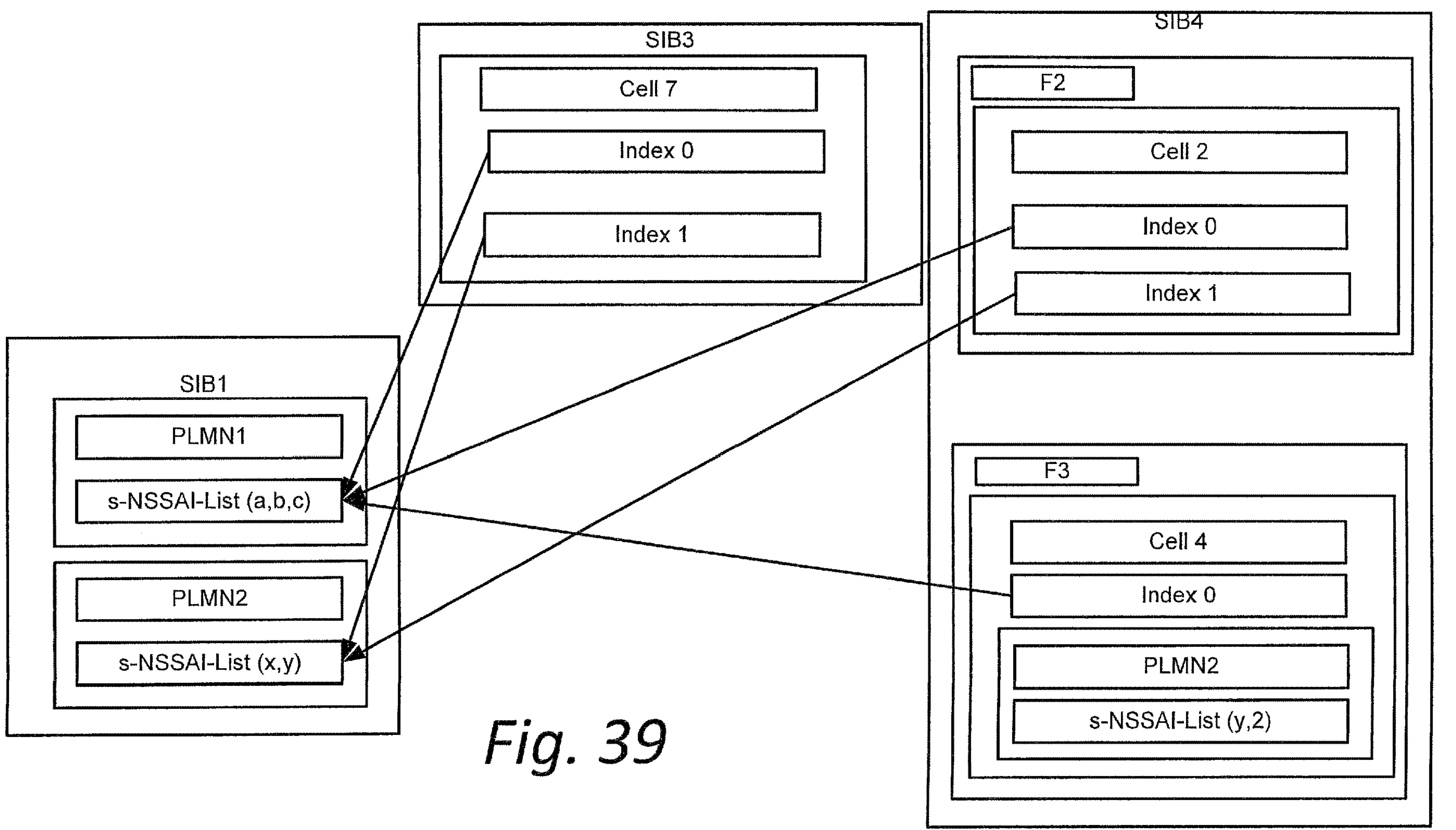
FIG. 39 is a diagrammatic view depicting system information, SIB1, SIB3 and SIB4, broadcasted by a cell based on the enhanced formats/structures of the listing of Table 20B, under the deployment scenario of FIG. 38.

FIG. 39 illustrates graphical representations of system information, SIB1, SIB3 and SIB4, broadcasted by Cell 1, e.g., a serving cell, based on the enhanced formats/structures of the listing of Table 20B, under the deployment scenario of FIG. 38. The sets of PLMN(s) and associated S-NSSAIs for Cell 2, Cell 3 and Cell 4 are specified by referencing to corresponding S-NSSAI-List instances in SIB1, except for PLMN2 of Cell 4, e.g., there is no matching instance in SIB1.

Figure 40:
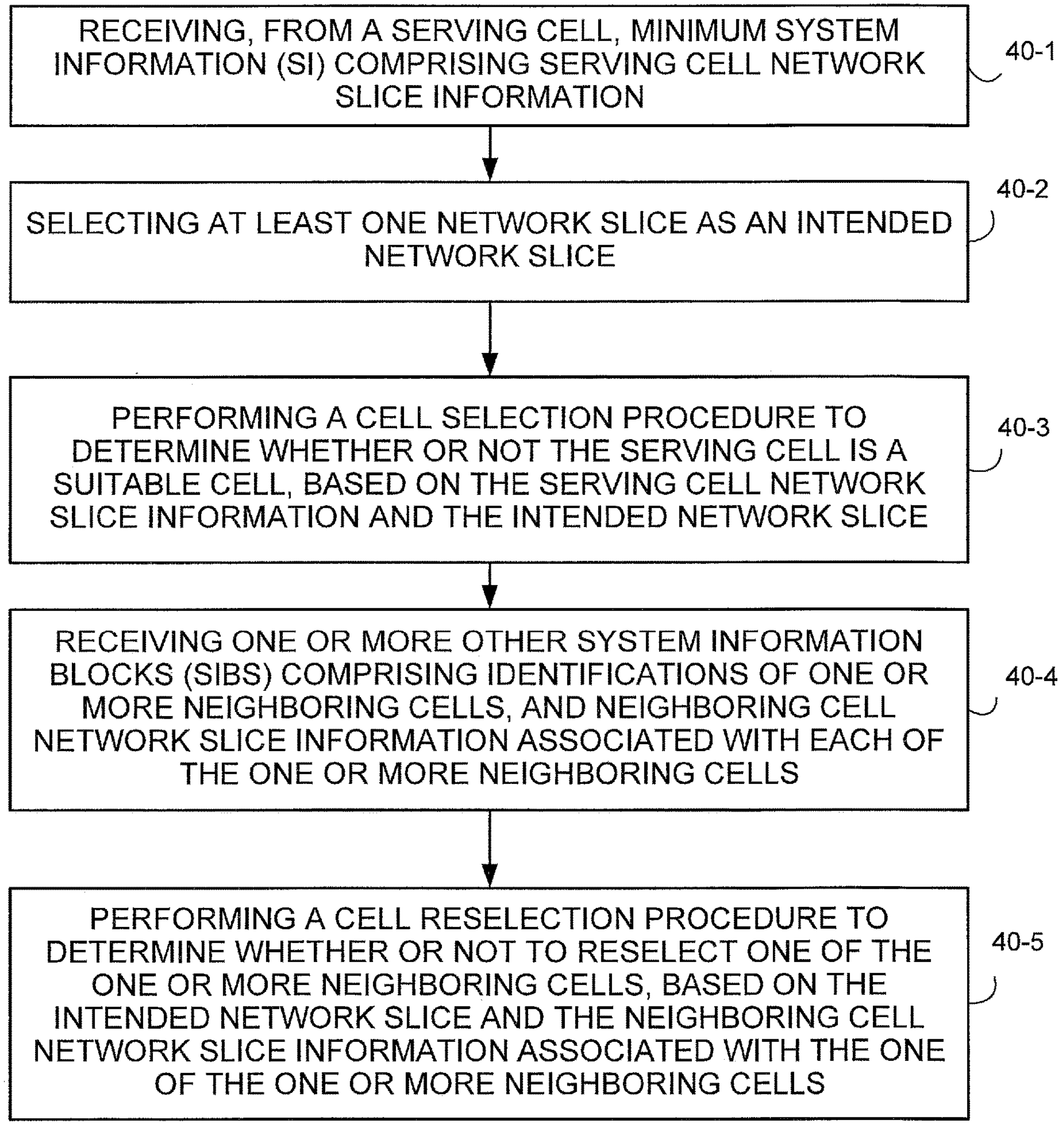
FIG. 40 is a flow chart showing example, representative steps or acts performed by a wireless terminal of the example embodiment and mode of FIG. 36.

FIG. 40 is a flow chart showing example representative steps or acts performed by a wireless terminal, e.g., UE, of the example embodiment and mode of FIG. 36-FIG. 41. Such wireless terminal is represented by wireless terminal 30(36) of FIG. 36, for example.

Act 40-1 comprises receiving, from a serving cell, minimum system information (SI) comprising serving cell network slice information. Act 40-1 is also depicted by arrow 36-1 in FIG. 36. The minimum SI may be required for acquiring the one or more Other SIBs and performing an initial access. The serving cell network slice information may indicate one or more network slices supported by the serving cell. In some configurations, the serving cell network slice information comprises one or more lists of network slice identifier(s), wherein each of the network slice identifier(s) in the each of the one or more lists may identify a network slice supported by the serving cell.

Act 40-2 comprises selecting at least one network slice as an intended network slice. An intended network slice may be also referred as a desired network slice. Act 40-2 may be performed by network slice selector 62(36) of FIG. 36.

Act 40-3 comprises performing a cell selection procedure to determine whether or not the serving cell is a suitable cell, based on the serving cell network slice information and the intended network slice. Act 40-3 may be performed by cell selector 64(36) of FIG. 36. During the cell selection procedure, the serving cell may be considered to be a candidate, in a case that the serving cell network slice information indicates that the at least one intended network slice is supported by the serving cell.

Act 40-4 comprises receiving one or more Other system information blocks (SIBs) comprising identifications of one or more neighboring cells, and neighboring cell network slice information associated with each of the one or more neighboring cells. The reception of the one or more Other system information blocks is depicted in example manner by arrow 36-2 of FIG. 36. The one or more Other SIBs may be received separately from the minimum SI. In addition, the one or more other SIBs may further comprise one or more values of radio frequencies/bands, each of the one or more values being associated with one of the one or more neighboring cells. The neighboring cell network slice information may comprise one or more lists of network slice identifier(s), each of the network slice identifier(s) in the one or more lists of network slice identifier(s) identifying a network slice supported by the associated neighboring cell. Additionally or alternatively, the neighboring cell network slice information may comprise one or more indices, each of the one or more indices refers to a subset of the one or more lists comprised in the minimum SI. The subset of the one or more lists identifies network slice(s) supported in both the serving cell and the associated neighboring cell.

Act 40-5 comprises performing a cell reselection procedure to determine whether or not to reselect one of the one or more neighboring cells, based on the intended network slice and the neighboring cell network slice information associated with the one of the one or more neighboring cells. The determination of whether the intended network slice and the neighboring cell network slice information associated with the one of the one or more neighboring cells justifies performance of the cell reselection procedure may be performed by neighboring cell network slice information processor 220. During the cell reselection procedure, which may be performed by cell re-selection processor 222, a neighboring cell may be prioritized in a case that the neighboring cell network slice information associated with the neighboring cell indicates that the at least one intended network slice is supported by the neighboring cell.

FIG. 41 is a flow chart showing example representative steps or acts performed by an access node, e.g., gNB, of the example embodiment and mode of FIG. 36-FIG. 41. Such an access node is illustrated, by way of example, as access node 28(36) in FIG. 36.

Act 41-1 comprises generating minimum system information (SI) comprising serving cell network slice information. The minimum SI may be required for a wireless terminal to acquire the one or more Other SIBs and to perform an initial access. The serving cell network slice information may indicate one or more network slices supported by the serving cell. In some configurations, the serving cell network slice information comprises one or more lists of network slice identifier(s), wherein each of the network slice identifier(s) in the each of the one or more lists may identify a network slice supported by the serving cell. The serving cell network slice information and at least one intended network slice may be used by the wireless terminal in a cell selection procedure to determine whether or not the serving cell is a suitable cell, the at least one intended network slice being a network slice selected by the wireless terminal.

Act 41-2 comprises generating one or more Other system information blocks (SIBs) comprising identifications of one or more neighboring cells, and neighboring cell network slice information associated with each of the one or more neighboring cells. The one or more Other SIBs may be transmitted separately from the minimum SI. In addition, the one or more Other SIBs may further comprise one or more values of radio frequencies/bands, each of the one or more values being associated with one of the one or more neighboring cells. The neighboring cell network slice information may comprise one or more lists of network slice identifier(s), each of the network slice identifier(s) in the one or more lists of network slice identifier(s) identifying a network slice supported by the associated neighboring cell. Additionally or alternatively, the neighboring cell network slice information may comprise one or more indices, each of the one or more indices refers to a subset of the one or more lists comprised in the minimum SI. The subset of the one or more lists identifies network slice(s) supported in both the serving cell and the associated neighboring cell. The neighboring cell network slice information and the at least one intended network slice may be used by the wireless terminal camping on the serving cell to perform a cell reselection procedure to determine whether or not to reselect one of the neighboring cells.

The generation of the minimum system information of act 41-1 and the other SIBs of act 41-2 may be performed by the system information generator 140(36).

Act 41-3 comprises transmitting, via the serving cell, the minimum SI, and the one or more Other SIBs. Arrow 36-1 of FIG. 36 simply depicts transmission of the minimum SI; arrow 36-1 of FIG. 36 simply depicts transmission of the one or more Other SIBs.

9.0 Priority Information for Network Slices

One or more of the preceding embodiments disclose methods for specifying network slices and supporting radio bands within an area, such as a tracking area or within one or more cells. In some deployment scenarios, for a given network slice network operators may desire to prioritize one radio band/frequency over another. In turn, a wireless terminal may desire to utilize such prioritizations during a cell selection/reselection procedure. Specifically, for a desired or intended slice, the wireless terminal may select/reselect a cell based on cell selection/reselection criteria that take into account the priority of radio bands/frequencies with regard to the desired or intended slices.

Figure 42:
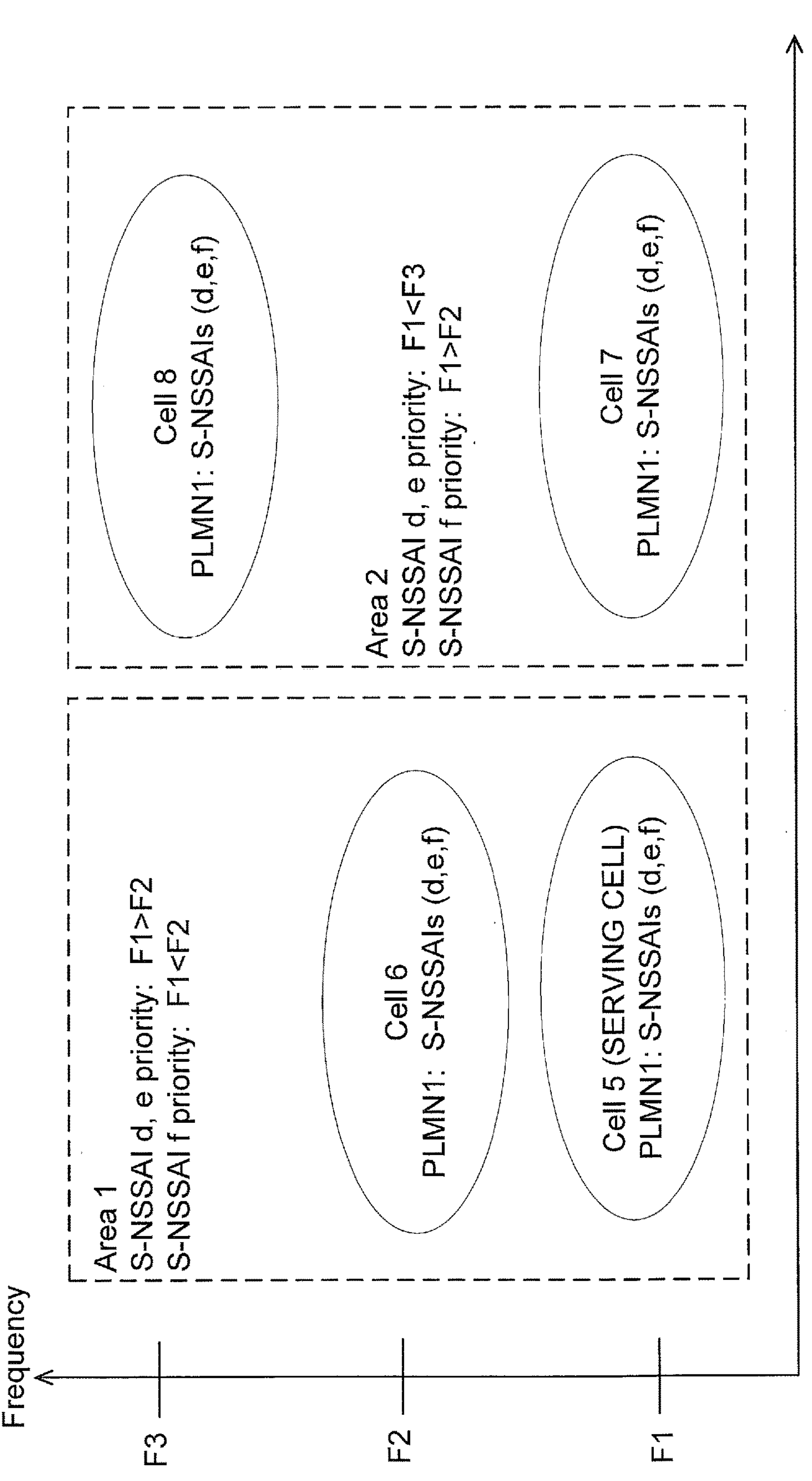
FIG. 42 is a diagrammatic view depicting an example scenario illustrating example applicability of the example embodiment and mode of the system of FIG. 43.

For example, FIG. 42 shows an example deployment scenario, wherein four cells, e.g., Cell 5, Cell 6, Cell 7 and Cell 8, support the same set of S-NSSAIs (d, e, f) within an PLMN, e.g., PLMN1. Cell 5 and Cell 6 are in an area, Area 1, and Cell 7 and Cell 8 are in another area (Area 2). Cell 5 and Cell 7 are operated on frequency F1; Cell 6 is operated on frequency F2; and Cell 8 is operated on frequency F3. As indicated in FIG. 42, in Area 1, F1 should be prioritized over F2 for S-NSSAI-List=(d,e) and F2 should be prioritized over F1 for S-NSSAI-List=(f). Likewise, in Area 2, F3 should be prioritized over F1 for S-NSSAI-List=(d,e), and F1 should be prioritized over F3 for SNSSAI-List=(f).

In the example embodiment and mode of FIG. 43-FIG. 46, a reselection procedure may be performed to determine whether or not to reselect one of the one or more neighboring cells, with the reselection procedure being based on the intended slice and the priority information associated with the one of the one or more neighboring cells. The example embodiment and mode of FIG. 43-FIG. 46 is an example implementation of the generic example embodiment and mode of FIG. 4 and FIG. 5, and as such explanations of FIG. 4 and FIG. 5 are applicable to communications system 20(43) of FIG. 43-FIG. 46 as well.

Figure 43:
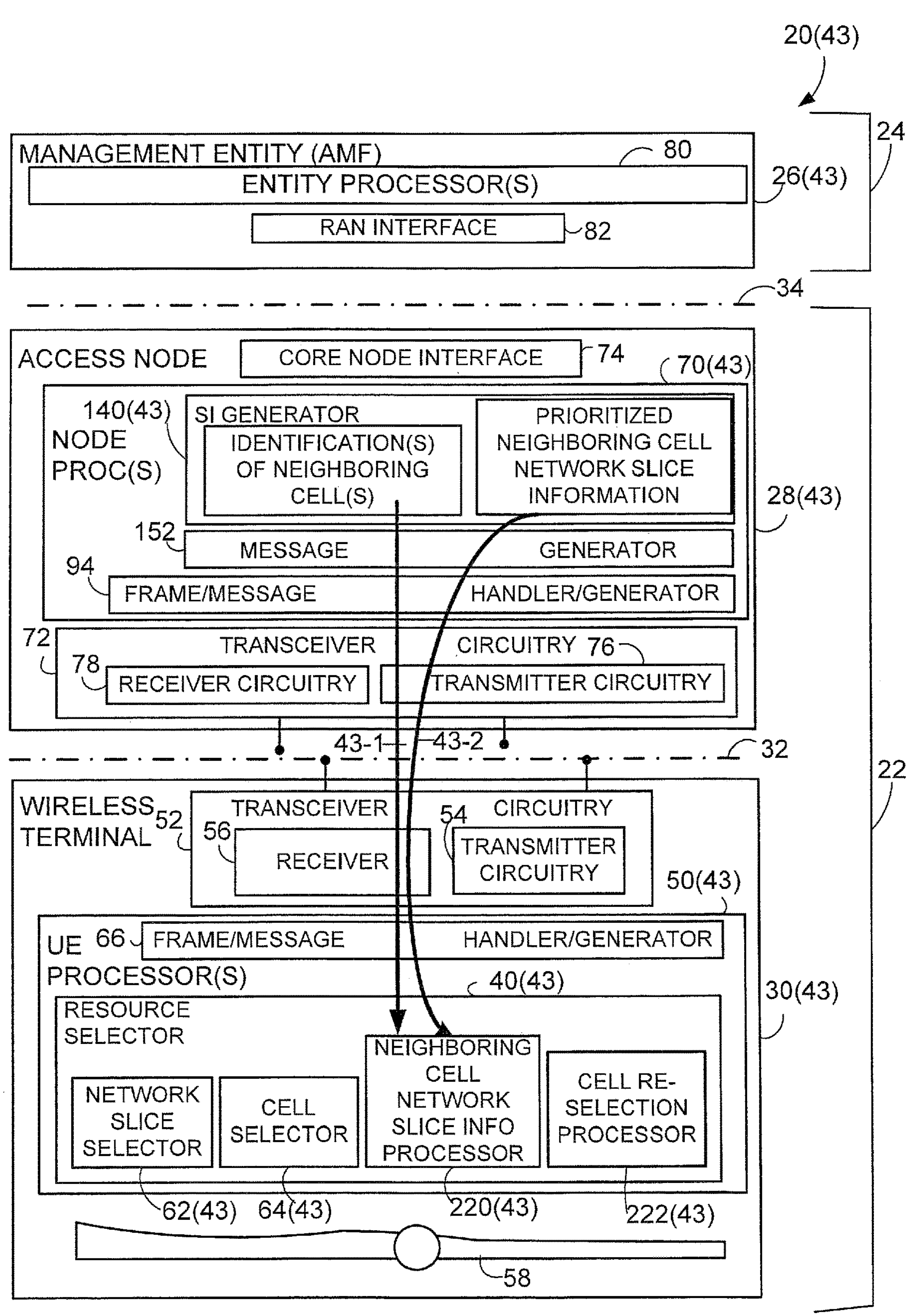
FIG. 43 is a schematic view of an example generic communications system in which a reselection procedure may be performed to determine whether or not to reselect one of the one or more neighboring cells, with the reselection procedure being based on the intended slice and the priority information associated with the one of the one or more neighboring cells.

For example, the communications system 20(43) of FIG. 43 comprises one or more radio access networks (RANs) 22 and one or more core networks (CNs) 24, with one management entities 26(43) being shown in the core network (CN) 24 by way of example and one access node 28(43) being shown by way of example in radio access network (RAN) 22. Although not illustrated as such, the communications system 20(43) of FIG. 43 may be and usually is utilized by plural PLMNs. In FIG. 43, wireless terminal 30 communicates with a management entity 26(43) of a core network through an access node 28(43) of a radio access network (RAN). The core network supports one or more network slices, each of the network slices providing a designated service within a public land mobile network (PLMN).

Since the communications system 20(4) is generic to various other example embodiments and modes described herein, it is again mentioned that the wireless terminal 30(43) may take various forms as mentioned above, and likewise that the access node 28(43) may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. Moreover, communications system 20(43) may be realized in virtualized and/or distributed and/or logical form.

Structures and functionalities of the communications system 20(43) of FIG. 43 which are common or essentially the same as one of more of the preceding example embodiments have the same reference numerals. For example, much of the structure of wireless terminal 30(43) of FIG. 43 and much of the structure of access node 28(43) of FIG. 43 are similar to preceding example embodiments.

The management entity 26(43) of communications system 20(43) may comprise core network entity processor circuitry 80 and interface 82 toward the radio access network (RAN) 22. The core network entity processor circuitry 80 may be realized or comprise one or more processors and at least one memory.

The access node 28(43) of the example embodiment and mode of FIG. 43 comprises node processor circuitry 70(43), node transceiver circuitry 72, and interface 74 to core network (CN) 24. The node transceiver circuitry 72 may comprise node transmitter circuitry 76 and node receiver circuitry 78. The transceiver circuitry 72 includes antenna(e) for the wireless transmission. Transmitter circuitry 76 may include, e.g., amplifier(s), modulation circuitry and other conventional transmission equipment. Receiver circuitry 78 may comprise, e.g., amplifiers, demodulation circuitry, and other conventional receiver equipment. As indicated above, various aspects of access node 28(43) including the node transceiver circuitry 72 may be realized by a distributed unit (DU) and a central unit (CU).

The node processor circuitry 70(43) of the access node 28(43) of FIG. 43 is shown as comprising, among other units and functionalities, system information generator 140(43); frame/message handler/generator 94 and message generator 152. In the example embodiment and mode of FIG. 43, the access node 28(26) generates the system information, e.g., one or more system information blocks (SIBs)s, to include, e.g., (1) identifications of one or more neighboring cells, and (2) prioritized neighboring cell network slice information associated with each of the one or more neighboring cells. In an example embodiment and mode the prioritized neighboring cell network slice information may indicate one or more network slices supported by the associated neighboring cell and priority information for the one or more network slices supported by the associated neighboring cell. The access node 28(43) may include memory, e.g., either memory integrated with node processor circuitry 70 or separate or associated therewith, which in turn includes computer program code, wherein the memory and the computer program code are configured to, working with the at least one processor, cause the access node 28(43) to perform at least at least the operations described herein.

The wireless terminal 30(43) of communications system 20(43) of FIG. 43 comprises terminal transceiver circuitry 52 and processor circuitry, e.g., terminal processor circuitry 50. The transceiver circuitry 52 in turn may comprise terminal transmitter circuitry 54 and terminal receiver circuitry 56. The transceiver circuitry 52 includes antenna(e) for the wireless transmission. Transmitter circuitry 54 may include, e.g., amplifier(s), modulation circuitry and other conventional transmission equipment. Receiver circuitry 56 may comprise, e.g., amplifiers, demodulation circuitry, and other conventional receiver equipment. FIG. 43 further shows that wireless terminal 30(43) may also comprise terminal interfaces 58. Such user interfaces may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The receiver circuitry 56 of wireless terminal 30(43) is configured to receive, from a cell served by the access node 28(43), the system information generated by system information generator 140(43).

The terminal processor circuitry 50(43) of FIG. 43 is shown as including terminal resource selector 40(43). The terminal resource selector 40(43) comprises network slice selector 62(43), cell selector 64(43); neighboring cell network slice information processor 220(43); and, cell re-selection processor 222(43), the functions of which are described below.

In the system of FIG. 43, the processor circuitry 70(43) of access node 28(43), and particularly system information generator 140(43), generates one or more system information blocks (SIBs) comprising identifications of one or more neighboring cells and the prioritized neighboring cell network slice information associated with each of the one or more neighboring cells. The prioritized neighboring cell network slice information serves to indicate one or more network slices supported by the associated neighboring cell and priority information for the one or more network slices supported by the associated neighboring cell. The node transmitter circuitry 76 transmits the one or more SIBs.

The terminal receiver circuitry 56 of wireless terminal 30(43) of FIG. 43 receives, from a serving cell served by access node 28(43), one or more system information blocks (SIBs) comprising the identifications of one or more neighboring cells and the prioritized neighboring cell network slice information associated with each of the one or more neighboring cells. As indicated above, the prioritized neighboring cell network slice information indicates one or more network slices supported by the associated neighboring cell and priority information for the one or more network slices supported by the associated neighboring cell. The terminal processor circuitry 50(43) selects at least one network slice as an intended network slice, and performs a cell reselection procedure while camping on the serving cell. The cell reselection procedure, which may be performed by cell re-selection processor 222(43), is performed to determine whether or not to reselect one of the one or more neighboring cells. The cell reselection procedure may be based on the intended slice and the priority information associated with the one of the one or more neighboring cells, as may be assessed by neighboring cell network slice information processor 220(43). The wireless terminal 30(43) may include memory, e.g., either memory integrated with terminal processor circuitry 50(43) or separate or associated therewith, which in turn includes computer program code, wherein the memory and the computer program code are configured to, working with the at least one processor, cause the wireless terminal 30(43) to perform at least at least the operations described herein.

One simple approach for specifying a priority to a specific radio band(s)/frequency(ies) of a specific network slice(s) within a specific PLMN(s) for a specific cell(s) is to assign a priority value to every unique/distinct combination of attributes such as cell ID, frequency, PLMN, S-NSSAI. In the case of the deployment scenario shown in FIG. 42, Table 21 shows an example for the assignment of priority values based on this approach. In Table 21, it is assumed that a higher value indicates a higher priority. However, any other forms/methods of prioritization can be alternatively used, such as a lower value indicating a higher priority, or use of an enumeration, e.g., {high, mid, low}.

TABLE 21

| Cell ID | Frequency | PLMN | S-NSSAI-List | Priority value | Relative priority |
|---|---|---|---|---|---|
| Cell 5 | F1 | PLMN1 | d, e | 2 | |
| | | | f | 2 | |
| Cell 6 | F2 | | d, e | 1 | −1 |
| | | | f | 3 | +1 |
| Cell 7 | F1 | | d, e | 2 | 0 |
| | | | f | 2 | 0 |
| Cell 8 | F3 | | d, e | 3 | +1 |
| | | | f | 1 | −1 |

Encoding of the priority information, such as that shown in Table 21, may result in large amount of data, especially when a number of cells, a number of network slices, a number of PLMNs and/or number of radio bands/frequencies become large. The example embodiment and mode of FIG. 43-FIG. 46 seeks, e.g., to minimize the amount of data that is to be included in system information to indicate priorities.

As a general principle, priority information for network slices may play a role during a cell reselection procedure, wherein a wireless terminal may look for a better cell. If there is a neighboring cell operated in a band/frequency whose priority for a desired network slice is higher than that of a serving cell, provided that other cell reselection criteria also satisfy, the wireless terminal may reselect the neighboring cell. Otherwise, the wireless terminal may stay camping on the serving cell. In contrast to a cell reselection procedure, a cell selection procedure is aimed to find a suitable cell, e.g., not a more/most suitable cell, and is completed once any suitable cell that supports a desired network slice is found. This means that the priority information may not be useful during the cell selection procedure and thus can be eliminated from the minimum SI, e.g., MIB, SIB1.

The listing of Table 22 shows formats/structures of SIB1, SIB3 and SIB4 as an enhanced implementation of this embodiment and mode, with Table 26 as a baseline. The optional information element s-NSSAI-ListPriority in Table 22 indicates a priority value for a corresponding list of s-NSSAI-List included in SIB1 indicated by sNSSAI-List-Index, or for a corresponding instance of sliceInfoPer-PLMN, e.g., with no indexing. Thus, priority information, such as s-NSSAI-ListPriority in Table 26, may specify a priority of one or more network slices and associated PLMN(s) for a neighboring cell operated in a radio frequency/band.

TABLE 22

```
SIB1 ::=            SEQUENCE {
...
    cellAccessRelatedInfo       CellAccessRelatedInfo,
...
}
CellAccessRelatedInfo    ::=  SEQUENCE {
    plmn-IdentityList          PLMN-IdentityInfoList,
    cellReservedForOtherUse       ENUMERATED {true} OPTIONAL,
-- Need R
    ...
}
PLMN-IdentityInfoList ::=   SEQUENCE (SIZE (1..maxPLMN)) OF
PLMN-IdentityInfo
PLMN-IdentityInfo ::=         SEQUENCE {
    plmn-IdentityList           SEQUENCE (SIZE (1..maxPLMN)) OF
PLMN-Identity,
    trackingAreaCode           TrackingAreaCode
OPTIONAL,      -- Need R
    ranac                       RAN-AreaCode
OPTIONAL,      -- Need R
    cellIdentity                 CellIdentity,
    cellReservedForOperatorUse      ENUMERATED {reserved,
notReserved},
    s-NSSAI-ListGroup          SEQUENCE (SIZE
(1..maxNrofS-NSSAI)) OF S-NSSAI-List OPTIONAL,          --
Need R
    ...
}
S-NSSAI-List ::= SEQUENCE (SIZE (1..maxNrofS-NSSAI)) OF
S-NSSAI
SIB3 ::=                  SEQUENCE {
    intraFreqNeighCellList      IntraFreqNeighCellList
OPTIONAL,   -- Need R
    intraFreqBlackCellList      IntraFreqBlackCellList
OPTIONAL,   -- Need R
    lateNonCriticalExtension      OCTET STRING
OPTIONAL,
    ...,
}
IntraFreqNeighCellList ::=                 SEQUENCE (SIZE
(1..maxCellIntra)) OF IntraFreqNeighCellInfo
IntraFreqNeighCellList-v1610::=         SEQUENCE (SIZE
(1..maxCellIntra)) OF IntraFreqNeighCellInfo-v1610
IntraFreqNeighCellInfo ::= SEQUENCE {
    physCellId              PhysCellId,
    q-OffsetCell              Q-OffsetRange,
    q-RxLevMinOffsetCell      INTEGER (1..8) OPTIONAL, -- Need R
    q-RxLevMinOffsetCellSUL      INTEGER (1..8) OPTIONAL, --
    Need R
    q-QualMinOffsetCell      INTEGER (1..8) OPTIONAL, -- Need R
    neighCellSliceInfoList        NeighCellSliceInfoList
OPTIONAL,   -- Need R
    ...
}
NeighCellSliceInfoList ::=      SEQUENCE (SIZE (1..maxPLMN)) OF
NeighCellSliceInfo
NeighCellSliceInfo ::=        SEQUENCE {
    C1                   CHOICE {
        s-NSSAI-ListIndex      INTEGER (0..maxPLMN−1),
        sliceInfoPerPLMN          SEQUENCE {
            plmn-IdentityList        SEQUENCE (SIZE
(1..maxPLMN)) OF PLMN-Identity,
            s-NSSAI-ListGroup        SEQUENCE (SIZE
(1..maxNrofS-NSSAI)) OF S-NSSAI-List
        }
    s-NSSAI-ListPriority      INTEGER (−8..7) OPTIONAL,--
    Need R
    ...
    }
}
SIB4 ::=                  SEQUENCE {
    interFreqCarrierFreqList     InterFreqCarrierFreqList,
    lateNonCriticalExtension      OCTET STRING OPTIONAL,
    ...,
}
InterFreqCarrierFreqList ::=      SEQUENCE (SIZE (1..maxFreq))
OF InterFreqCarrierFreqInfo
InterFreqCarrierFreqInfo ::=      SEQUENCE {
    dl-CarrierFreq              ARFCN-ValueNR,
    frequencyBandList           MultiFrequencyBandListNR-SIB
```

TABLE 22-continued

```
OPTIONAL,   -- Cond Mandatory
    frequencyBandListSUL        MultiFrequencyBandListNR-SIB
OPTIONAL,   -- Need R
    nrofSS-BlocksToAverage                INTEGER
(2..maxNrofSS-BlocksToAverage)                          OPTIONAL,
-- Need S
    absThreshSS-BlocksConsolidation      ThresholdNR
OPTIONAL,   -- Need S
    smtc                         SSB-MTC
OPTIONAL,   -- Need S
    ssbSubcarrierSpacing            SubcarrierSpacing,
  ssb-ToMeasure                  SSB-ToMeasure
OPTIONAL,   -- Need S
    deriveSSB-IndexFromCell         BOOLEAN,
    ss-RSSI-Measurement            SS-RSSI-Measurement
OPTIONAL,
    q-RxLevMin                     Q-RxLevMin,
    q-RxLevMinSUL               Q-RxLevMin
OPTIONAL,   -- Need R
    q-QualMin                   Q-QualMin
OPTIONAL,   -- Need S
    p-Max                       P-Max
OPTIONAL,   -- Need S
    t-ReselectionNR                  T-Reselection,
    t-ReselectionNR-SF             SpeedStateScaleFactors
OPTIONAL,   -- Need S
    threshX-HighP                ReselectionThreshold,
    threshX-LowP                ReselectionThreshold,
    threshX-Q               SEQUENCE {
        threshX-HighQ          ReselectionThresholdQ,
        threshX-LowQ          ReselectionThresholdQ
    }
OPTIONAL,   -- Cond RSRQ
    cellReselectionPriority          CellReselectionPriority
OPTIONAL,   -- Need R
    cellReselectionSubPriority
CellReselectionSubPriority
OPTIONAL,   -- Need R
    q-OffsetFreq                 Q-OffsetRange
DEFAULT dB0,
    interFreqNeighCellList           InterFreqNeighCellList
OPTIONAL,   -- Need R
    interFreqBlackCellList           InterFreqBlackCellList
OPTIONAL,   -- Need R
    ...
}
InterFreqNeighCellList ::=         SEQUENCE (SIZE
(1..maxCellInter)) OF InterFreqNeighCellInfo
InterFreqNeighCellInfo ::=       SEQUENCE {
    physCellId              PhysCellId,
    q-OffsetCell              Q-OffsetRange,
    q-RxLevMinOffsetCell         INTEGER (1..8)
OPTIONAL,   -- Need R
    q-RxLevMinOffsetCellSUL   INTEGER (1..8)
OPTIONAL,   -- Need R
    neighCellSliceInfoList         NeighCellSliceInfoList OPTIONAL,
-- Need R
    ...
}
```

It should be noted that s-NSSAI-ListPriority may indicate a priority of S-NSSAIs, e.g., s-NSSAI-List, supported in a neighboring cell of a radio frequency/band, relative to the S-NSSAIs supported in the serving cell. For example, assuming that a greater priority value represents a higher priority, if the priority value s-NSSAI-ListPriority is positive, a neighboring cell associated with the priority value is considered to be of higher priority than the serving cell, with regard to a corresponding set of S-NSSAIs. Likewise, if the priority value s-NSSAI-ListPriority is zero or not present, e.g., omitted, the neighboring cell is considered to be of the same priority. Furthermore, if the priority value s-NSSAI-ListPriority is negative, the neighboring cell is considered to be of a lower priority. The priority indicated by s-NSSAI-ListPriority may be taken into account as one of criteria for the cell reselection procedure.

A priority value may be also used to compare a priority of a set of S-NSSAIs supported in one neighboring cell to a priority of the same set of S-NSSAIs supported in another neighboring cell. For example, as shown in FIG. 42, the priority of the S-NSSAI set (d, e) for Cell 6 can be compared to the priority of the same set (d, e) for Cell 7 and Cell 8.

Figure 44:
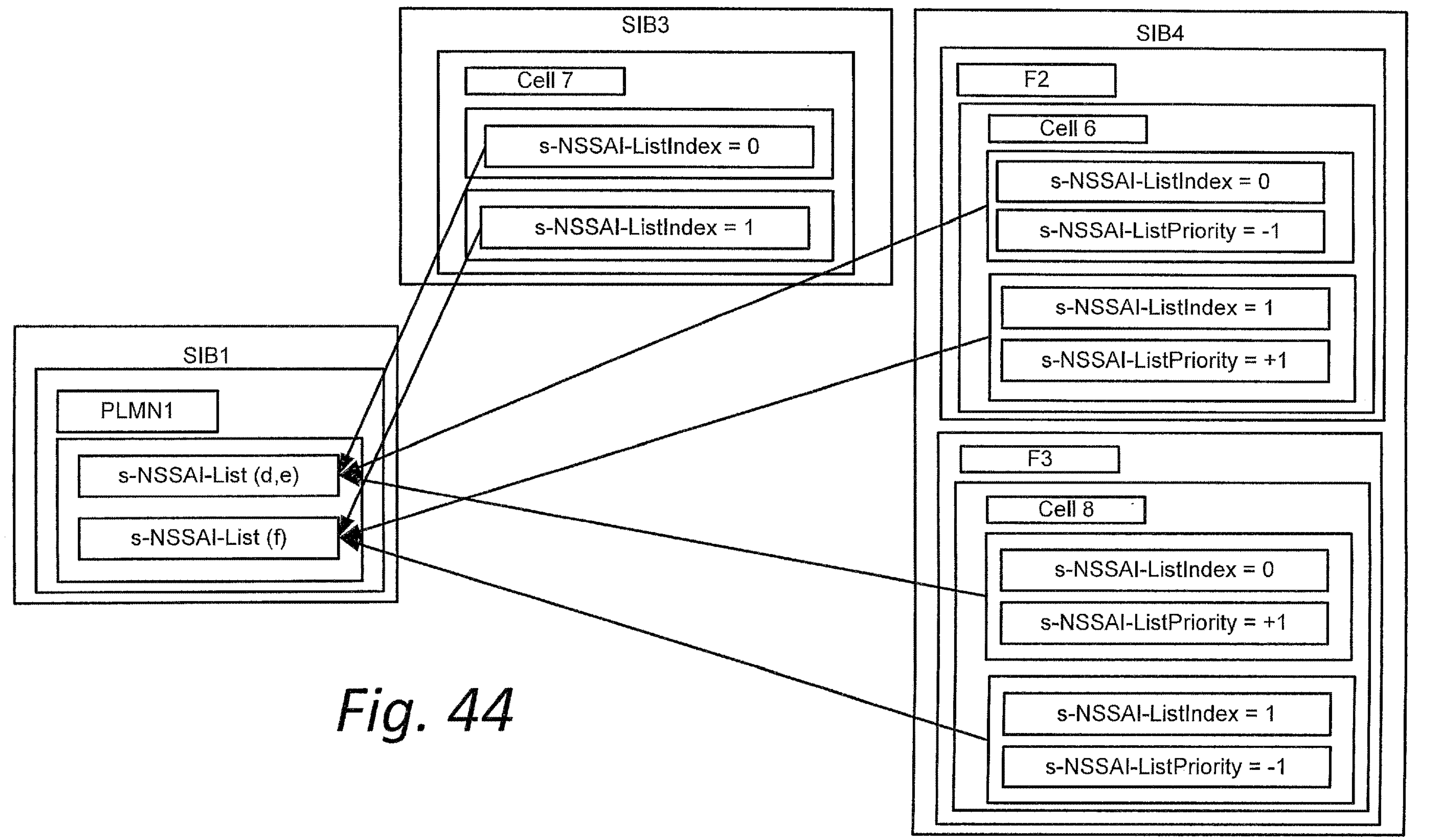
FIG. 44 is a diagrammatic view depicting a graphical representation of the contents of SIB1, SIB3 and SIB4 for the example deployment scenario illustrated in FIG. 42.

FIG. 44 depicts a graphical representation of the contents of SIB1, SIB3 and SIB4 for the deployment scenario illustrated in FIG. 42, based on the formats/structures shown in the listing of Table 22. It is assumed that each of the network slices supported in Cell 7 has the same priority as that of the serving cell, e.g., Cell 5, and thus the priority values are omitted for Cell 7.

Figure 45:
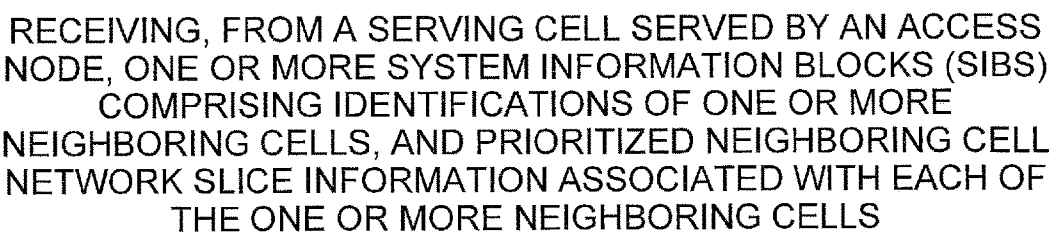
FIG. 45 is a flow chart showing example, representative steps or acts performed by a wireless terminal of the example embodiment and mode of FIG. 43.

FIG. 45 is a flow chart showing example representative steps or acts performed by a wireless terminal, e.g., UE, of the example embodiment and mode of FIG. 43-FIG. 46.

Act 45-1 comprises receiving, from a serving cell served by an access node such as access node 28(43), one or more system information blocks (SIBs) comprising identifications of one or more neighboring cells, and prioritized neighboring cell network slice information associated with each of the one or more neighboring cells. The prioritized neighboring cell network slice information may indicate (i) one or more network slices supported by the associated neighboring cell, and (ii) priority information for the one or more network slices supported by the associated neighboring cell. The priority information for the one or more network slices supported by the associated neighboring cell may comprise one or more priority values. Each of the priority values may be associated with a subset or all of the one or more network slices supported by the associated neighboring cell. Each of the priority values may represent a priority of the associated neighboring cell, wherein the priority may be used to evaluate the associated neighboring cell during the cell reselection procedure in a case that the subset includes a network slice corresponding to the intended network slice. In some example configurations, the priority of the associated neighboring cell represented by each of the priority values corresponds to a priority relative to a priority of the serving cell. The one or more SIBs may be received separately from minimum system information (SI), wherein the minimum SI is SI required for acquiring the one or more SIBs and performing an initial access. In some example configurations, the priority information may not be included in the minimum SI. Moreover, the one or more SIBs may further comprise one or more values of radio frequencies/bands, each of the one or more values being associated with one of the one or more neighboring cell.

Act 45-2 comprises selecting at least one network slice as an intended network slice. An intended network slice may be also referred as a desired network slice. The selection of the at least one network slice may be performed by network slice detector 62(43) in the example embodiment and mode of FIG. 43.

Act 45-3 comprises performing a cell selection procedure, to determine whether or not to reselect one of the one or more neighboring cells, based on the intended network slice and the priority information associated with the one of the one or more neighboring cells. Act 45-3 may be performed by one or more of cell selector 64(43) and cell re-selection processor 222(43).

Figure 46:
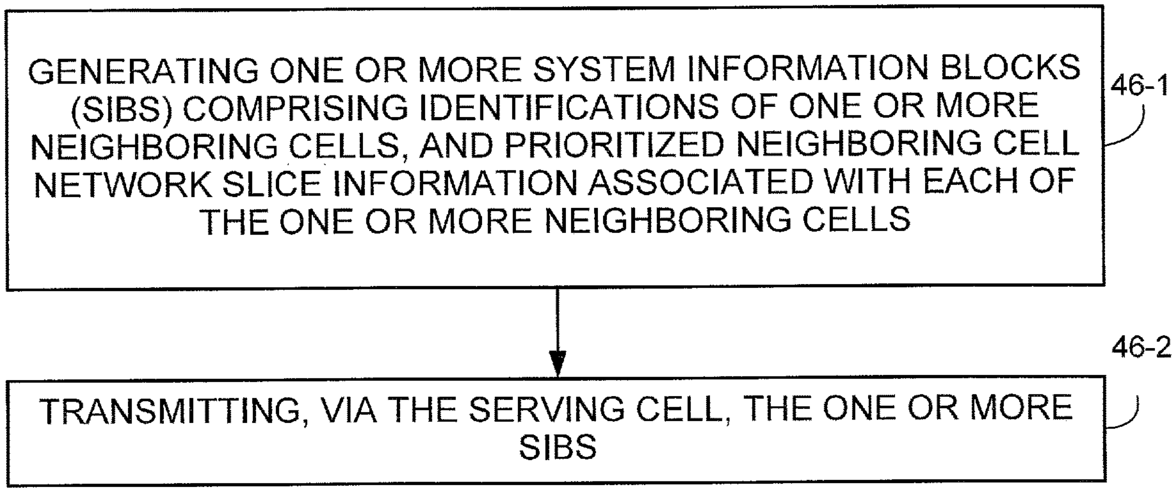
FIG. 46 is a flow chart showing example, representative steps or acts performed by an access node of the example embodiment and mode of FIG. 43.

FIG. 46 is a flow chart showing example representative steps or acts performed by an access node, e.g., gNB, of the example embodiment and mode of FIG. 43-FIG. 46, the access node serving a serving cell. For example, the acts of FIG. 46 may be performed by access node 28(43) of FIG. 43.

Act 46-1 comprises generating one or more system information blocks (SIBs) comprising identifications of one or more neighboring cells, and prioritized neighboring cell network slice information associated with each of the one or more neighboring cells. The prioritized neighboring cell network slice information may indicate one or more network slices supported by the associated neighboring cell, and priority information for the one or more network slices supported by the associated neighboring cell. The prioritized neighboring cell network slice information may indicate (i) one or more network slices supported by the associated neighboring cell, and (ii) priority information for the one or more network slices supported by the associated neighboring cell. The priority information for the one or more network slices supported by the associated neighboring cell may comprise one or more priority values. Each of the priority values may be associated with a subset or all of the one or more network slices supported by the associated neighboring cell. Each of the priority values may represent a priority of the associated neighboring cell, wherein the priority may be used to evaluate the associated neighboring cell during the cell reselection procedure in a case that the subset includes a network slice corresponding to the intended network slice. In some example configurations, the priority of the associated neighboring cell represented by the each of the priority values corresponds to a priority relative to a priority of the serving cell. The one or more SIBs may be received separately from minimum system information (SI), wherein the minimum SI is SI required for acquiring the one or more SIBs and performing an initial access. In some example configurations, the priority information may not be included in the minimum SI. Moreover, the one or more SIBs may further comprise one or more values of radio frequencies/bands, each of the one or more values being associated with one of the one or more neighboring cells.

Act 46-2 comprises transmitting, via the serving cell, the one or more SIBs. Act 46-2 may, for example, be performed by transmitter circuitry 76 of access node 28(43).

10.0 Validity of Network Slice-Related Information Provided by Dedicated Signaling In some of the previous example embodiments and modes, it is disclosed that network slice support/availability information as well as network slice priority information can be provided by system information broadcast and/or a dedicated signaling, e.g., RRC dedicated signaling or NAS dedicated signaling. The example embodiment and mode of FIG. 47-FIG. 51 discloses, e.g., a relationship between the slice information provided by broadcast and slice information provided by dedicated signaling.

According to the various previous embodiments, a cell may broadcast a set of configuration parameters for network slice-related information, such as the serving cell network slice information, the neighboring cell network slice information and the priority information for network slices. A wireless terminal that camps on the cell may acquire the network slice-related information and use it for a cell (re)selection procedure. As discussed in the example embodiment and mode of FIG. 47-FIG. 51, it is possible that the network may provide in parallel another set of configuration parameters for network slice-related information via a dedicated signaling. Such may be based on a network operator's decision. This set of configuration parameters may be customized to the wireless terminal.

In the example embodiment and mode of FIG. 47-FIG. 51, dedicated network slice-related information may be provided to a wireless terminal, UE, via RRC dedicated signaling. The dedicated network slice-related information is valid within the current registration area, overrides common network slice-related information broadcasted by system information, and is discarded upon occurrence of a predefined event. In one example implementation, the predefined event may occur when the UE moves outside of the registration area. In another example implementation, the predefined event may be elapse of a time period, e.g., at expiration of a timer. The example embodiment and mode of FIG. 47-FIG. 51 is an example implementation of the generic example embodiment and mode of FIG. 4 and FIG. 5, and as such explanations of FIG. 4 and FIG. 5 are applicable to communications system 20(47) of FIG. 47-FIG. 51 as well.

Figure 47:
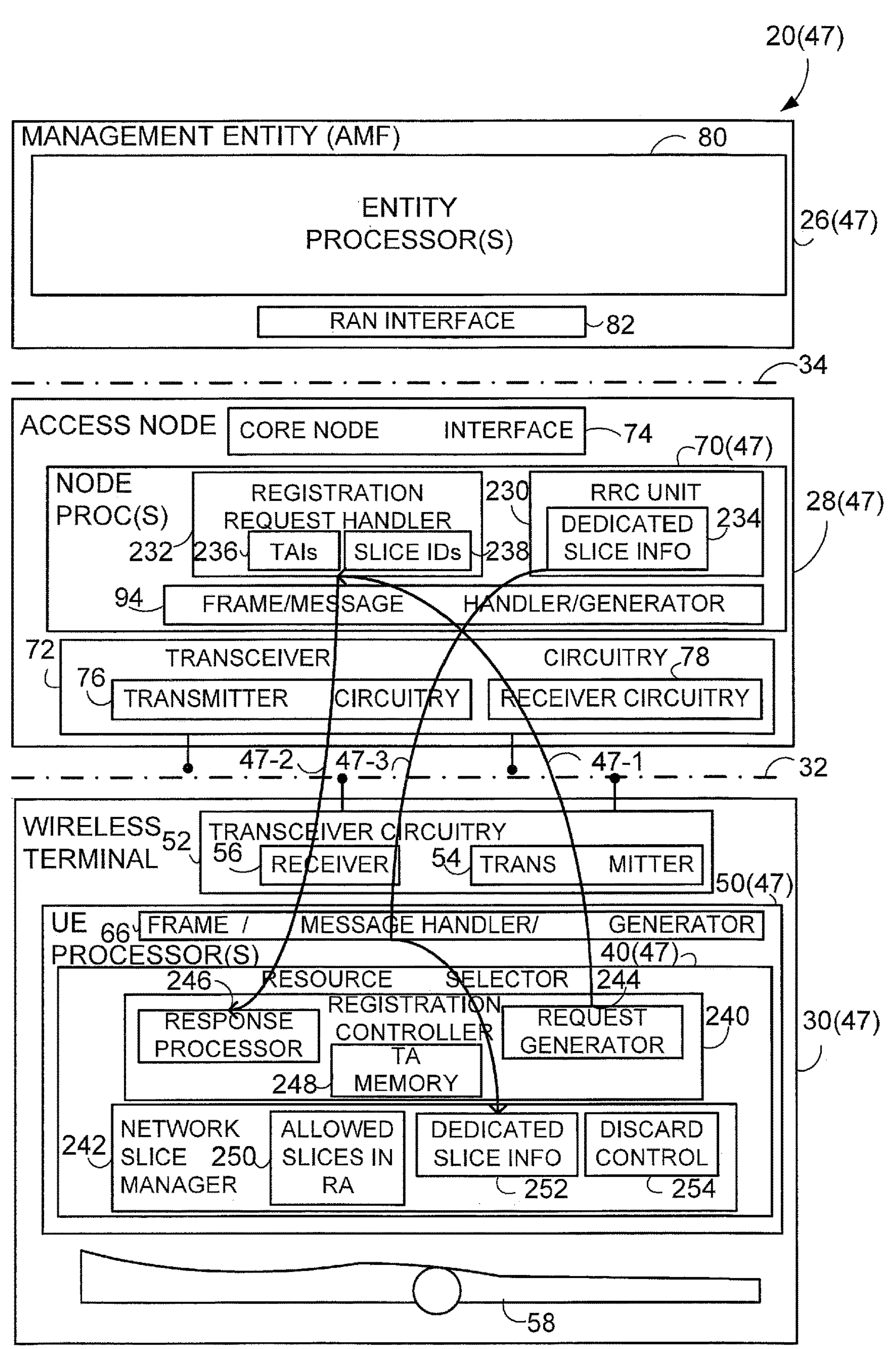
FIG. 47 is a schematic view of an example generic communications system in which a wireless terminal obtains multiple sets of parameters for the network slice-related information including a set of parameters provided by broadcast, referred as common network slice-related information, as well as a set of parameters provided by an RRC dedicated signalling, referred as dedicated network slice-related information.

The communications system 20(47) of FIG. 47 comprises one or more radio access networks (RANs) 22 and one or more core networks (CNs) 24, with one management entity 26(47) being shown in the core network (CN) 24 by way of example and one access node 28(47) being shown by way of example in radio access network (RAN) 22. Although not illustrated as such, the communications system 20(47) of FIG. 47 may be and usually is utilized by plural PLMNs. In FIG. 47, wireless terminal 30(47) communicates with a management entity 26(47) of a core network through an access node 28(47) of a radio access network (RAN). The core network supports one or more network slices, each of the network slices providing a designated service within a public land mobile network (PLMN).

Since the communications system 20(4) is generic to various other example embodiments and modes described herein, it is again mentioned that the wireless terminal 30(47) may take various forms as mentioned above, and likewise that the access node 28(47) may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. Moreover, communications system 20(47) may be realized in virtualized and/or distributed and/or logical form.

Structures and functionalities of the communications system 20(47) of FIG. 47 which are common or essentially the same as one of more of the preceding example embodiments have the same initial reference numerals. For example, much of the structure of wireless terminal 30(47) of FIG. 47 and much of the structure of access node 28(47) of FIG. 47 are similar to preceding example embodiments.

The management entity 26(47) of communications system 20(47) may comprise core network entity processor circuitry 80 and interface 82 toward the radio access network (RAN) 22. The core network entity processor circuitry 80 may be realized or comprise one or more processors and at least one memory.

The access node 28(47) of the example embodiment and mode of FIG. 47 comprises node processor circuitry 70(47), node transceiver circuitry 72, and interface 74 to core network (CN) 24. The node transceiver circuitry 72 may comprise node transmitter circuitry 76 and node receiver circuitry 78. The transceiver circuitry 72 includes antenna(e) for the wireless transmission. Transmitter circuitry 76 may include, e.g., amplifier(s), modulation circuitry and other conventional transmission equipment. Receiver circuitry 78 may comprise, e.g., amplifiers, demodulation circuitry, and other conventional receiver equipment. As indicated above, various aspects of access node 28(47) including the node transceiver circuitry 72 may be realized by a distributed unit (DU) and a central unit (CU).

The node processor circuitry 70(47) of the access node 28(47) of FIG. 47 is shown as comprising, among other units and functionalities, frame/message handler/generator 94, radio resource control (RRC) unit 230, and registration request handler 232. The radio resource control (RRC) unit 230 is configured to generate RRC messages that may include dedicated network slice information, which may be stored in a dedicated network slice information memory 234. Similarly, the registration request handler 232 may generate messages that may include tracking area (TA) identifiers (TAIs) and/or network slice information, such as common network slice information. As such, the registration request handler 232 may include tracking area (TA) identifier (TAIs) memory 236 and network slice information memory 238. It should be understood that the units and functionalities of access node 28(47) and of node processor circuitry 70(47) in particular may be otherwise arranged, provided, allocated, or referenced by other monikers.

The wireless terminal 30(47) of communications system 20(47) of FIG. 47 comprises terminal transceiver circuitry 52 and processor circuitry, e.g., terminal processor circuitry 50(47). The transceiver circuitry 52 in turn may comprise terminal transmitter circuitry 54 and terminal receiver circuitry 56. The transceiver circuitry 52 includes antenna(e) for the wireless transmission. Transmitter circuitry 54 may include, e.g., amplifier(s), modulation circuitry and other conventional transmission equipment. Receiver circuitry 56 may comprise, e.g., amplifiers, demodulation circuitry, and other conventional receiver equipment. FIG. 47 further shows that wireless terminal 30(47) may also comprise terminal interfaces 58. Such user interfaces may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The receiver circuitry 56 of wireless terminal 30(47) is configured to receive, from a cell served by the access node 28(47), both messages originated by radio resource control (RRC) unit 230 and messages originated by registration request handler 232. Both types of messages may be generated by node frame/message handler/generator 94.

The terminal processor circuitry 50(47) of FIG. 47 is shown as including frame/message generator/handler 66 and terminal resource selector 40(47). The terminal resource selector 40(47) comprises registration controller 240 and network slice manager 242. The registration controller 240 comprises registration request message generator 244 and registration response message processor 246, as well as tracking area (TA) memory 248. The network slice manager 242 comprises a memory for storing the allowed network slices in a registration area, e.g., allowed network slices in RA memory 250; dedicated network slice information memory 252; and dedicated network slice discard controller 254. It should be understood that the units and functionalities of wireless terminal 30(47) and of terminal processor circuitry 50(47) in particular may be otherwise arranged, provided, allocated, or referenced by other monikers.

In the system of FIG. 47, node receiver circuitry 78 receives from wireless terminal 30(47) a request message 47-1 comprising one or more identifiers of requested network slices. Upon receipt of such request message, the processor circuitry 70(47) of access node 28(47) generates a response message 47-2 which comprises one or more tracking area identities as a registration area (RA) and one or more network slice identifiers indicating allowed network slices in the RA. In one non-limiting implementation, the request message 47-1 may be, for example, a registration request message and the response message 47-2 may be a registration accept message, in which case the request message 47-1 is handled and the response message 47-2 is originated by registration request handler 232. The one or more tracking area identities may be obtained from tracking area (TA) identifier (TAIs) memory 236, and the one or more network slice identifiers indicating allowed network slices in the RA may be obtained from network slice information memory 238. Ultimately, both tracking area (TA) identifier (TAIs) memory 236 and network slice information memory 238 may be supplied with respective information from management entity 26(47). The transmitter circuitry 76 of access node 28(47) configured to transmit, in response to the request message 47-1, the response or accept message 47-2 comprising the one or more tracking area identities as a registration area (RA) and the one or more network slice identifiers indicating allowed network slices in the RA. In addition, the node transmitter circuitry 76 may transmit a dedicated network slice information message 47-3, such as a dedicated Radio Resource Control (RRC) message comprising dedicated network slice-related information associated with the allowed network slices. The dedicated network slice-related information may be used by the wireless terminal to perform a cell reselection procedure to reselect a cell.

The terminal transmitter circuitry 54 of wireless terminal 30(47) transmits the request message 47-1 comprising one or more identifiers of requested network slices to access node 28(47). As indicated above, the request message 47-1 may be a registration request message. The terminal receiver circuitry 56 of wireless terminal 30(47) of FIG. 47 receives, from a serving cell served by access node 28(47) and in response to the request message, the response message 47-2, which may be a registration accept message. As explained above, the response message 47-2 may comprise one or more tracking area identities as a registration area (RA) and one or more network slice identifiers indicating allowed network slices in the RA.

In addition, through its terminal receiver circuitry 56 the wireless terminal 30(47) receives the dedicated network slice information message 47-3, which may be a dedicated Radio Resource Control (RRC) message comprising dedicated network slice-related information associated with the allowed network slices. The dedicated network slice-related information is stored in dedicated network slice information memory 252 and may be and preferably is used to perform a cell reselection procedure to reselect a cell. In addition, the dedicated network slice discard controller 254 may discard the dedicated network slice information upon occurrence of a predefined event. In one example implementation, the predefined event may occur when the UE moves outside of the registration area. In another example implementation, the predefined event may be elapse of a time period, e.g., at expiration of a timer.

Figure 48:
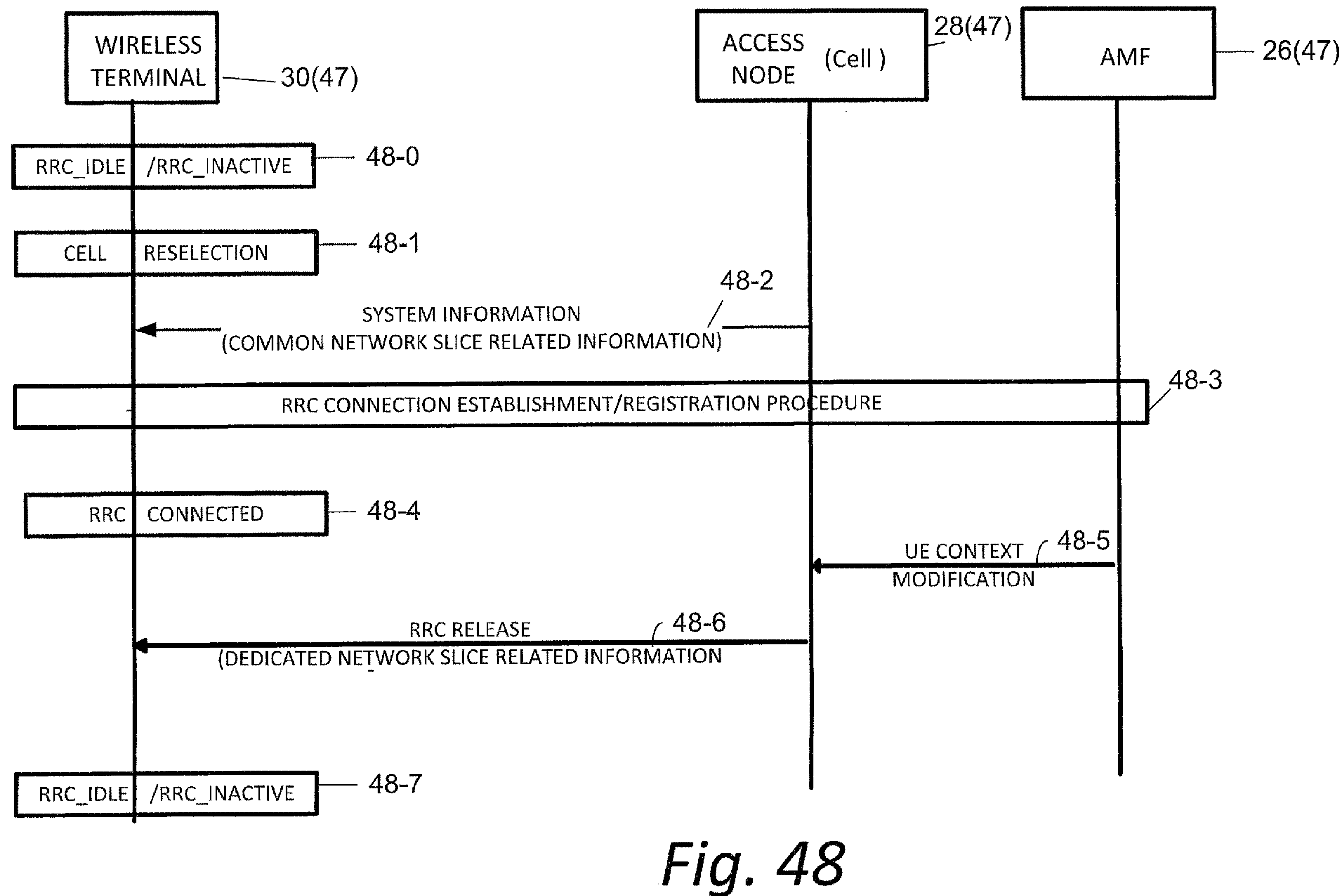
FIG. 48 is a diagrammatic view depicting a scenario of operation of the system of FIG. 47.

FIG. 48 illustrates a scenario where the wireless terminal obtains multiple sets of parameters for the network slice-related information, including a first set of parameters provided by broadcast and referred as common network slice-related information as well as a second set provided by an RRC dedicated signaling and referred as dedicated network slice-related information. At the beginning, as act 48-0 the wireless terminal 30(47) is in RRC_IDLE or RRC_INACTIVE state, and as act 48-1 (*re*)selects a cell served by an access node (e.g., a gNB). As act 48-2 the wireless terminal may then acquire system information. The system information may comprise one or more system information blocks, SIBs including, but not limited to, a cell identity, PLMN identity(ies), tracking area code(s) and the common network slice-related information. In a case that the tracking area code(s) indicates that the cell belongs to a registration area (RA) different from a currently registered RA, as act 48-3 the wireless terminal may perform a connection establishment procedure and a registration procedure. As shown in FIG. 3, the connection establishment procedure and the registration procedure may be performed in parallel. In this regard, some of non-access stratum, NAS, messages, such as the Registration Request message may be "piggy-bagged" in an RRC message, e.g., in a RRCSetupComplete message. The connection establishment procedure allows the wireless terminal to inform the network of a PLMN that the wireless terminal has selected. The Registration Request message, which is also represented by request message 47-1 shown in FIG. 47, may comprise one or more S-NSSAIs as a Requested NSSAI. The Registration Accept message, in response to the Registration Request message, may comprise a list of tracking area code(s) defining a new RA for the wireless terminal, and one or more S-NSSAIs as an Allowed NSSAI. The Registration Accept message discussed with respect to act 48-3 is an example of the more generic response message 47-2 of FIG. 47.

As shown by act 48-4, the connection establishment procedure performed as act 48-3 may cause the wireless terminal to enter RRC_CONNECTED state. Upon completion of the registration procedure of act 48-3, as act 48-5 the AMF, a management entity of a core network such as management entity 26(43) of FIG. 47, may send to the access node a message, e.g., UE Context Modification message, comprising information sufficient for the access node to generate the dedicated network slice-related information. In some configurations, the access node 28(47) may be pre-configured with multiple sets of network slice-related information and the message from the AMF may comprise an index/indices of one or more of such multiple sets based on the Allowed NSSAI and the selected PLMN. Based on the message of act 48-5, as act 48-6 the access node 28(47) may compose an RRCRelease message comprising the dedicated network slice-related information and an instruction, e.g., suspendConfig, for a next RRC state, RRC_IDLE or RRC_INACTIVE. The RRCRelease message is an example of the generic dedicated network slice information message 47-3 described in FIG. 47.

As act 48-7 the wireless terminal enters RRC_IDLE or RRC_INACTIVE based on the instruction of act 48-6 and uses the dedicated network slice-related information for upcoming cell (re)selections.

In some example deployment scenarios, the dedicated network slice-related information may override the common network slice-related information. That is, even if the wireless terminal is already configured with the common network slice-related information obtained from a currently serving cell or a cell within a validity area of the common network slice-related information, the wireless terminal may use dedicated network slice-related information when provided. In one configuration, the dedicated network slice-related information may be associated with a timer and may be valid until the timer expires. In this example configuration, the dedicated network slice discard controller 254 may comprise or be connected to the timer. The timer may be pre-configured or may be configured by the message that comprises the dedicated network slice-related information, e.g., RRCRelease message. In one example implementation, the timer may be a T320 timer, e.g., a cell reselection priorities validity timer per 3GPP TS 38.331. In another example implementation, the timer may be a timer separately configured from T320. In any case, upon an expiration of the timer, the wireless terminal may invalidate and discard the dedicated network slice-related information.

It was mentioned above, e.g., in section 7.0, that all S-NSSAIs in the Allowed NSSAI may be supported within the tracking area, TA, and also in all TAs of the registration area, RA, resulting in homogeneous slice availability within an RA. Moreover, the dedicated network slice-related information may be given based on the Allowed NSSAI, where the Allowed NSSAI is valid in the RA of the selected PLMN. Therefore, in the example embodiment and mode of FIG. 47-FIG. 51, the dedicated network slice-related information may be considered to be valid within an RA where the dedicated network slice-related information is given, and should be invalidated when the wireless terminal moves out of the RA.

Figure 49:
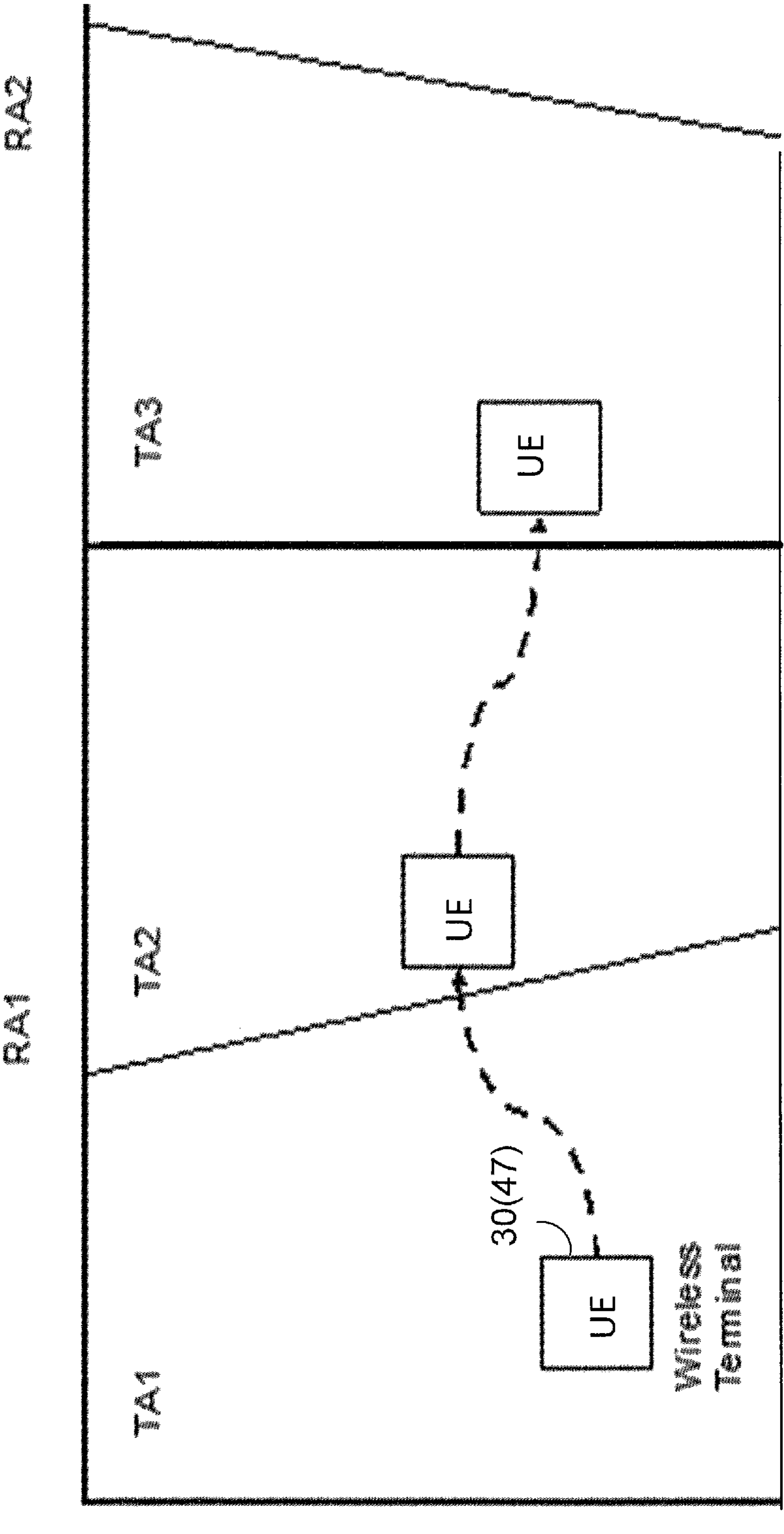
FIG. 49 is a diagrammatic view depicting a scenario of operation of the system of FIG. 47 wherein discarding of dedicated network slice-related information may occur upon entering a cell not belonging to a certain registration area.

FIG. 49 shows an example scenario of the example embodiment and mode of FIG. 47-FIG. 51. In FIG. 49 registration area RA1 comprises tracking area TA1 and tracking area TA2, and registration area RA2 comprises tracking area TA3. Registration area RA2 may possibly comprises other tracking areas not illustrated. Each TA may be covered by one or more unillustrated cells. In the scenario of FIG. 49, a wireless terminal such as wireless terminal 30(47) may first camp on a cell within TA1 and acquire the common network slice-related information by system information broadcast. The wireless terminal may then perform the procedure of act 48-3 as shown in FIG. 48. During the procedure, the wireless terminal may obtain the current RA, i.e., TA1 and TA2, and an Allowed NSSAI. At the end of the procedure the network may decide whether or not to configure the dedicated network slice-related information to the wireless terminal by the dedicated network slice information message 47-3, e.g., by the RRCRelease message. The wireless terminal may use the dedicated network slice-related information if configured, otherwise may use the common network slice-related information.

Continuing further with the example scenario of FIG. 49, the wireless terminal then enters TA2, which is a part of the current RA. As such, the wireless terminal may not perform the registration procedure and the dedicated network slice-related information, if configured, may still be valid unless the timer has already expired.

Next the wireless terminal 30(47) enters TA3, which is outside of RA1. In TA3 the wireless terminal may obtain system information from a cell in TA3 and recognize that the cell does not belong to the current registration area RA1. Thus, the wireless terminal 30(47) of this example embodiment and mode may invalidate the dedicated network slice-related information and stop the timer if the timer has not expired yet. Further, before performing a registration procedure in TA3, the wireless terminal may perform a cell reselection based on the common network slice-related information. This common network slice-related information may be obtained via the system information received from the cell in TA3 or obtained from a cell outside of TA3, e.g., likely a TA2 cell close to the border to TA3. The wireless terminal may then perform the registration procedure, which may provide a new RA including TA3, a new Allowed NSSAI and possibly new dedicated network slice-related information. The invalidated dedicated network slice-related information may be also discarded immediately from its memory or may be kept until completing a successful registration procedure in TA3. In the latter case, the invalidated dedicated network slice-related information may be re-validated if the wireless terminal happens to reselect a TA2 cell.

In one example implementation, types of the configuration parameters provided by the dedicated network slice-related information may be identical or similar to types of the configuration parameters provided by the common network slice-related information. Specifically, the dedicated network slice-related information may provide some or all of the aforementioned information types, such as the serving cell network slice information, neighboring cell network slice information and the priority information for network slices. Table 23A shows an example format of the dedicated network slice-related information in the RRCRelease message, including a new information element DedicatedSliceRelatedInfo, which further comprises servingCellSliceInfo as the serving cell network slice information, IntraFreqNeighCellList and InterFreqNeighCellList as the neighboring cell network slice information. ServingCellSliceInfo is a list of S-NSSAIs supported in the serving cell. A timer t3xy, the timer configured separately from t320, is also included in the message. The contents of IntraFreqNeighCellList and InterFreqNeighCellList are defined in Table 22.

TABLE 23A

```
-- ASN1START
-- TAG-RRCRELEASE-START
RRCRelease ::=          SEQUENCE {
  rrc-TransactionIdentifier   RRC-TransactionIdentifier,
  criticalExtensions          CHOICE {
    rrcRelease               RRCRelease-IEs,
    criticalExtensionsFuture       SEQUENCE { }
  }
}
RRCRelease-IEs ::=          SEQUENCE {
  redirectedCarrierInfo        RedirectedCarrierInfo
OPTIONAL, -- Need N
  cellReselectionPriorities    CellReselectionPriorities
OPTIONAL, - Need R
  suspendConfig          SuspendConfig
OPTIONAL, -- Need R
  deprioritisationReq       SEQUENCE {
    deprioritisationType       ENUMERATED {frequency, nr},
    deprioritisationTimer       ENUMERATED {min5, min10,
min15, min30}
  }
OPTIONAL, -- Need N
  lateNonCriticalExtension          OCTET STRING
OPTIONAL,
  nonCriticalExtension            RRCRelease-v1540-IEs
OPTIONAL
}
RRCRelease-v1540-IEs ::=       SEQUENCE {
  waitTime               RejectWaitTime
OPTIONAL, -- Need N
  nonCriticalExtension            RRCRelease-v1610-IEs
OPTIONAL
RRCRelease-v1610-IEs ::=       SEQUENCE {
  voiceFallbackIndication-r16   ENUMERATED {true}
OPTIONAL, -- Need N
  measIdleConfig-r16          SetupRelease
{MeasIdleConfigDedicated-r16}   OPTIONAL, -- Need M
  nonCriticalExtension        RRCRelease-v1700-IEs
OPTIONAL
}
RRCRelease-v1700-IEs ::=       SEQUENCE {
  dedicatedSliceRelatedInfo   DedicatedSliceRelatedInfo
OPTIONAL, -- Need N
  nonCriticalExtension        RRCRelease-v1610-IEs
OPTIONAL
}
DedicatedSliceRelatedInfo ::= SEQUENCE {
  servingCellSliceInfo         SEQUENCE (SIZE
(1..maxNrofS-NSSAI)) OF S-NSSAI   OPTIONAL, -- Need N
  intraFreqNeighCellList       IntraFreqNeighCellList
```

TABLE 23A-continued

```
OPTIONAL, -- Need N
  interFreqNeighCellList       InterFreqNeighCellList
OPTIONAL, -- Need N
  t3xy                 ENUMERATED {min5, min10,
min20, min30, min60, min120, min180, spare1}   OPTIONAL,      --
Need R
}
RedirectedCarrierInfo ::=      CHOICE {
  nr                 CarrierInfoNR,
  eutra                 RedirectedCarrierInfo-EUTRA,
  ...
}
RedirectedCarrierInfo-EUTRA ::= SEQUENCE {
  eutraFrequency              ARFCN-ValueEUTRA,
  cnType              ENUMERATED {epc, fiveGC}
OPTIONAL -- Need N
}
CarrierInfoNR ::=          SEQUENCE {
  carrierFreq              ARFCN-ValueNR,
  ssbSubcarrierSpacing         SubcarrierSpacing,
  smtc              SSB-MTC
OPTIONAL,       -- Need S
  ...
}
SuspendConfig ::=          SEQUENCE {
  fullI-RNTI             I-RNTI-Value,
  shortI-RNTI             ShortI-RNTI-Value,
  ran-PagingCycle              PagingCycle,
  ran-NotificationAreaInfo        RAN-NotificationAreaInfo
OPTIONAL, -- Need M
  t380              PeriodicRNAU-TimerValue
OPTIONAL, -- Need R
  nextHopChainingCount          NextHopChainingCount,
  ...
}
PeriodicRNAU-TimerValue ::=       ENUMERATED {min5, min10,
min20, min30, min60, min120, min360, min720}
CellReselectionPriorities ::=   SEQUENCE {
  freqPriorityListEUTRA          FreqPriorityListEUTRA
OPTIONAL, -- Need M
  freqPriorityListNR          FreqPriorityListNR
OPTIONAL, -- Need M
  t320                 ENUMERATED {min5, min10, min20,
min30, min60, min120, min180, spare1}   OPTIONAL,       -- Need
R
  ...
}
PagingCycle ::=          ENUMERATED {rf32, rf64, rf128, rf256}
FreqPriorityListEUTRA ::= SEQUENCE (SIZE 1..maxFreq)) OF
FreqPriorityEUTRA
FreqPriorityListNR ::=   SEQUENCE (SIZE 1..maxFreq)) OF
FreqPriorityNR
FreqPriorityEUTRA ::=      SEQUENCE {
  carrierFreq              ARFCN-ValueEUTRA,
  cellReselectionPriority          CellReselectionPriority,
  cellReselectionSubPriority       CellReselectionSubPriority
OPTIONAL -- Need R
}
FreqPriorityNR ::=          SEQUENCE {
  carrierFreq              ARFCN-ValueNR,
  cellReselectionPriority    CellReselectionPriority,
  cellReselectionSubPriority CellReselectionSubPriority
OPTIONAL -- Need R
}
RAN-NotificationAreaInfo ::= CHOICE {
  cellList              PLMN-RAN-AreaCellList,
  ran-AreaConfigList          PLMN-RAN-AreaConfigList,
  ...
}
PLMN-RAN-AreaCellList ::=   SEQUENCE (SIZE (1..
maxPLMNIdentities)) OF PLMN-RAN-AreaCell
PLMN-RAN-AreaCell ::=       SEQUENCE {
  plmn-Identity          PLMN-Identity
OPTIONAL, -- Need S
  ran-AreaCells             SEQUENCE (SIZE (1..32)) OF
CellIdentity
}
PLMN-RAN-AreaConfigList ::=   SEQUENCE (SIZE
(1..maxPLMNIdentities)) OF PLMN-RAN-AreaConfig
PLMN-RAN-AreaConfig ::=          SEQUENCE {
  plmn-Identity           PLMN-Identity
OPTIONAL, -- Need S
  ran-Area            SEQUENCE (SIZE (1..16)) OF
RAN-AreaConfig
}
RAN-AreaConfig ::=          SEQUENCE {
  trackingAreaCode          TrackingAreaCode,
  ran-AreaCodeList          SEQUENCE (SIZE (1..32)) OF
RAN-AreaCode       OPTIONAL    -- Need R
}
-- TAG-RRCRELEASE-STOP
-- ASN1STOP
```

In another example implementation, the configuration parameters provided by the dedicated network slice-related information may provide different types of configuration parameters. Considering that availability of network slices within a registration area RA may be homogeneous, and that such available network slices can be indicated as an Allowed NSSAI during the registration procedure, the dedicated network slice-related information may not need to indicate the availability of network slices, since the available network slices information is guaranteed to be supported within an RA. Instead, the dedicated network slice-related information may be used only for prioritization. In a case that radio frequency prioritization is also considered to be homogeneous within an RA for a given network slice, the dedicated network slice-related information may comprise a prioritized list of radio frequency per network slice. If the prioritization for a given network slice is cell-by-cell basis, e.g., not homogeneous within an RA, the dedicated network slice-related information may comprise a prioritized cell list per network slice. Table 23B shows an example format of the dedicated network slice-related information of this configuration supporting both the frequency-based prioritization and the cell-by-cell based prioritization. In Table 23B, the DedicatedSliceRelatedInfo replaces the DedicatedSliceRelatedInfo of Table 23A.

TABLE 23B

```
DedicatedSliceRelatedInfo ::=   SEQUENCE {
  prioritizedSliceInfoList       SEQUENCE (SIZE
(1..maxNrofS-NSSAI)) OF PrioritizedSliceInfo
  t3xy                 ENUMERATED {min5, min10, min20,
min30, min60, min120, min180, spare1} OPTIONAL, -- Need
R
}
PrioritizedSliceInfo ::= SEQUENCE {
  s-NSSAIList              SEQUENCE (SIZE
(1..maxNrofS-NSSAI)) OF S-NSSAI,
  intraFreqCellPriorityList SEQUENCE (SIZE
(1..maxCellIntra)) OF IntraFreqCellPriorityInfo OPTIONAL,
-- Need R
  interFreqCellPriorityList SEQUENCE (SIZE
(1..maxCellIntra)) OF InterFreqCellPriorityInfo OPTIONAL,
-- Need R
  freqPriorityList              SEQUENCE (SIZE (1..maxFreq)) OF
FreqPriorityInfo OPTIONAL        -- Need R
  }
}
IntraFreqCellPriorityInfo ::= SEQUENCE {
  physCellId             PhysCellId,
  cellReselectionPriority   CellReselectionPriority,
  cellReselectionSubPriority CellReselectionSubPriority
}
    InterFreqCellPriorityInfo ::= SEQUENCE {
      physCellId                  PhysCellId,
      c1       CHOICE {
        freqPriorityEUTRA        FreqPriorityEUTRA,
        freqPriorityNR         FreqPriorityNR
      }
```

TABLE 23B-continued

```
}
FreqPriorityInfo ::= SEQUENCE {
  c1      CHOICE {
    freqPriorityEUTRA        FreqPriorityEUTRA,
    freqPriorityNR           FreqPriorityNR
  }
}
```

FIG. 50 is a flow chart showing example representative steps or acts performed by a wireless terminal such as wireless terminal 30(47) of FIG. 47, e.g., a UE, of the example embodiment and mode of FIG. 47-FIG. 51.

Act 50-1 comprises transmitting a request message 47-1, such as a registration request message, comprising one or more identifiers of requested network slices. The request message may be received by an access node such as access node 28(47) FIG. 47, e.g., a gNB, and may be transferred to a management entity such as management entity 26(43) of FIG. 47, e.g., an AMF of a core network. The one or more identifiers may be S-NSSAIs included in a Requested NSSAI.

Act 50-2 comprises receiving, in response to the request message 47-1, a response message 47-2, such as a registration accept message, comprising one or more tracking area identities as a registration area (RA) and one or more network slice identifiers indicating allowed network slices in the RA. The response message 47-2 may have been originated by the management entity 26(43) and transferred to access node 28(47). The one or more network slice identifiers may be S-NSSAIs included in an Allowed NSSAI.

Act 50-3 comprises receiving a dedicated network slice information message 47-3, such as a dedicated Radio Resource Control (RRC) message, comprising dedicated network slice-related information. The dedicated network slice information message 47-3 may be an RRCRelease message. The dedicated network slice-related information may be associated with the allowed network slices, e.g., Allowed NSSAI, and may be used to perform a cell reselection procedure to reselect a cell within the RA. The dedicated network slice-related information may indicate priority information for each of the allowed network slices. In some configurations, the priority information for each of the allowed network slices comprises at least one prioritized list of cell identities. Alternatively or additionally, the priority information for each of the allowed network slices comprises at least one prioritized list of radio frequencies. The dedicated network slice-related information may be associated with a timer and may be discarded upon the timer expires.

Act 50-4 comprises discarding, upon entering a cell not belonging to the RA, the dedicated network slice-related information. In a case that the wireless terminal has valid common network slice-related information obtained from the cell not belonging to the RA or another cell belonging to the RA, the wireless may perform a cell reselection procedure based on the common network slice-related information, followed by a registration procedure for a new RA. The common network slice-related information may be broadcasted by system information and may indicate a network slice(s) supported in a serving cell and/or a neighboring cell(s). Additionally the common network slice-related information may indicate priority information for the one or more network slices.

FIG. 51 is a flow chart showing example representative steps or acts performed by an access node such as access node 28(47) of FIG. 47, e.g., gNB, of the example embodiment and mode of FIG. 47-FIG. 51.

Act 51-1 comprises receiving a request message 47-1, such as a registration request message, comprising one or more identifiers of requested network slices. The received registration request message may be transferred to a management entity such as management entity 26(43) of FIG. 47, e.g., an AMF, of a core network. The one or more identifiers may be S-NSSAIs included in a Requested NSSAI.

Act 51-2 comprises transmitting, in response to the request message 47-1, a response message 47-2, such as a registration accept message, comprising one or more tracking area identities as a registration area (RA) and one or more network slice identifiers indicating allowed network slices in the RA. The registration accept message may have been originated by the management entity 26(43) and transferred to the access node 28(47). The one or more network slice identifiers may be S-NSSAIs included in an Allowed NSSAI.

Act 51-3 comprises transmitting a dedicated network slice information message 47-3, such as a dedicated Radio Resource Control (RRC) message, comprising dedicated network slice-related information. The dedicated network slice information message 47-3 may be an RRCRelease message. The dedicated network slice-related information may be associated with the allowed network slices, e.g., Allowed NSSAI, and may be used by the wireless terminal to perform a cell reselection procedure to reselect a cell within the RA. The dedicated network slice-related information may indicate priority information for each of the allowed network slices. In some configurations, the priority information for each of the allowed network slices comprises at least one prioritized list of cell identities. Alternatively or additionally, the priority information for each of the allowed network slices comprises at least one prioritized list of radio frequencies. The dedicated network slice-related information may be associated with a timer. The dedicated network slice-related information may be discarded by the wireless terminal (1) upon the timer expires or (2) the wireless terminal entering a cell not belonging to the RA. The access node may further transmit common network slice-related information via system information broadcast, which may be used by the wireless terminal for a cell reselection procedure, upon or after the dedicated network slice-related information is discarded.

11.0 Further Considerations

Thus in one of its example aspects the technology disclosed herein involves methods for supporting network slicing in a radio access network (RAN), including but not limited to the following:

The UE performs a cell selection/reselection procedure based on network slice band association information.

The network slice band association information comprises a list of network slice identifiers, where each of some of the network slice identifiers is associated with a corresponding radio band(s).

The network slice band association is pre-configured, or configured by RRC signaling and/or NAS signaling.

The UE receives, from a cell, network slice cell barring information that comprises a list of network slice identifiers (S-NSSAIs) for which the cell is barred.

The UE performs a registration procedure to a core network in a case that the UE does not know an S-NSSAI valid in a serving PLMN.

The network slice band association is associated with one or more area scope indications. Each of the one or more area scope indications indicates an area where an association of a radio band(s) with a network slice is effective/valid.

The network configures network slice coverage area configurations. Each of the network slice coverage area configuration indicates an area where a network slice is supported/available.

The UE stays on a current radio band in a case that a desired network slice(s) is supported on the current radio band.

The UE initiates a cell reselection procedure to select a cell on a different radio band suggested by the network slice band association information, in a case that a desired network slice(s) is not supported on a current radio band but is supported on the different radio band.

The UE initiates a PLMN selection to select a PLMN different from a currently serving PLMN, in a case that a desired network slice(s) is not supported in any radio bands for a currently serving PLMN.

Network slice information is broadcasted in minimum system information (SI) and one or more other system information blocks (SIBs). The minimum SI comprises information indicating network slices supported in a serving cell, whereas the other SIBs comprise information indicating network slices supported in neighboring cells. A wireless terminal utilizes the information in the minimum SI to perform a cell selection procedure, and the information in the other SIBs to perform a cell reselection procedure.

The network slice information further comprises priority information indicating priorities of neighboring cells, each of the priorities being associated with a designated network slice(s). A wireless terminal utilizes the priority information during a cell reselection procedure.

In example embodiment and modes, dedicated network slice-related information is provided to the UE via an RRC dedicated signaling. The dedicated network slice-related information is valid within the current registration area, overrides common network slice-related information broadcasted by system information, and is discarded when the UE moves outside of the registration area.

It should be understood that the various foregoing example embodiments and modes may be utilized in conjunction with one or more example embodiments and modes described herein. For example, the example embodiment and mode of FIG. 47-FIG. 51 may be utilized in combination with one or more other example embodiments and modes disclosed herein.

Figure 52:
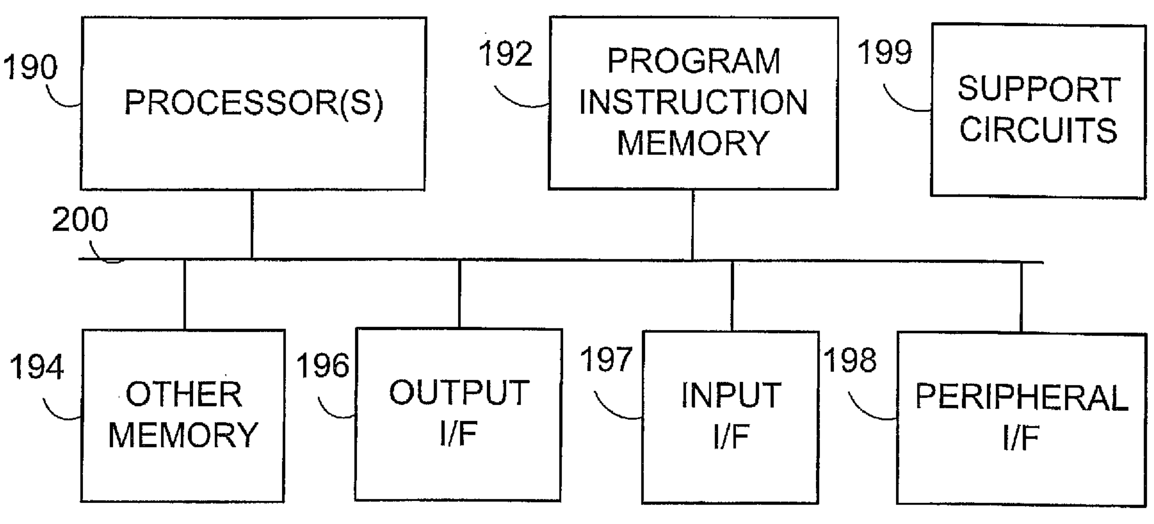
FIG. 52 is a diagrammatic view showing example elements comprising electronic machinery which may comprise a wireless terminal, a radio access node, and a core network node according to an example embodiment and mode.
Figure 53:
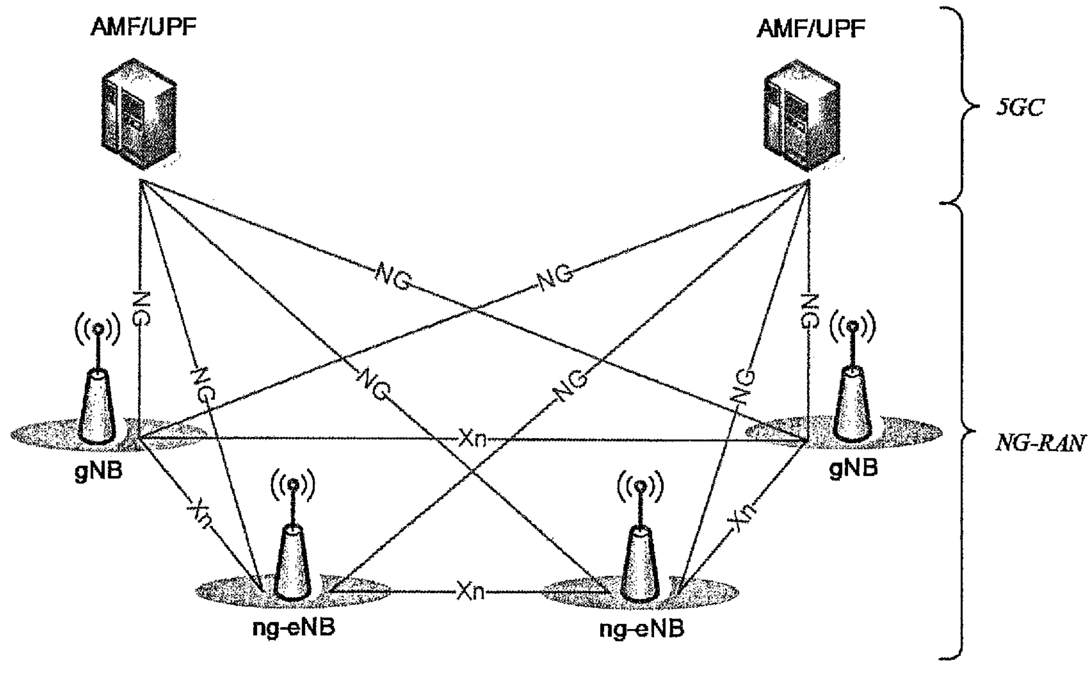
FIG. 53 is a diagrammatic view of overall architecture for a 5G New Radio system.

Certain units and functionalities of the systems 20 may be implemented by electronic machinery. For example, electronic machinery may refer to the processor circuitry described herein, such as terminal processor circuitries 50, node processor circuitries 70, and core network entity processor circuitries 80. Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites. With these understandings, FIG. 52 shows an example of electronic machinery, e.g., processor circuitry, as comprising one or more processors 190, program instruction memory 192; other memory 194 (e.g., RAM, cache, etc.); input/output interfaces 196 and 197, peripheral interfaces 198; support circuits 199; and busses 200 for communication between the aforementioned units. The processor(s) 190 may comprise the processor circuitries described herein, for example, terminal processor circuitries 50, node processor circuitries 70, and core network entity processor circuitries 80, however suffixed, such as terminal processor circuitry 50(47); node processor circuitry 70(47), and core network entity processor circuitry 80(47).

A memory or register described herein may be depicted by memory 194, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 199 are coupled to the processors 190 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus, machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 30 and Integrated Access and Backhaul (IAB) nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves resource selection and resource utilization in a communications system.

The technology disclosed herein encompasses one or more of the following non-limiting, non-exclusive example embodiments and modes:

Example Embodiment 1: A wireless terminal of a cellular telecommunication network, the cellular telecommunication network supporting one or more network slices, each of the one or more network slices providing a designated service within a public land mobile network (PLMN), the wireless terminal comprising:

transmitter circuitry configured to transmit a registration request message comprising one or more identifiers of requested network slices;

receiver circuitry configured to:

receive, in response to the registration request message, a registration accept message comprising:

one or more tracking area identities as a registration area (RA), and;

one or more network slice identifiers indicating allowed network slices in the RA, and;

receive a dedicated Radio Resource Control (RRC) message comprising dedicated network slice-related information associated with the allowed network slices, the dedicated network slice-related information being used to perform a cell reselection procedure to reselect a cell;

processor circuitry configured to discard, upon entering a cell not belonging to the RA, the dedicated network slice-related information.

Example Embodiment 2: The wireless terminal of Example Embodiment 1, wherein the dedicated network slice-related information indicates priority information for each of the allowed network slices.

Example Embodiment 3: The wireless terminal of Example Embodiment 2, wherein the priority information for each of the allowed network slices comprises at least one prioritized list of cell identities.

Example Embodiment 4: The wireless terminal of Example Embodiment 2, wherein the priority information for each of the allowed network slices comprises at least one prioritized list of radio frequencies.

Example Embodiment 5: The wireless terminal of Example Embodiment 1, wherein the receiver circuitry is further configured to receive system information comprising common network slice-related information, the common network slice-related information being used upon or after the dedicated network slice-related information is discarded.

Example Embodiment 6: The wireless terminal of Example Embodiment 5, wherein the common network slice-related information indicates a network slice(s) supported in a serving cell.

Example Embodiment 7: The wireless terminal of Example Embodiment 5, wherein the common network slice-related information indicates one or more neighboring cells, one or more network slices supported by each of the one or more neighboring cell, and priority information for the one or more network slices.

Example Embodiment 8: The wireless terminal of Example Embodiment 5, wherein a cell reselection is performed based on the common network slice-related information.

Example Embodiment 9: The wireless terminal of Example Embodiment 8, wherein a registration procedure is performed after performing the cell reselection.

Example Embodiment 10: The wireless terminal of Example Embodiment 1, wherein the dedicated network slice-related information is associated with a timer and is discarded upon the timer expires.

Example Embodiment 11: An access node of a cellular telecommunication network, the cellular telecommunication network supporting one or more network slices, each of the one or more network slices providing a designated service within a public land mobile network (PLMN), the access node comprising:

receiver circuitry configured to receive, from a wireless terminal, a registration request message comprising one or more identifiers of requested network slices;

transmitter circuitry configured to:

transmit, in response to the registration request message, a registration accept message comprising:

one or more tracking area identities as a registration area (RA), and;

one or more network slice identifiers indicating allowed network slices in the RA, and;

transmit a dedicated Radio Resource Control (RRC) message comprising dedicated network slice-related information associated with the allowed network slices, the dedicated network slice-related information being used by the wireless terminal to perform a cell reselection procedure to reselect a cell, wherein;

the dedicated network slice-related information is discarded by the wireless terminal upon the wireless terminal entering a cell not belonging to the RA.

Example Embodiment 12: The access node of Example Embodiment 11, wherein the dedicated network slice-related information indicates priority information for each of the allowed network slices.

Example Embodiment 13: The access node of Example Embodiment 12, wherein the priority information for each of the allowed network slices comprises at least one prioritized list of cell identities.

Example Embodiment 14: The access node of Example Embodiment 12, wherein the priority information for each of the allowed network slices comprises at least one prioritized list of radio frequencies.

Example Embodiment 15: The access node of Example Embodiment 11, wherein the transmitter circuitry is further configured to transmit system information comprising common network slice-related information, the common network slice-related information being used by the wireless terminal upon or after the dedicated network slice-related information is discarded.

Example Embodiment 16: The access node of Example Embodiment 15, wherein the common network slice-related information indicates a network slice(s) supported in a serving cell served by the access node.

Example Embodiment 17: The access node of Example Embodiment 15, wherein the common network slice-related information indicates one or more neighboring cells, one or more network slices supported by each of the one or more neighboring cell, and priority information for the one or more network slices.

Example Embodiment 18: The access node of Example Embodiment 15, wherein a cell reselection is performed by the wireless terminal based on the common network slice-related information.

Example Embodiment 19: The access node of Example Embodiment 18, wherein a registration procedure is performed by the wireless terminal after performing the cell reselection.

Example Embodiment 20: The access node of Example Embodiment 11, wherein the dedicated network slice-related information is associated with a timer and is discarded by the wireless terminal upon the timer expires.

Example Embodiment 21: A method for a wireless terminal of a cellular telecommunication network, the cellular telecommunication network supporting one or more network slices, each of the one or more network slices providing a designated service within a public land mobile network (PLMN), the method comprising:

- transmitting a registration request message comprising one or more identifiers of requested network slices;
- receiving, in response to the registration request message, a registration accept message comprising:
- one or more tracking area identities as a registration area (RA), and;
- one or more network slice identifiers indicating allowed network slices in the RA, and;
- receiving a dedicated Radio Resource Control (RRC) message comprising dedicated network slice-related information associated with the allowed network slices, the dedicated network slice-related information being used to perform a cell reselection procedure to reselect a cell;
- discarding, upon entering a cell not belonging to the RA, the dedicated network slice-related information.

Example Embodiment 22: The method of Example Embodiment 21, wherein the dedicated network slice-related information indicates priority information for each of the allowed network slices.

Example Embodiment 23: The method of Example Embodiment 22, wherein the priority information for each of the allowed network slices comprises at least one prioritized list of cell identities.

Example Embodiment 24: The method of Example Embodiment 23, wherein the priority information for each of the allowed network slices comprises at least one prioritized list of radio frequencies.

Example Embodiment 25: The method of Example Embodiment 21, further comprising receiving system information comprising common network slice-related information, the common network slice-related information being used upon or after the dedicated network slice-related information is discarded.

Example Embodiment 26: The method of Example Embodiment 25, wherein the common network slice-related information indicates a network slice(s) supported in a serving cell.

Example Embodiment 27: The method of Example Embodiment 25, wherein the common network slice-related information indicates one or more neighboring cells, one or more network slices supported by each of the one or more neighboring cell, and priority information for the one or more network slices.

Example Embodiment 28: The method of Example Embodiment 25, wherein a cell reselection is performed based on the common network slice-related information.

Example Embodiment 29: The method of Example Embodiment 28, wherein a registration procedure is performed after performing the cell reselection.

Example Embodiment 30: The method of Example Embodiment 21, wherein the dedicated network slice-related information is associated with a timer and is discarded upon the timer expires.

Example Embodiment 31: A method for an access node of a cellular telecommunication network, the cellular telecommunication network supporting one or more network slices, each of the one or more network slices providing a designated service within a public land mobile network (PLMN), the method comprising:

- receiving, from a wireless terminal, a registration request message comprising one or more identifiers of requested network slices;
- transmitting, in response to the registration request message, a registration accept message comprising:
- one or more tracking area identities as a registration area (RA), and;
- one or more network slice identifiers indicating allowed network slices in the RA, and;
- transmitting a dedicated Radio Resource Control (RRC) message comprising dedicated network slice-related information associated with the allowed network slices, the dedicated network slice-related information being used by the wireless terminal to perform a cell reselection procedure to reselect a cell, wherein;
- the dedicated network slice-related information is discarded by the wireless terminal upon the wireless terminal entering a cell not belonging to the RA.

Example Embodiment 32: The method of Example Embodiment 31, wherein the dedicated network slice-related information indicates priority information for each of the allowed network slices.

Example Embodiment 33: The method of Example Embodiment 32, wherein the priority information for each of the allowed network slices comprises at least one prioritized list of cell identities.

Example Embodiment 34: The method of Example Embodiment 32, wherein the priority information for each of the allowed network slices comprises at least one prioritized list of radio frequencies.

Example Embodiment 35: The method of Example Embodiment 31, further comprising transmitting system information comprising common network slice-related information, the common network slice-related information being used by the wireless terminal upon or after the dedicated network slice-related information is discarded.

Example Embodiment 36: The method of Example Embodiment 35, wherein the common network slice-related information indicates a network slice(s) supported in a serving cell served by the access node.

Example Embodiment 37: The method of Example Embodiment 35, wherein the common network slice-related information indicates one or more neighboring cells, one or more network slices supported by each of the one or more neighboring cell, and priority information for the one or more network slices.

Example Embodiment 38: The method of Example Embodiment 35, wherein a cell reselection is performed by the wireless terminal based on the common network slice-related information.

Example Embodiment 39: The method of Example Embodiment 38, wherein a registration procedure is performed by the wireless terminal after performing the cell reselection.

Example Embodiment 40: The method of Example Embodiment 31, wherein the dedicated network slice-related information is associated with a timer and is discarded by the wireless terminal upon the timer expires.

One or more of the following documents may be pertinent to the technology disclosed herein (all of which are incorporated herein by reference in their entirety):

3GPP TS 38.300 v16.1.0
3GPP TS 38.304 v16.1.0
3GPP TS 38.331 v16.1.0
3GPP TS 23.501 v16.4.0
3GPP TS 24,501 v16.4.1
3GPP TR 23.740 v16.0.0
R2-2102696 Slice specific cell reselection, Qualcomm Incorporated
R2-2102762 Considerations on slice based cell reselection, Beijing Xiaomi Software Tech
R2-2102773 Considerations on contents of slice based reselection, KDDI Corporation
R2-2102831 slice specific cell reselection, Intel Corporation
R2-2102988 Considerations on slice-based cell reselection, Lenovo, Motorola Mobility
R2-2103159 Discussion on slice based cell reselection, China Telecommunication
R2-2103213 Consideration on slice-specific cell reselection, OPPO
R2-2103239 Discussion on slice based cell reselection, Spreadtrum Communications
R2-2103269 Cell (re)selection for RAN slicing, Asia Pacific Telecom co. Ltd, FGI
R2-2103375 Slice based cell reselection, vivo
R2-2103589 Slice based Cell Reselection, Sony Europe B.V.
R2-2103621 Discussion on slice based cell reselection, LG Electronics UK
R2-2103646 On solution for RAN slicing enhancement, Ericsson
R2-2103668 Slice-based cell reselection information, Nokia, Nokia Shanghai Bell
R2-2103695 Discussion on slice based cell reselection, CMCC
R2-2103745 Slice-specific system information for cell reselection, Google Inc.
R2-2103881 Discussion on slice based cell reselection, Apple
R2-2103961 System information contents for slice-aware cell reselection, Sharp
R2-2104004 Discussion on slice based cell reselection under network control, Huawei, HiSilicon
R2-2104032 Discussion on slice based Cell Reselection, CATT
R2-2104063 Discussion on slice-aware cell reselection, ZTE corporation, Sanechips
R2-2104176 Discussion on slice based cell reselection, Samsung Electronics Co., Ltd
R2-2104321 Summary of [AT113bis-e][251][NR] Slice-specific cell reselection, Intel Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

CROSS REFERENCE

This Nonprovisional application claims priority under 35 U.S.C. § 119 on provisional Application No. 63/184,722 on May 5, 2021, the entire contents of which are hereby incorporated by reference.

What is claimed is:

1. A wireless terminal in a cellular telecommunication network, the cellular telecommunication network supporting one or more network slices, each of the one or more network slices providing a designated service, the wireless terminal comprising:

receiver circuitry configured to receive a dedicated Radio Resource Control (RRC) message comprising dedicated network slice-related frequency priority information associated with the one or more network slices; and processor circuitry configured to perform a cell reselection procedure based on the dedicated network slice-related frequency priority information, wherein:

in a case that the wireless terminal has received common network slice-related frequency priority information broadcasted by system information, the dedicated network slice-related frequency priority information overrides the common network slice-related frequency priority information.

2. The wireless terminal of claim 1, wherein the dedicated network slice-related frequency priority information comprises at least one prioritized list of radio frequencies.

3. An access node in a cellular telecommunication network, the cellular telecommunication network supporting one or more network slices, each of the one or more network slices providing a designated service, the access node comprising:

transmitter circuitry configured to transmit a dedicated Radio Resource Control (RRC) message comprising dedicated network slice-related frequency priority information associated with the one or more network slices, wherein:

the dedicated network slice-related frequency priority information is used by a wireless terminal to perform a cell reselection procedure, and in a case that the wireless terminal has received common network slice-related frequency priority information broadcasted by system information, the dedicated network slice-related frequency priority information overrides the common network slice-related frequency priority information.

4. The access node of claim 3, wherein the dedicated network slice-related priority information comprises at least one prioritized list of radio frequencies.

5. A method performed by a wireless terminal in a cellular telecommunication network, the cellular telecommunication network supporting one or more network slices, each of the one or more network slices providing a designated service, the method comprising:

receiving a dedicated Radio Resource Control (RRC) message comprising dedicated network slice-related frequency priority information associated with the one or more network slices; and performing a cell reselection procedure based on the dedicated network slice-related frequency priority information, wherein:

in a case that the wireless terminal has received common network slice-related frequency priority information broadcasted by system information, the dedicated network slice-related frequency priority information overrides the common network slice-related frequency priority information.

* * * * *